United States Patent [19]

Meagher

[11] Patent Number: 4,694,404
[45] Date of Patent: Sep. 15, 1987

[54] HIGH-SPEED IMAGE GENERATION OF COMPLEX SOLID OBJECTS USING OCTREE ENCODING

[75] Inventor: Donald J. R. Meagher, Loudonville, N.Y.

[73] Assignee: Key Bank N.A., Albany, N.Y.

[21] Appl. No.: 570,287

[22] Filed: Jan. 12, 1984

[51] Int. Cl.[4] .................... G06F 15/62; G09G 1/14
[52] U.S. Cl. ................................ 364/518; 364/521; 340/729; 340/747
[58] Field of Search .................. 340/728, 729, 747; 364/518, 521, 519, 520, 522

[56] References Cited

U.S. PATENT DOCUMENTS

| | | | |
|---|---|---|---|
| 3,602,702 | 8/1971 | Warnock | 364/522 |
| 4,384,286 | 5/1983 | DiToro | 364/521 |
| 4,463,380 | 7/1984 | Hooks, Jr. | 364/522 |

OTHER PUBLICATIONS

Samet, Hanan "Computing Perimeters of Regions in Images Represented by Quadtrees", *IEEE Transactions on Pattern Analysis and Machine Intelligence*, vol. PAMI-3, No. 6, Nov. 1981, pp. 683-687.
Wu et al., "Threshold Selection using Quadtrees", *IEEE Transactions on Pattern Analysis and Machine Intelligence*, vol. PAMI-4, No. 1, Jan. 1982, pp. 90-94.
Gargantini, Irene, "Linear Octtrees for Fast Processing of Three-Dimensional Objects", *Computer Graphics and Image Processing*, vol. 20, No. 4, Dec. 1982, pp. 365-374.
Jackins et al, "Oct-Trees and Their Use in Representing Three-Dimensional Objects", Computer Graphics and Image Processing, vol. 14, pp. 249-270, 1980.
IPL-TR-032, "The Octree Encoding Method for Efficient Solid Modeling" by Donald J. R. Meagher, *Image Processing Laboratory*, Electrical and Systems Engineering Department, Rensselaer Polytechnic Institute, Troy, New York (Aug. 1982).
"Efficient Synthetic Image Generation of Arbitrary 3-D Objects" by Donald J. R. Meagher, *Proceedings of the IEEE Computer Society Conference on Pattern Recognition and Image Processing*, (Jun. 1982).
"Geometric Modeling Using Octree Encoding", by Donald J. R. Meagher, *Computer Graphics and Image Processing* 19, 129-147, (1982).
IPL-TR-80-111 "Octree Encoding: A New Technique for the Representation, Manipulation and Display of Arbitrary 3-D Objects by Computer" by Donald J. R. Meagher, *Image Processing Laboratory*, Electrical and Systems Engineering Department, Rensselaer Polytechnic Institute, Troy, New York, (Oct. 1980).

(List continued on next page.)

Primary Examiner—Errol A. Krass
Assistant Examiner—Joseph L. Dixon
Attorney, Agent, or Firm—Nixon & Vanderhye

[57] ABSTRACT

To generate two-dimensional images of three-dimensional solid objects at high speed, an object is defined within a three-dimensional universe hierarchically subdivided into a plurality of discrete volumes of uniform size and similar orientation. The three-dimensional universe is represented by an octree structure having a plurality of nodes, one for every volume in the three-dimensional universe which is at least partially occupied by the object. An arbitrary point of view is selected. Nodes in the tree structure representing the three-dimensional universe are visited in a sequence determined by the selected point of view so that nodes corresponding to volumes which are unobstructed by other volumes are visited first. Each visited node contained by the object is projected onto a subdivided view plane organized into a hierarchy of discrete areas. Areas of the view plane enclosed by the projection are painted onto a display screen. View plane areas which intersect but are not enclosed by the projection are further subdivided. To create sectional views, a user may define a region of the three-dimensional universe, and volumes outside of that region are not projected. Real time image generation wherein calculations necessary to create the image are performed by hard-wired digital logic elements to increase speed performance is possible.

110 Claims, 104 Drawing Figures

OTHER PUBLICATIONS

IPL-TR-027 "Octree Generation, Analysis and Manipulation", by Donald J. R. Meagher, Image Processing Laboratory, Electrical, Computer, and Systems Engineering Department, Rensselaer Polytechnic Institute, Troy, N.Y., (Apr. 1982).

"Octree-Related Data Structures and Algorithms" by K. Yamaguchi, T. L. Kunii and K. Fujimura, University of Tokyo, H. Toriya, Ricoh Co., Ltd. (Jan. 1984).

"Representation of Three-Dimensional Objects" by D. R. Reddy and S. Rubin, Department of Computer Science, Carnegie-Mellon University (Apr. 1978).

Display Techniques for Octree-Encoded Objects, by Louis J. Doctor, John G. Torborg, Rastar Technologies, Inc., Jul. 1981, IEEE, pp. 29-36.

High Speed Display of 3-D Medical Images Using Octree Encoding, Donald Meagher, Sep. 1981, IPL-TR-021, Images Processing Laboratory.

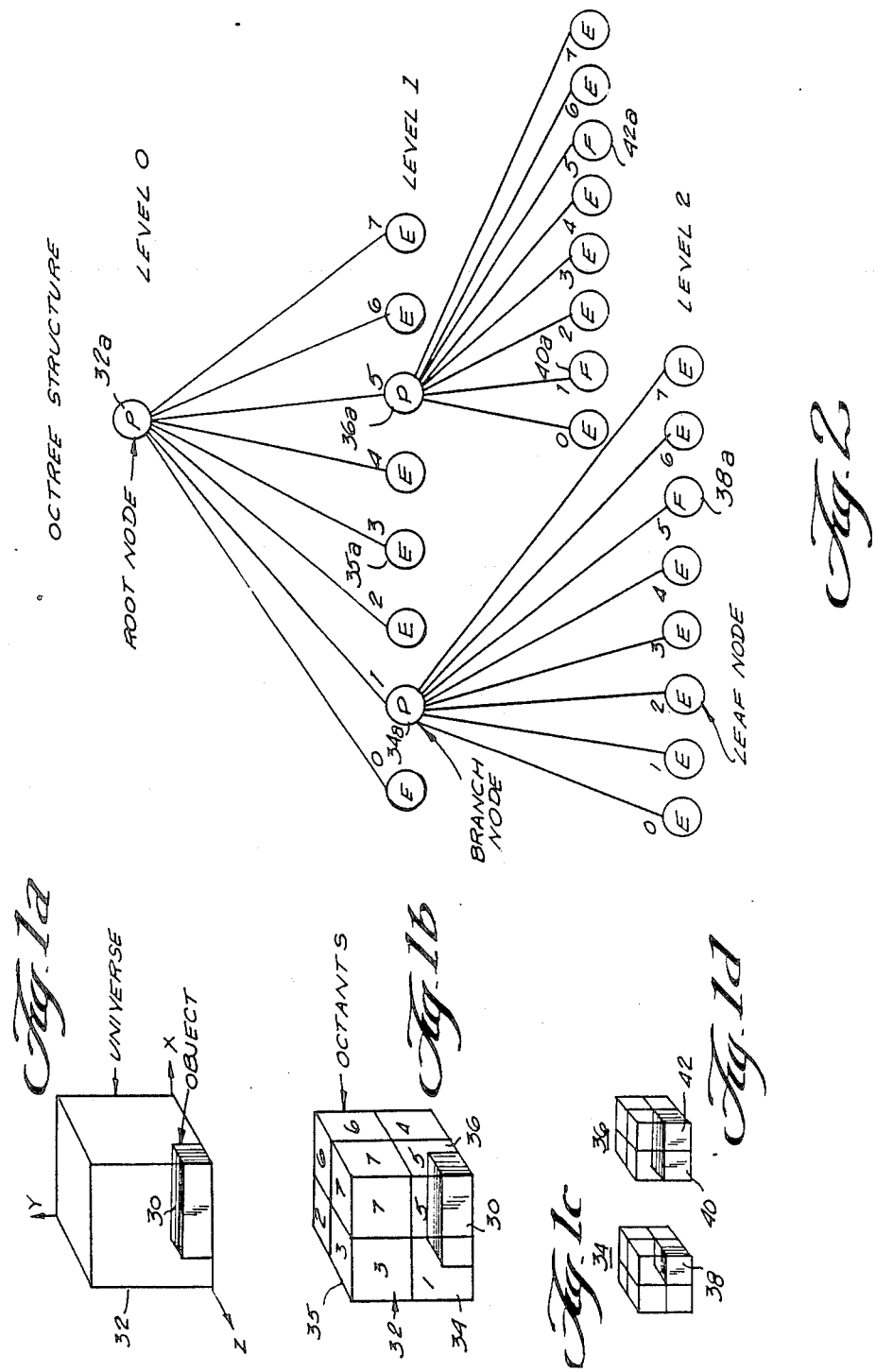

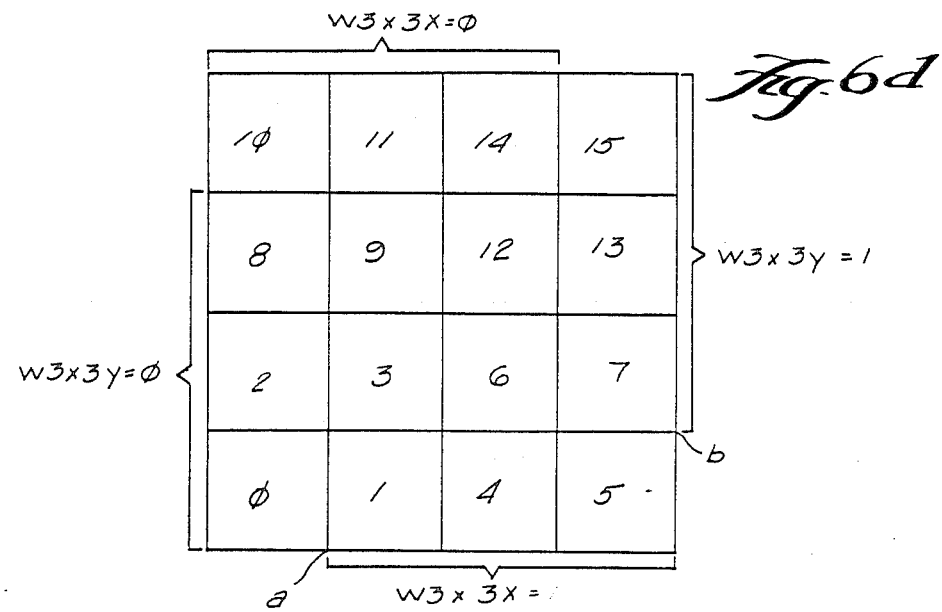
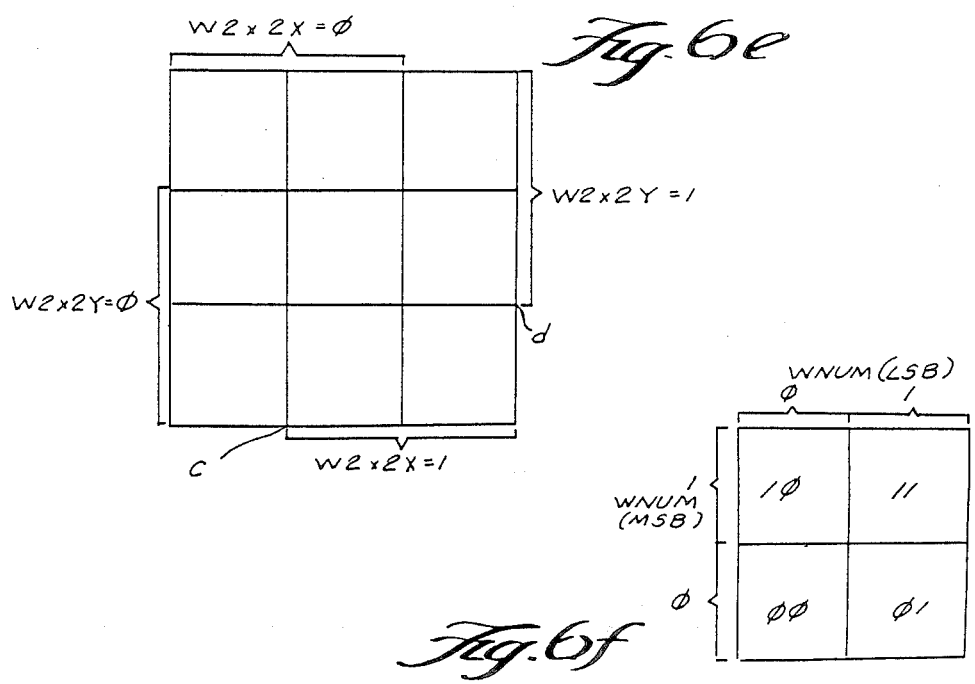

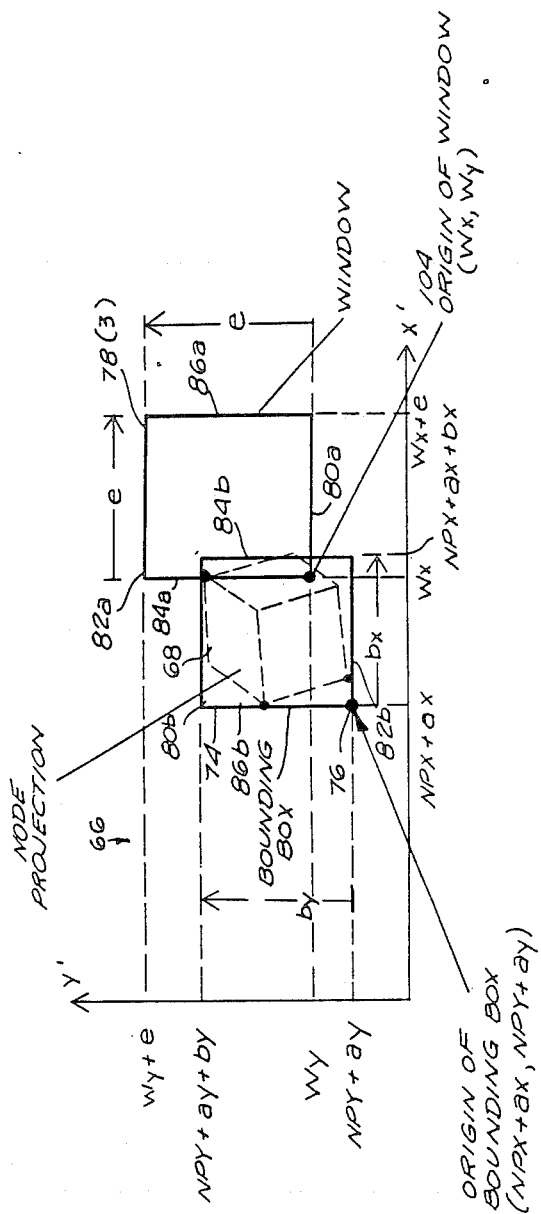

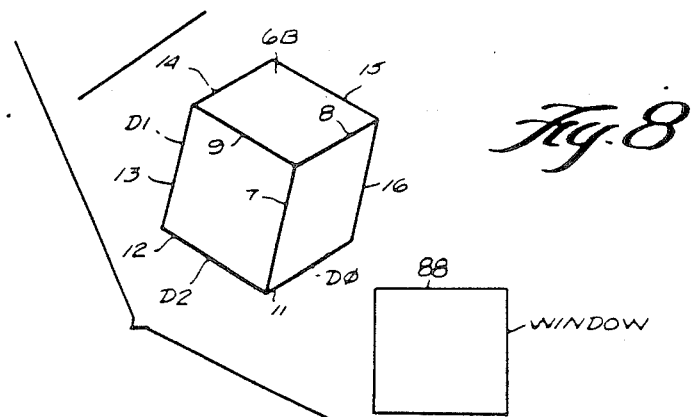
Fig. 8
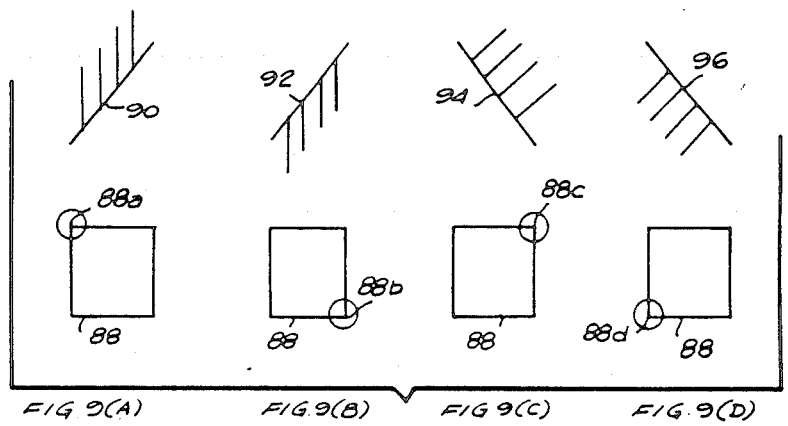
Fig. 9
FIG. 9(A)  FIG.9(B)  FIG 9(C)  FIG.9(D)
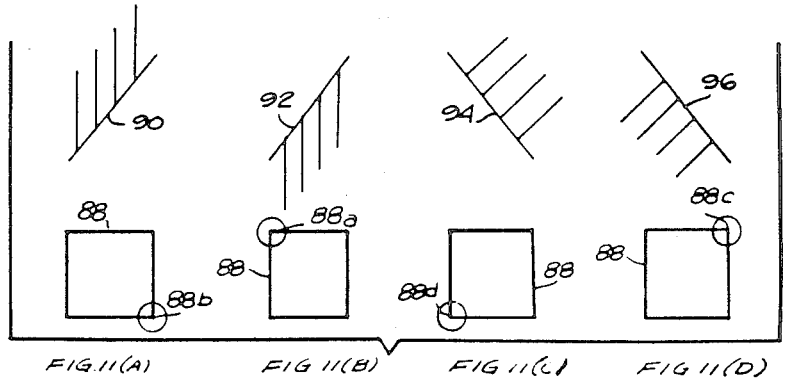
Fig. 11
FIG.11(A)  FIG 11(B)  FIG 11(C)  FIG 11(D)

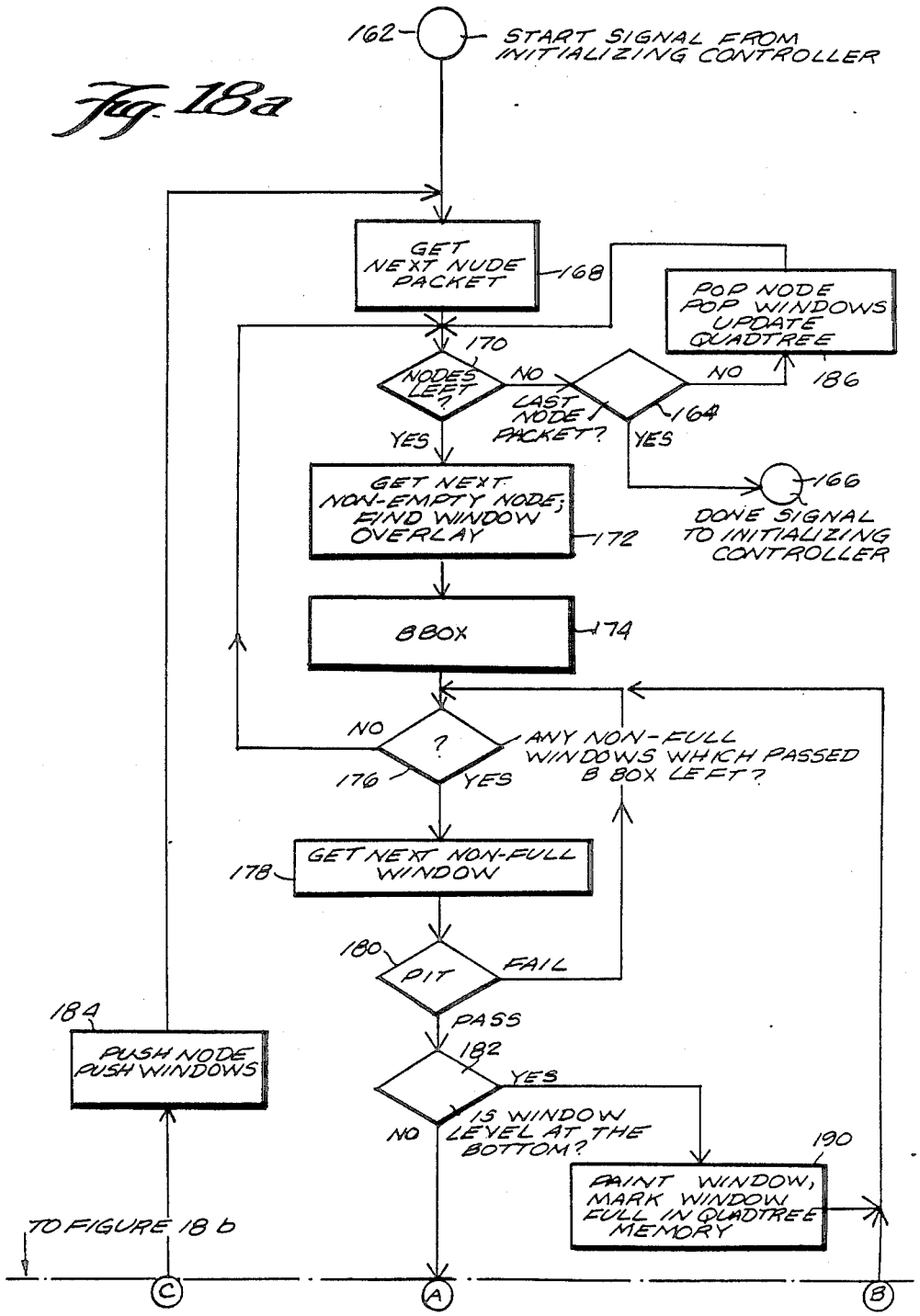

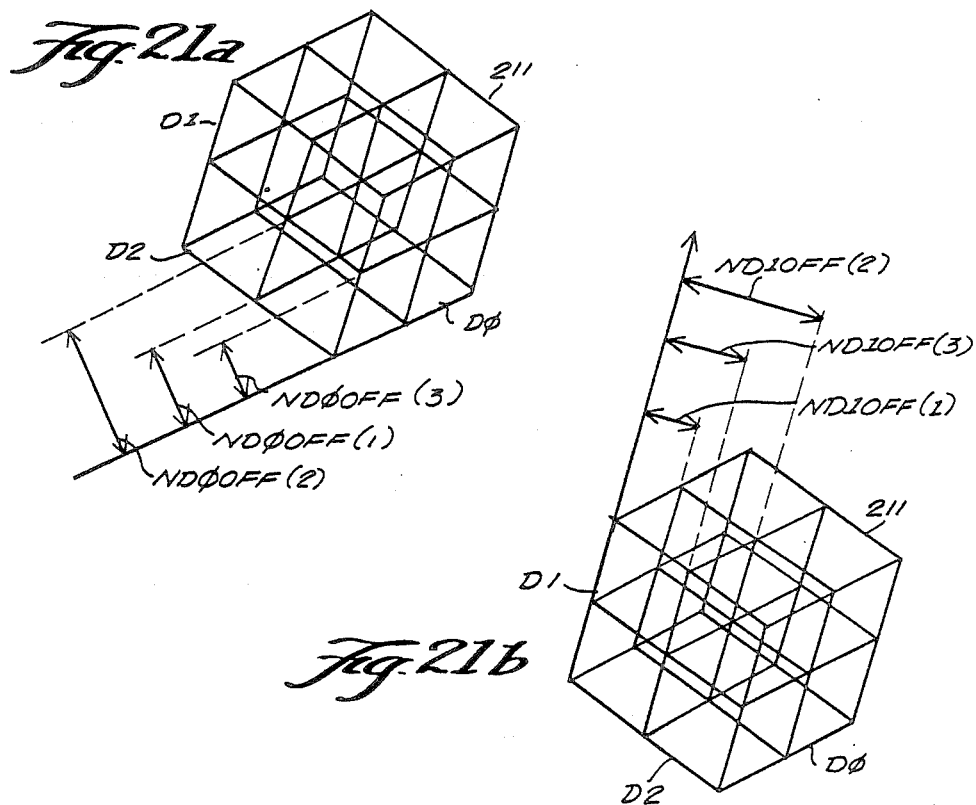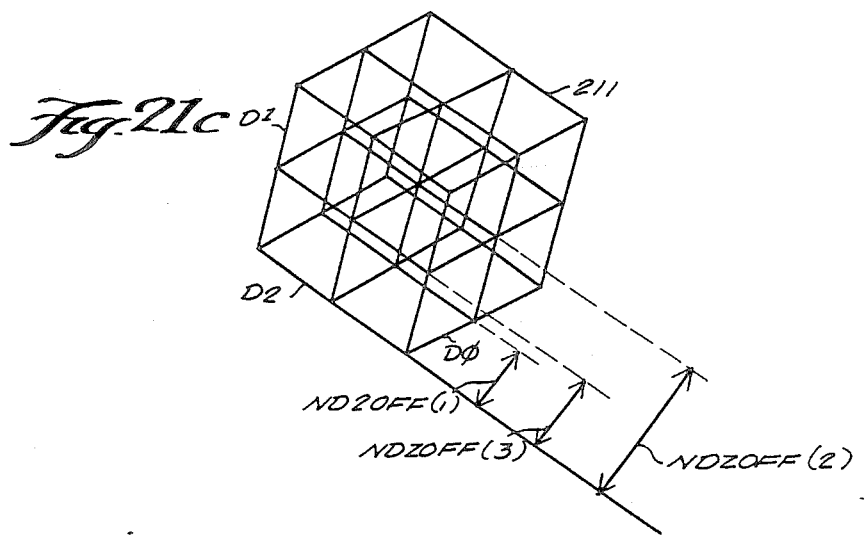

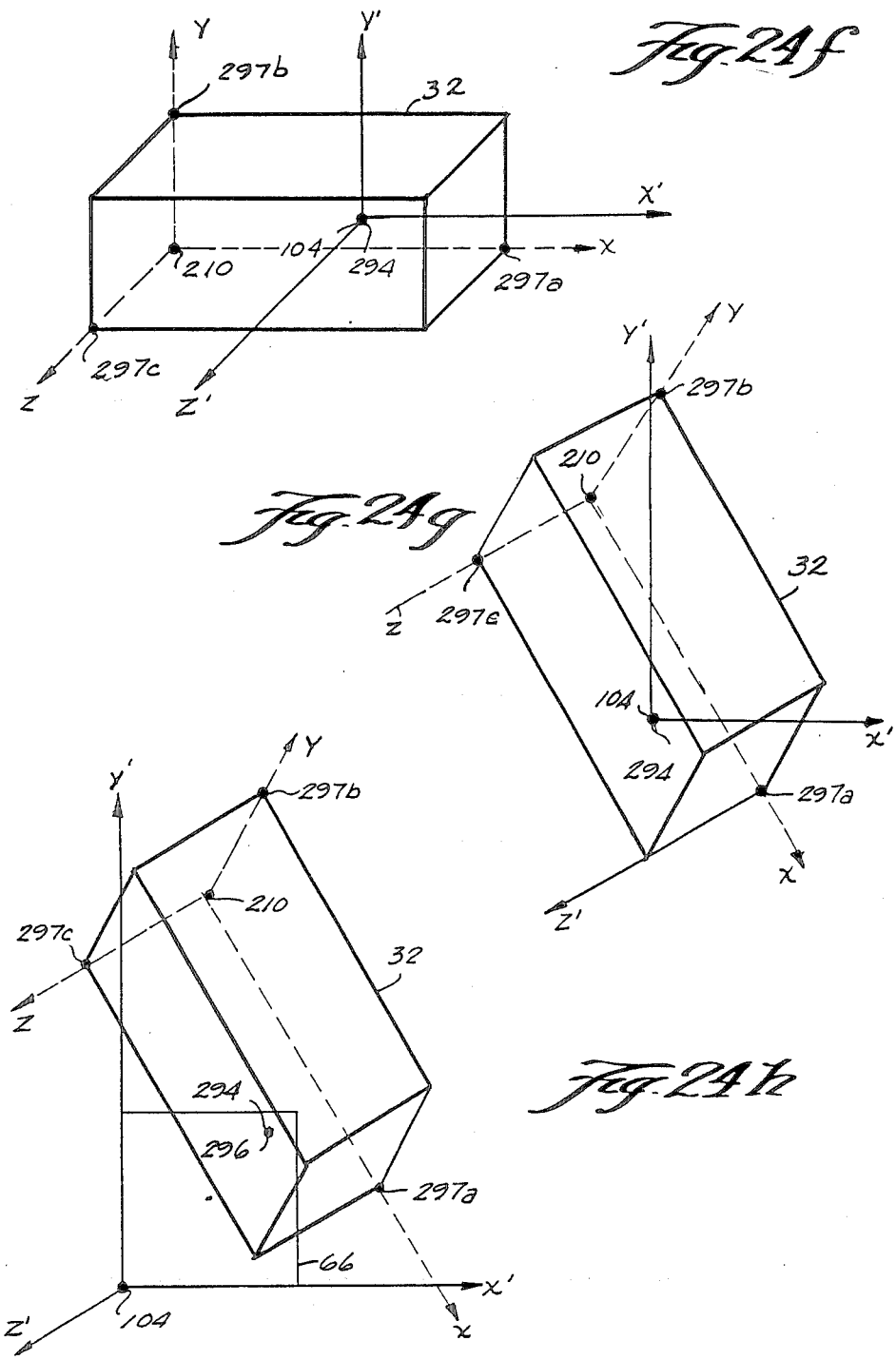

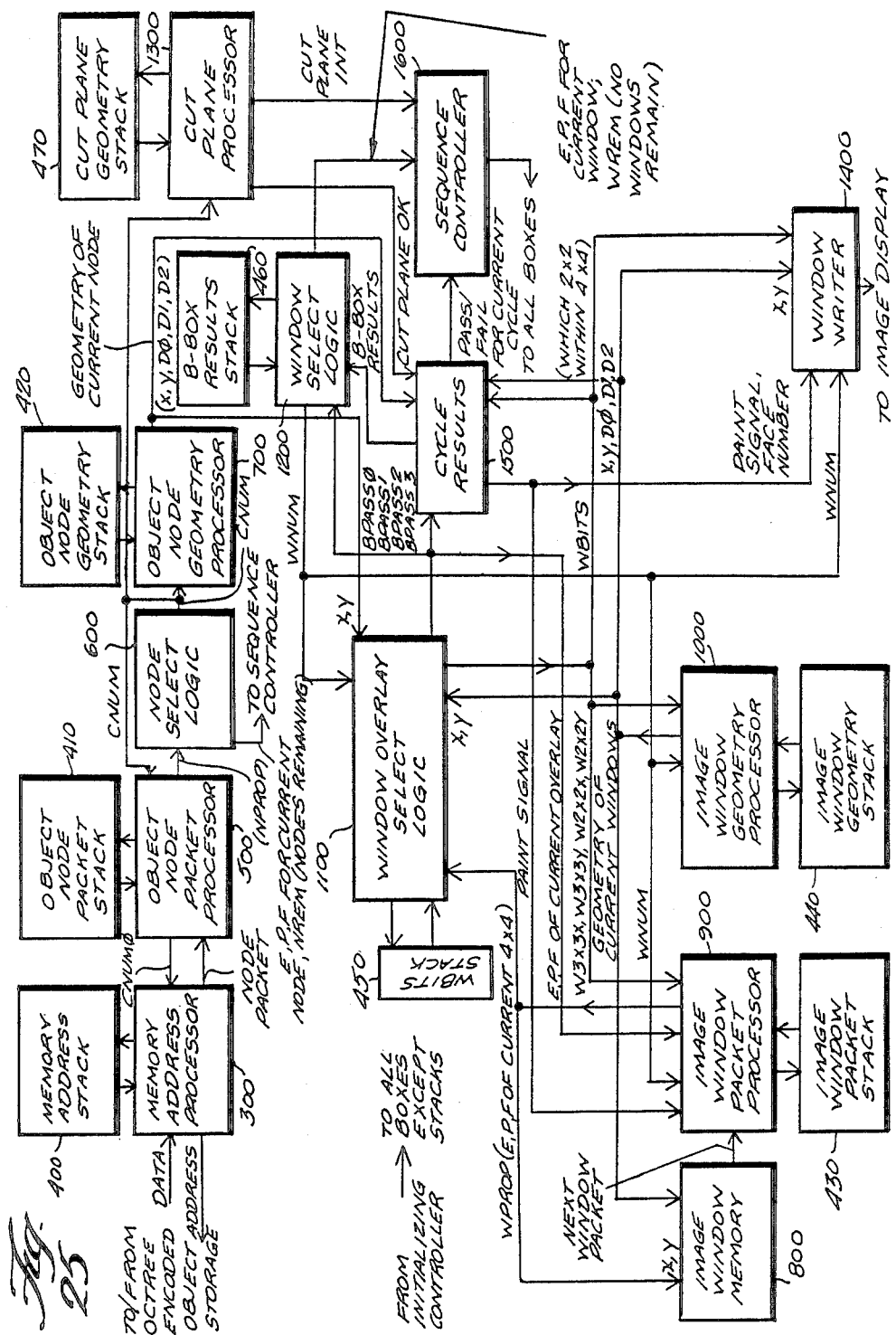

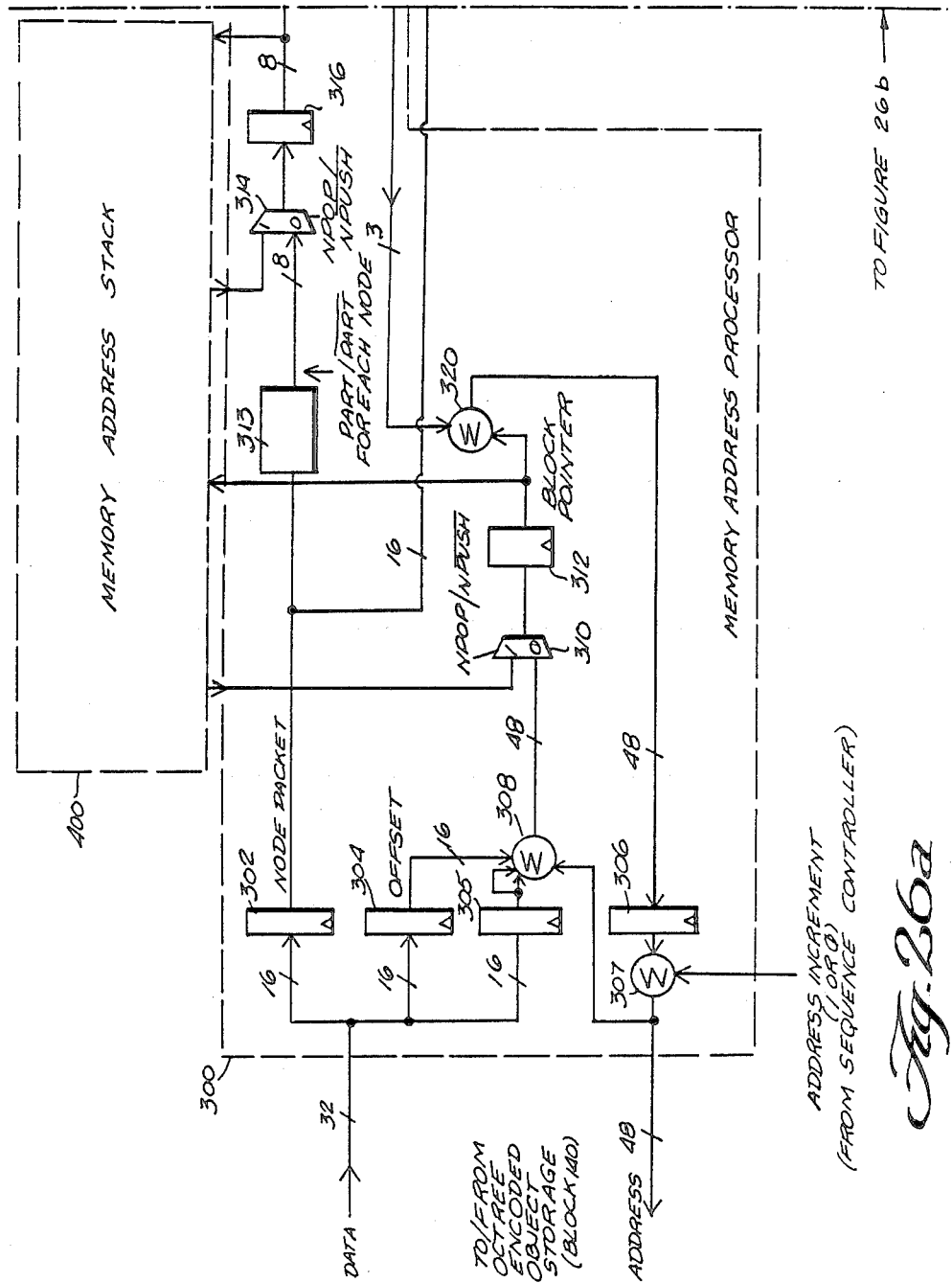

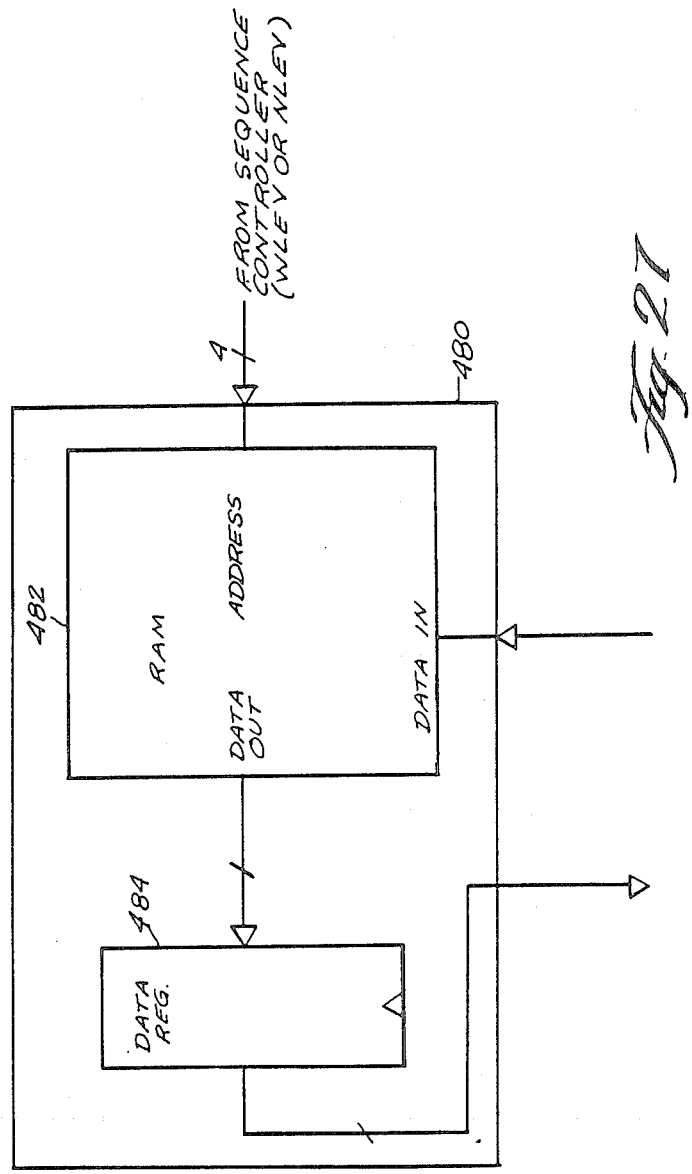

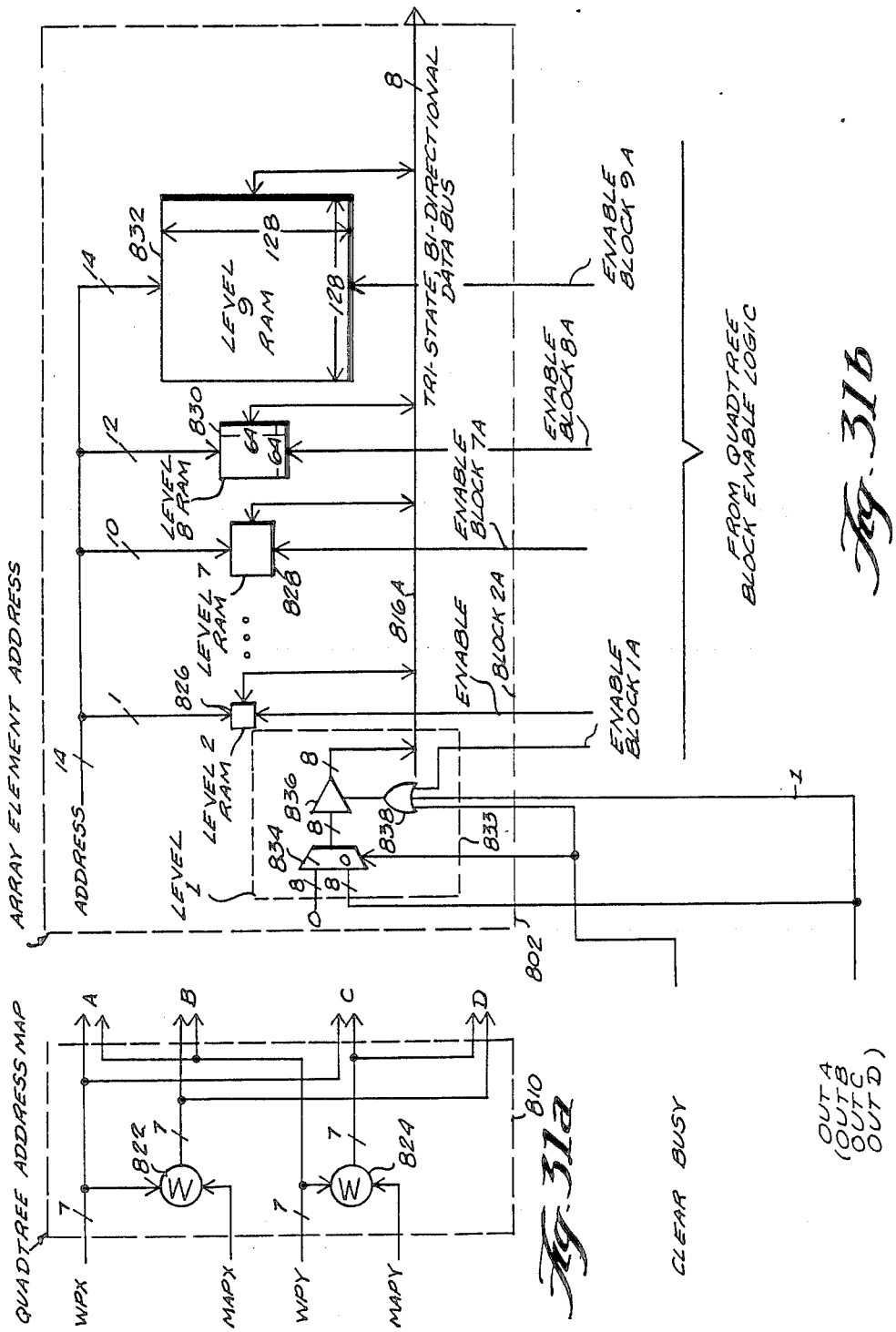

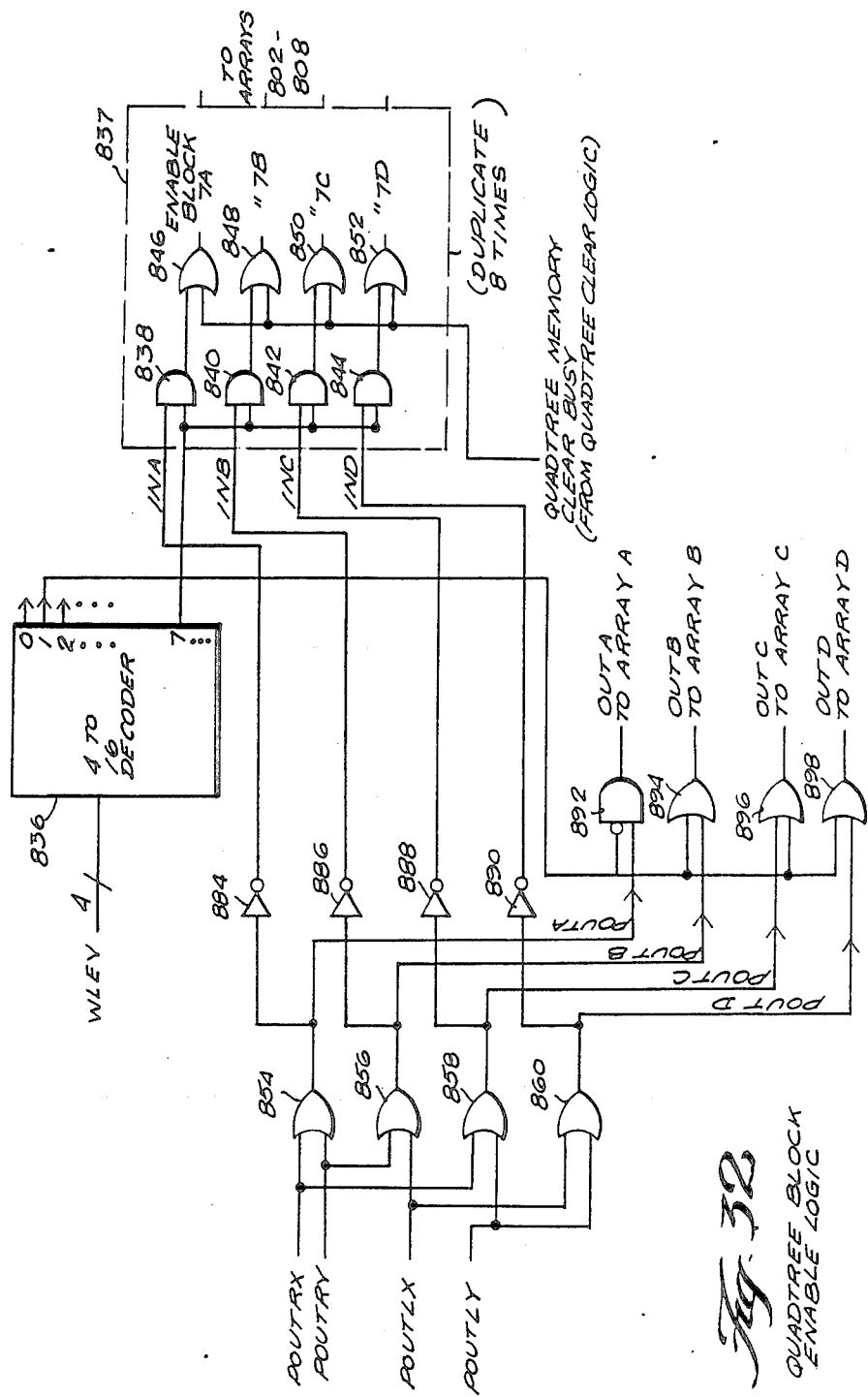
Fig. 32 QUADTREE BLOCK ENABLE LOGIC

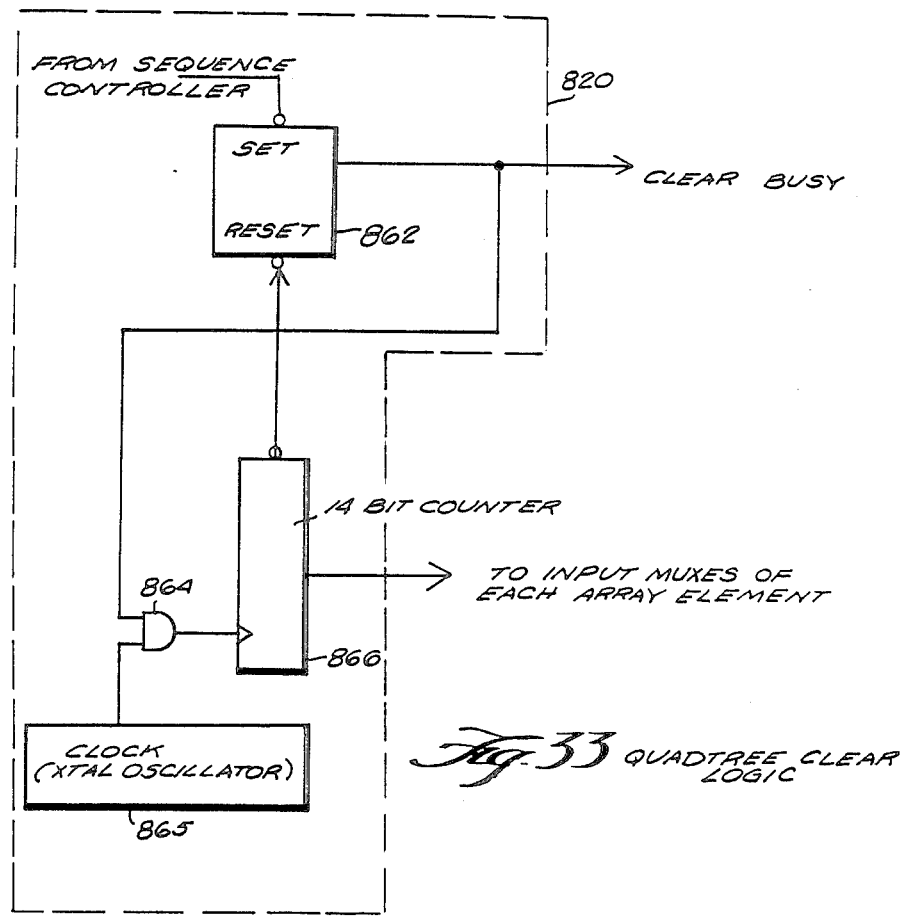

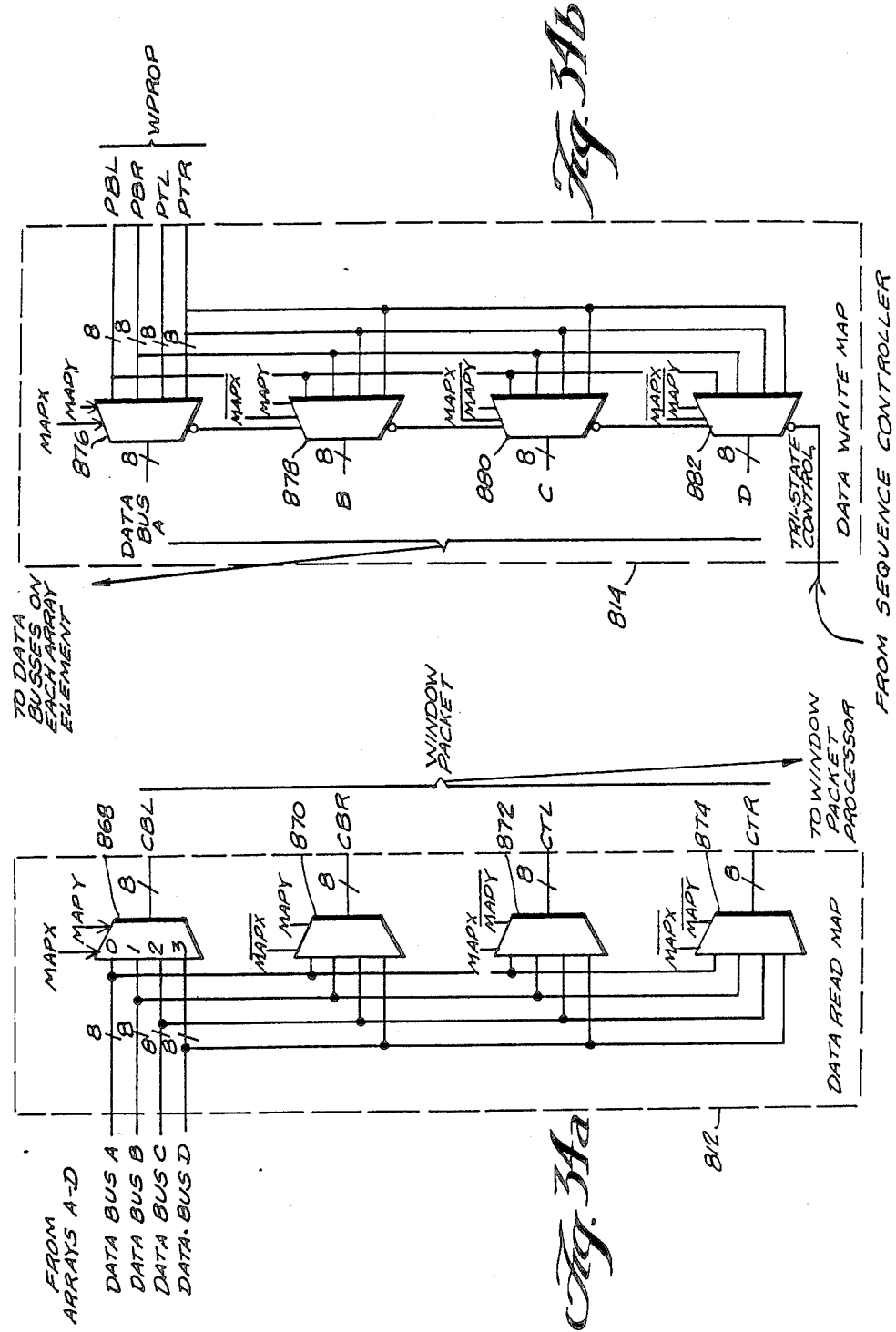

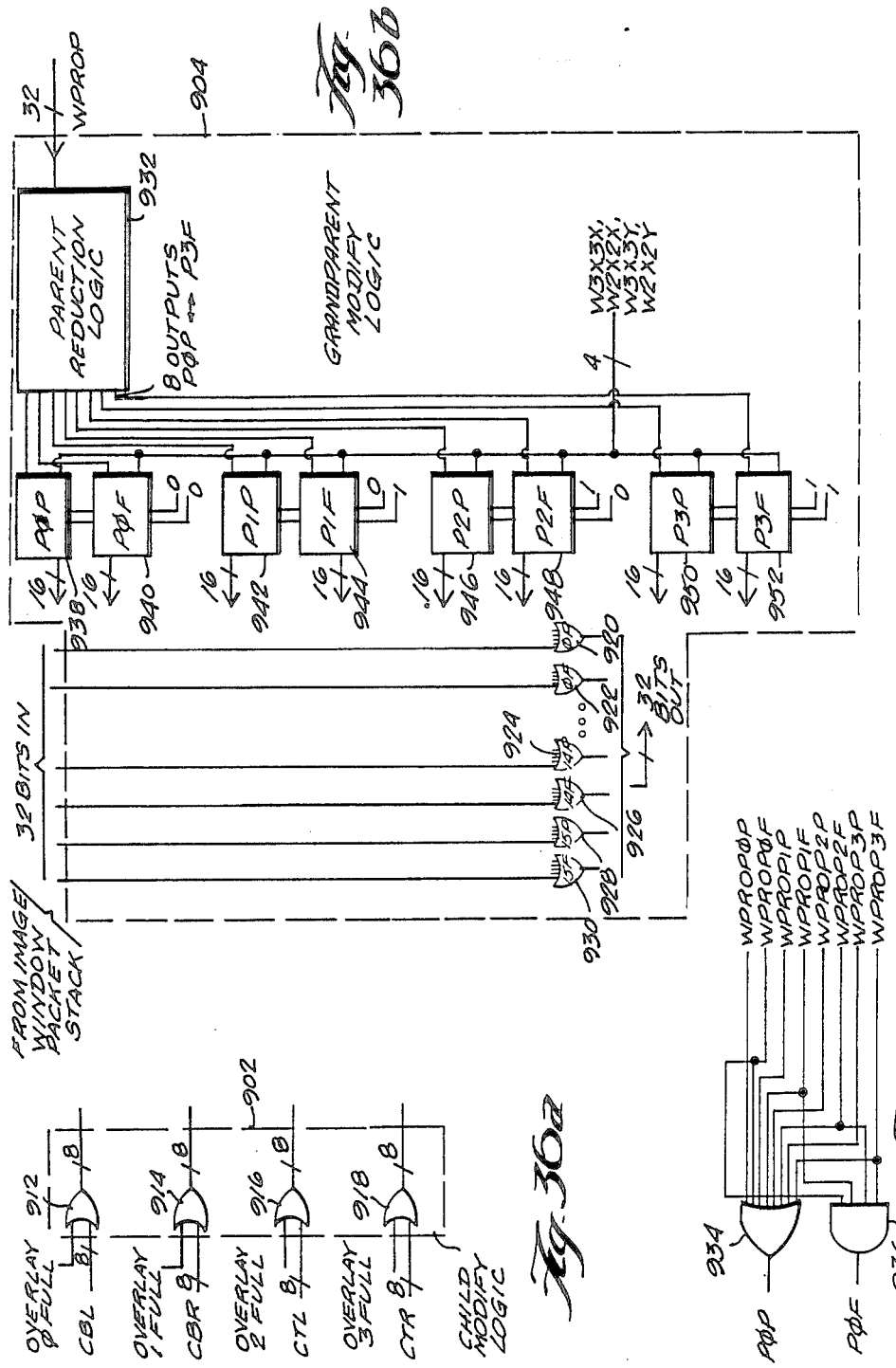

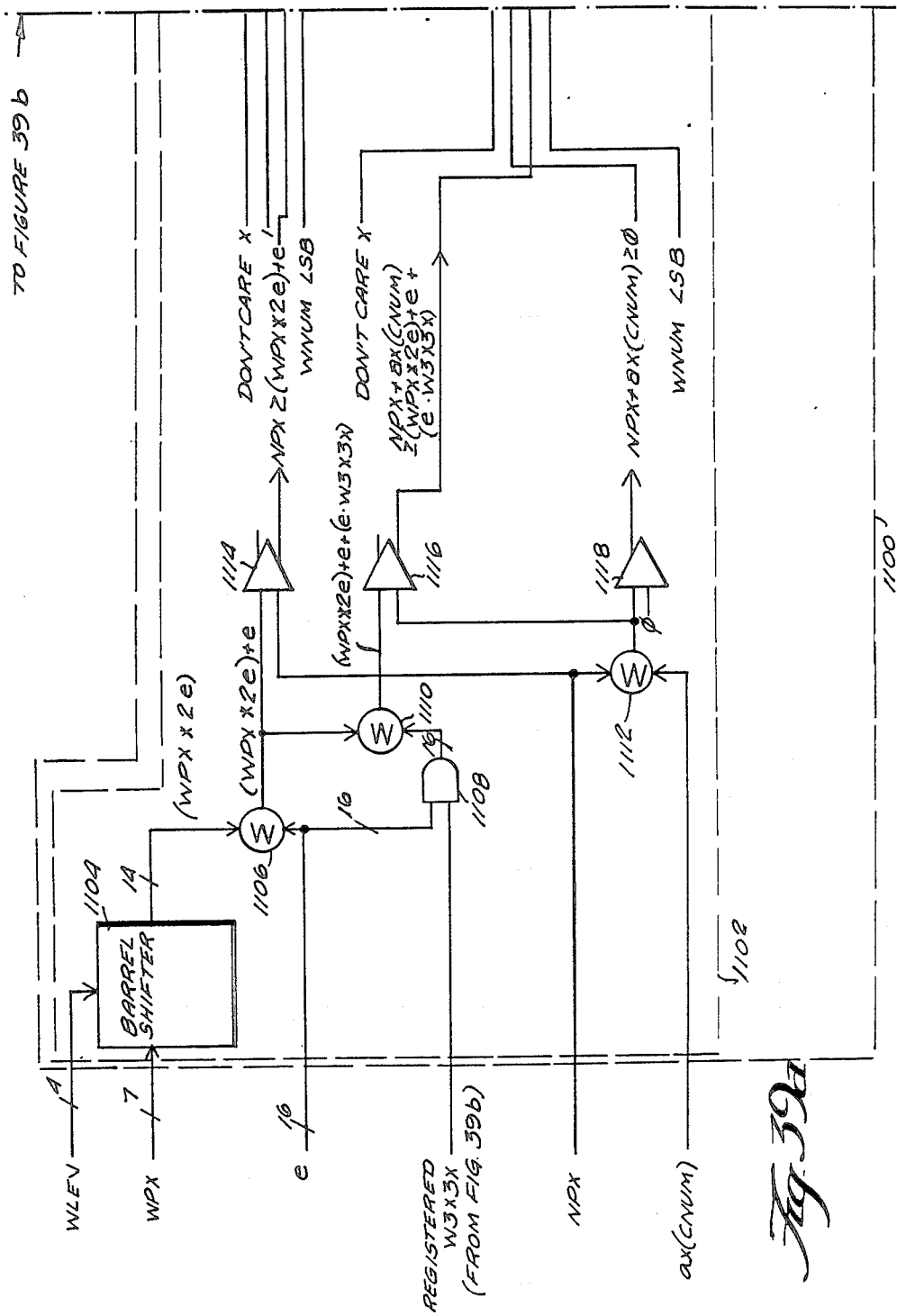

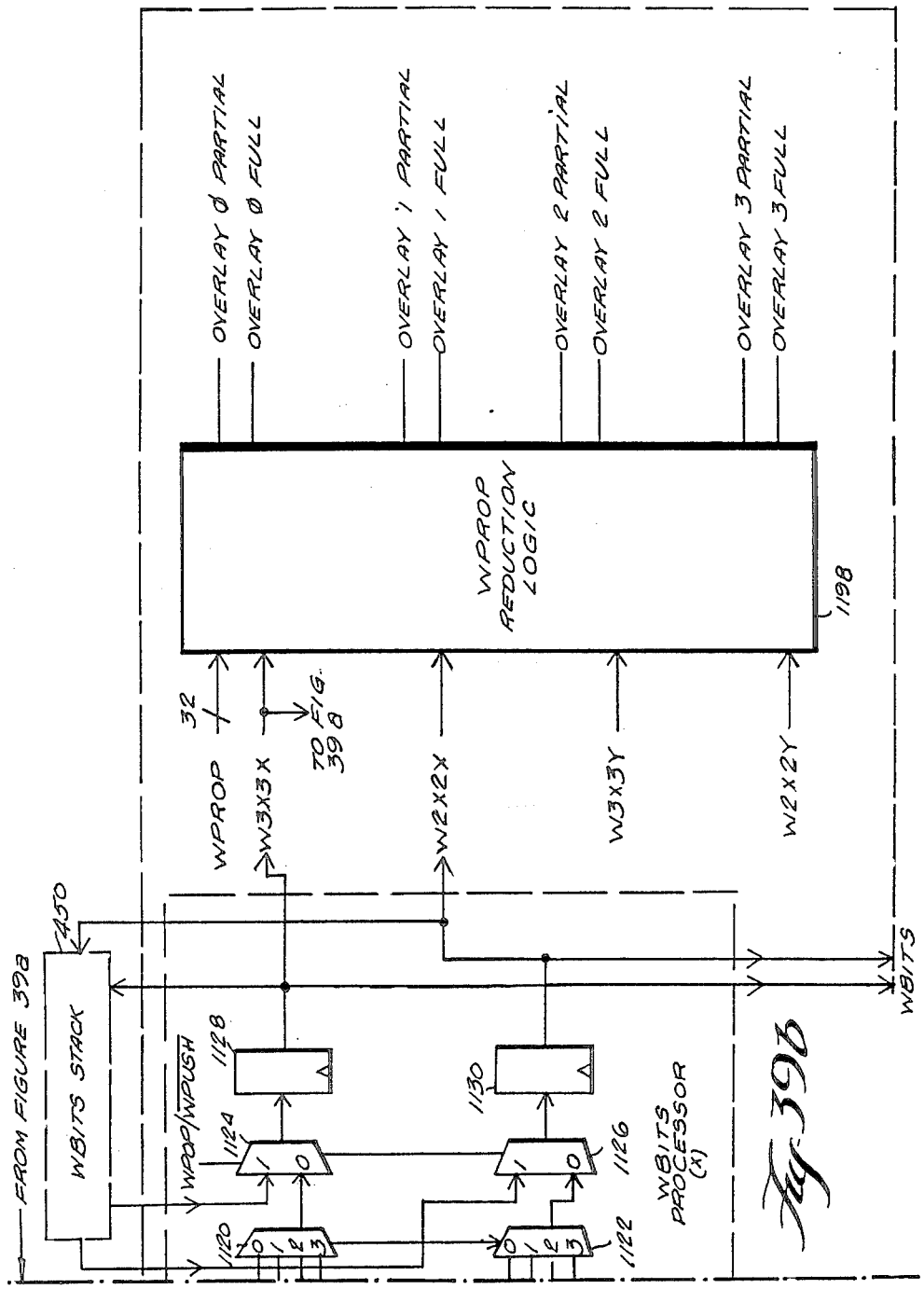

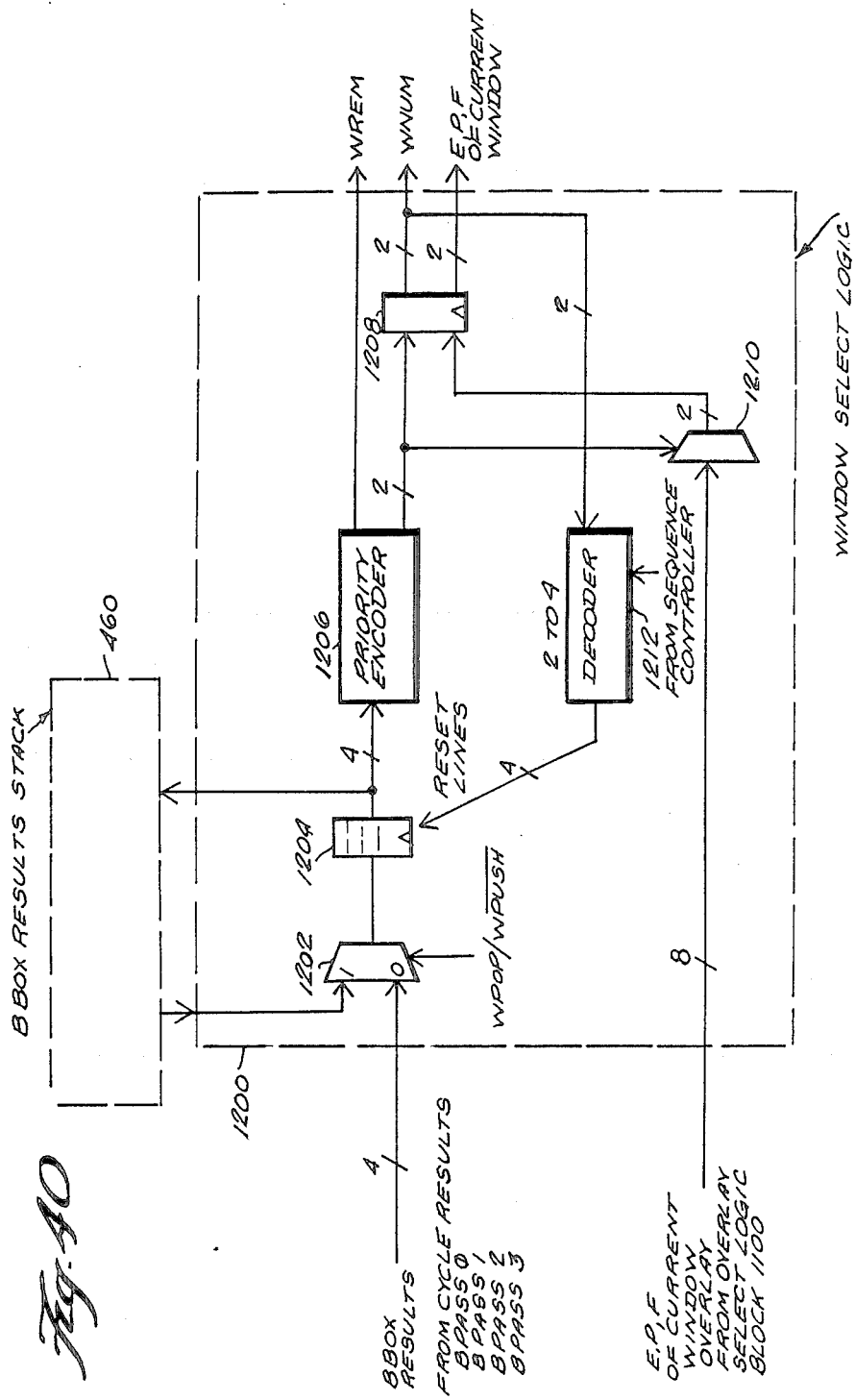

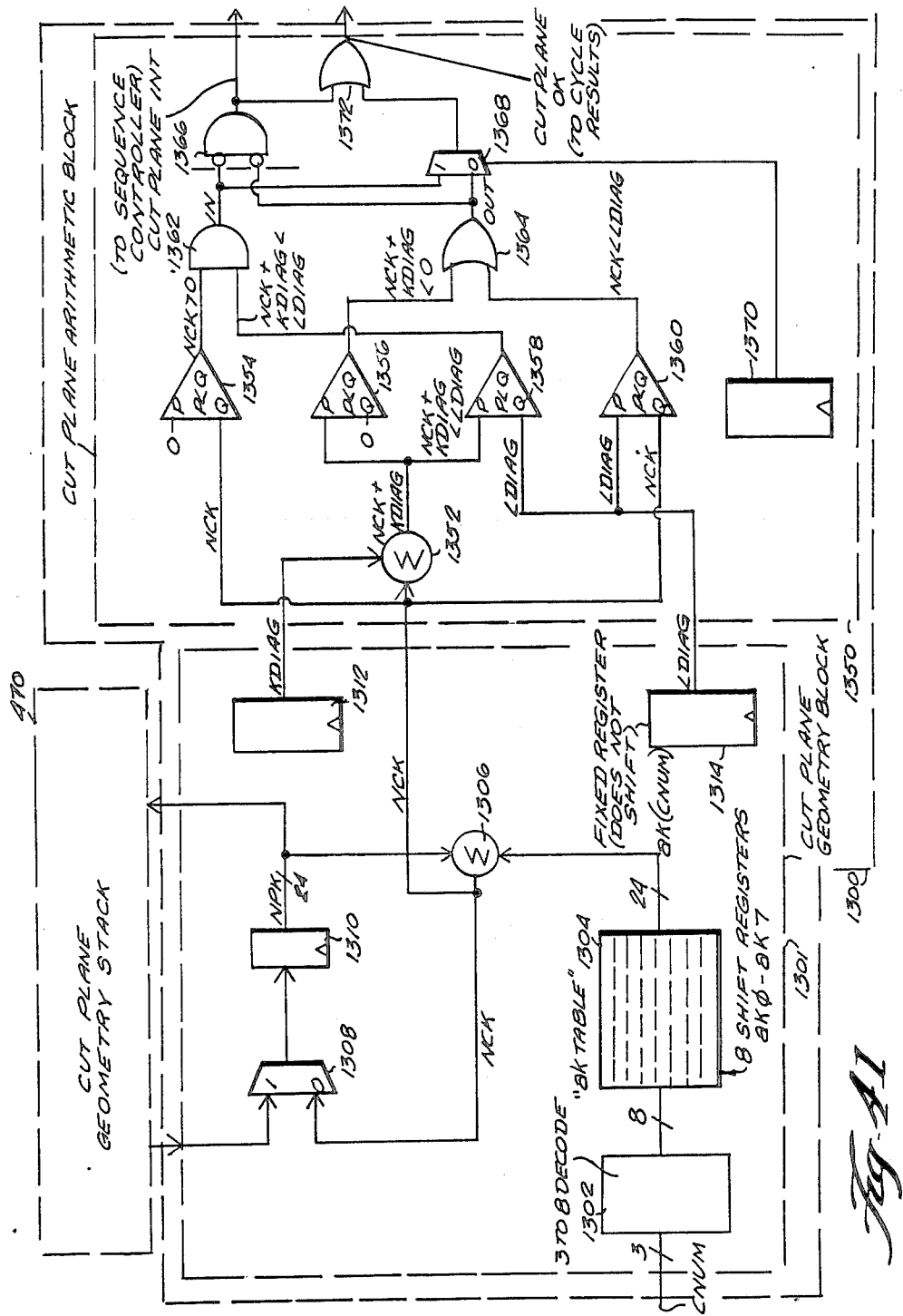
Fig. A1

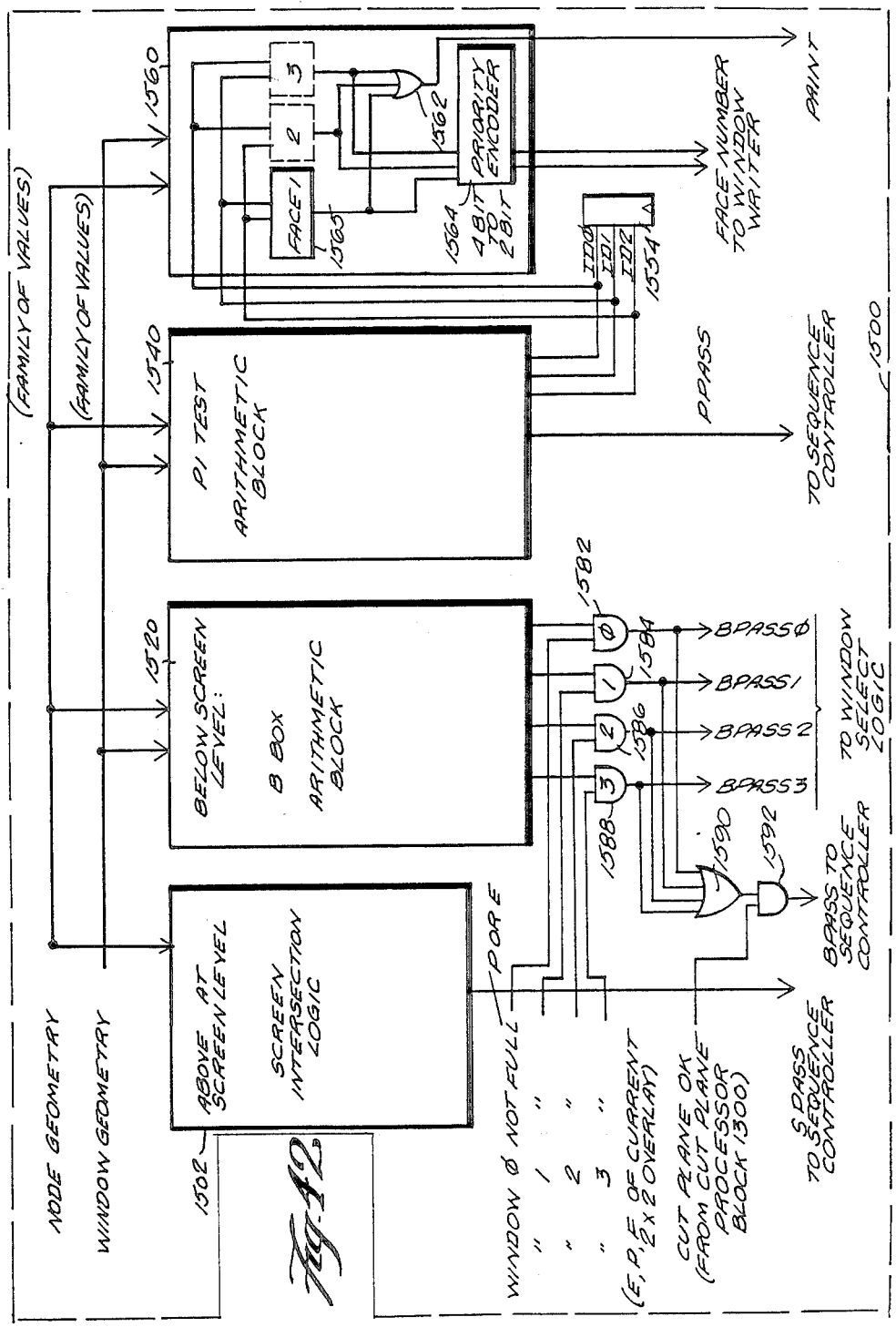

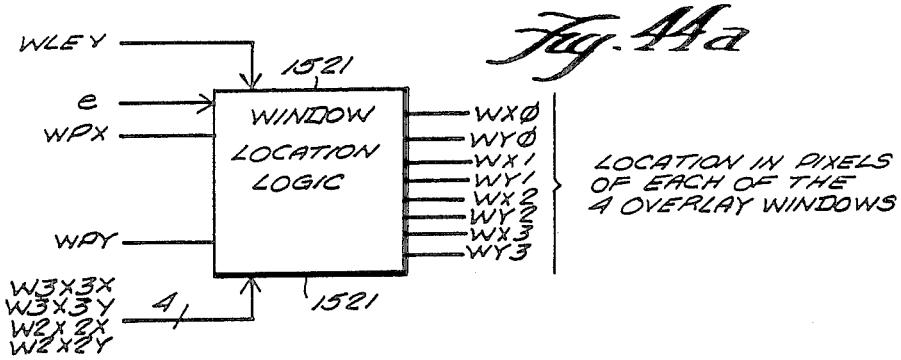
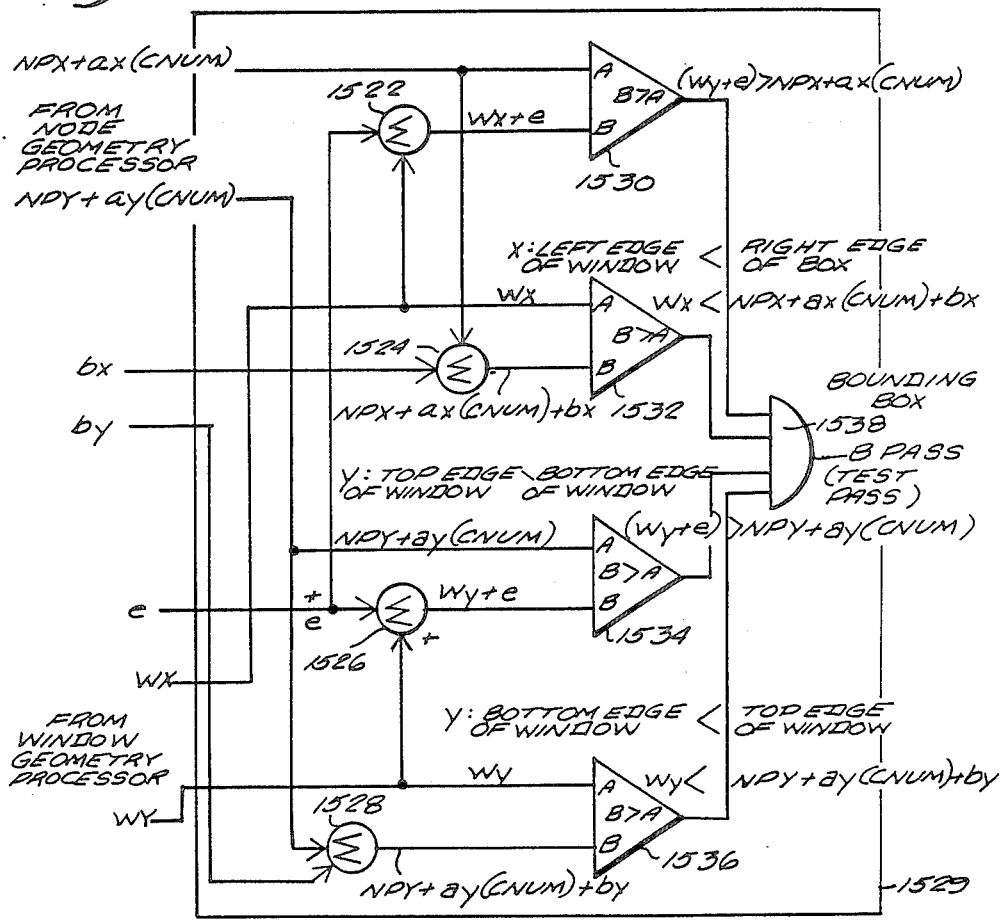

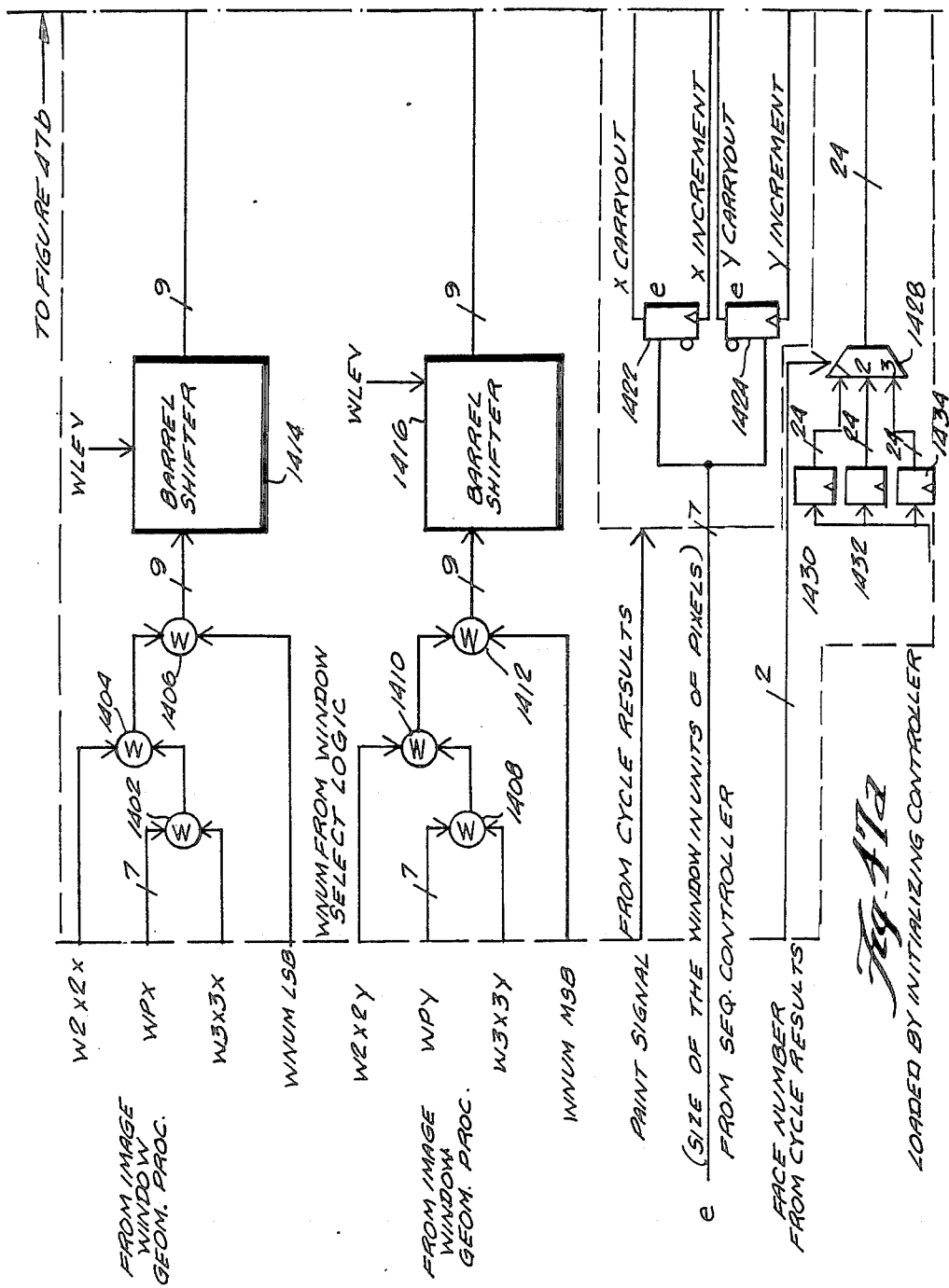

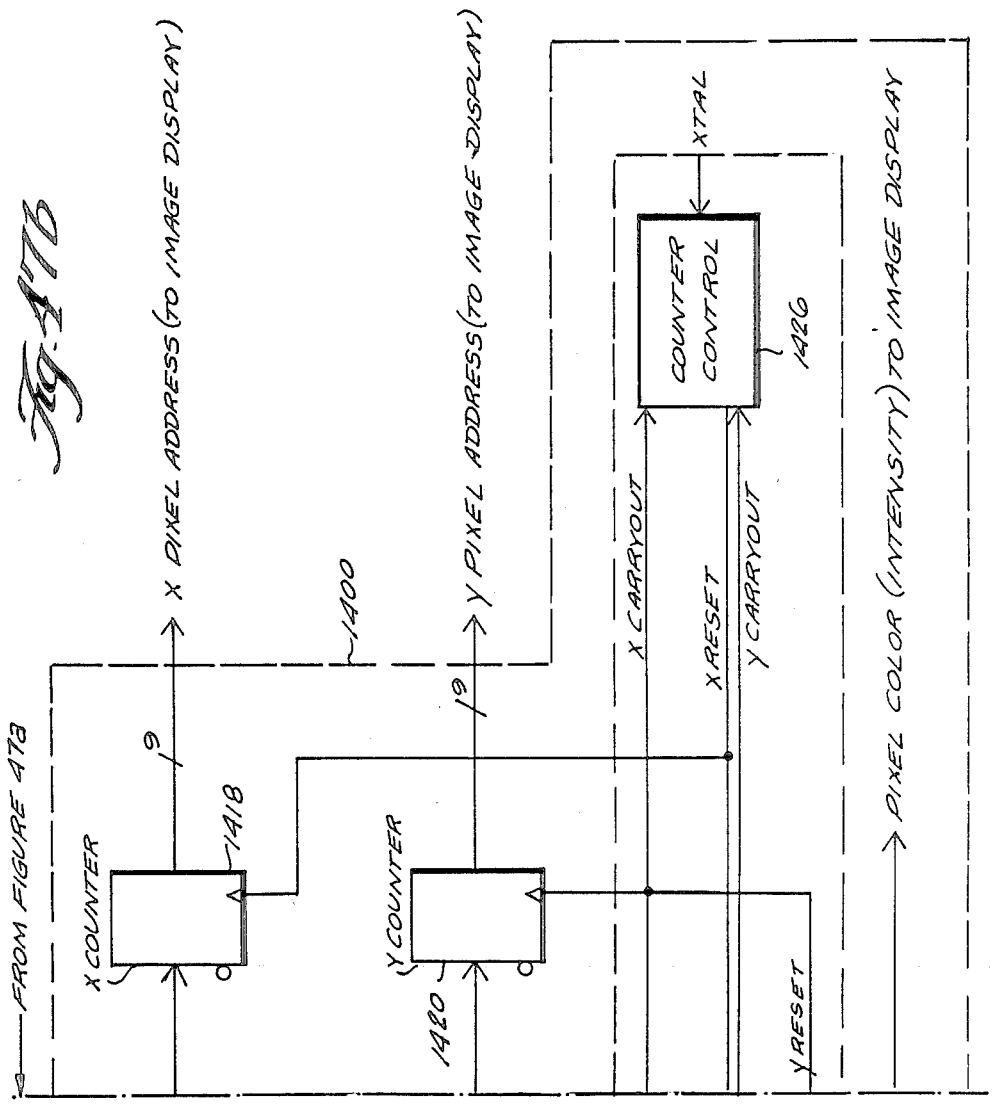

HIGH-SPEED IMAGE GENERATION OF COMPLEX SOLID OBJECTS USING OCTREE ENCODING

FIELD OF THE INVENTION

The invention generally relates to solid modeling of three-dimensional solid objects and more particularly to a method and apparatus for the high-speed generation of a two-dimensional image of a three-dimensional solid object wherein surfaces hidden from the viewer from a selected point of view are eliminated from the image. The invention is applicable wherever the generation of two-dimensional images of solid objects of arbitrary complexity must be performed in real time, and is especially suited for interactive image generation systems.

BACKGROUND OF THE INVENTION

Countless applications presently exist for automated solid modeling, the automated representation, manipulation, analysis and display of solid objects. Perhaps the primary application for solid modeling systems at present are in CAD/CAM (Computer-Aided Design and Computer-Aided Manufacture) systems. Such systems permit the efficient design and analysis of mechanical parts, the analysis of space utilization processes (for instance packaging, process planning, robotics, parts assembly, etc.), molecular modeling, and literally countless of other uses.

Solid modeling systems have also been applied to medical imaging, where an image of a portion of a human body is generated from data acquired by a CT (Computer Tomography), NMR or Ultrasound Scanner to permit a physician to study, analyze and manipulate the image. Using such systems, physicians are able to selectively view portions of the anatomy under study from various viewing angles and at different magnifications, employ an "electronic scapel" to cut out parts of the anatomy, analyze volumes and displacements to determine the size and location of anatomical structures, etc.

Another useful application of solid modeling systems is in flight simulators, which permit a pilot to train under a variety of flight conditions without the associated danger and cost of using an actual aircraft. Another application is in seismology, wherein a geologist may study and analyze images created from acoustical or electromagnetic data indicative of mineral structures of the earth's surface in order to predict the location of valuable mineral deposits, the occurrence of seismological disturbances, etc. Yet another application is in the field of artificial vision wherein templates of three-dimensional objects viewed from various angles and perspectives must be compared with observed data to permit the recognition of objects. Further applications of solid modeling systems include the generation of realistic images of physical objects or analytically-defined objects and permitting the interactive manipulation of these images for use in cinematography and video arcade games. As solid modeling systems become more efficient and less costly, numerous other applications for them will no doubt be found.

There are several different solid modeling systems presently commercially available, but all of them are limited by restrictions on the way in which the object to be imaged is represented or the speed at which the image is generated. Many available systems do not permit an object of arbitrary complexity to be represented. Others can operate on objects of essentially arbitrary complexity and configurations, but require a substantial amount of real time to generate single images (often the time to generate one image may be measured in minutes or hours) because of the extremely large number of calculations required to perform interference detection, hidden-surface removal and object manipulation on such arbitrarily complex objects.

Of course, the time it takes to generate an image is not critical in many applications. However, if a human being must interact with the image generation process (for instance, to define points of view, scaling factors, sectional views, etc.), it may be desirable to generate images in real time. For instance, video arcade games and flight simulators require a real time response in generated images when a user operates various interactive input devices. Likewise, the creative thought processes of a physician would be severely inhibited if he or she had to wait minutes or hours after specifying a view of a portion of a patient's anatomy before actually seeing the resulting image. Productivity of a CAD/CAM system decreases dramatically as the time required to generate each image increases.

Some commercially available graphics systems reduce the time required to generate images by not truly modeling the three-dimensional object to be imaged, but rather projecting only the edges (rather than the surfaces) of the object onto a display screen. The determination of what is actually solid is left to human interpretation in such imaging systems. While quite suitable for many applications, such systems (which in reality can only be used as sophisticated automated drafting systems) do not produce realistic images of solids.

Various schemes for representing solid objects to be imaged are employed by existing true solid modeling systems. Some systems define the object to be imaged through primitive instancing, wherein families of objects are defined in terms of a primitive shape type (for example, a certain kind of polyhedron) and a limited set of parameters further specifying the shape. Spatial enumeration, wherein an object is represented by the cuboid spatial three-dimensional cells which it occupies, is another method conventionally used to define a three-dimensional object. A generalized form of spatial enumeration is cell decomposition, in which the spatial cells are not necessarily cuboid or even identical. Another method conventionally used is constructive solid geometry (CSG), wherein objects are represented as collections of primitive solids such as cuboids, cylinders, etc. Tree structures are typically used to organize the primitive solids, wherein leaf nodes of the tree represent the primitives and branch nodes specify set operations performed on the primitives. Yet another method of representing a solid is by defining it as the volume swept by a two-dimensional or three-dimensional shape as it is translated along a curve. Finally, boundary representation is conventionally used to represent objects by characterizing them according to their enclosing surfaces (i.e. planes, quadric surfaces, patches, etc.).

Specific advantages and disadvantages of the various methods of object representation conventionally employed together with a classification of some existing solid modeling systems may be found in Requicha, A., and Voelcker, H., "Solid Modeling: Current Status and Research Directions," *IEEE Computer Graphics and Applications,* Vol. 3, No. 7, October 1983, pp. 25-37, and Requicha, A., and Voelcker, H., "Solid Modeling: A Historical Summary and Contemporary Assessment," *IEEE Computer Graphics and Applications,* Vol. 2, No. 2, March 1982, pp. 9-24. See also Baer, A., Eastman, C., and Henrion, M., "Geometric Modeling: A Survey," *Computer-Aided Design,* Vol. 11, No. 5, September 1979.

Most commercially available solid modeling systems use either constructive solid geometry or boundary representation (or a combination of the two) as the primary scheme to represent the object. For example, the TIPS, the PADL, and the SynthaVision systems use a constructive solid geometry representation scheme; the Build, CADD, Design, Solidesign and Romulus systems employ the boundary representation scheme; the EUKLID and GMSolid systems use a combination of these two schemes. Some systems permit alternate representations, such as alternate data input schemes wherein an object may be defined by the swept volume representation. The TIPS system can sort the primitives into a spatial enumeration array to facilitate interference analysis.

New methods are needed to solve or at least reduce a number of problems which have plagued solid modeling systems developed in the past. Many existing systems seriously restrict the objects which can be imaged because of the constraints imposed by the representation scheme used. Serious limitations are imposed when the object must be defined by a limited number of mathematically well-defined surface or solid primitives. Many schemes cause extraneous surfaces not corresponding to true surfaces in the three-dimensional object to be included in the generated images due to imprecision in the object representation.

An important drawback of present solid modeling systems where real time image generation is desired is the often huge amount of data required to represent an object of arbitrary complexity, and the efficiency of the operations which must be performed on this data to generate an image. The computational complexity and memory requirements of algorithms used to generate the image should not grow at a rate faster than linear with the number and complexity of objects to be imaged. Most present systems which can represent objects of arbitrary complexity do not satisfy these requirements.

Finally, most existing solid modeling systems were designed using limited hardware and storage resource design constraints. Because the amount of hardware is often traded off with the speed performance of the system, existing solid modeling systems generally have poor speed performance as a result. With the advent of inexpensive solid state memory and hardware (brought about by the advent of VLSI technology), larger amounts of hardware can now be used at relatively little cost to achieve faster processing time than could be realized previously.

One of the keys to the efficient generation of images of solids is to limit algorithms to a linear growth rate. One method which may be used to limit growth rate in image generation is the hierarchical subdivision of the display surface into progressively smaller areas. Such a scheme is disclosed in Warnock (U.S. Pat. No. 3,602,702, issued Aug. 31, 1971), which discloses a method and system for electronically generating and displaying shaded two-dimensional perspective images of three-dimensional objects. Warnock discloses the representation of an object to be displayed by planar polygonal surface primitives resulting when the object is projected onto a view plane. A square view plane is subdivided into a number of subsquares, each of which may be further subdivided if necessary. The surface primitive is tested with respect to the various subsquares of the view plane to determine whether the subsquare is enclosed by the surface primitive, intersects but does not enclose the surface primitive, or is completely disjoint with the surface primitive. These tests are performed by comparing the coordinates of each of the line segments of the surface primitive with the coordinates of the subsquare of the view plane under test.

A subsquare which is entirely enclosed by a surface primitive may be shaded on a display screen. Subsquares which intersect but are not enclosed by the surface primitive are further subdivided until a level of resolution along the edge of the surface primitive is reached. Of course, during the subdivision process, new subsquares which are found to be enclosed by the surface primitive are appropriately shaded.

The use of two-dimensional hierarchical tree structures called "quadtrees" in the field of image processing to represent a hierarchically-subdivided display surface was proposed in Hunter, G. M. and Steiglitz, K., "Operations on Images Using Quad Trees," *IEEE Transactions on Pattern Analysis and Machine Intelligence,* Vol. PAMI-1, No. 2, April 1979. Rosenfeld, A., "Quadtrees and Pyramids for Pattern Recognition and Image Processing," Proceedings of the 5th International Conference on Pattern Recognition, December 1980, discusses the use of quadtrees in pattern recognition and image processing. Samet, H., and Rosenfeld, A., "Quadtree Representation of Binary Images," Proceedings of the 5th International Conference on Pattern Recognition, December 1980, presents an overview of quadtrees, while Samet, H., "Neighbor Finding Techniques for Images Represented by Quadtrees," *Computer Graphics and Image Processing,* Vol. 18, 1982, 37-57 discusses techniques for finding neighbors for images represented by quadtrees.

The use of an 8-ary hierarchical tree to represent three-dimensional objects has been suggested in Hunter, G. M., "Efficient Computation and Data Structures for Graphics," PhD dissertation, Electrical Engineering and Computer Science Department, Princeton University, June 1978 as an extension of quadtrees. This concept was discussed in Jackins, C. L., and Tanimoto, S. L., "Oct-Trees and Their Use in Representing Three-Dimensional Objects," Technical Report 74-07-06, Department of Computer Science, University of Washington, Seattle, July 1979; Jackins, C. L., and Tanimoto, S. L., "Oct-Trees and Their Use in Representing Three-Dimensional Objects," *Computer Graphics and Image Processing*, December 1980; Srihari, S. N., "Representation of Three-Dimensional Digital Images," Technical Report No. 162, Dept. of Computer Science, State University of New York at Buffalo, July 1980; Srihari, S. N., "Hierarchical Representations for Serial Section Images," Proceedings of the 5th International Conference on Pattern Recognition, December 1980; Meagher, D., "Octree Encoding: A New Technique for the Representation, Manipulation and Display of Arbitrary 3-D Objects by Computer," Technical Report IPL-TR-80-111, Image Processing Laboratory, Rensselaer Polytechnic Institute, October 1980. Later papers discussing octree encoding include Doctor, L. J. and Torborg, J. G., "Display Techniques for Octree-Encoded Objects," *IEEE Computer Graphics and Applications*, Vol. 1, No. 3, July 1981; Doctor, L., "Solid Modeling Algorithms Utilizing Octree Encoding," Center for Interactive Computer Graphics, Rensselaer Polytechnic Institute, December 1980; Iftikhar, A., "Linear Geometric Transformations on Octrees," M. S. thesis, Electrical, Computer and Systems Engineering Department, Rensselaer Polytechnic Institute, May 1981; and Yau, M. M., and Srihari, S. N., "Recursive Generation of Hierarchical Data Structures for Multidimensional Digital Images," Technical Report No. 170, Dept. of Computer Science, State University of New York at Buffalo, January 1981.

Additionally, the present inventor has published several papers discussing octree encoding. After publishing the paper in October of 1980 which discloses an octree encoding scheme, the present inventor presented additional results in Meagher, D., "Geometric Modeling Using Octree Encoding," *Computer Graphics and Image Processing*, 19, June 1982. A display algorithm was discussed in Meagher, D., "High Speed Display of 3-D Medical Images Using Octree Encoding," IPL-TR-021, Image Processing Laboratory, Rensselaer Polytechnic Institute, September 1981, and an updated version of the display algorithm was presented in Meagher, D., "Efficient Synthetic Image Generation of Arbitrary 3-D Objects," Proc. IEEE Computer Society Conference on Pattern Recognition and Image Processing, June 1982. The development of efficient object generation algorithms was documented in Meagher, D., "Octree Generation, Analysis and Manipulation," IPL-TR-027, Image Processing Laboratory, Rensselaer Polytechnic Institute, April 1982. Finally, a summarization of the octree encoding scheme and algorithms used in conjunction with that scheme for efficient solid modeling was disclosed in Meagher, D., "The Octree Encoding Method for Efficient Solid Modeling," IPL-TR-032, Image Processing Laboratory, Rensselaer Polytechnic Institute, August, 1982. All of the above cited documents authored by Donald J. R. Meagher are hereby explicitly incorporated herein by reference.

SUMMARY OF THE INVENTION

The present invention is a method and system for efficiently generating two-dimensional images of three-dimensional solid objects. Three-dimensional objects to be imaged are defined within a cuboid three-dimensional universe which has been hierarchically subdivided into a number of levels. Each level in the three-dimensional universe comprises a plurality of discrete volumes of uniform size and similar orientation. Each volume is characterized by the degree to which it is occupied by an object to be displayed. Each volume in each of the levels of the hierarchy is a subdivision of the volume in the level above it which is partially occupied by the object but not occupied to a predetermined degree. Each subdivided volume in the hierarchy is subdivided into eight volumes of identical size, shape and orientation.

The characterization of the degree to which the object occupies each of the volumes in the three-dimensional universe is stored in nodes in an octree structure contained in an octree encoded store. Objects of arbitrary complexity and shape may be represented by the octree structure.

A user may interact with the image display process by specifying, among other things, the point of view for viewing the object.

A two-dimensional view plane is established. The view plane is organized into a hierarchy of a predetermined number of levels. Each level in the hierarchy comprises a plurality of discrete areas of uniform size and orientation. Each of the areas in each of the levels is a subdivision of an area in the level in the hierarchy above that level.

Nodes in the octree structure are visited in a sequence determined by the point of view selected by the user so that nodes corresponding to volumes which are unobstructed by other volumes are visited first. Volumes occupied by the object are projected onto the view plane at a location and orientation determined by the selected point of view and the location of the volume in the three-dimensional universe.

Areas of the view plane are tested to determine if they are completely enclosed by the projection, intersect but are not enclosed by the projection, or are completely disjoint with the projection. Areas which are completely enclosed by the projection are painted onto a display screen (i.e. an area on a display screen corresponding to the enclosed area on the view plane is shaded in with a given intensity). Areas which intersect but are not enclosed by the projection are further subdivided to locate those areas which are enclosed so that they, too, can be painted. This subdividing process continues until a predetermined degree of resolution is reached.

Because of the similarity in the shape and orientation of the volumes of the three-dimensional universe, the shape and orientation of the projection of any volume will be precisely the same, differing only in location and size. Likewise, because of the symmetry in the geometry of the areas in the view plane, any two areas will differ only in size and location. For this reason, the calculations required to test areas for intersection and enclosure with projections are simple (and can be calculated by simple arithmetic operations which can be performed quickly). Likewise, objects of arbitrary complexity may be represented by the octree structure. In this way, images of three-dimensional objects of arbitrary complexity may be generated with a minimum of calculation time, permitting high-speed image generation.

A quadtree structure corresponding to the hierarchically-subdivided view plane is stored in a separate store. Each time an area of the view plane is painted, a location in the quadtree structure corresponding to that area is marked.

Before an area of the view plane is painted, the location corresponding to that area in the quadtree structure is checked. Areas corresponding to windows in the quadtree structure which have been marked will not be painted again. In this way, hidden surfaces are not included in the image generated.

Because the projection of each of the volumes in the three-dimensional universe is a six-sided polygon having three internal faces, it is possible to test the areas of the view plane for enclosure with the projection of a *face* of the volume rather than with the entire projection. Areas enclosed by the projection of different faces may be painted different colors to produce a more realistic three-dimensional image.

A user may define a subset of the three-dimensional universe to image. Volumes outside of this subset are not projected onto the view plane, permitting the creation of sectional views.

Due to the hierarchical structure of the three-dimensional and the two-dimensional universe and the symmetry of subdivisions of those entities as well as to the simplicity of the calculations necessary to create an image, real time image generation is made possible.

These as well as other objects and advantages of this invention will be better appreciated by studying the following detailed description of the presently preferred exemplary embodiment of this invention in conjunction with the accompanying drawings.

BRIEF DESCRIPTION OF THE DRAWINGS

FIG. 1(A) is a graphic illustration of a three-dimensional universe and a three-dimensional object defined within that universe to be imaged;

FIG. 1(B) is a graphic illustration of the universe shown in FIG. 1(A) organized into an octree hierarchy wherein the universe is defined as the root node of the octree;

FIG. 1(C) graphically illustrates a further subdivision of child node 1 of the root node shown in FIG. 1(B) into eight children nodes;

FIG. 1(D) graphically illustrates a further subdivision of child node 5 of the root node shown in FIG. 1(B) into eight children nodes;

FIG. 2 is a schematic representation of the octree structure corresponding to the universe shown in FIG. 1;

FIG. 6(D) is a graphic illustration of the subdivision of the window overlay shown in FIG. 6(C) into a 4×4 window array, and the selection of a single 3×3 window array within that 4×4 array;

FIG. 6(E) is a graphic illustration of the selection of a window overlay from the selected 3×3 window array shown in FIG. 6(D);

FIG. 6(F) is a graphic illustration of the selection of one window from the selected window overlay shown in FIG. 6(E);

FIG. 7 is a graphic illustration of the geometry associated with a bounding box test, a test which determines whether the bounding box shown defined by the projection of an octree object node in FIG. 6(B) intersects a given quadtree window of the view plane;

FIG. 8 is a graphic illustration of a projection of a node wherein the six exterior edges and three interior edges of the projection are numbered for the purpose of comparisons performed by a polygon intersection test and an enclosure test, tests which aid in determining whether a projection of an octree node intersects and encloses a quadtree window, respectively;

FIG. 9 is a graphic illustration of the selection of critical vertices of a quadtree window for the polygon intersection test as a function of the slope and interior orientation of edges of a node projected onto the view plane;

FIG. 11 is a graphic illustration of the selection of critical vertices of a quadtree window for the enclosure test as a function of the slope and interior orientation of edges of a node projected onto the view plane;

FIGS. 18(A)–18(B) show a flow chart describing the function of the Image Display Processor block shown in FIG. 15;

FIG. 21(A) is a graphic illustration of node edge offsets indicating the displacement of the D0 edge of each child node projection from the D0 edge of the parent node projection shown in FIG. 20(A);

FIG. 21(B) is a graphic illustration of node edge offsets indicating the displacement of the D1 edge of each child node projection from the D1 edge of the parent node projection shown in FIG. 20(A);

FIG. 21(C) is a graphic illustration of node edge offsets indicating the displacement of the D2 edge of each child node projection from the D2 edge of a parent node projection shown in FIG. 20(A);

FIG. 24(F) is a graphical illustration of the scaled three-dimensional universe shown in FIG. 24(E) wherein the origin of the coordinate system shown in FIG. 24(C) defined by the view plane is positioned at the center of rotation by block 258 of FIG. 24(A);

FIG. 24(G) is a graphical illustration of the three-dimensional universe translated as shown in FIG. 24(F) and rotated about its center of rotation by block 260 of FIG. 24(A);

FIG. 24(H) is a graphical illustration of the three-dimensional universe rotated as shown in FIG. 24(G) and translated by block 262 of FIG. 24(A) so that its center of rotation corresponds to the user-specified point on the view plane shown in FIG. 24(C);

FIG. 25 is a block diagram further detailing the Image Display Processor block shown in FIG. 15;

FIGS. 26(A)-26(B) are a schematic diagram of the Memory Address Processor block shown in FIG. 25;

FIG. 27 is a schematic diagram of a general Stack architecture used for the Memory Address Stack, the Object Node Packet Stack, the Object Node Geometry Stack, the WBITS Stack, the Image Window Packet Stack, the Image Window Geometry, the B-Box Results Stack and the Cut Plane Geometry Stack shown in FIG. 25;

FIG. 31(A) is a schematic diagram of the quadtree address map shown in FIG. 30(A);

FIG. 31(B) is a schematic diagram of one of the four Arrays (A, B, C and D) shown in FIG. 30(A);

FIG. 32 is a schematic diagram of the Quadtree Block Enable Logic shown in FIG. 30(A);

FIG. 33 is a schematic diagram of the Quadtree Clear Address Generator block shown in FIG. 30(A);

FIG. 34(A) is a schematic diagram of the Data Read Map shown in FIG. 30(A);

FIG. 34(B) is a schematic diagram of the Data Write Map shown in FIG. 30(A);

FIG. 36(A) is a schematic diagram of the Child Modify Logic shown in FIG. 35;

FIG. 36(B) is a schematic diagram of the Grandparent Modify Logic shown in FIG. 35;

FIG. 37 is a schematic diagram of the Parent Reduction Logic shown in FIG. 36(B);

FIGS. 39(A) and 39(B) show a schematic diagram of the Window Overlay Select Logic block shown in FIG. 25;

FIG. 40 is a schematic diagram of the Window Select Logic block shown in FIG. 25;

FIG. 41 is a schematic diagram of the Cut Plane Processor block shown in FIG. 25;

FIG. 42 is a schematic diagram of the Cycle Results block shown in FIG. 25;

FIG. 44(A) is a block diagram of a Window Location Logic block, one of the components of the BBOX Arithmetic block shown in FIG. 42;

FIG. 44(B) is a schematic diagram of a portion of the BBOX Arithmetic Block shown in FIG. 42 which performs the BBOX test on one of the four windows in a window overlay;

FIGS. 47(A) and (B) are a schematic diagram of the Window Writer block shown in FIG. 25;

DETAILED DESCRIPTION OF THE PREFERRED EMBODIMENTS

Figure 3A:
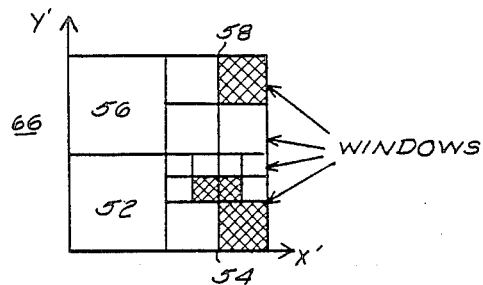
FIG. 3(A) schematically illustrates a two-dimensional viewing plane organized into a quadtree hierarchy, some of the windows of which are subdivided into child and further subdivided into grandchild windows, wherein some of the defined windows of the viewing plane are painted.

The hierarchical organization of the three-dimensional universe and its representation by an octree structure, and the hierarchical organization of the two-dimensional universe and its representation by a quadtree structure will first be described. The process of projecting objects defined by the octree structure onto the two-dimensional view plane and testing windows of the view plane for intersection and enclosure with the projection using the constructs of a bounding box and a window overlay will then be described. Next described will be the cut plane test, which allows sectional views to be generated.

Next described will be a functional representation of the preferred embodiment of the present invention. The Octree Data Conversion and Initializing Controller blocks of the functional representation will be discussed in detail. The remainder of the disclosure will describe in detail the algorithm performed by the Image Display Processor block of the functional representation (that portion of the presently preferred embodiment which actually generates an image), and the architecture and operation of the Image Display Processor as it is implemented in the presently preferred exemplary embodiment of the present invention.

Organization of the 3-Dimensional Object Universe and the 2-Dimensional View Plane Referring to FIG. 1(A), shown is an arbitrary 3-dimensional object 30 defined within a 3-dimensional universe 32. A parallelepiped has been chosen to define universe 32 in order to simplify the mathematical ascertainment of the position of the object 30 within universe 32. The preferred embodiment only generates images of objects or portions of objects within universe 32, ignoring any objects not within the universe.

Referring to FIG. 1(B), universe 32 is subdivided into eight smaller parallelepipeds of identical size, shape and orientation (the "child" parallelepipeds of the universe). An object 30 contained by universe 32 will be contained by one or more of the child parallelepipeds (here, by child parallelepipeds 34 and 36). Object 30 need not be a single continuous object, but may rather be an assembly of multiple disjoint parts.

Referring to FIGS. 1(C) and 1(D), child nodes 34 and 36 each have been further subdivided into their eight children parallelepipeds. Thus, the children parallelepipeds of nodes 34 and 36 are the grandchildren of universe 32. Object 30 completely encloses child parallelepiped 38 of parallelepiped 34 and child parallelepipeds 40 and 42 of parallelepiped 36. By subdividing universe 32 recursively, it is possible to determine the exact position and dimensions of any arbitrary object 30 within universe 32 by determining all of the descendent parallelepipeds of the universe 32 which are completely filled by the object. The resolution in the determination of the position of object 30 within universe 32 is thus limited only by the number of subdivisions of the universe that are recursively performed.

A parallelepiped at any given level may have one of three relationships ("property values") with respect to object 30 indicating the degree to which it is occupied by the object. A parallelepiped may be empty (E), where it and the object are completely disjoint, (as, for example parallelepiped 35); it may be full (F), meaning that it is completely contained by the object (as are parallelepipeds 38, 40 and 42); and finally, it may be partial (P), meaning that it contains some part of the object but is not completely contained by the object (e.g. parallelepipeds 34 and 36).

If a given parallelepiped is E (empty), all of the children of that parallelepiped will also be E. Likewise, if a given parallelepiped is F (full), all of its children must also be F. Finally, if a given parallelepiped is P (partial), some of its descendents must be F and some must be E (depending upon the subdivision at which these F and E descendents occur, some or many of the descendents of a P parallelepiped may also be P). Thus, a P parallelepiped must have at least one non-EMPTY (P or F) child but not all F children.

Referring to FIG. 2, shown is an octree structure representing the three-dimensional space shown in FIGS. 1(A)-1(D). The structure shown is a "tree" structure organized hierarchically into an arbitrary number of levels of "nodes" (three levels are shown, beginning with level 0, i.e. the "root node"), each successive level representing, to a higher level of precision, the same space as the level above it. "Octree" denotes that each node is subdivided into eight children nodes. If a node is subdivided into its eight children nodes, it is called a "branch node"; nodes not subdivided are called "leaf nodes" or "terminal nodes".

The root node represents the entire universe 32 of FIG. 1(A). Each node at any lower level in the octree structure represents one of the disjoint segments of space defined by the subdivisions of universe 32 shown in FIGS. 1(B)-1(D). Referring to FIGS. 1(A)-1(D) and 2, root node 32a represents universe 32, while each of the eight level 1 nodes represent one of the eight children parallelepipeds of universe 32 (thus, level 1 represents the level of subdivision shown in FIG. 1(B); node 34a represents parallelepiped 34, node 35a represents parallelepiped 35, etc.). Likewise, each of the level 2 nodes in the octree represents one of the eight grandchildren parallelepipeds shown in FIGS. 1(C) and 1(D). There are 8 possible nodes at level 1, 64 possible nodes at level 2 and $8^n$ possible nodes at level n.

Referring to FIGS. 1(A)-1(D) and 2, each node in the octree structure has associated with it a property value corresponding to the relationship between the parallelepiped in three-dimensional space which it represents and the object 30, as discussed above. Thus, a node is marked E if the parallelepiped which it represents is Empty, marked F if the parallelepiped which it represents is Full, and marked P if the parallelepiped which it represents is only partially filled by the object 30. As shown, all but two of the level 1 nodes have been marked E because they represent empty parallelepipeds shown in FIG. 1(B) (for example, node 35a represents empty parallelepiped 35). Likewise, the level 2 (grandchildren) nodes 38a, 40a and 42a have been marked F because the parallelepipeds in universe 32 to which these nodes correspond (parallelepipeds 38, 40 and 42, respectively) are completely contained by object 30. Since none of the other level 2 nodes represent parallelepipeds containing any part of object 30, they have all been marked EMPTY. The parent node 34 of node 38 and the parent node 36 of nodes 40 and 42 have both been marked PARTIAL because they each have at least one non-EMPTY child but all of their children are not FULL. Likewise, root node 32 has been marked PARTIAL.

As mentioned previously, an arbitrary number of subdivisions of nodes partially filled by an object may be required to locate descendent nodes which are completely contained by an object. However, terminal (EMPTY and FULL) nodes need not be subdivided in order to determine the properties of their descendent nodes (all EMPTY and all FULL, respectively). Thus, the octree structure shown in FIG. 2 has been "trimmed" or "pruned", meaning that only the subdivisions for PARTIAL nodes have been retained in the structure. Great increases in efficiency and savings in hardware result from the "trimming" of the octree, as will soon be apparent.

It will be understood by those skilled in the art that a three-dimensional object of arbitrary complexity and shape may be represented by an octree structure of the type shown in FIG. 2. Moreover, the degree of resolution of the representation may be increased by simply adding more levels to the octree structure.

Referring to FIG. 3(A), shown is a 2-dimensional view plane 66 defined by a rectangle, suitably a square. (It will be understood by those skilled in the art that any primitive geometric shape could be used). View plane 66 (also referred to as the 2-dimensional universe) is subdivided into four square children "windows" 52, 54, 56 and 58, all of identical size and orientation. These children windows can be further subdivided into their four children windows, which in turn may be further recursively subdivided. This hierarchical organization of the view plane is similar to that disclosed in Warnock, discussed previously.

Some of the windows of view plane 66 are shown "painted", meaning that they are completely filled by an image being displayed on view plane 66. A window may either be Full (i.e. "painted"), Empty, or Partial (meaning that some, but not all of the descendents of that window are Full).

Figure 3B:
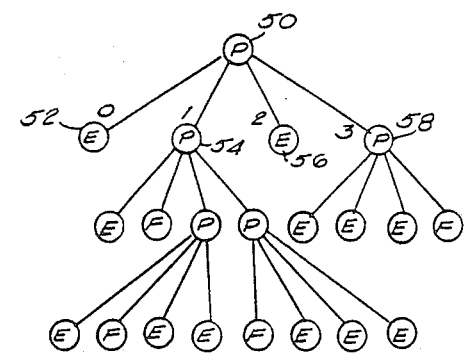
FIG. 3(B) is a schematic representation of a quadtree structure corresponding to the viewing plane shown in FIG. 3(A)

Referring to FIG. 3(B), a "quadtree" structure representing the two-dimensional view plane 66 shown in FIG. 3(A) is shown. It will be apparent that the quadtree structure of FIG. 3(B) is analogous to the octree structure of FIG. 2 except that each parent window is subdivided into only four (not eight) children windows (because windows in view plane 66 are subdivided into four rather than eight children). Each window in the quadtree structure analogously has associated with it a property value of either EMPTY (E), PARTIAL (P) or FULL (F), depending upon the relationship between the window and the image being displayed on view plane 66.

Note that the quadtree is comprised of "nodes" representing two-dimensional windows just as the octree is comprised of nodes representing three-dimensional parallelepipeds. Quadtree "nodes" will be referred to as "windows" to avoid confusion. Likewise, the three-dimensional parallelepipeds in the three-dimensional universe which octree nodes represent will also be referred to as "nodes" for the sake of simplicity, although it should be remembered that a node is an entry in the octree structure representing a parallelepiped in the three-dimensional universe.

Hidden Surface Removal and Traversal of the Octree

Figure 4A:
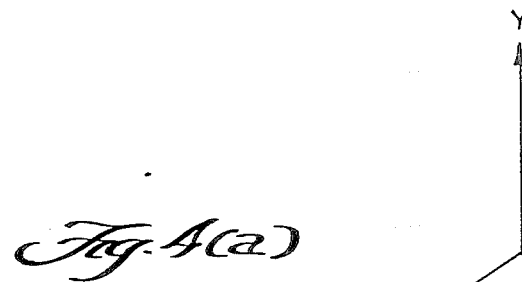
FIG. 4(A) schematically illustrates a traversal sequence of 0 to 7 of the eight children nodes of any given node in the octree structure for a given viewing angle.

Referring to FIG. 4(A), the octree traversal sequence for the eight children of an arbitrary parallelepiped descendent 60 of three-dimensional universe 32 for a predetermined viewing angle is shown. It will be understood that for any given viewing angle, an object contained in some of the children nodes may obstruct the view of different objects (or parts of the same object) contained in others of the children nodes. For instance, for the viewing angle shown, one of the children nodes (node 0) cannot be seen at all because it is obstructed by the other nodes. For the viewing angle shown, child node 7 is "closest" to the viewer, so that an object contained in child node 7 will not be obstructed by any of the other children nodes.

The octree traversal sequence, i.e. the order in which the eight children nodes of a given parent node in the octree structure are visited, must conform to the way in which some of the represented parallelepipeds obstruct others if a realistic three-dimensional image which doesn't show hidden surfaces is to be generated. For the viewing angle shown, node 7 is visited first, node 6 is visited next, etc., and node 0 is visited last (a 7-to-0 traversal sequence). A sequence which visits nodes such that no node later in the sequence can obstruct the view of a node earlier in the sequence is called a "front-to-back" traversal sequence. The order of some of the various nodes in the traversal sequence will be arbitrary for a given view point (for instance, for the viewing angle shown, it does not matter whether node 3 is visited before node 6 or after it).

As the viewing angle changes, the traversal sequence may change. For instance, if the node shown in FIG. 4(A) were rotated 180° about each of the x, y and z axes, the view of child node 7 would be obstructed completely and node 0 (not shown) would be the first node in the traversal sequence. A total of 8 such sequences are needed, corresponding to the 8 octants of the three-dimensional universe in which the observer may be located (the eight "viewing octants"). The presently preferred embodiment of the present invention uses the traversal sequence for the viewing angle shown in FIG. 4(A) to number and process each of the children nodes of a parent node. The hardware translates the node visited in this traversal sequence as a function of viewing angle.

Figure 4B:
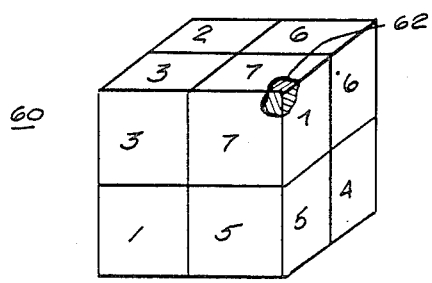
FIG. 4(B) graphically illustrates an object (comprising a single level 3 node) within the octree structure shown in FIG. 4(A)
Figure 4C:
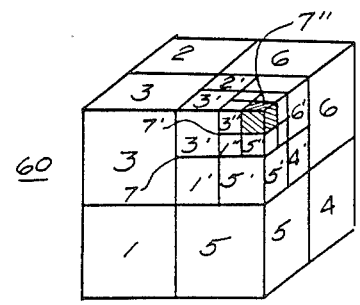
FIG. 4(C) is a schematic representation of the recursive application of the traversal sequence in the octree shown in FIG. 4(B) to further subdivide node 7 of the octree into children and grandchildren nodes in order to locate the node representing the object.

FIG. 4(B) shows an object 62 defined within the parent node shown in FIG. 4(A). Referring to FIG. 4(C), shown is the parent node of FIG. 4(B) subdivided into descendent nodes in order to isolate the position of object 62 within the parent node 60. Thus, child node 7 of node 60 is subdivided into its eight children, each of which is labeled according to the 7-to-0 traversal sequence shown in FIG. 4(A) (7', 6', 5', 4', 3', 2', 1' and 0' (not shown)). Likewise, node 7' is further subdivided into its eight children, each of which is also numbered according to the 7-to-0 traversal sequence. Object 62 is contiguous with node 7", (the great-grandchild node of node 60).

As discussed previously, a node containing an object (or part of an object) may obstruct the view of nodes containing another object (or another part of the same object) for a given viewing angle. Of course, E nodes will not obstruct any other nodes. Likewise, it can be determined with certainty which nodes are obstructed by a F node. A P node, however, must be further subdivided into the E and F nodes which comprise it in order to determine with certainty which nodes it obstructs. Thus, unless the first child node in the traversal sequence is E or F, it is necessary to subdivide that child node in order to determine which nodes in the three-dimensional universe it obstructs.

For this reason, the octree structure is traversed by *completely* processing (i.e. subdividing) nodes occurring earlier in the 7-to-0 traversal sequence (and the descendents of those nodes) *before* visiting later nodes in the traversal sequence. Hence, node 7" of FIG. 4(C) is visited before, for example, node 6", node 6', node 6, any "siblings" (i.e. nodes having a common parent) of node 60 occurring later in the 7-to-0 traversal sequence than node 60 or any siblings of the "ancestors" of node 60 which occur later in the traversal sequence than those ancestors.

This "depth-first" traversal of the octree structure (i.e. traversal of the octree downward from parent to child, and returning to the parent only when all of its descendents have been processed) is utilized by the presently preferred embodiment of the present invention because it permits hidden surface removal while the image is being generated. Other traversal schemes of the octree (such as "breadth-first" traversal, where an entire octree level is processed before the next level down is visited, or a hybrid of "depth-first" and "breadth-first" traversals) might be suitable for the generation of images other than realistic 3-dimensional images requiring hidden surface removal, where the octree was defined differently, or where constraints were placed upon the structure of the object being imaged. However, as will be explained later, this "depth-first" traversal sequence is also utilized by the presently preferred embodiment to prevent quadratic growth of the calculations required for image generation.

Those skilled in the art will recognize that a "back-to-front" traversal sequence could be used instead of the "front-to-back" sequence. If a "back-to-front" traversal sequence is used, hidden surface removal is accomplished by "overpainting" portions of the object by other obstructing portions of the object visited later in the back-to-front traversal sequence. As will become apparent, a front-to-back traversal sequence is far more efficient since whole subtrees of the octree structure may not have to be processed. However, a back-to-front traversal sequence of the octree structure might be warranted for particular applications or implementations.

Figure 5:
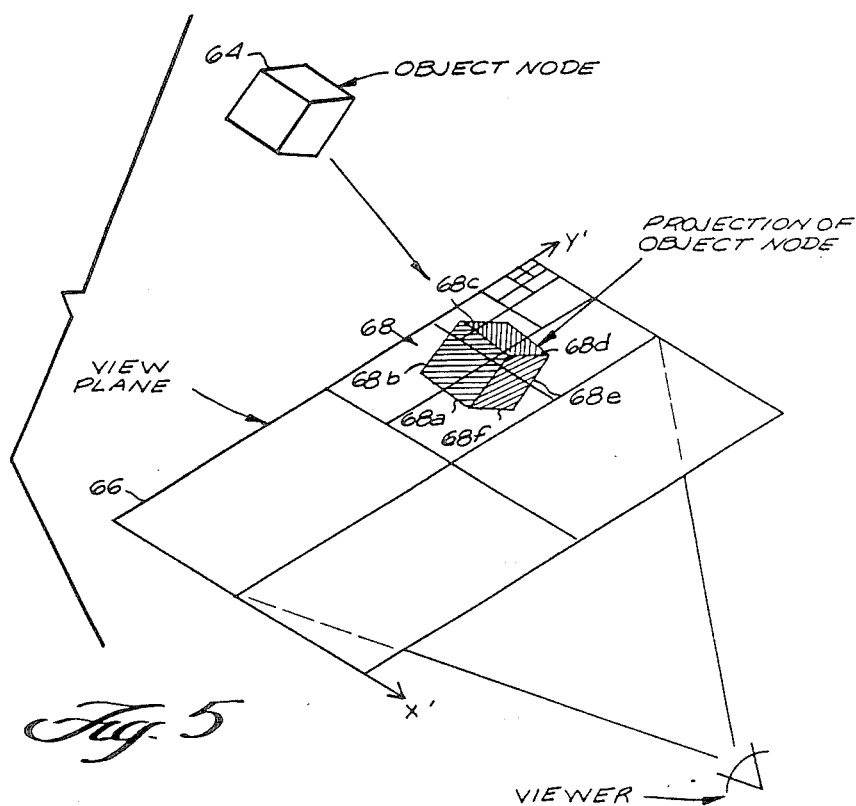
FIG. 5 is a schematic representation of a three-dimensional object node projected onto a two-dimensional viewing plane, the viewing plane being organized into a quadtree structure.

The Projection of the Three-Dimensional Universe onto the Two-Dimensional View Plane Referring to FIG. 5, shown is a parallelepiped 64 of the three-dimensional universe represented by an F node in the octree structure projected onto 2-dimensional view plane 66. The projection 68 of parallelepiped 64 onto view plane 66 in the general case will be a 2-dimensional polygon with six exterior edges 68a, 68b, 68c, 68d, 68e and 68f. It will be understood that just as a maximum of three faces of 3-dimensional parallelepiped 64 may be seen from any given viewing angle, a maximum of three faces of the parallelepiped will be projected onto view plane 66 for any given viewing angle (of course, if the viewing angle is such that only one or two faces of parallelpiped 64 may be seen, then only one or two faces, respectively, of object node 64 will be projected onto view plane 66, and the projection 68 will be a four-sided polygon).

Figure 6A:
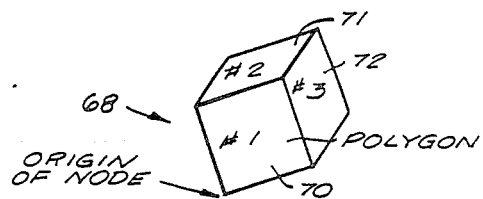
FIG. 6(A) is a graphic illustration of a projection of the three-dimensional object node shown in FIG. 5, wherein the three visible faces of the node at a given viewing angle are defined in the projection.

The six-sided polygon projection 68 of parallelepiped 64 onto view plane 66 in the general case can also be regarded as the projection of three faces of a parallelepiped, each of which is separated by an edge internal to the projection. Referring to FIG. 6(A), each of the three visible faces of parallelepiped 64 are projected as a four-sided polygon in the projection 68. Thus, faces number 1, 2 and 3 (arbitrarily numbered) of the object node appear as faces 70, 71 and 72 in projection 68.

Bounding Box and Window Overlay

Figure 6B:
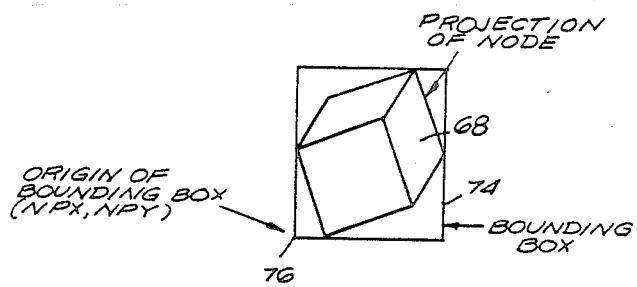
FIG. 6(B) is a graphic illustration of a bounding box defined by the node projection shown in FIG. 6(A)

Referring to FIG. 6(B), shown is a "bounding box" 74 defined by the node projection 68 shown in FIG. 6(A). Bounding Box 74 is defined as the smallest rectangle of predetermined orientation (i.e. having edges parallel to the view plane coordinate axes, not shown) which completely contains node projection 68. (Note that bounding box 74 need not be square, and in general will not be.) The origin 76 of bounding box 74 is arbitrarily defined to be the lower left-hand corner of the bounding box.

Figure 6C:
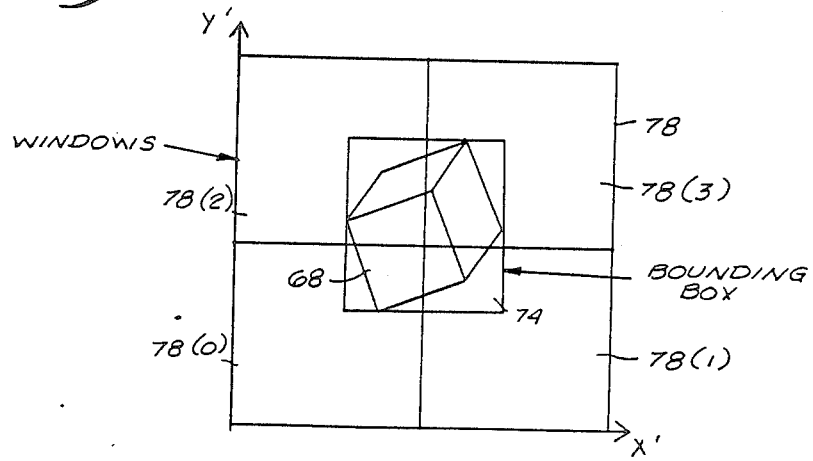
FIG. 6(C) is a graphic illustration of window overlay constructed around the node projection and the bounding box shown in FIG. 6(B) which it defines.

Referring to FIG. 6(C), a window overlay 78 is superimposed on node projection 68 and the Bounding Box 74 which it defines. Window overlay 78 comprises four contiguous windows 78(0), 78(1), 78(2) and 78(3) of equal size (i.e. at the same level of the quadtree shown in FIG. 3(B)).

Because windows of the view plane exist only in fixed and discrete sizes and locations (the length of an edge of a window at level n equals the length of the edge of the view plane/$2^n$), it will not be possible in the general case to find a single window which encloses bounding box 74. Because the bonding box is randomly located, it often lies on window edges, intersecting multiple windows. For this reason, window overlay 78 is defined as that set of four contiguous windows at the lowest common level of the quadtree structure which is just large enough to completely contain bounding box 74 regardless of its location (so that a set of four windows of common size of the next level of subdivision of the view plane will be too small to completely contain the bounding box in all cases). This implies that *each* of the four windows in the window overlay must be the same size as or larger than bounding box 74.

Given this definition of window overlay 78, a bounding box 74 for any node 68 will be enclosed by at least one window overlay 78 of four contiguous windows, all selected from the same level of the quadtree structure. A given bounding box 74 will usually be enclosed by only one window overlay. However, some bounding boxes may be enclosed by more than one window overlay, depending upon the orientation of the bounding box on the view plane (for instance, a bounding box that is completely enclosed by a single window will be enclosed by four different window overlays, each containing that window). In such cases, any one of the enclosing window overlays may be arbitrarily selected.

Obviously, if node 68 is subdivided into its eight children nodes, the projection of each child node will also be contained somewhere within the selected window overlay 78, as will be the bounding box of each child node. Although not immediately apparent, due to the symmetry between node and window geometries, the bounding box defined by any one of the eight children node projections will be enclosed by a contiguous window overlay selected from the sixteen child windows obtained when each of windows 78(0)-78(3) is subdivided into its four children.

In other words, when the quadtree structure is traversed one level down to subdivide a window overlay of a given node projection into a 4×4 window array (composed of four families of four children each), the window overlay of each of the eight child node projections of the given node projection (i.e. the four contiguous windows just large enough to completely contain the bounding box of that child node projection) may be selected from that 4×4 window array. Of course, different window overlays may and in the general case will be selected for different child node projections. Moreover, the four windows composing the window overlay need *not* be children of the same parent window (windows 78(0)-78(3)), although the four windows must be contiguous (i.e. "neighbors").

Thus, once the window overlay for a given node projection is located, both the quadtree and the octree structures may be subdivided together to locate the window overlay for the children of the given node. Hence, only a downward (as opposed to a lateral) traversal of the quadtree structure is necessary to locate the window overlay of any of the descendent node projections of a given node once the window overlay for that given node is located. Finally, if the window overlay of any given node projection is always located before the quadtree structure is traversed downward and the quadtree is only traversed downward one level at a time, then any quadtree subdivision will be a subdivision of a window overlay into a 4×4 window array.

Thus, only a small number of windows need ever be kept track of any one time, and downward traversal of the quadtree structure results in only a linear growth in the number of windows which need be manipulated at a given time. This feature is extremely important to the speed and efficiency of the preferred embodiment, as will soon be apparent.

When a subdivision of a node and a window occurs, the presently preferred embodiment of the present invention selects one child node projection at a time (from the eight children nodes resulting from the octree subdivision), selects the window overlay for that child node projection (from the 4×4 window array resulting from the quadtree subdivision), and proceeds to "process" each of the four windows in the window overlay individually in a manner that will be explained hereafter. The selection of any given window overlay from the 4×4 window array may suitably be encoded into a 6-bit value, as is shown in FIGS. 6(D)-6(F) (it will be understood by those skilled in the art that other encoding schemes using even fewer bits are possible).

Referring to FIG. 6(D), the preferred embodiment of the present invention selects from the 4×4 array (16 windows) the one of four possible 3×3 arrays within the 4×4 array which contains the bounding box of the child node projection. The variable W3×3X is set to logic level 0 if the selected 3×3 array contains any windows to the left of line a and is set to logic level 1 if the selected 3×3 array is entirely to the right of line a. Likewise, the variable W3×3Y is set to logic level 0 if the selected 3×3 array contains any windows below line b, and is set to logic level 1 if the selected 3×3 array is entirely above line b.

Referring to FIG. 6(E), the preferred embodiment next selects one window overlay containing the child node projection from the four possible 2×2 window arrays contained within the 3×3 window array selected in FIG. 6(C). The variable W2×2X is set to logic level 0 if the selected window overlay contains any windows to the left of line c, and is set to logic level 1 if the selected window overlay is entirely to the right of line c. Likewise, the variable W2×2Y is set to logic level 0 if the selected window overlay contains any windows below line d, and is set to logic level 1 if the selected window overlay is entirely above line d.

Once the preferred embodiment of the present invention has selected a window overlay from the 4×4 window array (the selection being encoded in the variables W3×3X, W3×3Y, W2×2X and W2×2Y, collectively referred to as the WBITS), single windows may be selected from the window overlay by a 2-bit variable WNUM. A suitable encoding of WNUM is shown in FIG. 6(F) (while any numbering convention would be suitable, the presently preferred embodiment of the present invention employs a numbering system wherein the lower left-hand window is numbered window 0 (00), the lower right-hand window is numbered window 1 (01), the upper left-hand window is numbered window 2 (10) and the upper right-hand window is numbered window 3 (11)). In "processing" any family of four children windows, this numbering convention is used as a "traversal sequence" to determine the order in which the windows are processed.

Generation of an Image

The object of the preferred embodiment according to the present invention is to locate and paint (i.e. shade a corresponding area of an Image Display) all windows of the view plane which are completely enclosed by projections of F nodes of the octree (i.e. those nodes which represent parallelepipeds which are completely enclosed by an object defined within the 3-dimensional universe). Assuming that node projection 68 shown in FIG. 6(C) is the projection of an F node, it is necessary to determine which, if any, of the four windows of window overlay 78 are completely enclosed by the projection. If any of the windows are completely enclosed, those windows will be painted; however, if one or more of those windows are only *partially* enclosed by projection 68, the windows that are partially enclosed will be further subdivided in order to locate completely enclosed windows. (Windows disjoint with the projection are not painted, of course).

For reasons of efficiency (i.e. in order to quickly eliminate those windows which are not enclosed by a node projection as will be further explained later), the presently preferred embodiment tests each window in the window overlay to determine if it is completely enclosed by a node projection by testing it in succession by three independent tests: the bounding box test (BBOX test), the polygon intersection test (PI test) and the enclosure test (E test). The results of these tests indicate whether the window intersects or is enclosed by the node projection.

The Bounding Box Test

Referring to FIG. 7, shown is the geometry associated with the first of the three tests mentioned above, the BBOX test. Node projection 68 and the bounding box 74 which it defines is located at an arbitrary point on the view plane; the origin 76 of the bounding box 74 is suitably defined as (NPX+ax, NPY+ay). The dimension of bounding box 74 in the x' direction (i.e. the width) is suitably defined as bx, while the dimension of the bounding box in the y' direction (i.e. the height) is suitably defined as by. Thus, the four edges of bounding box 74 define the lines NPX+ax, NPX+ax+bx, NPY+ay and NPY+ay+by. Note that the former two lines are both parallel to a y' axis of the view plane, while the latter two lines are parallel to an x' axis of the view plane (one of the constraints of the definition of the bounding box).

A window 78(3) with origin (Wx, Wy) and dimension e (since all windows are square, their dimensions in x' and y' are equal) is shown. Window 78(3) is suitably selected from the window overlay 78 of node projection 68 shown in FIG. 6(C) (the particular window selected here is the upper righthand window of that overlay). The four edges of window 78(3) define the lines Wx, Wx+e, Wy and Wy+e.

The object of the bounding box test is to determine whether the bounding box defined by the node projection under test is intersected by one or more of the four windows of overlay 78 defined by that node projection. To determine this, the position of each of the four edges of each of the windows in overlay 78 is compared to the position of a corresponding one of the edges of bounding box 74, as follows:

Is the bottom edge 80a of window 78(3) *lower* than the top edge 80b of bounding box 74?

Is the top edge 82a of window 78(3) *higher* than the bottom edge 82b of bounding box 74?

Is the left edge 84a of window 78(3) *to the left of* right edge 84b of bounding box 74?

Is the right edge 86a of window 78(3) *to the right of* left edge 86b of bounding box 74?

These four comparisons can be written in equation form as follows:

$$Wy < NPY + ay + by \text{ AND}$$

$$Wy + e > NPY + ay \text{ AND}$$

$$Wx < NPX + ax + bx \text{ AND}$$

$$Wx + e > NPX + ax$$

then the bounding box test passes for that window.

Because bounding box 74 is, in general, larger than node projection 68, a window which intersects the bounding box does not necessarily intersect the node projection. However, any window which does not intersect bounding box 74 of node projection 68 does not intersect with the node projection. Thus, a window which *passes* the BBOX test does not necessarily intersect the node projection, but a window which *fails* the BBOX test definitely does *not* intersect with the node projection. A second test is required to determine if the window intersects the node projection itself.

The Polygon Intersection Test

The object of the polygon intersection (PI) test is to determine if a window that has been found to intersect the bounding box of a node projection of interest intersects the node projection itself. The PI test is performed by selecting a "critical vertex" of the window for each of the six edges of the node projection and comparing the position of each edge of the node projection with the position of its corresponding critical vertex to determine if the critical vertex lies on the "side" of the edge interior to the node projection. The PI test actually comprises six independent comparisons, one for each of the six edges of a node projection.

Referring to FIG. 8, shown is an arbitrary window 88 and an arbitrary node projection 68 having six exterior edges 11–16. The position of window 88 must be compared with the position of each of edges 11–16 to determine if some part of the window intersects some part of node projection 68.

Referring to FIGS. 9(A), 9(B), 9(C) and 9(D), shown is a graphic illustration of the selection of a PI test critical vertex of window 88 for an edge of a node projection as a function of the slope of the edge and the orientation of that edge with respect to the interior of the node projection. Upper left-hand vertex 88a of window 88 is selected as the critical vertex for the PI test for edges such as edge 90 which have a positive slope (with respect to the view plane coordinate system) and are segments of lines defining a half-plane such that the node projection lies above (i.e. in the positive y direction with respect to) the edge (for example, edge 11 of FIG. 8 meet this description). The lower right-hand vertex 88b of window 88 is selected as the critical vertex for edges such as edge 92 which have a positive slope and are segments of lines defining a half-plane such that the node projection lies below the edge (for example, edge 14 of node projection 68 of FIG. 8 meets this description). The upper right-hand vertex 88c of window 88 is selected as the critical vertex for edges such as edge 94 which have a negative slope and are segments of lines defining a half-plane such that the node projection is above the edge (for example, edge 13 of node projection 68 shown in FIG. 8 meets this description). Finally, the lower left-hand vertex 88d of window 88 is selected as the critical vertex for edges such as edge 96 which have a negative slope and are segments of lines defining a half-plane such that the node projection lies entirely below the edge (for example, edge 16 of node projection 68 of FIG. 8 meets this description).

Figure 10:
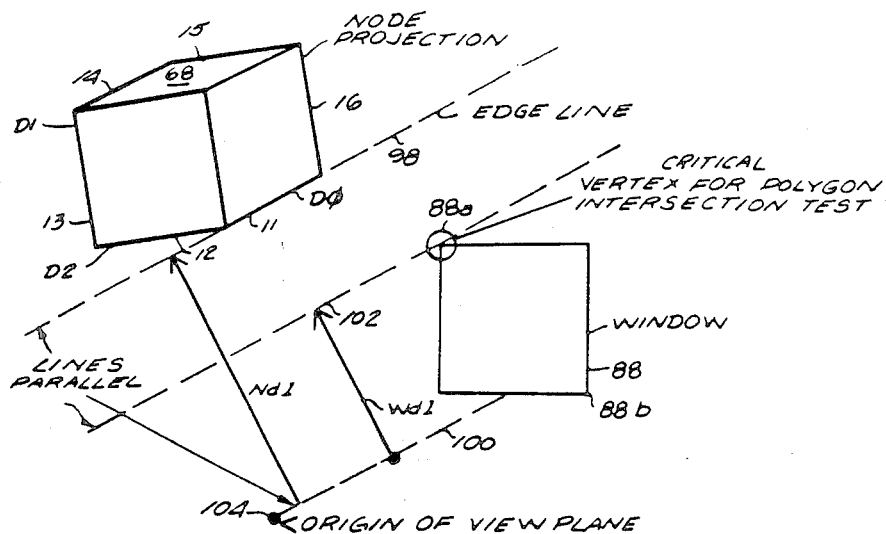
FIG. 10 is a graphic illustration of the geometry associated with the polygon intersection test, wherein the position of each exterior edge of a node projected onto the view plane is compared with the position of an associated critical vertex of a quadtree window to determine if the window intersects the node projection.

Referring to FIG. 10, shown is the geometry of the PI test for edge 11 of node projection 68. Because edge 11 has a positive slope and is a segment of a line 98 defining a half-plane such that the node projection 68 lies completely above the line, vertex 88a of window 88 is selected as the critical vertex associated with edge 11 (the geometry is analogous to that shown in FIG. 9(A)). The PI test determines whether critical vertex 88a lies within the half-plane defined by line 98 which contains node projection 68. Thus, for this geometry it must be determined whether the critical vertex lies *above* the line (if the node projection 68 was contained by the half-plane *below* line 98, the opposite vertex 88b would be selected as the critical vertex, and the test would have to determine if vertex 88b lies in the half-plane *below* line 98).

To determine if critical vertex 88a lies above line 98, two additional lines 100 and 102 are constructed. Line 100 is suitably the line parallel to line 98 defined by the edge of node projection 68 in interest (here, edge 11) which passes through the origin of the view plane 104 (how the origin of the view plane 104 is defined will be discussed hereafter; it suffices here to define point 104 as an arbitrary fixed point used for all six critical vertex-to-edge comparisons of the PI test).

Line 102 is suitably the line constructed parallel to line 98 which passes through critical vertex 88a. If line 102 lies within the half-plane defined by line 98 which contains node projection 68, then critical vertex 88a will also lie within that half-plane.

A line segment Nd1 is suitably constructed from line 100 to line 98 perpendicular to both of these lines. The length of line segment Nd1 is thus the distance between lines 98 and 100. Analogously, a line segment Wd1 is constructed from line 100 to line 102 perpendicular to both of these lines. The length of line segment Wd1 is the distance between lines 102 and 100. The length of line segment Nd1 is compared with the length of line segment Wd1; if the length of line segment Nd1 is less than the length of line segment Wd1, critical vertex 88a lies in the same half-plane defined by line 98 which contains node projection 68.

As mentioned previously, the comparison just described is made for all six of the edges of node projection 68. Only if all six comparisons yield a pass result (i.e. if the selected critical vertex for each of the six edges is found to lie within the "interior" half-plane defined by its respective edge) does the window 88 pass the polygon intersection test. If a window passes the PI test, it does not necessarily intersect node projection 68; this is because all six of the comparisons are made with respect to half-planes rather than with respect to the node projection itself.

As mentioned previously, a window which *passes* the BBOX test cannot be guaranteed to intersect the node projection, although a window which *fails* the BBOX test *can* be guaranteed *not* to intersect the node projection. Likewise, a window which *passes* the PI test cannot be guaranteed to intersect the node projection, although a window which *fails* the PI test *can* be guaranteed not to intersect the node projection. However, if a window passes *both* the BBOX and PI tests, it can be proven that the window in fact intersects the node projection.

Thus, by successively applying two relatively simple geometric tests to a given window, the BBOX test and then the PI test, it can be determined with certainty whether that window intersects the node projection. The preferred embodiment of the present invention uses this method for testing intersection because it may be easily carried out using simple calculations and few operands (i.e. for efficiency reasons). Those skilled in the art will, of course, be able to devise methods for testing geometric intersection between window 88 and node projection 68 which yield more determinative results with fewer comparisons. However, by employing a series of relatively simple tests rather than one single, more complex test, the presently preferred embodiment quickly determines cases of non-intersection and non-intersecting windows are quickly discarded. (Statistical analysis has shown that approximately 80% of the windows that do not intersect node projections are eliminated by the BBOX test.)

Enclosure Test

As mentioned previously, the object of the present invention is to locate and paint all of those windows on the view plane which are entirely enclosed by the projection of a F node (i.e. one which is enclosed by an object). A window which does not intersect a given node projection cannot possibly be enclosed by the node projection. However, only a subset of those windows which intersect a node projection (as determined by the combined results of the BBOX and PI tests) are enclosed by the node projection. Thus, a third test, called the enclosure (E) test, is necessary to determine enclosure.

The preferred embodiment employs a technique called "block shading", an added enhancement which necessitates dividing node projection 68 into three faces (as was shown in FIG. 6(A)); the E test determines not whether a given window is enclosed by the node projection, but whether it is enclosed by *one of the faces* of the node projection. While the algorithm executed by the preferred embodiment of the present invention would be somewhat simplified if the E test was performed with respect to the entire node projection, separate E tests for each of the three faces of the node projection are performed in order to permit the creation of a more realistic three-dimensional image. (An alternate shading method called "surface normal" shading uses the entire node projection, not the individual faces, and will be discussed below).

When a given window is painted, the color or shading which it is painted may be affected by a number of factors; windows may be painted any color or shade desired. It has been found that by painting windows one of three different colors or shades depending upon which one of the three faces of the node projection encloses that window, a sense of depth is added to the final image because the viewer is able to distinguish three direction planes of the object (as defined by the three visible faces of the parallelepiped three-dimensional universe) from one another. In order to make this shading distinction, it is thus necessary to determine not merely whether the node projection encloses a given window, but whether one of the three faces of the node projection encloses that window.

The object of the E test, then, is to determine whether a window is completely enclosed by one of the three faces of the node projection. The geometry of the E test is similar to that of the PI test. Referring to FIGS. 11(A)–(D), shown is a graphical illustration of the selection of a critical vertex of an abitrary window 88 for the E test as a function of the slope of a face edge of a node projection and the orientation of that face edge with respect to the interior of the face of the node projection. It will be noted by comparing FIGS. 9(A)–(D) and 11(A)–(D) that the vertex opposite that selected for the PI test is selected as the critical vertex for the E test in each of the four cases. Thus, a face edge such as edge 90 having a positive slope (with respect to the view plane coordiante system) and is a segment of a line defining a half-plane containing the interior of the face which lies above the line selects vertex 88b of window 88 as the critical vertex for the E test. Vertices 88a, 88d and 88c of window 88 are selected as the critical vertex for the E test for face edges 92, 94 and 96, respectively, in an analogous manner.

Figure 12:
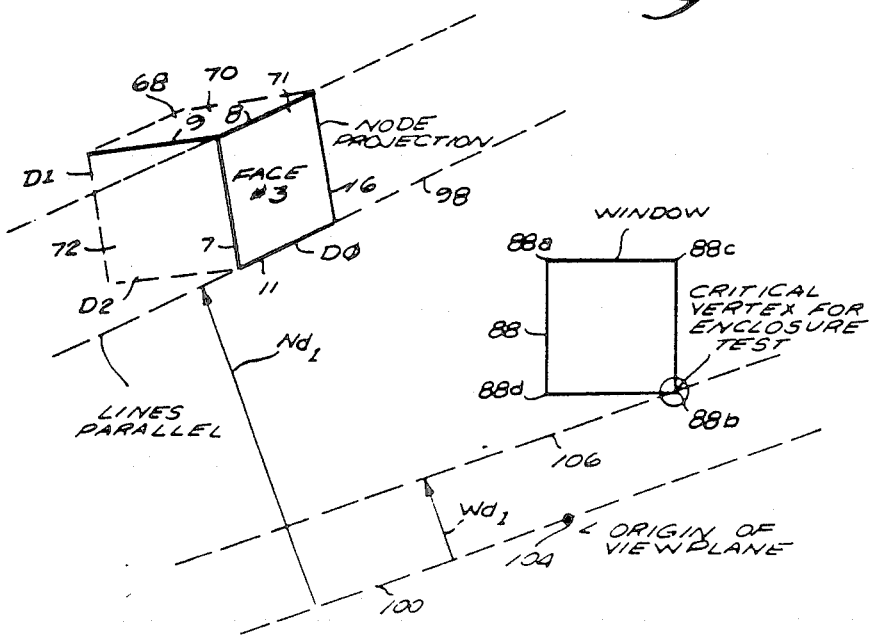
FIG. 12 is a graphic illustration of the geometry associated with the Enclosure test, wherein the position of each edge of each face of a node projected onto the view plane is compared with the position of an associated critical vertex of a quadtree window in order to determine if the window is completely enclosed by a face of the node projection.

Referring to FIG. 12, shown is the geometry associated with edge 11 of face 71 of node projection 68 for the E test. It will be understood that the E test involves four such comparisons for each face of the node projection (for a total of twelve comparisons) in order to test each of the three faces of the node projection.

A line 98 defined by edge 11 of face 72 is suitably constructed, as for the PI test. Likewise, a second line 100 is suitably constructed parallel to line 98 and passing through origin 104 of the view plane. A third line 106 is constructed parallel to line 98 which passes through the critical vertex 88b of window 88. A line segment Nd1 is constructed between lines 100 and 98 and perpendicular to both of these lines, just as for the PI test. Likewise, a second line segment Wd1 is constructed between line 100 and line 106 perpendicular to both of these lines.

For the geometry shown, if window 88 is completely enclosed by face 71, then all of the following must be true: critical vertex 88b must lie above edge 11; critical vertex 88a must lie below edge 8; critical vertex 88c must lie to the left of edge 16; and critical vertex 88d must lie to the right of edge 7.

To determine if critical vertex 88b lies within the half-plane defined by line 98 in which the interior of face 71 lies, it is necessary only to compare the position of line 106 with the position of line 98; for the geometry shown, if line 106 lies above line 98, then critical vertex 88b must also lie above line 98 (and thus in the "interior" half-plane). This comparison may suitably be accomplished by comparing the length of line segment Nd1 with the length of line segment Wd1; if Nd1<Wd1, then the E test for the critical vertex 88b is satisfied (it will be understood that the direction of the inequality sign will change if the half-plane defined by line 98 containing face 71 lies below the line, just as the opposite critical vertex 88a would be selected for the comparison). An analogous comparison is performed for each of the four edges of face 71. If it is found that all of the four comparisons are true, then the window passes the E test for that face, meaning that the window is completely enclosed by the face.

Obviously, a given window can only be enclosed by one of the three faces of a given node projection. Nevertheless, because all of the twelve comparisons require similar information, all twelve comparisons may suitably be performed simultaneously to determine (1) whether the window is enclosed by a face (in which case an EPASS signal is generated) and (2) which of the three faces it is enclosed by if it is so enclosed (indicated by FACE NUMBER information specifying which of the three faces the window is enclosed by so that the window may suitably be painted a proper color).

Figure 13:
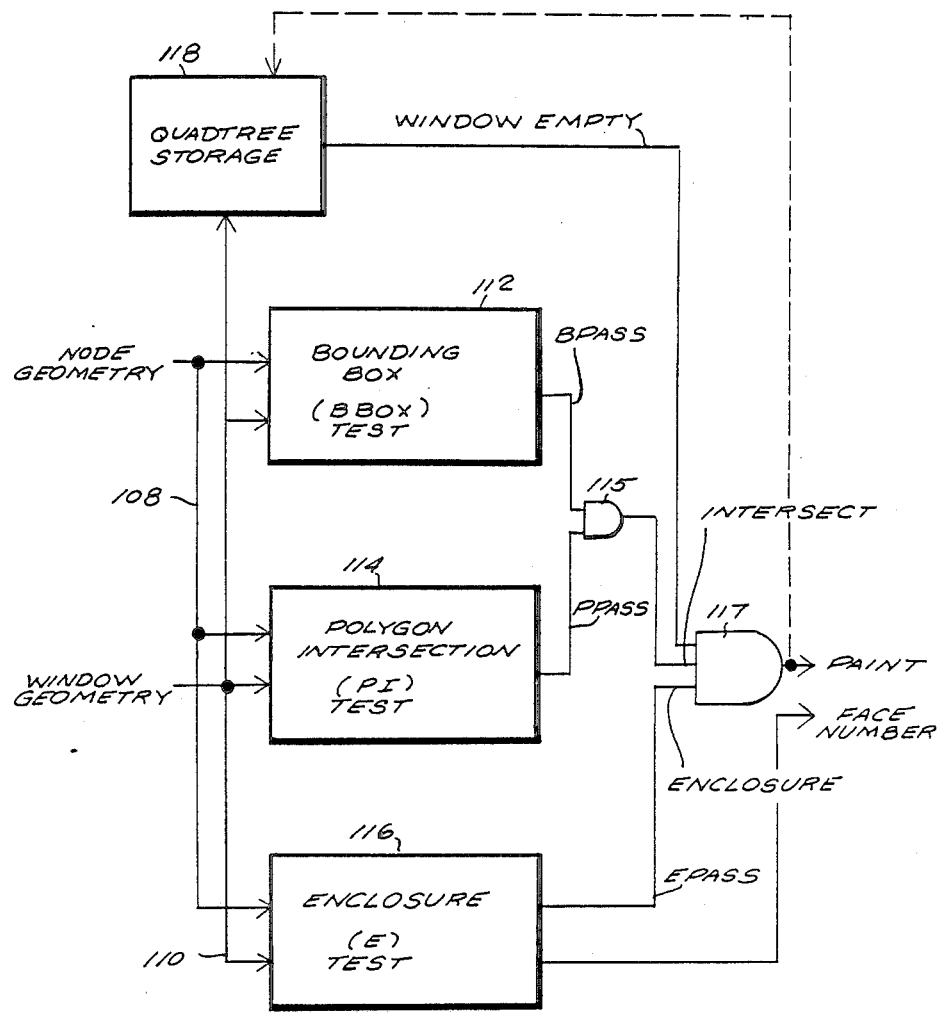
FIG. 13 is a functional block diagram showing the application of the results of the bounding box test, the polygon intersection test and the enclosure test to generate a result indicating whether a quadtree window intersects or is completely enclosed by a face of a node projection.

Referring to FIG. 13, shown is a functional block diagram of how the results of the BBOX, PI and E tests are used by the preferred embodiment of the present invention. As discussed, each of the three tests are carried on independently. Likewise, each of the three tests use similar information about the location and orientation of node projections ("NODE GEOMETRY") carried on bus 108 and the position and orientation of windows in the view plane ("WINDOW GEOMETRY") carried on bus 110. The BBOX test block 112 generates an output BPASS indicating whether the window passes the BBOX test. The PI test block 114 generates an output PPASS indicating whether the window passes the PI test. BPASS and PPASS are ANDed together (by AND gate 115) to generate the signal INTERSECT, which is asserted if the window intersects the node projection, as discussed above.

The E test block 116 generates an output signal EPASS which is asserted if the window passes the E test, and also generates a signal FACE NUMBER, which indicates which face of the node projection the window is enclosed by (if it is enclosed by any of them). The EPASS signal is ANDed with the INTERSECT signal by AND gate 117 to generate an output signal PAINT.

It should be noted that while the process shown in FIG. 13 performs each of the three tests simultaneously, the presently preferred exemplary embodiment in accordance with the present invention actually performs successively the Window Not FULL and BBOX tests, then the PI test and finally the E test. Only if the window is not FULL, and the BPASS signal is generated will the PI test be performed, and only if the PPASS signal is generated will the E test be performed. Efficiency is increased in this manner, since windows which fail an early one of the tests are disposed of early after a minimum number of calculations.

It will be understood that simultaneous performance of these tests may be preferred to allow even greater efficiency if suffcent hardware was available (such as in a VLSI enviroment). Indeed, different testing algorithms might be preferred for other hardware implementations. For instance, the PI test could be performed on faces of the node projection rather than on the entire node projection (just as the E test is performed on the individual faces). Some of the features of the testing algorithm are arbitrary or determined by the particular hardware implementation employed, and might not be preferred for different hardware implementations (e.g. VLSI) of the invention. Moreover, it will be understood by those skilled in the art that the PI and E tests could in fact be completely dispensed with entirely, and the BBOX test alone relied upon to determine whether the node projection intersects the window under test. While substantial inefficiency would result by using only the BBOX test (as will become apparent), the image generation could still be successfully carried out. The added inefficiency might be tolerable in, for instance, VLSI hardware environments, where high speed could compensate for inefficiencies in the algorithm executed.

The Image Generation Algorithm

In the course of discussing the operation of each of the three tests, an arbitrary node projection and an arbitrary window were assumed. As mentioned before, however, window 88 is actually one of the four windows of window 78(0)–78(3) of window overlay 78 in FIG. 6(C). Each of the windows in the window overlay must be tested for the BBOX, PI and E tests.

Only the projections of non-Empty (i.e. P or F) nodes are tested for intersection by the preferred embodiment, since only nodes containing or contained by an object will project an image onto the view plane. Likewise, only Full nodes are suitably ever tested for enclosure, since it would not be known with certainty whether a window enclosed by a Partial node should be painted or not (part or none of such a window might actually be enclosed by the projection of nodes contained by the object). Partial nodes are tested for intersection (by the BBOX and the PI tests), however, since descendents of a window can only be enclosed by descendents of a node if the window and the node intersect. Determination of non-intersection may eliminate many unnecessary tests at lower levels. Hence, an EMPTY node may be discarded, while a PARTIAL intersecting node must be further subdivided until its FULL descendents are encountered if it continues to intersect at least one window that was not previously painted.

If a window is found to intersect a FULL node projection (i.e. the INTERSECT signal shown in FIG. 13 is asserted) but fails the E test, then only part of that window is enclosed by the node projection. Recalling the quadtree structure of the view plane shown in FIGS. 3(A) and 3(B), at least one of the descendents of the window must be a FULL window which is completely enclosed by the node projection (assuming a quadtree structure with an infinite number of levels). In this case, the window is subdivided into its four children and the BBOX, PI and E tests are performed on each child window to determine if one of them is completely enclosed by the node projection. (Hence, in this special case, the window overlay will be comprised of four children windows having the same parent.) This process continues recursively until all partially-enclosed windows have been subdivided into windows that are either FULL or EMPTY (or until a predetermined resolution limit is reached).

If a window is found which passes all three tests and is thus completely enclosed by a FULL node projection, it must be marked FULL (F) in the quadtree structure shown in FIG. 3(B). In order to keep the quadtree structure accurate, all of the ancestors of this FULL window marked E must be marked PARTIAL (P). Moreover, if it happens that the other three siblings (children of the same parent window in the quadtree) of this FULL window are also FULL, then its parent window must be marked FULL. The Quadtree Storage block 118 shown in FIG. 13 is used to store the updated quadtree structure.

The reader should now begin to appreciate the recursive nature of the algorithm in accordance with the present invention. The octree structure representing three-dimensional space is traversed to locate FULL nodes, and simultaneously, the quadtree structure of FIG. 3(B) is traversed to locate windows which are completely enclosed by the projections of those full nodes. At any given level of the octree structure, all eight children nodes must be processed: EMPTY nodes are disposed of immediately; FULL nodes are processed by subdividing the windows of the window overlays defined by those full nodes (by traversing the quadtree structure downward) to locate those windows which are completely enclosed by the projections of those FULL nodes; and PARTIAL nodes are subdivided (together with the window overlays defined by the projections of such nodes) to locate FULL nodes unless all intersecting windows are FULL (already painted).

Once a FULL node is encountered, each of the intersecting, non-FULL windows in the overlay which it defines are tested to see if they are completely enclosed by the projection of the FULL node. Windows which are completely enclosed by the node projection are painted; windows which do not intersect the node projection are discarded; and windows which intersect but are not enclosed by the node projection are further subdivided (given the limitations imposed by the window resolution) to locate windows which are enclosed.

As discussed previously, in order to avoid displaying surfaces hidden from the viewer for a given viewing angle, only a subset of the nodes marked as FULL in the octree structure of FIG. 2 will actually cause painting on the display screen because the view of some of the FULL nodes will be obstructed by other FULL nodes. Because the object is three-dimensional, some windows may be completely enclosed by several F node projections simultaneously; only the projection of the first-encountered enclosing node in the traversal sequence should be permitted to paint such a window since this first FULL node, being visited first in the octree traversal sequence, visually obstructs the portions of the object represented by later-visited FULL nodes. Often, such later nodes are never visited because an ancestor node was found to not intersect any non-FULL windows and it and its descendants are discarded (i.e. never accessed). However, when the later node or nodes completely enclosing the window are visited, the window will be found to be FULL and not painted. Thus, only the first such enclosure will result in painting. Correlative to this, while any given node in the octree is visited only once, a given window may be visited numerous times (but may be painted only once).

Referring once again to FIG. 13, to ensure that a given window is painted only once, the quadtree storage block 118 generates an output WINDOW EMPTY indicating whether the window under test has previously been painted. This output is ANDed together with the INTERSECT and the EPASS signals by AND gate 117, so that the PAINT signal is only produced if the window is both enclosed by a face of the node projection and has not been painted previously.

If the PAINT signal is asserted, the window will be painted on a display screen according to one of three shades or colors determined by the FACE NUMBER signal (for block shading) and in a location specified by Window Geometry bus 110.

Cut Plane Test

One of the prinicipal advantageous features of the algorithm discussed above is that a realistic two-dimensional image of a three-dimensional object is generated in which all surfaces which are hidden from view from the given viewing angle are eliminated from the image. It is often useful, however, to generate sectional or cut-away images of the three-dimensional object, permitting a user to define portions of the object which are not to be displayed so that those portions do not obstruct the view of the portions of the object which the user desires to see.

An enhancement of the algorithm executed by the presently preferred embodiment of the present invention permits a user to define a three-dimensional subset of the three-dimensional universe. The algorithm will only produce the PAINT signal when an F node completely encloses the window under test, the window has not previously been painted and the F node lies completely within the user-defined three-dimensional space. By defining this space in different ways, the user may view areas of the object which would ordinarily be hidden from view from the particular viewing angle (or perhaps from every viewing angle).

Figure 14A:
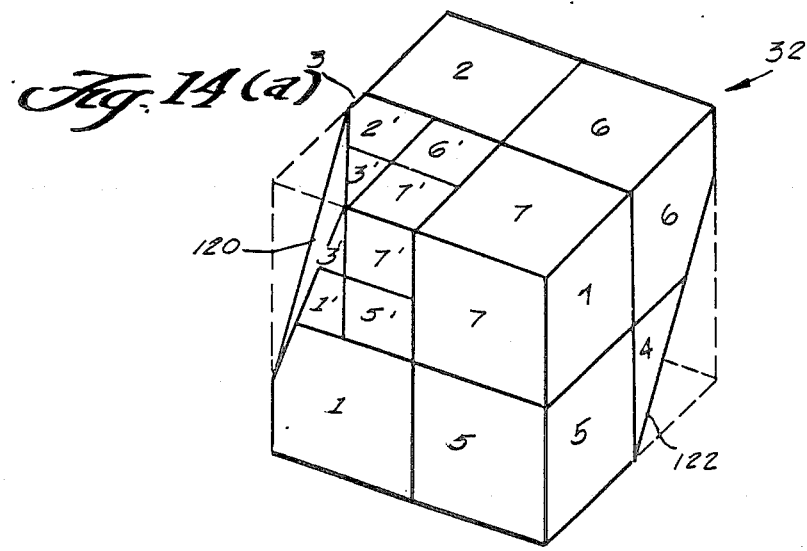
FIG. 14(A) is a graphic illustration of those portions of Node 60 shown in FIG. 4(A) which fall within a region defined by a pair of cut planes.

Referring to FIG. 14(A), shown is a graphic illustration of three-dimensional universe 32, portions of which have been eliminated from interest. In order to simplify the calculations involved, the preferred embodiment permits the user to define a subset of universe 32 of interest by defining a pair of parallel "cut planes" 120 and 122. Cut planes 120 and 122 may have any orientation with respect to universe 32, the only constraint being that they are parallel planes.

The portion of universe 32 which will be displayed is that portion lying between cut planes 120 and 122 (or outside of the space between the two planes, at the user's selection). For the geometry shown, nodes 7 and 2 and 0 (not shown) lie entirely within the space defined by cut planes 120 and 122 to be displayed, and will be processed as previously discussed. Likewise, if cut planes 120 and 122 were situated such that some of the descendent nodes of root node 32 were located entirely outside of the region to be displayed (for example, if the region to be displayed was defined as that portion of root node 32 lying outside of the space between the two planes, nodes 7 and 2 and 0 would be such nodes), these nodes could be immediately discarded and not tested at all for either intersection or enclosure since they could never be used to paint windows (even if they were F nodes).

Somewhat analogous to the concept of a P node discussed previously, however, are those nodes which are intersected by one of cut planes 120 or 122. For example, child node 3 of root node 32 is intersected by cut plane 120, so that some of its child nodes are within the region to be displayed while some of them are outside of that region. Just as a P node must be further subdivided to determine which of its descendents are F nodes, a node which intersects a cut plane must be further subdivided to locate all of its descendent F nodes which lie within the region to be displayed (as defined by the cut planes). Thus, child nodes 7', 6', 5' and 4' of child node 3 are contained within the region to be displayed defined by cut planes 120 and 122, and will be processed as discussed previously. However, children nodes 3', 2', 1' (and probably 0', not shown) of child node 3 are in turn intersected by cut plane 120, and must be further subdivided.

While it would be possible to first subdivide root node 32 in order to determine which of its descendents were located within the region to be displayed by cut planes 120 and 122, trim the octree structure to eliminate all those nodes which were not so located, and then perform the algorithm as discussed previously on the modified octree structure, such a method would require a separate definition of the octree structure for each different definition of cut planes 120 and 122. The presently preferred embodiment of the present invention traverses the octree structure only once, and subdivides a node either if it is a P node or if it is an F node and is intersected by a cut plane. A PAINT signal is only produced if the conditions previously discussed are satisfied and the F node under test is completely contained within the region defined by the cut planes to be displayed.

Figure 14B:
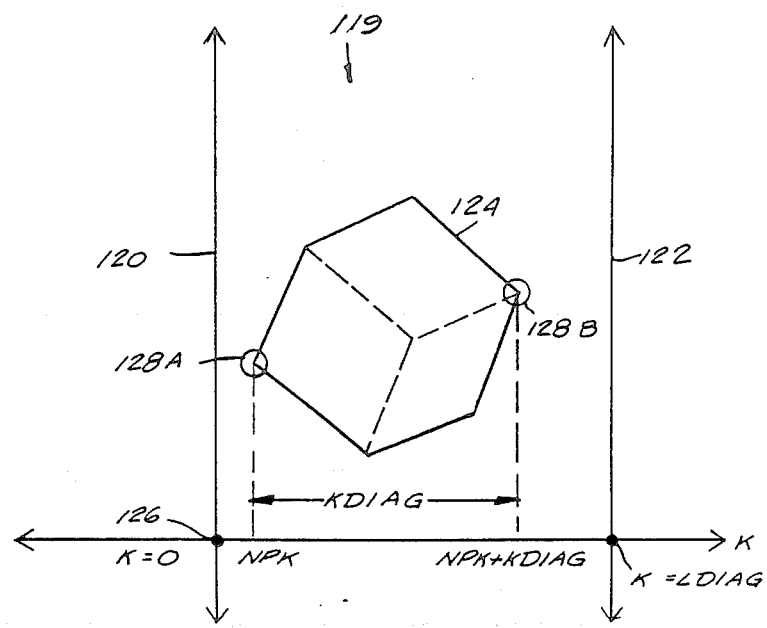
FIG. 14(B) is a graphic illustration of the geometry associated with the cut plane test, which determines whether a node is inside or outside of the region defined by a pair of cut planes and whether the node is intersected by a cut plane.

Referring to FIG. 14(B), shown is a graphic illustration of the geometry of the cut plane test, which determines whether a node is contained within the region to be displayed defined by cut planes 120 and 122. The node under test is projected onto a two-dimensional cut plane test plane perpendicular to the cut planes 119 (the plane of the page), resulting in a node projection 124 (while this process is exactly analogous to projecting a node onto the view plane discussed previously, the test plane and the view plane are not, in general, the same entities in the presently preferred embodiment because the cut planes can be randomly oriented with respect to the view plane.

A k axis perpendicular to both cut planes 120 and 122 is constructed. Cut plane 120 (the "reference" cut plane) is located at k=0, while cut plane 122 is located at k=LDIAG (in the preferred embodiment, the user defines the locations of cut planes 120 and 122 by specifying the direction of the k axis on the test plane, the position in 3-D of point 126 (k=0) the distance LDIAG between cut planes 120 and 122, and whether the region to be displayed is either inside of the cut planes (i.e. $0 \leq k \leq LDIAG$) or outside of the cut planes (i.e. $k \leq 0$ or $k \geq LDIAG$). Those skilled in the art will understand that it is not really necessary to project the node onto test plane 119; actually, nodes are projected onto a line, the k axis (thus, a three-dimensional parallelepiped is actually projected into one dimension to determine distances).

It is necessary to isolate the two vertices 128a and 128b of node projection 124 which have k coordinates that are most negative and most positive. The k coordinate of the "left-most" vertex 128a of node projection 124 (i.e. that vertex which has the most negative k coordinate) is defined as NPK. Analogously, the "right-most" vertex 128b of node projection 124 (that vertex which has the most positive k coordinate) is defined as NPK+KDIAG.

If the region to be displayed is defined as that region inside of the cut planes 120 and 122, then node projection 124 is entirely within the region to be displayed if:
NPK>0 AND
NPK+KDIAG<LDIAG
These equations are satisfied if the left-most vertex 128a is to the right of reference cut plane 120 and the right-most vertex 128b is to the left of cut plane 122 (node projection 124 shown in FIG. 14(B) satisfies these conditions).

If the region to be displayed is selected as the region outside of cut planes 120 and 122, then a node located within the region to be displayed must satisfy the following equation:
NPK>LDIAG OR
NPK+KDIAG<0
These equations are satisfied if either the left-most vertex 128a is to the right of cut plane 122 or the right-most vertex 128b is to the left of reference cut plane 120.

If neither of these two sets of conditions are satisfied, then the node projection under test is neither completely within or completely outside of the region to be displayed; in other words, it is intersected by one (or both) of the cut planes. As discussed above, a node which is intersected by a cut plane must be further subdivided in order to determine which of its descendents lie within the region to be displayed and which lie outside of the region to be displayed. While perhaps not immediately apparent, all of the nodes along an "edge" of the object defined by a cut plane (i.e. along the flat surface defined by a cut plane which borders the region to be displayed as shown in FIG. 14(A)) will in general be the lowest level of subdivision permitted by the constraint of resolution requirements.

While the use of a pair of parallel planes to define a region to be displayed within the three-dimensional universe is efficient and requires few calculations to implement, it has the disadvantage that only planar sectional views can be generated. Such views are extremely useful in many applications (such as in CAD/CAM systems) where planar sectional views are the conventional type of sectional views employed. It may be desirable, however, to allow the user to define more complex regions to be displayed.

One simple way to expand the user's capability to define complex regions to be used for sectional views is to permit independent definition a plurality of pairs of parallel cut planes. Only those nodes which are contained within the regions to be displayed defined by all of the pairs of cut planes will be permitted to paint windows; likewise, a node will be subdivided if it is non-Empty and is intersected by any one of the multiple cut planes. Providing a user with the capability of independently defining three pairs of cut planes (and, independently, whether the region to be displayed is inside or outside each pair) permits the generation of extremely complex sectional views. It will be understood that it would also be possible to define such regions through the use of second-order equations (or equations of higher orders), although the complexity of the calculations required to determine whether a node is within the region to be displayed would increase.

Functional Representation of the Preferred Embodiment

Figure 15:
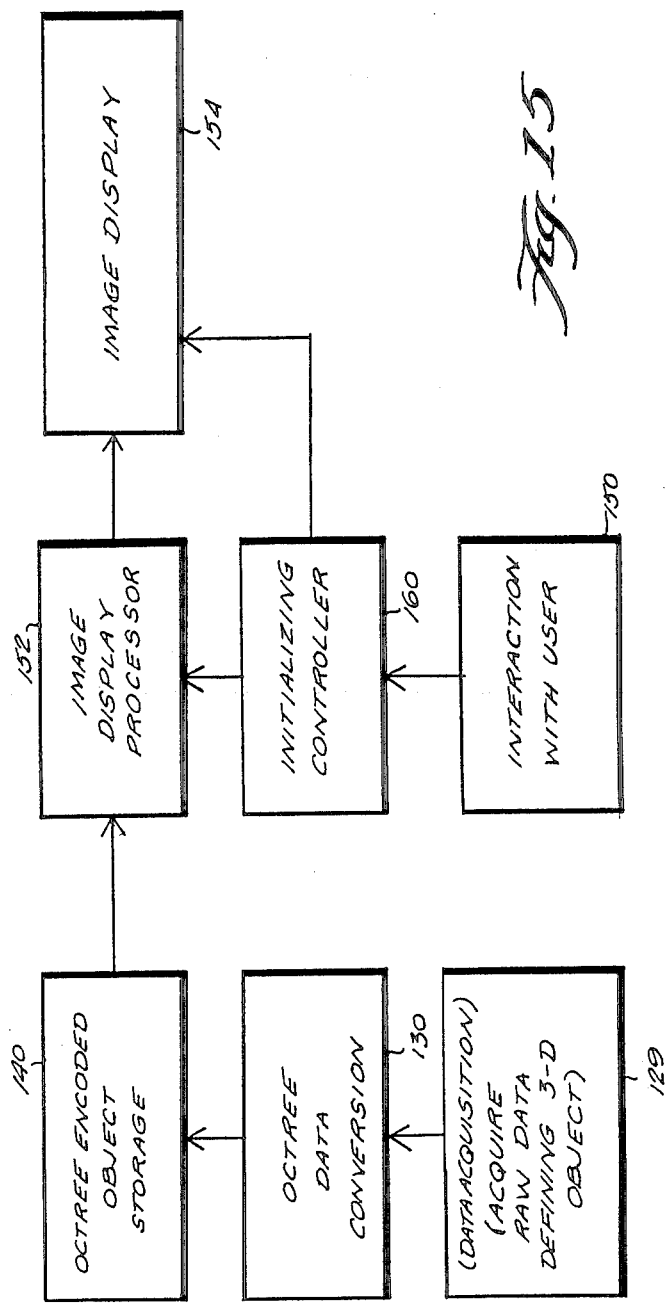
FIG. 15 is a block diagram of a threedimensional Solid Object Image Generator according to the present invention.

Referring to FIG. 15, shown is a block diagram of the functional representation of the preferred embodiment of the present invention. The function of the preferred embodiment comprises seven blocks: the DATA ACQUISITION block 129, the OCTREE DATA CONVERSION block 130, the OCTREE ENCODED OBJECT STORAGE block 140, the INTERACTION WITH USER block 150, the INITIALIZING CONTROLLER block 160, the IMAGE DISPLAY PROCESSOR block 152 and the IMAGE DISPLAY block 154.

The DATA ACQUISITION block 129 may suitably be implemented by a number of methods, depending upon the application. For instance, if the present invention is to be applied to the generation of images of objects existing in the physical world such as, for example, medical image generation, the DATA ACQUISITION block 129 may comprise scanning the object with a CT (Computed Tomography) scanner and generating a plurality of data slices, each slice comprising a plurality of cells having attached to them location and density information.

If the preferred embodiment of the present invention is used in CAD/CAM (Computer-Aided Design and Computer-Aided Manufacturing) applications, the DATA ACQUISITION block 129 may comprise a software program executing on an interactive digital computing device which permits a user to mathematically define surfaces or solids within a three-dimensional space according to location, density, shape, etc. Those skilled in the art will immediately recognize a wide variety of different ways in which data defining an object might be input and represented, and the present invention is by no means limited to any one such representation.

The OCTREE DATA CONVERSION block 130 accepts data from the DATA ACQUISITION block 129 as an input and generates an octree structure (as shown in FIG. 2) as an output to be stored in the OCTREE ENCODED OBJECT STORAGE block 140. The OCTREE DATA CONVERSION block 130 must organize the raw data into a hierarchical structure of object nodes, each of which has an associated property value of E, P or F. The OCTREE DATA CONVERSION block 130 must also define areas of the three-dimensional universe not specified by the data from the DATA ACQUISITION block 129 by generating EMPTY ("leaf") nodes to terminate branches in the octree structure. Finally, the OCTREE DATA CONVERSION block 130 must "trim" the generated octree (either as it performs the conversion process initially or during a second pass through the stored octree) to mark FULL the parent of any eight children nodes which are FULL, mark EMPTY the parent of any eight children nodes which are EMPTY, and mark PARTIAL any node having descendents which are FULL and descendents which are EMPTY.

In the preferred embodiment of the present invention, the OCTREE DATA CONVERSION block 130 is implemented by a software program executing on a digital computer. The OCTREE DATA CONVERSION block 130 for the preferred embodiment will be described in detail shortly.

The function of the OCTREE ENCODED OBJECT STORAGE block 140 is to store the octree structure generated by the OCTREE DATA CONVERSION block 130 and to permit the IMAGE DISPLAY PROCESSOR block 152 to randomly access the stored octree structure. The OCTREE ENCODED OBJECT STORAGE block 140 may suitably be implemented by a large semiconductor Random Access Memory (RAM) or other storage device permitting high-speed random access of information.

The INTERACTION WITH USER block 150 allows a user to interact with the IMAGE DISPLAY PROCESSOR block 152 through the INITIALIZING CONTROLLER block 160 to select a viewing angle (i.e. to rotate and translate the three-dimensional object with respect to the view plane), to select the scale of the image to be displayed, to select the coloration and shading of the displayed image, to define cut planes for the generation of sectional views, to select when an image is to be displayed, etc. The INTERACTION WITH USER block 150 in the preferred embodiment of the present invention is implemented by an alphanumeric keyboard (suitably a VT-100 manufactured by Digital Equipment Corp.); a Trackball (suitably a Model 636-G893 manufactured by Measurement Systems, Inc.); and a Bit Pad (suitably a Model BP-10 manufactured by Summagraphics, Inc.).

The INITIALIZING CONTROLLER block 160 accepts information from the INTERACTION WITH USER block 150 and generates initializing values for the IMAGE DISPLAY PROCESSOR block 152 and the IMAGE DISPLAY block 154. In the preferred embodiment of the present invention, the INITIALIZING CONTROLLER block 160 generates a set of initializing values for any given set of parameters specified by the INTERACTION WITH USER block 150 (i.e. for any given image). The INITIALIZING CONTROLLER block 160 is implemented by software suitably executing on a 68000 microprocessor-based computer manufactured by Motorola, Inc. The operation of the INITIALIZING CONTROLLER block 160 will be discussed in detail hereafter.

The IMAGE DISPLAY PROCESSOR block 152 accesses the octree-encoded information stored in the OCTREE ENCODED OBJECT STORAGE block 140 in accordance with user-defined parameters generated by the INITIALIZING CONTROLLER block 160, and generates an output to the IMAGE DISPLAY block 154 consisting of addresses of pixels to be displayed and the coloration or shading for those pixels (a pixel is a unit of display corresponding to one dot on the dot-matrix display screen). The structure and operation of the IMAGE DISPLAY PROCESSOR block 152, which is implemented in the preferred embodiment of the present invention by hard-wired digital logic, will be discussed in detail hereafter.

The IMAGE DISPLAY block 154 accepts the output from the IMAGE DISPLAY PROCESSOR 152, stores the pixel information generated by the IMAGE DISPLAY PROCESSOR block (in a dynamic semiconductor Random Access Memory, suitably a RDS-3000 frame buffer manufactured by Adage, Inc., Billerica, Mass.), and displays completed images (suitably on a video monitor utilizing a high-resolution Cathode Ray Tube having 1024 scan lines).

Octree Data Conversion

Figure 16:
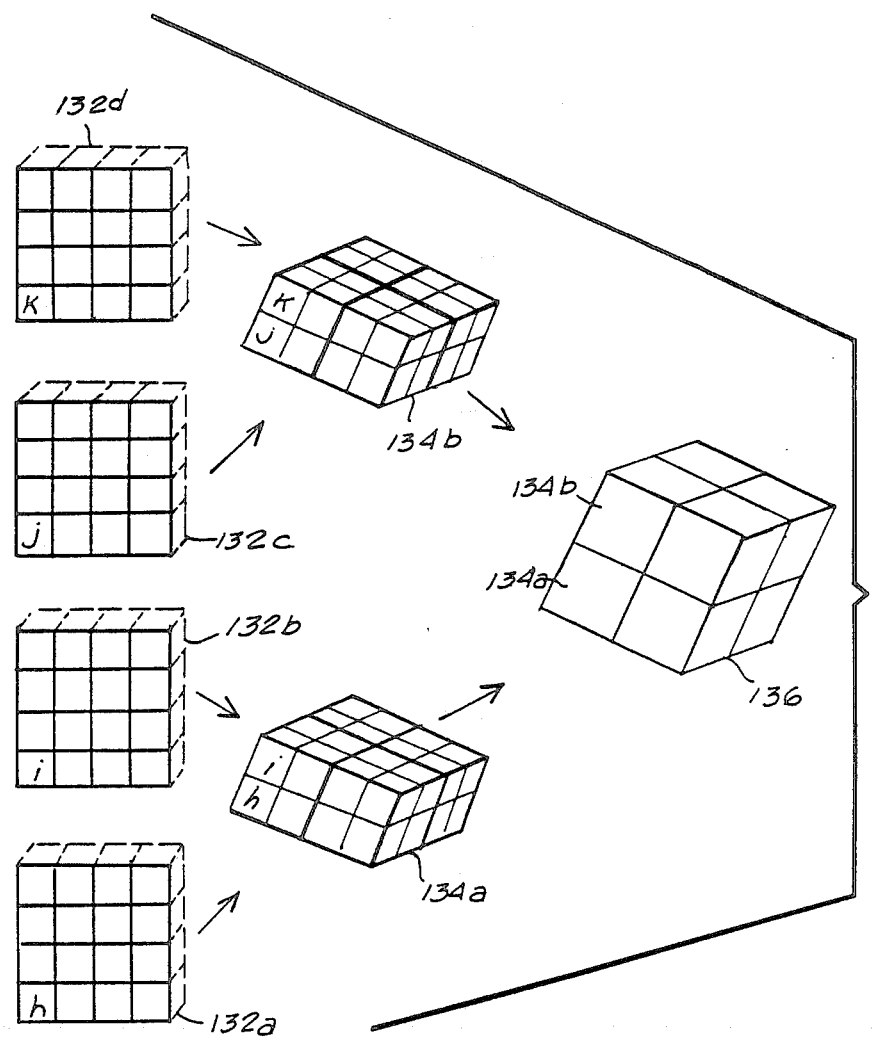
FIG. 16 is a graphical illustration of the conversion of input data to an octree structure as performed by the Octree Data Conversion block shown in FIG. 15.

Referring to FIG. 16, shown is a graphic illustration of the process used in the presently preferred exemplary embodiment of the present invention to convert raw data defining a three-dimensional object acquired by the Data Acquisition block 129 shown in FIG. 15 into an octree structure to be stored in the Octree Encoded Storage block 140 of FIG. 15.

The Octree Data Conversion block 130 in the presently preferred embodiment is implemented by a software program executing on a model 68000 microcomputer manufactured by Motorola, Inc. A copy of this software is appended hereto as Appendix A.

Shown in FIG. 16 are four arrays 132a–132d, each of which is comprised of elements organized in an array of four rows by four columns. Each of the elements has associated with it a gray scale image value indicating the density of that particular element. Arrays 132a–132d are the type of information conventionally generated by a medical CT (Computed Tomography) scanner. Such a conventional scanner produces a plurality of "slices" of the object being scanned, each of which comprises an array of elements sorted by location. Associated with each of the elements in each array is information indicating the density of the space of the object corresponding to that element. Such information is conventionally produced and stored on a bulk information storage device such as a magnetic disk or tape.

While each of the arrays 132a–132d are in fact planar images representing often disjoint slices of finite thickness in the object to be imaged occurring at various depths in the object, they are treated by the preferred embodiment as approximating three-dimensional, contiguous slices of the object of uniform thickness, each element of each slice having a uniform density (this representation of the arrays as slices of uniform thickness is indicated by the lines in phantom). In some cases, additional slices are generated between original slices by interpolation in order to improve image quality.

Because a CT scanner normally produces a very large amount of information, the presently preferred embodiment only operates on four "slices" of raw data at a time. These four slices of data are read from the bulk information storage device discussed above and stored in a random access memory. The Octree Data Conversion block 130 then divides each slice into 4×4 arrays (of 16 elements each) and operates on four such 4×4 arrays at one time, one from each of the four slices. In the representation shown in FIG. 16, the slice from which array 132a is extracted is the bottommost slice, and the slices from which 132b, 132c and 132d are extracted are stacked on top of this bottommost slice (in that order). Thus, arrays 132a–132d as they exist in the object to be imaged are stacked one on top of another, thus defining the same two-dimensional area of their respective slices for a viewer observing the object in plan.

It will be understood by those skilled in the art that any conventional scanner or other data acquisition device has only limited resolution. Thus, each of the elements of arrays 132a–132d is actually an average uniform density value for a small volume of the object. The actual volume corresponding to a given element may not (and in the general case will not) have uniform density. Due to this limitation in resolution, the octree structure generated will not have an infinite number of levels, but rather will have an arbitrary, limited number of levels. In the preferred embodiment of the present invention, eight to ten levels are typically used with 16 being the current hardware limit, but, of course, any number of octree levels may be employed consistent with the trade-off between the resolution of the generated image and the time and hardware necessary to generate an image, limited only by the resolution of the Data Acquisition block 129 (and the resolution of the Image Display Processor 152 and the Image Display block 154).

Thus, the elements shown in arrays 132a–132d constitute volumes represented by the bottom level of the octree (level eight, for example). The Octree Data Conversion block 130 of FIG. 15 must therefore generate the octree structure from bottom to top (the octree structure may suitably be generated from top to bottom if the three-dimensional object to be imaged is represented by a well-defined set of parameters, such as a set of equations input for use in Computer-Aided Design applications; those skilled in the art could readily devise an algorithm to generate an octree from an analytically defined object).

The first step which the Octree Data Conversion block 130 must perform is to convert the density information of each of the elements in arrays 132a–132d to binary values suitable for compact storage in a semiconductor RAM. As previously mentioned, each of the nodes as stored in the octree structure can have one of three properties: Empty, Partial or Full. Thus, at its most simplistic level, the Octree Data Conversion block 130 must determine whether each of the elements of arrays 132a–132d are Empty or Full (note that none of these elements will ever be marked Partial because such a marking indicates that the node has some Full descendents and some Empty descendents; because these elements are at the bottom level of the octree, they have no descendents).

Of course, it may be desirable to store information about each of these nodes other than merely whether they are Full or Empty. For instance, it might be desirable to represent objects of different densities with different colors in the generated image (in order to distinguish, e.g. between bone and flesh in medical imaging). It would be possible to store such auxiliary information together with the E, P and F property information within the octree structure itself. Indeed, it will be apparent to those skilled in the art that every node in the octree structure could have a plurality of fields, each of which represents a property value for a different physical or other property of the three-dimensional object. The preferred embodiment of the present invention, however, attaches to each node in the octree structure only a two-bit property value, and thus may represent only whether the node is Empty (00), Full (11) or Partial (01). (Even with this minimal representation, it will be noted that one more bit combination (10) exists which may be used to represent a Full property value for a second physical property of the three-dimensional object or for distinguishing between different disjoint objects contained within the three-dimensional universe.)

The preferred embodiment of the present invention employs an auxiliary "property memory" (not shown) to store additional property information about each node in the octree which may be directly accessed by the Image Display block 154 before the node is written.

Such additional information might include the actual density of each node, a color for each node (encoded in intensities for each of red, green and blue), an intensity for each node (determined, for instance, by the orientation of a plane tangent to the surface of the object and passing through the node with respect to an imaginary light source positioned "behind" the viewer, the distance of the node from the viewer, or other factors), or other properties associated with each node to permit the generation of a more realistic image or to provide other information about the object.

Once the density values for each of the elements of arrays 132a–132d have been converted into either an E (for a gray scale value below a user-defined predetermined level) or a F (for a gray scale value above the user-defined predetermined level), the parents of these elements may be generated. It should be noted that more complex E/F determination methods than a simple threshold determination may be used. In the octree structure, eight contiguous level eight nodes will be grouped together into a family, and a single parent node will be generated from that group of eight children. The groupings of four sets of eight children into four families of eight are shown by each of the structures 134a and 134b.

The Octree Data Conversion block stacks the 4×4 array 132b on top of the 4×4 array 132a to generate a 4×4×2 array 134a. The 4×4×2 array 134a thus contains four families of eight level 8 nodes. Analogously, the 4×4×2 array 134b is generated by stacking the 4×4 level 8 array 132d on top of the 4×4 level 8 array 132c.

Once eight level 8 nodes have been grouped together, the property value of the parent of those eight nodes may be determined by examining the property values of all of the eight nodes. If all of the eight level 8 nodes are E, then the parent is also marked E. Likewise, if all of the level 8 nodes are F, then the parent of the eight nodes is marked F. Finally, if some of the level 8 nodes are E and some of the level eight nodes are F, then the parent of the eight nodes must be marked P. In other words, the property information must be identical for all eight children nodes of a parent node for the parent node to be given the same node value and property information as its 8 children nodes; otherwise the parent node is given a P value.

Thus, each of the 4×4×2 arrays 134a and 134b represents not only comprise a group of thirty-two level 8 nodes, but also a group of four level 7 parent nodes. These two groups of four level 7 nodes may be stacked one on top of the other to form a family of eight level seven nodes 136, which may be further combined to form a single level six node.

Each of the level 7 nodes is now marked either E, P, or F; the property of the level six node may be directly determined by the property of its children. As before, if all of the level 7 nodes in the group of eight are E, the level 6 parent node is marked E. Likewise, if all of the level 7 children are F, the level 6 parent node is marked F (property information is handled as noted above). Otherwise, the level six parent must be marked P (indicating that some of its descendents, but not necessarily children, are E and some of its descendents, but not necessarily children, are F; some of the level 7 children may be E, some of the level 7 children may be F and some of the level 7 children may be P).

It will be recalled that the octree structure generated by a preferred embodiment of the present invention is "trimmed," meaning that the descendents of a F or an E node are not included in the structure. Hence, only if a level 7 node is marked P need its eight level 8 children nodes be stored in the octree. Likewise, the eight level 7 children nodes need only be stored in the octree structure if their level 6 parent is marked P. The Octree Data Conversion block generates as an output a "node packet" comprising a family of eight children nodes; it will only generate such a node packet if the parent node of the node packet is marked P. Otherwise, it will generate no node packet and instead keep track of the property value of the parent node and use it to generate the next level node (i.e. its parent).

Each time the Octree Data Conversion block 130 generates a node packet, it stores the node packet in the Octree Encoded Object Storage block 140 (shown in FIG. 15), suitably using Direct Memory Access (DMA) techniques. In addition, it retains the property value of the parent node just produced whether or not a node packet is generated. This parent node property value is used to combine with contiguous nodes of the same level in the octree generated later to produce even higher levels of the octree and further node packets. Although FIG. 16 shows only the generation of nodes at levels 8, 7 and 6, the algorithm used to generate those levels is carried through recursively up to the level zero, or the root node.

Every one of the 4×4 arrays in the four slices of raw data stored in the Octree Data Conversion block 130 random access memory must be completely processed as described above before four new slices of raw data may be read from the bulk information storage device. As this process is recursively performed, higher and higher levels of the octree will be generated. It may be necessary for the Octree Data Conversion block 130 to generate slices of empty data in order to complete the octree structure (i.e. if the number of slices stored on the bulk information storage device is not equal to $2^n$ where n is the lowest tree level). Likewise, depending upon the format of the data generated by the Data Acquisition block 129, it may be necessary for the Octree Data Conversion block 130 to add Empty elements to each of the slices obtained from the bulk information storage device if the number of rows of elements in each slice does not equal the number of columns, or the number of rows and columns is not divisible by four. Finally, it may be desirable to provide further processing of the raw data in order to provide compatability with a variety of different data acquisition devices or to permit a user to modify or define some of the octree structure.

Sequential storage ("heap storage") formats wherein the descendents of a given node are stored adjacent to that node (sequentially according to the 7-to-0 traversal sequence) could be used in the Octree Encoded Object Storage block 140 because of the sequential nature of the depth-first traversal of the octree structure. Thus, in order to traverse the octree, storage locations could be merely read sequentially. While this method represents the most efficient use of storage space, it provides no way to skip internal subtrees if, for example, a P node is found to not intersect any non-FULL overlay windows. Sequential octree traversal must always begin at the top of the tree and traverse the entire tree. If it became necessary to alter the tree structure (for instance, to insert another three-dimensional object into the universe), the entire octree would have be rewritten. More importantly, the octree structure would vary according to the traversal sequence and thus would have to be rewritten each time the viewing angle entered a new viewing octant, or alternatively, multiple copies of the octree would have to be created, one for each different traversal sequence.

Another possible method of storing the octree is by using a totally Random Access linked-list type Storage Method, wherein a given node is stored together with two fields, one containing the property value (E, P or F) of the node and the other containing the absolute address in memory of a block containing its eight children (which would be stored sequentially). This method of storage is perhaps the most versatile, because any given "node packet" (a family of eight children) may be stored anywhere in memory, and the parent of that node packet can be made to point directly to the location of that node packet. Because the ancestors of a given node are always accessed before the node itself, the fact that all of ancestors of a node must be accessed to arrive at the absolute address of the node poses no inconvenience whatsoever. Since a given parent node "knows" the absolute address of its family of eight children, the eight children may be stored anywhere in memory (so long as they are stored together in a block). Nodes may be added to or subtracted from the octree by merely manipulating the fields containing absolute addresses. Moreover, the same octree may be accessed in different orders according to the traversal sequence for the selected viewing angle.

The disadvantage of this method is that for a memory with sizeable storage capacity, each field containing an absolute address may be required to store a large number (as many as thirty-two or more) bits of information. The Octree Encoded Object Storage block 140 would necessarily be a very large memory, a large portion of which would be used merely to store the address pointers. Because the octree is preferably stored in Random Access Memory (such as semiconductor memory) in order to reduce access time, such a memory would be extremely expensive.

Figure 17:
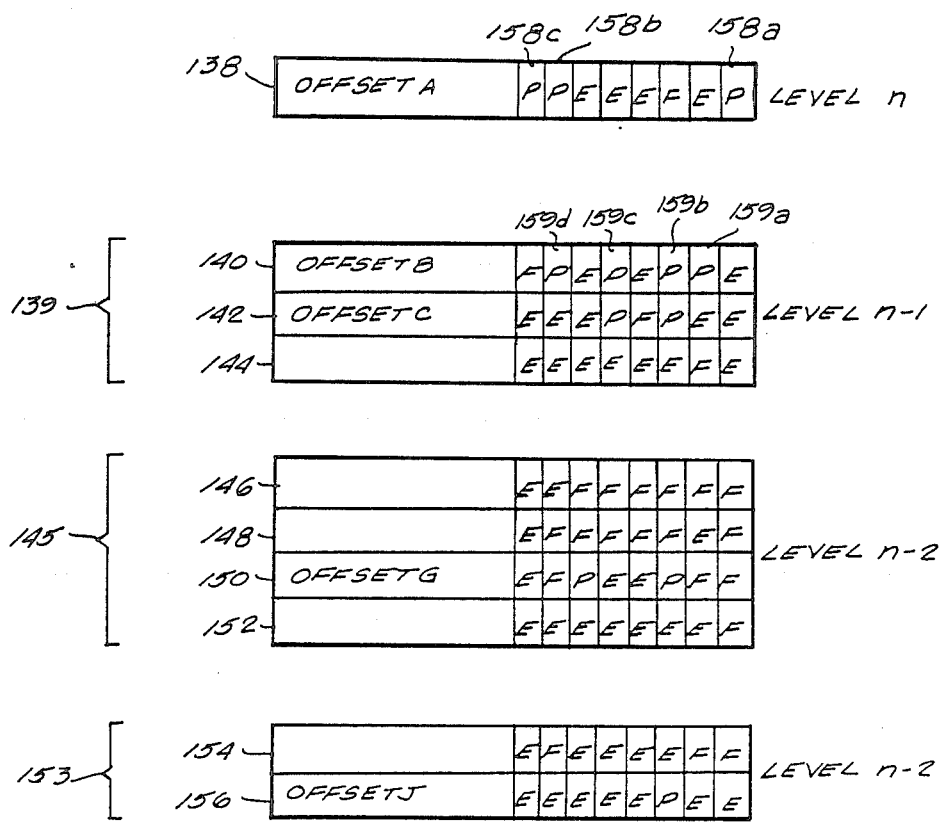
FIG. 17 is a diagram of an octree structure as stored in the Octree-Encoded Object Storage block shown in FIG. 15.

Referring to FIG. 17, the presently preferred exemplary embodiment of the present invention uses Relative Addressing Format, a refinement of the Random Access linked-list method discussed above. A family of eight children nodes are always stored together as a unit (called a "node packet") in memory. It will be recalled that each node may take on one of three property values (E, P or F); thus, the property value of each node may be encoded into only two bits, as discussed previously. The property values of an entire node packet of eight children nodes may thus be stored in 8 fields of 2 bits each for a total of only 16 bits (2 bytes).

Each child in the node packet must also "point" to the block containing its eight children. Thus, a node packet must point to, at most, eight grandchild node packets, one for each of the children nodes in the node packet, all of which are stored sequentially in a "node packet block". Because the octree structure is "trimmed," the children of only partial nodes (and not Full or Empty nodes) are stored; blocks will have variable lengths, containing between 1 and 8 grandchild node packets depending upon the number of Partial children nodes within that given node packet. In order to simplify addressing, each node packet is stored together with the memory offset from its own address to the starting address of the block containing the children node packets of the nodes which it contains. The length of that block and the address of each individual node packet within that block may be readily ascertained from the number of P child nodes in the given node packet, as will be seen shortly.

Referring to FIG. 17, an arbitrary node packet 138 containing 8 level n nodes of the octree structure is stored in a 32 bit word at a location x in memory. Node packet 138 is stored in a word containing two half-word fields: the least significant 16 bits holds 8 two-bit fields, each of which contains the property value (E, P or F) of one of the family of eight children in the node packet; the second half-word field holds an address offset OFFSETA, which points to the block of node packets containing the children of the nodes in node packet 138. Because only three of the eight children nodes in node packet 138 are marked P, the block of node packets representing the children of these nodes will comprise only three node packets, and will be found beginning at address location x+OFFSETA.

Block 139 contains node packets 140, 142 and 144, each of which contain the children of one of the nodes in node packet 138. Block 139 is stored beginning at location x+OFFSETA. The structure of each of node packets 140, 142 and 144 is similar to that of node packet 138. Each of node packets 140, 142 and 144 must likewise point to a block of node packets containing the children of the nodes which they contain.

OFFSETA, the address field of node packet 138, only points to the beginning of block 139. Thus, node packet 140 of block 139 has address location x+OFFSETA+0; node packet 142 of block 139 occupies address location x+OFFSETA+1; and node packet 144 of block 139 occupies address location x+OFFSETA+2. The address of any given node packet may thus be regarded as comprising a base address (X), an offset from the base address locating the beginning of the block containing that node packet, and finally, a second offset indicating the position of that node packet within its block. This second offset may be easily calculated by merely counting the number of P nodes occurring "before" the parent node in the given node packet as stored in the parent node packet. In the preferred embodiment, "children" node packets containing information about the children of the nodes whose property values are stored in the right-most positions in the property value half-word fields of a parent node packet are stored upper-most in the block to which that parent node packet points. Thus, the children of node 158a of node packet 138 are stored in node packet 140 of block 139. Likewise, the children of node 158b of node packet 138 are stored in node packet 142 of block 139, etc.

Assuming that the location of node packet 138 is x, the address for the block of node packets representing the children of the nodes contained in node packet 138 is calculated as location x+OFFSETA, as already mentioned. The nodes contained in node packet 138 are scanned from right to left beginning with node 158a. Only nodes 158a, 158b and 158c in node packet 138 will have descendents because they are the only nodes which are marked P. The address of the node packet containing the children of node 158a is computed as x+OFFSETA+0 (the second offset is equal to 0 because node 158a is the first P node encountered in node packet 138 as it is scanned from right to left). The address of node packet 142 (containing the children of node 158b) is calculated as location x+OFFSETA+1 (the value of the second offset equal to 1 because node 158b is the second P node encountered in node packet 138 as it is scanned from right to left). The address of node packet 144 (containing the children of node 158c of node packet 138) is calculated as location x+OFFSETA+2 (the value of the second offset equal to 2 because node 158c is the third P node encountered in node packet 138 as it is scanned from right to left).

None of the nodes contained in node packet 144 of block 139 have descendents because none of those nodes are marked P. However, some of the children in node packets 140 and 142 have descendents and must thus be further subdivided. The block 145 of node packets containing the children of the nodes in node packet 140 begins at memory location x+OFFSETA+OFFSETB (note that while for the present calculation three offsets are now required for a block address, the preferred embodiment of the present invention simply updates the base register value x so that $x=x+OFFSETA$; thus, for the calculation of the address of any given block of node packets, only one simple addition is required).

Because node packet 140 of block 139 contains four nodes marked P, block 145 contains four node packets, each one storing the eight children for one of those P nodes. As before, the offset of each of these four node packets within block 145 is calculated according to the occurrence of its parent node within node packet 140 as node packet 140 is scanned from right to left. Thus, for example, node packet 150 within block 145 (storing the eight children of node 159c of node packet 140) has address location x+OFFSETA+OFFSETB+2 (because parent node 159c within block 140 is the third P node encountered as node packet 140 is scanned from right to left). The addresses of node packets 146, 148 and 152 would be calculated similarly.

The node packets storing the children of the nodes stored in node packet 142 of block 139 are located in a separate block 153. The address of block 153 is calculated as x+OFFSETA+OFFSETC. Note that block 153 contains only two node packets 154 and 156, because there are only two nodes marked P in node packet 142. The addresses of each of node packets 154 and 156 within block 153 are calculated as above.

It will be understood that node packet 150 within block 145 contains two P nodes, and thus would point to yet another block (not shown) containing two node packets, the block being stored beginning at memory location x+OFFSETA+OFFSETB+OFFSETG. Likewise, node packet 156 within block 153 contains a node marked P, so that node packet 156 would point to yet another block (not shown) comprising one node packet stored at memory location x+OFFSETA+OFFSETC+OFFSETJ.

As mentioned above, a given node packet will not point to a block of node packets if it contains no P nodes. Thus, no meaningful address offset is stored in such a node packet. Hence, node packets 144, 146, 148, 152 and 154 do not contain offset values. Nevertheless, space is reserved for offset values in these node packets even though this space is not used. Although this represents some waste of memory storage space, the spaces are retained for uniformity in manipulation of node packets and to provide versatility should the octree structure later be modified.

The presently preferred embodiment stores a node packet in a 32-bit word (four bytes) of memory; sixteen bits are used to store the E, P and F property values for each of the eight nodes; sixteen bits are then left over for storing address offsets. The preferred embodiment employs only positive address offsets. Those skilled in the art will recognize that according to this scheme, the beginning of a block of node packets to which a node points must be located in the Octree Encoded Storage block 148 within a range of addresses 0 to $2^{16}$ from the address of the node packet. While usually enough for lower levels of the octree, this range of memory may not be sufficient to allow addressing of some of the higher levels of the octree (because as the octree is traversed from level 0 to the lower levels, the amount of required storage space typically increases by a factor of four for each level).

In order to provide a wider addressing offset range, the node packets containing nodes at the higher levels of the octree may suitably use a "Long" Relative Address Format wherein the address offset already discussed is stored in an additional word (so that each node packet requires two contiguous words in memory). As discussed above, 16 bits are still required to represent the E, P and F property values for each of the eight children of the parent node. The 16 bit short address field is available for other purposes, while the relative address is stored in the next 32-bit contiguous word of memory. Thus, each node packet occupies a total of 64 bits. The 32 bits of address offset provide addressing anywhere within a range of $2^{32}$ locations. Depending upon the complexity of the three-dimensional objects stored in the octree, the "long" format method may suitably be used for the first one to several levels of the octree, while the "Short" format previously discussed may be used for the remaining levels of the octree.

Those skilled in the art could easily devise a scheme wherein a field in each node packet could be used to indicate whether the node packet is stored in "long" or "short" format. In one such format, nodes are in long format until a flag bit (contained in the 16 bit offset field) indicate that all lower level nodes are in short format.

The above description is for "packed" format in which no space is allocated for unneeded node packets in a block. An "unpacked" format may also be used. In the unpacked format, each block contains eight node packets, one for each parent node (even for E and F nodes). This facilitates the random addition and deletion of nodes in an octree needed for many operations to be performed on the tree structure. Numerous algorithms for tree management are used. They are similar to the memory management techniques on general purpose computer operating systems and are easily devisable by those skilled in the art.

The property information can be stored as additional words attached to each node packet for F node and possibly P nodes. Alternately, for increased processing speed, they can be stored in an auxiliary memory at the same relative memory locations (so that different address offset values need not be calculated for the additional property memory). Depending on the number of bits needed for each property, the relative addresses may be multiplied by an integer constant to locate properties for specific nodes. It will be understood by those skilled in the art that any method permitting random access of nodes would be suitable for storing the octree.

As mentioned previously, an image generator in accordance with the present invention is by no means limited to displaying images of objects data about which is acquired by a computed tomography scanner. Those skilled in the art could readily devise a variety of different techniques which could be used to define objects to be imaged. For instance, the object to be imaged could be defined by data input by a user to an automated interactive input device which analytically specifies an object to be imaged. Such an analytically-specified object might be defined entirely automatically by an automated device, partially by user specification and partially automatically by the automated device, or entirely by the user. The automated device could then produce and store the octree structure in the Octree Encoded Object Storage block 140 (of FIG. 15).

Alternatively, the Octree Encoded Object Storage block 140 could be replaced by a function block which both analytically specifies the object to be displayed and produces node packets on demand. Such a function block would not have to store an octree structure at all, since it could compute the property values of a demanded node packet by merely comparing the location of the nodes in the three-dimensional universe with the position of the analytically-defined object to be displayed. Those skilled in the art could readily devise various methods of implementing such a function box to provide flexibility in a variety of different applications.

THE ALGORITHM EXECUTED BY THE IMAGE DISPLAY PROCESSOR

Before describing the operation of the Initializing Controller block 160 of FIG. 15, it is necessary to familiarize the reader generally with the method in which the Image Display Processor block 152 of FIG. 15 accesses and tests nodes by traversing the octree and then comparing those nodes with windows obtained by traversing the quadtree. Once the general algorithm is understood, the specific initializing parameters produced by the Initializing Controller block 160 will be discussed in detail.

While the general algorithm executed by the Image Display Processor block 152 has already been described in some detail, a more precise description is expressed by the following PASCAL program:

```
Procedure PROCESS(NODE)
begin
If NODE intersects any non-FULL window then
If NODE is FULL then
begin
For WINDOW ← non-FULL intersecting window
begin
TERM(NODE,WINDOW)
end
end
else
begin
PROCESS(CHILD(NODE))
end
else
begin
NODE ← NEXT(NODE)
end
end
procedure TERM(NODE,WINDOW)
begin
if WINDOW is EMPTY and enclosed by NODE then
begin
PAINT WINDOW
mark WINDOW FULL
end
else
begin
for I:=1 to 4 do
begin
TERM (NODE,CHILD2(WINDOW(I)))
end
end
end
procedure CHILD(NODE)
(* subdivides NODE into its children and returns
first non-empty child *)
procedure CHILD2(WINDOW,I)
(* returns child number I of WINDOW *)
procedure NEXT(NODE)
(* returns next node in front-to-back traversal sequence,
i.e. the first non-empty node in sequence not a
descendant of NODE *)
```

The variable NODE stores a single node in the octree structure, and is initialized to the root node (the node at level 0) before the program begins. The variable WINDOW stores a single window in the quadtree structure, and is selected during algorithm operation from the four overlay windows associated with the node currently being processed. Depending upon the size of the node projection (as determined by the user specified scale factor), the overlay is initialized at a specific level relative to the root of the octree. This initialized level is the lowest level such that the bounding box of the node projection is the same size or smaller (in each dimension) as a window at that level. The initial overlay is, of course, composed of the four windows at that level which enclose the projection of the octree root node (the universe).

The algorithm is entered at the procedure PROCESS, and is initially passed the root node. The algorithm first determines if the node projection intersects any non-full window in the current window overlay (any of the four). If it does, that node is "processed." If the node does not intersect any non-full window, then the next non-empty node in the front-to-back traversal sequence is obtained by the procedure NEXT. The algorithm terminates when NEXT is called with the root node.

As mentioned above, if the node does intersect a non-full (i.e. Empty or Partial) window, then that node is "processed." First, it is determined whether the node is Full. If it is not Full, then it must be a Partial node at some level other than the bottom of the octree (because the procedure NEXT returns only non-Empty nodes), and that node is subdivided into its children and the children processed (when PROCESS calls itself and passes itself the children of the current node). If the node is Full then it will not be further subdivided; rather, the windows in the overlay will be subdivided to locate all of those windows completely enclosed by the Full node. However, the windows are not subdivided unless they are either Empty or Partial (since Full windows have already been painted and will not be painted again). If the window is not Full and intersects the node, then the window is processed by the procedure TERM. It is only during the procedure TERM that windows completely enclosed by Full nodes are located and painted (which is the output generated by the algorithm).

Procedure TERM first tests to see if the window passed to it is Empty and enclosed by the node. If it is, then that window is painted and is marked Full (so that it will not be painted again). If it is not Empty or not enclosed by the node, then either it must be a Partial window or it is not enclosed by the node being processed, both conditions indicating that at most only some of the descendents of the window are to be painted. In such a case, the window must be further subdivided to locate all of those windows which are both Empty and enclosed by the node. This is done recursively for each of the four children (and all of the descendents of each of those children) of the window in the loop section of the procedure TERM wherein the procedure calls itself.

Those skilled in the art will recognize that the recursive nature of this algorithm permits the algorithm to process all of the levels of the quadtree and the octree. To implement a recursive process such as TERM, all of the present values of all of the variables of the recursive procedure are suitably stored in a Last-In-First-Out (LIFO) stack, after which all of the variables are reinitialized (or set to the appropriate parameters passed to the procedure by the statement calling it), and the procedure is executed again from the beginning with these new variable values. When the procedure completes a given recursion, it reloads all of its variables to their former values (obtained from the stack), and resumes execution exactly where it left off before it called itself.

Those skilled in the art will also understand a LIFO stack to be a common general structure used in computer science. A LIFO stack is a variable-length storage structure used to temporarily store a plurality of values. The stack has two operations, PUSH and POP. A PUSH operation places a value at the "top" of the stack. A POP operation removes a value from the "top" of the stack. The last value placed at the top of a stack by a PUSH operation will be the first one removed from the stack by the next POP operation. (Thus, a LIFO stack may be analogized to the simple devices commonly found in cafeterias to store empty food trays; the last tray placed in such a device remains at the top and is the first one removed when a tray is needed.) Each time the procedure TERM calls itself (thus traversing down one level of the quadtree), a PUSH operation is performed on the stack to store the present values of the variables used by TERM. Likewise, each time the procedure TERM completes processing a given recursion and returns to itself (i.e. returns back up the quadtree structure one level), a POP operation is performed on the stack to retrieve the old values of all of the variables of TERM so that the procedure can begin executing right after the point where it called itself.

It will be understood that the algorithm shown is actually recursive (it calls itself) in two places: the procedure PROCESS calls itself, and the procedure TERM calls itself. Whenever PROCESS calls itself, both nodes and windows are subdivided, i.e. both the octree and the quadtree structure are traversed one level down simultaneously. Nodes are subdivided explicitly because PROCESS calls itself and passes itself the children of the current node. Windows are implicitly subdivided in that WINDOW is always selected from the four overlay windows at the quadtree level comprising windows of a size that are just large enough to contain the bounding box defined by the projection of the node being processed. While the subdivision of windows along with nodes is not essential to the operation of the algorithm, this feature makes the algorithm far more efficient by preventing a quadratic increase in the number of windows to be tested with respect to every F node.

When the procedure TERM calls itself, only the quadtree structure is traversed one level down, while the octree level remains constant. This can be intuitively understood by realizing that the procedure TERM is called only once a Terminal node has been located, meaning that the node cannot be further subdivided (it does not have children in the octree).

Figure 18B:
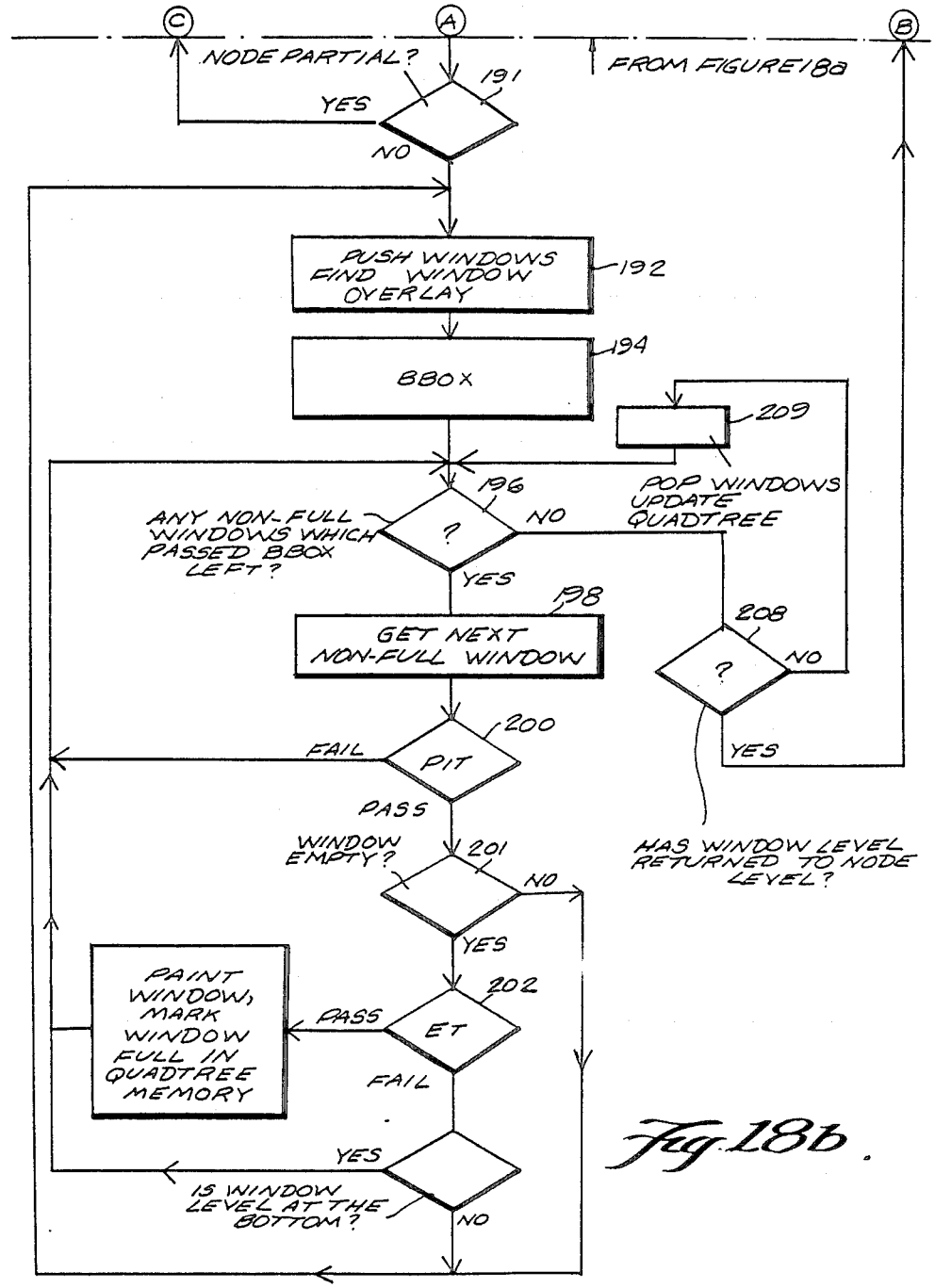

Referring to FIGS. 18(A)–18(B), shown is a more detailed flow chart of the algorithm in accordance with the preferred embodiment of the present invention. The flow of this flow chart is from top to bottom, and is entered at the entry point 162. Block 168 reads in the next node packet. Decision block 170 tests to see if there are any non-Empty nodes left in the node packet. If so, block 172 obtains the next non-Empty node in the traversal sequence in the node packet read in by block 168, and locates the window overlay in the quadtree structure (i.e. those contiguous four windows in the quadtree structure which completely enclose the bounding box defined by the node). Block 174 performs the BBOX test, suitably on all four windows in the window overlay simultaneously, to determine which of the four windows passes the BBOX test (at least *one* of the four windows *must* pass the BBOX test because of the definition of the window overlay).

The algorithm proceeds down to decision block 176, which determines if there are any non-Full (i.e. E or P) windows left to be processed of those windows which passed the BBOX test. It will be recalled that Full windows are never painted, and thus are quickly disposed of by decision block 176. If no non-Full windows are left, then the algorithm jumps back to decision block 170 to get the next node in the node packet, if there is one.

If there are E or P windows left of the windows which passed the BBOX test, block 178 obtains the next such window according to the traversal sequence by which the quadtree is accessed. Decision block 180 performs a PI test on the (one) window obtained by block 178. If the window fails the PI test, then the algorithm jumps back to decision block 176 to determine if there are any non-Full windows left, and if there are, to obtain the next such window. If, however, the window passes the PI test, decision block 182 tests if the window level is at the bottom level of the quadtree.

A window at the bottom level of the quadtree (i.e. at the level of resolution of Image Display block 154 shown in FIG. 15), cannot be subdivided, so it must be handled differently. If the window is at the bottom level, block 190 paints the window to the Image Display block 154 of FIG. 15, and marks the window F in the quadtree. It will be recalled that once a window is marked F, it will never be painted again (i.e. no F windows will ever reach decision block 188 because they will be discarded by block 178). It will be understood that it is somewhat arbitrary what action is taken for windows at the bottom of the quadtree. Another presently preferred embodiment of the present invention only paints windows at the bottom level of the quadtree having a center point which intersects the node projection (so that some *area* of the window is guaranteed to in fact intersect the node projection). In fact, for windows at the lowest level, the PI test can test the center point of the window rather than the window itself. For P nodes in the octree, the above method makes the assumption that the node is, in fact, an F node. Several other methods could be used. The window could never be written in such a situation (i.e. assumed to be E), or P nodes could be further subdivided with the window center used for the PI test. Alternatively, the subtrees of the P node could be traversed to determine if more than half of the volume which they represent is occupied by the object (F nodes). If so, the node is assumed F. If not, it is assumed E. Those skilled in the art could easily devise other "center point intersection tests" analogous to the tests previously described. Experience has shown that the exact window termination method used is not of great concern in most cases.

The algorithm jumps back to decision block 176 to process any remaining non-Full windows which passed the BBOX test from both block 190 and block 180 (if the window failed the PI test). As mentioned above, because block 190 is executed only for windows at the bottom level of the quadtree, its function is somewhat arbitrary (i.e. it will not greatly affect the image generated if a different action other than that described is taken for windows at the level of resolution).

If the window is not at the bottom of the quadtree, it may be further subdivided. Decision block 191 tests to see if the node is a Partial node. If the window is P, block 184 causes the current node packet (as well as information concerning which nodes in the node packet have been processed and the geometry of their common parent node projection) to be PUSHed onto a LIFO node stack, and likewise causes the current window packet (including information about which windows in that window packet have already been processed, which ones have passed the BBOX test but have yet to be processed, and the geometry of the window packet) to be PUSHed onto a LIFO window stack. While these stacks are not shown, they function as described previously. The algorithm recurses, i.e. it jumps back to block 168 to obtain the node packet containing the children of the node just PUSHed onto the node stack, and then processes that node packet of children with a new window overlay of four windows, each of which is a child of one of the four windows PUSHed onto the window stack.

After processing these children nodes and windows (and recursively, all of their descendents), a point will finally be reached, as tested for by decision block 170, when there are no nodes left in the child node packet. At this point, decision block 164 tests whether the node packet just processed was at level 1 of the octree; if so, the octree has been completely traversed, and the algorithm exits through exit point 166. If the node packet just processed is not at level 1 of the octree, the algorithm is not finished, and block 186 POPs the parent node packet and its associated geometry from the node stack, POPs the parent window packet and its associated geometry from the window stack, and resumes processing the node and window packets exactly where processing was left off at block 191. Thus, decision block 170 then determines if any non-Empty nodes are left in the POPped node packet, the next node from the node packet and the appropriate window overlay for that node is obtained by block 172, etc. Block 166 also updates the quadtree structure by marking the parent windows of the overlay windows P or F (as appropriate) if any descendants had been painted.

If the node does not satisfy decision block 191, the node is Full, and the algorithm must now search for windows which are completely enclosed by this Full node. Once the algorithm reaches this point, it likewise has located a window which intersects the Full node (tested for by block 180). Thus, some of the descendents of the intersecting window are enclosed by the node projection. (The window itself *cannot* be enclosed by the node projection because the window is, by definition, larger than the bounding box of the node projection).

Block 192 PUSHes the window onto the window stack, thus subdividing the window into its four children (the node is *not* subdivided at this point). The four children form the "overlay" but, in fact, this "overlay" is no longer a legitimate overlay because it won't, in general, enclose the node (the node is now too big because it wasn't subdivided). Thus, the window "overlay" located by block 192 at this point is in fact the 4 *children* of the window just PUSHed, (unlike the general case in block 172 where the overlay need not be, and generally is not, comprised of 4 windows having the same parent). Block 194 performs the BBOX test on the new window "overlay" of four children windows. Decision block 196 then determines if there are any non-Full (i.e. E or P) windows which passed the BBOX test remaining in this overlay. If so, then block 198 obtains the next such window according to the traversal sequence used to traverse the quadtree structure.

Decision block 200 tests the window obtained by block 198 for the PI test. If the window fails the PI test, the algorithm jumps back to block 196 to obtain the next non-Full window which passed the BBOX test. If the window passes the PI test, decision block 201 tests the window to see if it is Empty. If the window is not Empty, it must be Partial (since block 198 discarded any Full windows). P windows cannot be painted, but must be further subdivided to locate its E descendants. Because no windows at the bottom of the quadtree can be Partial (all terminal windows are either E or F), all Partial windows can be subdivided. If the window is Partial, the algorithm jumps back to block 192 to subdivide the window into its four children.

If decision block 201 determines that the window is Empty, decision block 202 tests the window for enclosure (E test). If the window is enclosed by the projection of the current (F) node, it is painted to the Image Display block 154 of FIG. 15 and is marked F in the quadtree memory (so it will never be painted again). If the window fails the E test, it must be further subdivided, if possible, to locate those of its descendents which are completely enclosed by the node projection. At the bottom level of the quadtree, the E test determines enclosure for the center of the window rather than for the window itself. Thus, if the center of a bottom level window is enclosed by the F node projection, it passes the E test and is painted. Decision block 206 determines if the window is at the bottom of the quadtree; if it is, the window is discarded and the algorithm jumps back to decision block 196 to process any remaining windows. If the window is not at the bottom level of the quadtree, it is subdivided into its children by block 192.

If decision block 196 determines that there are no non-Full windows remaining in the current window packet which intersect the node projection, the algorithm proceeds to decision block 208, which determines whether the window level and the node level are equal. If the window level is still below the node level, then the algorithm must traverse yet another level back up the quadtree (by performing another POP on the window stack in block 209). The windows so POPped must then be processed, beginning at the point where processing left off before they were PUSHed by block 192 (a POP includes updating the quadtree by marking the parent of windows just painted (or their descendants) P or F, as appropriate). However, if decision block 208 determines that the window and node levels are equal, then the quadtree has been completely traversed below the level of the quadtree that the algorithm was processing before block 192 was executed. The algorithm returns to block 176 to determine if there are any non-Full windows left to be processed at this level.

It will be understood that blocks 162–191 of FIG. 17 approximately correspond to the procedure PROCESS of the PASCAL program, while blocks 192–209 approximately correspond to procedure TERM of the PASCAL program.

Figure 19:
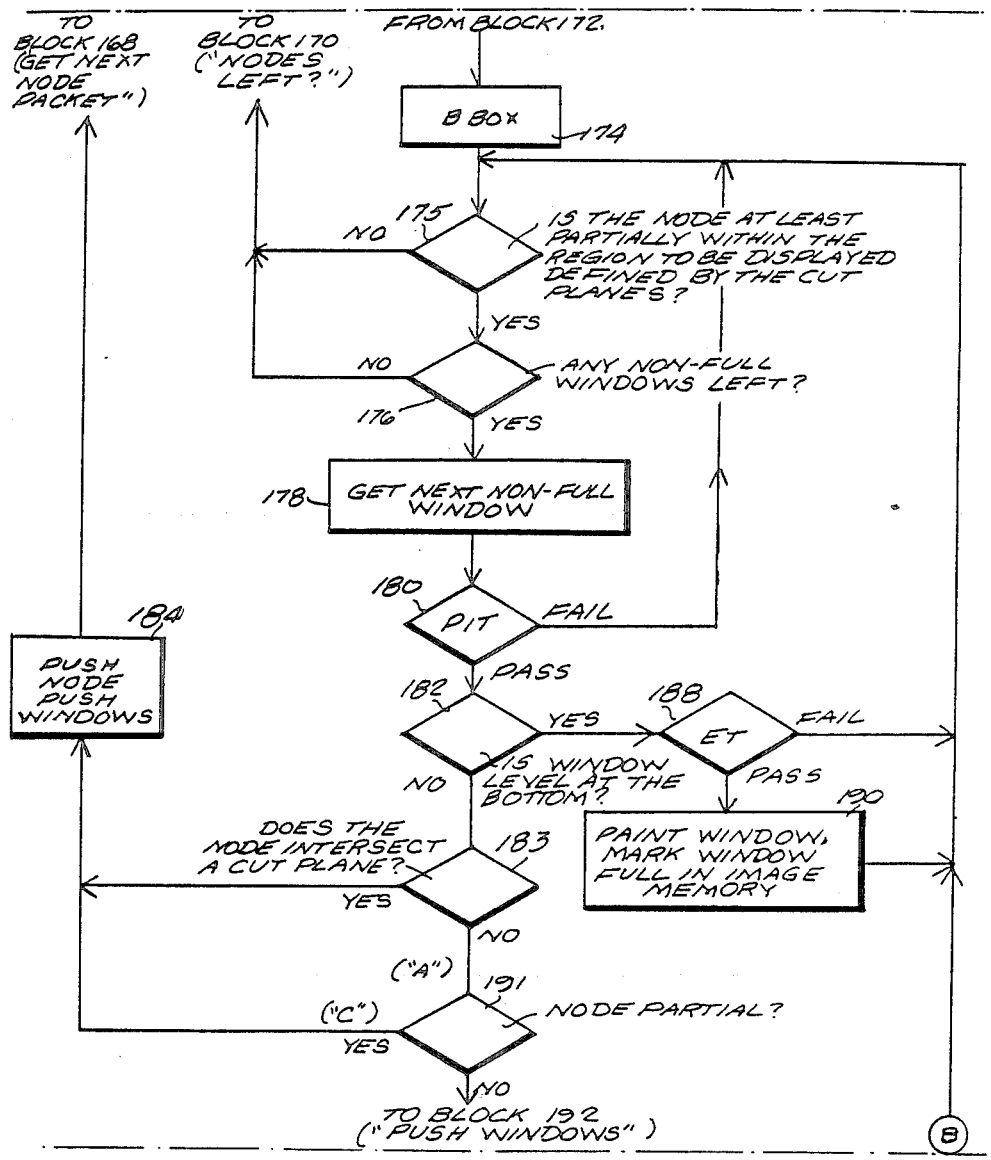
FIG. 19 is a modification of the flow chart shown in FIGS. 18(A)–18(B) showing the operation of the Image Display Processor block shown in FIG. 15 when the cut plane test is utilized to produce sectional images.

Referring to FIG. 19, shown is a modification of a portion of the flow chart shown in FIGS. 18(A)–18(B) to include the cut plane test. Decision block 175 is added between block 174 and decision block 176 to determine whether the current node is at least partially within the region to be displayed defined by the cut plane (i.e. either entirely within the region, or partially within it). If it is not, the node is discarded and the algorithm jumps back to decision block 170 to process remaining nodes in the node packet. If the current node is at least partially within the region to be displayed, the algorithm proceeds to decision block 176, as before.

Decision block 183 is inserted between decision blocks 182 and 191, and determines whether the current node intersects a cut plane. If the node does not intersect the cut plane, then it must lie entirely within the region to be displayed, and the algorithm proceeds as before to block 191. However, if the node is intersected by a cut plane, it must be further subdivided to determine which of its descendents lie within the region to be displayed and which lie outside of that region. The algorithm jumps to block 184 to further subdivide the node (and the windows).

Initializing Controller

The Initializing Controller block 160 of FIG. 15 has several basic functions. First, the Initializing Controller block performs linear transformations on the three-dimensional universe according to parameters input by a user through the Interaction With User block 150. The Initializing Controller block 160 then projects the three-dimensional universe onto the two-dimensional view plane. Finally, the Initializing Controller block 160 performs a "protractor" function on the projection of the three-dimensional universe in order to determine the geometric relationships between parent node projections and child node projections, parent windows and children windows, and between the projection of the three-dimensional universe and the view plane origin. From these calculated geometric relationships, the Image Display Processor block 152 can calculate the geometric relationship between windows of the view plane and the projection of any node in the three-dimensional universe.

The flow chart shown in FIGS. 18(A)-18(B) assumes that the geometric locations of a given node within the three-dimensional universe and the dimensions of that node can be obtained from the level in the octree structure at which that node appears and knowledge of which node is the parent of that node. Likewise, the flow chart of FIGS. 18(A)-18(B) assumes that the location of a given window on the view plane and the dimensions of that window can be obtained from the level in the quadtree structure which that window appears and knowledge of which window is the parent of that window. These geometric locations and dimensions are required for the BBOX, PI and E tests, the cut plane test and the PAINT blocks.

The calculations performed by the preferred embodiment of the present invention to obtain this location and dimension information are in fact that simple (those skilled in the art will understand that if such calculations were complex, the generation of an image would require a great deal of time). Because the geometry of the eight children nodes with respect to their parent node is precisely the same for any level of the octree structure, once the geometric relationships for one level are derived for a selected view, they can be applied to any level of the octree. Moreover, since the dimensions of any child node are exactly one-half those of its parent node, the geometry of child nodes to parent nodes for adjacent levels of the octree structure are all related by a factor of 2.

Likewise, because the geometric relationship between four children windows and their parent is precisely the same for any level in the quadtree structure, once the geometric relationship is derived for one level of the quadtree, it can be applied to any given level. Analogously, since a child window has dimensions exactly one-half that of its parent, the geometric relationships between children-to-parent windows for two adjacent levels of the quadtree structure are related by a factor of 2.

It will be understood by those skilled in the art that simple calculations such as addition, subtraction and magnitude comparison can be changed by a factor of 2 by simply shifting, using shift registers, the operands used for those calculations. Thus, once the relatively complex descriptions of the geometric relationships between child-to-parent node projections and child-to-parent windows are derived, the preferred embodiment of the present invention utilizes those derived parameters for every level of the octree and the quadtree, respectively, merely shifting those parameters an appropriate number of places to the left or to the right (depending upon the level of the octree or quadtree being accessed). The derivation of these parameters in the first place is performed by the Initializing Controller block 160 of FIG. 15, which then initializes the Image Display Processor block 152.

Figure 20A:
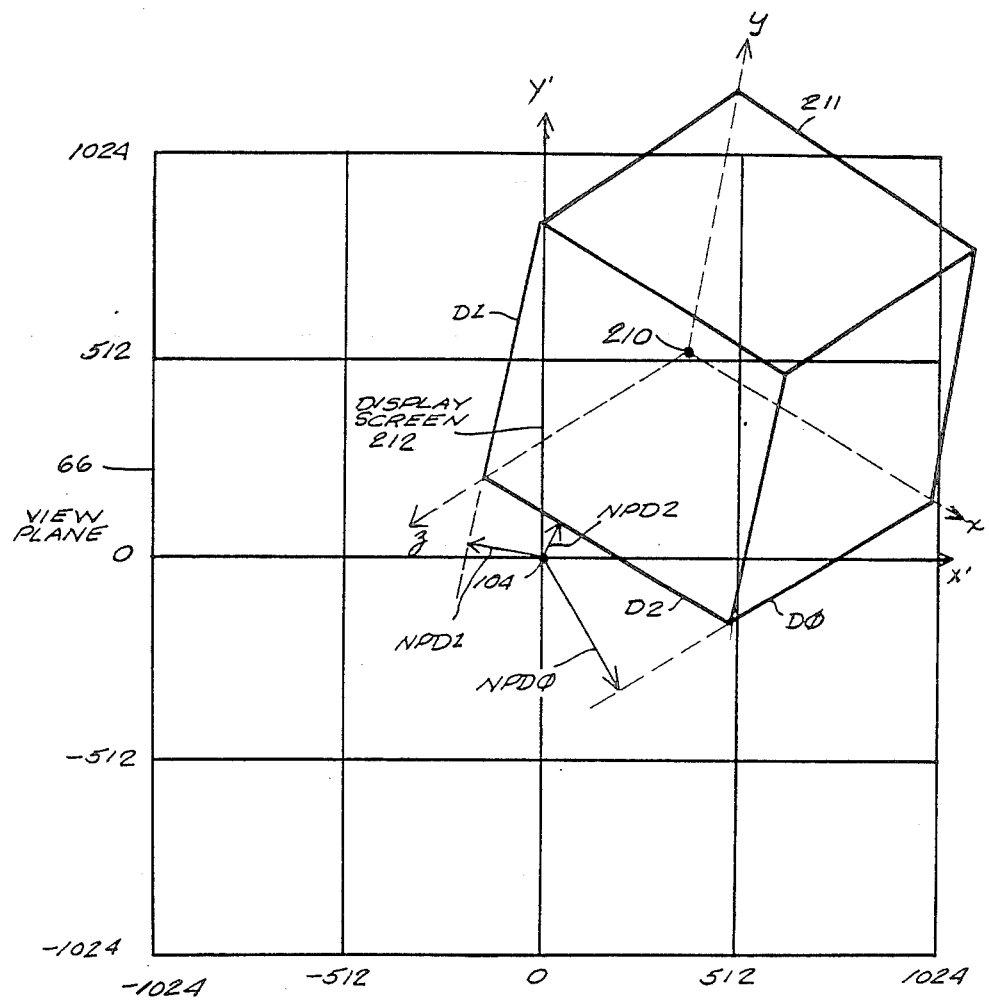
FIG. 20(A) is a graphic illustration of the 3-dimensional octree universe projected onto the 2-dimensional quadtree universe for a given view point defining the relationships between the two-dimensional and three-dimensional coordinate systems in accordance with the present invention.

Referring to FIG. 20(A), shown is a graphical illustration of the three-dimensional universe 32 (shown in FIG. 11A)) projected onto the two-dimensional view plane 66 for a given viewing angle. Before the Initializing Controller block 160 can relate any of the geometry of the projection 211 of the three-dimensional universe 32 to the view plane 66, it must determine the orientation of the three-dimensional coordinate system (x, y, z) with respect to the two-dimensional coordinate system (x', y') of the view plane.

The Interaction With User block 150 shown in FIG. 15 suitably permits a user to perform a variety of linear transformations of the three-dimensional universe with respect to the view plane 66. For instance, a user may translate the origin 210 of the projection 211 to any point on the view plane 66. The Interaction With User block 150 further permits the user to rotate the three-dimensional coordinate system (x, y, z) about a user-defined point in the three-dimensional universe with respect to view plane 66 to any given rotational orientation. Finally, a user may scale the dimensions of the three-dimensional universe (the Interaction with User block 150 suitably permits independent scaling for each of the x, y, z dimensions). Another possible linear transformation that could be performed by the Initializing Controller block is skewing of the three-dimensional universe in each of the x, y and z dimensions. Shown in FIG. 20(A) is a three-dimensional coordinate system for a given translational and rotational orientation and having a given set of scaling factors with respect to the two-dimensional view plane 66.

Figure 43A:
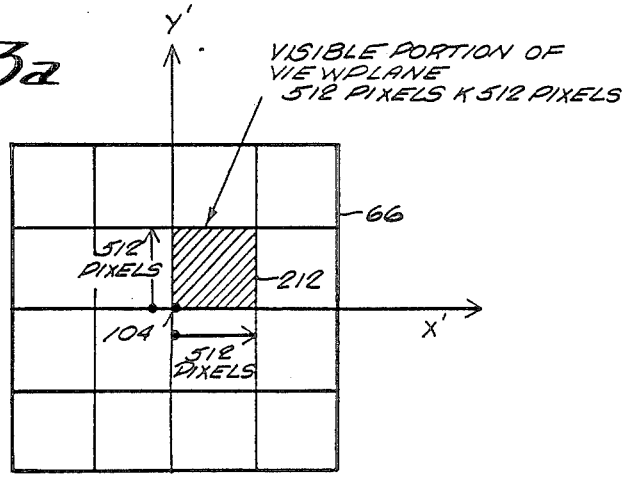
FIG. 43(A) is a graphic illustration of a 4×4 window array such that the size of a quadtree window is equal to that of the Display Screen, one of the situations in which the Screen Intersection Logic block of FIG. 42 is used to perform the screen intersection test in lieu of the BBOX test.
Figure 43B:
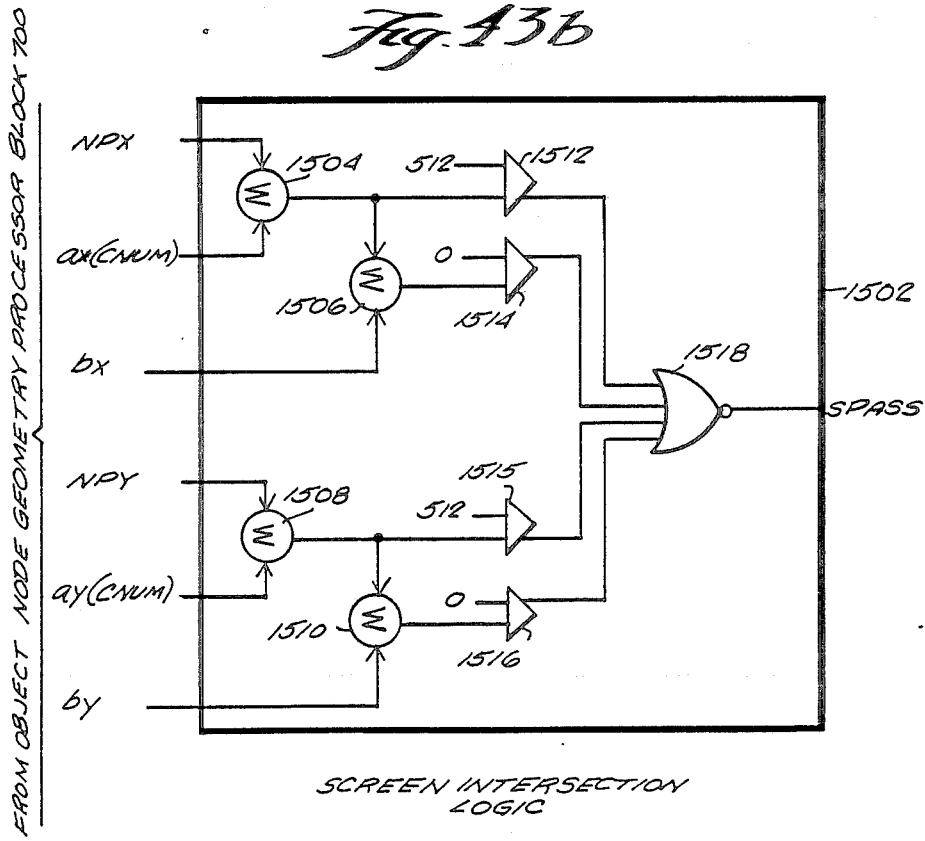
FIG. 43(B) is a schematic diagram of the Screen Intersection Logic block shown in FIG. 42.

As shown in FIG. 20(A), the view plane comprises sixteen windows, each of which are the size of a Display Screen 212 (that portion of the view plane 66 which is actually displayed by the Image Display block 154 shown in FIG. 15). The quadtree organization is not imposed upon the entire view plane 66, but only that portion of the view plane of interest, i.e. Display Screen 212. View plane 66 is larger than Display Screen 212 to permit a projection 211 that is likewise much larger than Display Screen 212 (so that, for instance, the projection of the three-dimensional object may be scaled to permit generation of "close-up" images). Referring to FIGS. 6(D), 20(A) and 43(A), Display Screen 212 comprises window number 12 of the 4×4 window array while still permitting window overlays for the largest node projections of the universe.

The origin 104 of the view plane 66 may suitably be assigned to the lower left-hand corner of Display Screen 212. The view plane 66 is dimensioned in pixels (the smallest unit of image information that will be accepted by the Image Display block 154 of FIG. 15), Display Screen 212 suitably having dimensions of 512×512 pixels.

Dimensions in the three-dimensional coordinate system are not measured in pixels, but rather are indexed in terms of node number and level. For a given viewing angle and scaling factor, the Initializing Controller block 160 computes the various dimensions of the projection 211 of root node 32 in units of pixel width scaled up by a factor of a power of two (such as 256). Whenever the geometry of the three-dimensional octree universe is to be compared with the geometry of the view plane 66, the former is converted into scaled pixel widths.

FIG. 20(A) also shows the relationship between the projection 211 of three-dimensional universe 32 and the two-dimensional view plane 66 as defined by three offsets NPD0, NPD1 and NPD2, each of which is constructed from the view plane origin 104 to perpendicularly intersect one of three lines defined by three edges of projection 211. Three-dimensional universe 32 suitably defines a parallelepiped, three intersecting orthogonal edges of which define the three-dimensional orthogonal axes x, y and z. The position of the projection of the x, y and z coordinate axes onto view plane 66 must be defined with respect to the x' and y' coordinate axes of the view plane in order to define the position of the projection of any of the nodes in three-dimensional universe 32 onto the view plane.

Although it will be understood that there are several possible methods of defining the position of the projection of the x, y and z axes with respect to the x' and y' axes, the presently preferred embodiment of the present invention defines three additional lines each of which is defined by an edge of universe 32 and then computes the distance from each of these lines to origin 104 of view plane 66. The three edges of universe 32, D0, D1 and D2, are selected as follows:

Edge D0 is that edge of universe 32 which is parallel to the z axis and which intersects the x axis;

Edge D1 is that edge which is parallel to the y axis and which intersects the z axis; and Edge D2 is that edge which is parallel to the x axis and which intersects the z axis.

A line segment NPD0 is constructed from origin 104 of view plane 66 to perpendicularly intersect the projection of the line defined by edge D0. Likewise, a line segment NPD1 is constructed from origin 104 to perpendicularly intersect the projection of the line defined by edge D1, and a line segment NPD2 is constructed from origin 104 to perpendicularly intersect the projection of the line defined by edge D2. NPD0–NPD2 are constructed in this manner regardless of the viewing angle (i.e. the orientation of the three-dimensional coordinate axes with respect to the two-dimensional coordinate axes). Edges D0–D2 are suitably used for nearly all calculations involving node geometry (since every edge of the node projection is parallel to one of these three edges), while NPD0–NPD2 are used for nearly all calculations which compare the location of a node projection to the location of a window.

Figure 20B:
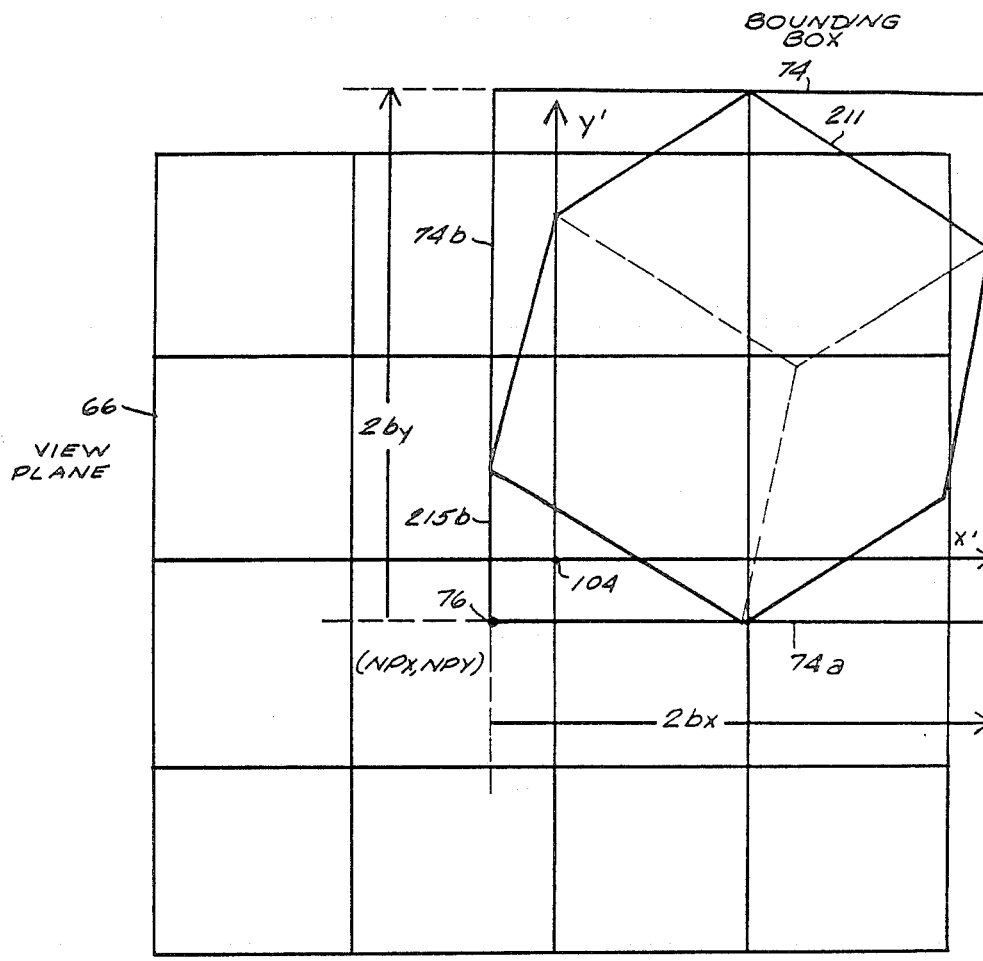
FIG. 20(B) is a graphic illustration of the definition of the bounding box of the projection of the root node.

A graphic illustration of geometric measurements required for the BBOX test is shown in FIG. 20(B). A Bounding Box 74 defined on view plane 66 by the projection 211 of the entire three-dimensional octree universe 32 is constructed as previously described. This Bounding Box 74 suitably has origin 76 at the point (NPX, NPY), a dimension in the x' direction of 2bx, and a dimension in the y' direction of 2by. It will be understood that the dimensions of Bounding Box 74 for any child node projection at a given octree level for a given view will be the same, although the origin 76 of that Bounding Box will, of course, change by an offset. Moreover, the dimensions of Bounding Box 74 of a child node projection will be exactly one-half those of the projection of its parent because the dimensions of the child node itself are exactly one-half those of its parent (for example, the dimensions of the bounding boxes defined by the projection of each child node of root node 32 will be bx and by). Thus, once the dimensions of the Bounding Box 74 for the projection 211 of root node 32 are determined, the dimensions of the Bounding Box for any node in the octree structure may readily be arithmatically calculated as a function of the node level.

Figure 20C:
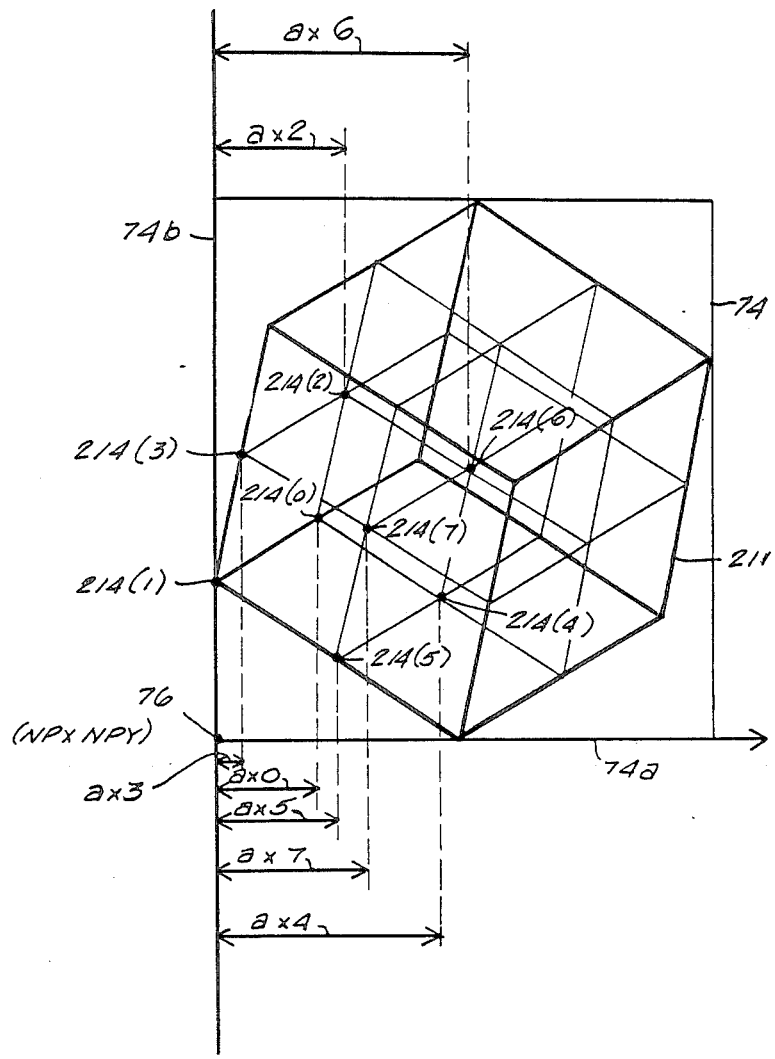
FIG. 20(C) is a graphic illustration of the definition of bounding box offsets in the X direction, indicating the displacement of the bounding boxes of the eight children node projections on the two-dimensional viewing plane from the bounding box of their parent node (shown in FIG. 20(B))

Referring to FIG. 20(C), shown is a graphic illustration of the offsets in the x' direction of the left-most edges of the bounding boxes of the projections of each of the eight children nodes of root node 32 from the left-most edge of Bounding Box 74. The origin of each bounding box may be defined as the origin 76 of the parent bounding box plus a positive offset (possibly 0) in both the x' and the y' direction. As is shown in FIG. 7, the origin 76 of any bounding box may be written as (NPX+ax, NPY+ay). The offsets ax and ay will, of course, be different for each of the children nodes. The calculations shown in FIG. 20(C) must be made in the y' direction as well as to obtain analogous ay offsets.

Referring to FIGS. 4(A) and 20(C), the eight children nodes of root node 32 are numbered 0 to 7 (according to the seven-to-zero traversal sequence). The left edge of a bounding box for any node defines a line parallel to the y' axis passing through the left-most vertex (with respect to the view plane) of the projection of that node onto the view plane (which vertex is the left-most one will depend upon the viewing angle). Thus, line 74b is parallel to the y' axis of view plane 66 (and analogously, line 74a is parallel to the x' axis of the view plane).

The left-most vertex of root node projection 211 is 214(1), the lower left vertex of the projection. Because of the symmetry of the three-dimensional universe, the left-most vertex of the projection of each of the children of root node 32 will likewise be the lower left vertex of its projection. These vertices are labelled 214(0) through 214(7), where, for instance, the left-most vertex of the projection of child node 6 is 214(6).

To calculate the offsets from the left edge 74b of the bounding box 74 of root node projection 211 to the left edge of the bounding box defined by the projection of any given child of root node 32, a vertical line is first constructed through the left-most vertex of the child node projection of interest. A horizontal line segment perpendicular to both the vertical line 74b defining the left edge of bounding box 74 and the vertical line passing through the left-most vertex of the child node projection is then constructed between the two vertical lines. The length of this line segment is the offset from the left edge 74b of the parent node projection bounding box to the left edge of the child node projection bounding box. For example, the length of line segment ax4 is the offset in the x' direction from parent bounding box 74 to the bounding box defined by the projection of child node 4. Similar offsets ay0–ay7 are constructed in the y' direction, suitably between the lower edge 74a of bounding box 74 to horizontal lines defined by the bottom-most vertex of each of the projections of the eight child nodes.

This process of calculating ax and ay offsets results in sixteen different values (ax0-ax7 and ay0-ay7), one for each of the bounding boxes defined by the eight children node projections in both the x' and the y' directions. (It will be understood that for the viewing angle shown, ax1=0 because vertex 214(1) happens to be the left-most vertex for both root node projection 211 and the projection of child node 1; analogously, ay5=0 for the viewing angle shown).

The origin of the bounding box defined by any *child* node projection may be calculated by adding the ax and ay offsets corresponding to that child to the origin of the bounding box defined by the parent child node projection (thus, the origin of the bounding box defined by the projection of child node 5, for example, is (NPX+ax5, NPY+ay5).

Once the sixteen ax and ay offset values have been calculated for the children of root node 32, the ax and ay offset values for the projection of any *descendent* of the root node may be derived from these values as a function of child number and node level. For example, the ax offset value from the origin of the bounding box of the projection of child node 1 to the origin of the bounding boxes of the projection of the children of child node 1 (i.e. the grandchildren of root node 32) are simply one-half of the ax offset values shown in FIG. 20(C) (because the dimensions of any child node are exactly one-half of those of its parent). Each time the octree structure is traversed downward, the proper ax and ay offsets are simply divided by 2 (i.e. shifted right one place) and added to the origin of the bounding box defined by the parent node projection to obtain the bounding box origin of the projection of the selected child node. Recursion is thus used to calculate the origin of the bounding box of the projection of any node in the three-dimensional universe. The bx and by values shown in FIG. 20(B) are also shifted one position to the right to accurately reflect the dimensions of the bounding box of interest.

The bits shifted out of the value registers such as bx are shifted into an underflow register and are thus saved. When the octree structure is traversed upward, the values are multiplied by two by shifting left one place. The saved lower order bits are, of course, shifted back into the register on an upwards transversal of the octree structure.

It will be recalled that the location and dimensions of the bounding box only provide sufficient information about the geometry of a node projection with respect to the view plane to perform the BBOX test. The PI test and the E test both require information about the location of the six exterior edges of the node projection. In addition, the E test requires information about the location of the three interior face edges of the node projection. Referring to FIGS. 21(A)-21(C), shown are graphic illustrations of offsets from the D0, D1 and D2 edges of the projection 211 of root node 32 to the D0, D1 and D2 edges of the projections of the eight children nodes of the root node. These offets permit the projection of any child node to be located relative to the projection of its parent node.

Referring to FIG. 21(A), the offsets from the D0 edge of the projection 211 of root node 32 (as defined in FIG. 20(A)) to the D0 edges of the projections of each of the children of node 32 is shown. The analogous offsets for D1 and D2 edges are shown in FIG. 21(B) and FIG. 21(C), respectively. Thus, for instance, the location of the D0 edge of the projection of child nodes 2 and 3 of root node 32 is given by NPD0+D0OFF(2) (where NPD0 in FIG. 20(A) is the location of edge D0 with respect to the origin of the view plane). Likewise, the location of edges D1 of the projection of nodes 0 and 2 are given by NPD1+ND1OFF(1), while the edges D2 of the projection of nodes 2 and 6 are given by NPD2+ND2OFF(2). In this way, the projection of any child node of any given parent node may be located with respect to the projection of the parent node. Note that just as for the ax and ay offset values, the offsets shown in FIGS. 21(A)-21(C) are suitably divided in half (shifted to the right) in order to determine the locations of, for example, the children of child node 2, and would be further divided by 2 for each further subdivision of nodes.

Figure 21D:
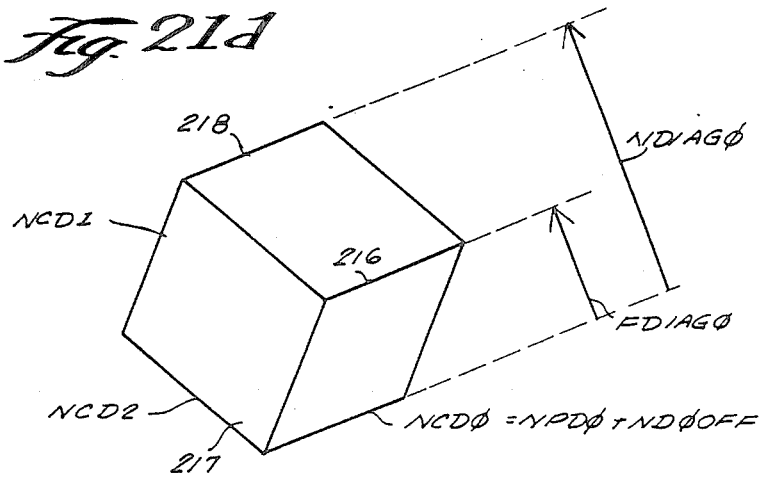
FIG. 21(D) is a graphic illustration of offsets of each face edge of a child node projection parallel to the D0 edge from the D0 edge of that child node projection.
Figure 21E:
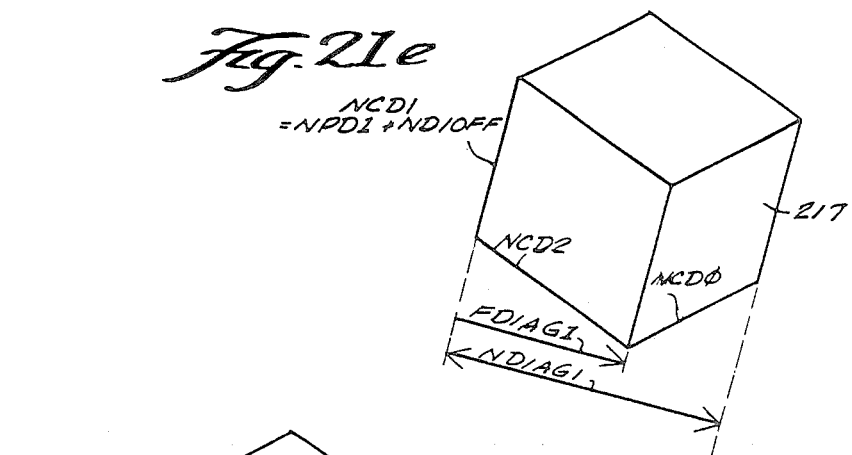
FIG. 21(E) is a graphic illustration of the offsets of each face edge of a child node projection parallel to the D1 edge from the D1 edge of that child node projection.
Figure 21F:
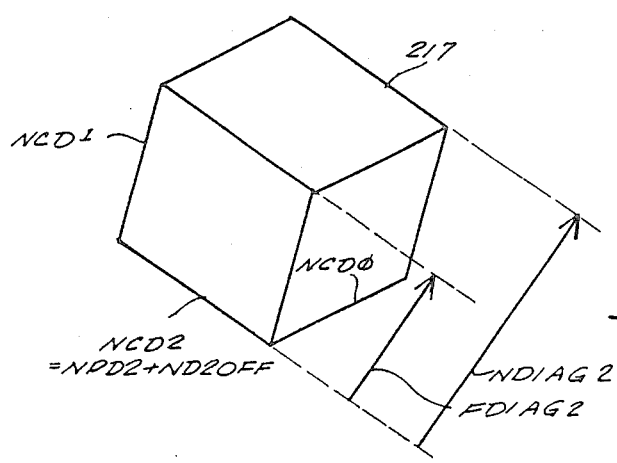
FIG. 21(F) is a graphic illustration of the offsets of each face edge of a child node projection parallel to the D2 edge from the D2 edge of that child node projection.

As discussed above, the interior face edges as well as the exterior node projection edges must be located for the E test. Referring to FIGS. 21(D)-21(F), shown are graphic illustrations of the location of interior face edges of the projection of an arbitrary child node of root node 32 (not the root node itself) with respect to the D0, D1 and D2 edges of that child node projection. Referring to FIG. 21(D), shown are the offsets from the D0 edge of the projection of a child node 217 of root node 32 to the two other edges of the projection of the child node parallel to edge D0 which are necessary for locating the visible faces of the projection of the child node. FDIAG0 is the length of a line segment constructed between and perpendicular to a line defined by the D0 edge of the projection of child node 217 and a line defined by the edge labelled 216 which separates two of the faces of the projection of the child node. Likewise, NDIAG0 is the length of a line segment constructed between and perpendicular to the line defined by the D0 edge of the projection of child node 217 and a line defined by an edge 218 of the projection of child node 217. It will be understood that edges 216 and 218 are the two edges of the child node 217 parallel to edge D0 which are projected onto the view plane 66 for the viewing angle shown (there will be, at most, two such lines, with a third parallel edge being located "behind" the node and hence not part of the projection). Likewise, FDIAG1 and NDIAG1 shown in FIG. 21(E) are analogous offsets from the D1 edge of the projection of the child node 217, and FDIAG2 and NDIAG2 shown in FIG. 21(F) are analogous offsets from the D2 edge of the projection of child node 217.

It is noted for completeness that some of the offsets shown in FIGS. 21(D)-21(F) are actually redundant, since they correspond to some of the offsets shown in FIGS. 21(A)-21(C). The preferred embodiment, of course, does not recalculate redundant offsets again.

From the offsets shown in FIGS. 21(A)-21(F) the location of any given edge of interest of any child node projection may be located with respect to the D0, D1 and D2 edges of its parent. Referring to FIGS. 4(A), 8, 21(A)-21(F), locations of the exterior edges and the interior face edges of, for example, the projection of child node 2 of root node 32 may be calculated as follows:

*Edge* 11=*NPD0*+*ND0OFF*(2)=*NCD0* (the D0 edge of child node 2)
*Edge* 12=*NPD2*+*ND20FF*(2)=*NCD2* (the D2 edge of child node 2)
*Edge* 13=*NPD1*+*ND1OFF*(1)=*NCD1* (the D1 edge of child node 2)
*Edge* 14=*NCD0*+*NDIAG0*
*Edge* 15=*NCD2*+*NDIAG2*
*Edge* 16=*NCD1*+*NDIAG1*
*Edge* 7=*NCD1*+*FDIAG1*
*Edge* 8=*NCD0*+*FDIAG0*
*Edge* 9=*NCD2*+*FDIAG2*

Figure 22B:
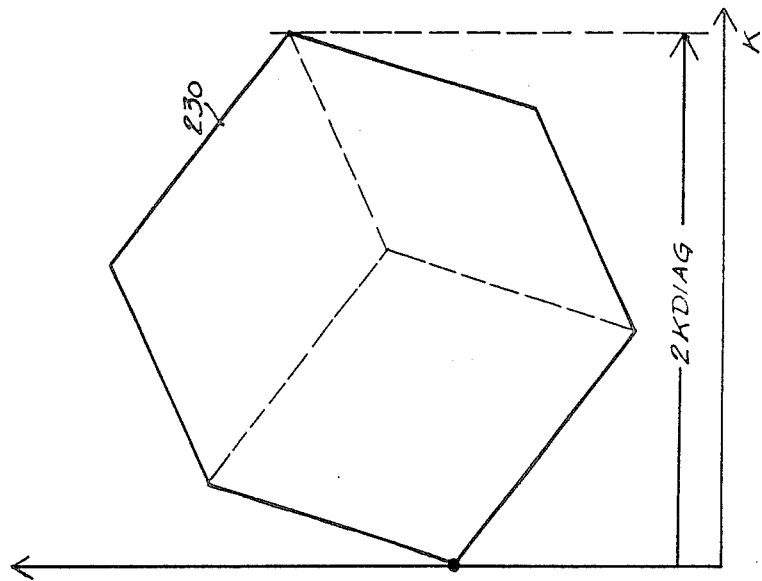
FIG. 22(B) is a graphic illustration of the measurement of a dimension of a node projection for use in the cut plane test.
Figure 22A:
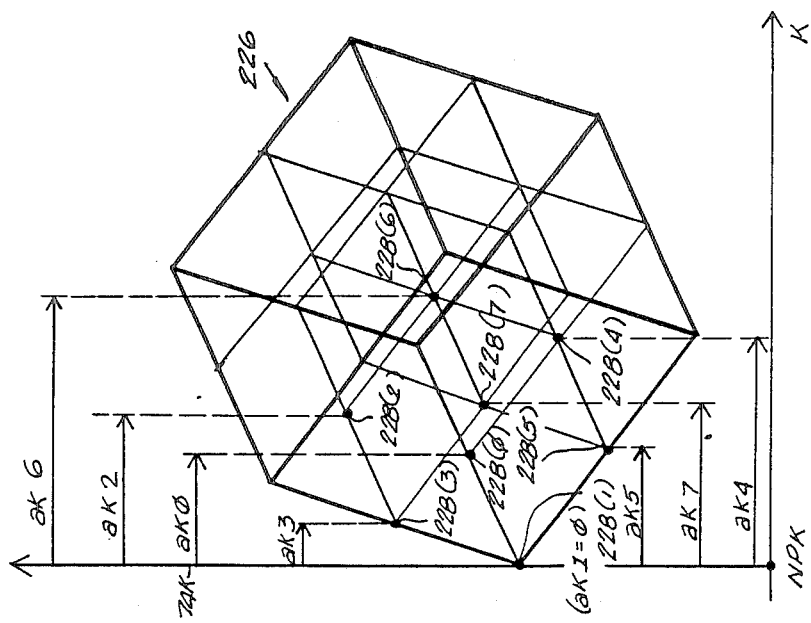
FIG. 22(A) is a graphic illustration of offsets from a vertex of a parent node projection to the vertices of each child node projection, the offsets shown needed for the cut plane test, a test which determines if a node lies in a region defined by a pair of parallel planes.

Referring to FIGS. 22(A)-22(B), shown are graphic illustrations of the geometry required to perform the cut plane test described previously in conjunction with FIG. 14(B). Referring to FIG. 22(A), ak offsets from the left-most vertex 228(1) (with respect to the k axis) of the projection 226 of root node 32 onto the cut plane test plane to the left-most vertices of the projections of each of the children nodes of the root node onto the test plane are shown. These offsets are calculated by constructing a line 74k perpendicular to the k axis (and therefore parallel to each of the cut planes 120 and 122 shown in FIG. 14(B)) passing through the left-most vertex of the projection 226. A line is constructed parallel to line 74k passing through each of the left-most vertices 228(0)-228(7) of the children node projections of the root node. Line segments are then constructed perpendicular to and between line 74k and each of the lines passing through the child vertices (thus, the offsets depicted in FIG. 22(A) are somewhat similar to the bounding box offsets shown in FIG. 20(C)).

The point at which line 74k intersects the k axis is defined as NPK. To determine the location of any child vertex, it is necessary only to add the appropriate offset to NPK. Thus, for instance, the k coordinate of the left-most vertex of the projection of child node 4 (numbered as in FIG. 4(A)) onto the test plane is given by NPK+ak4. Because the cut plane test requires only information about the k coordinate of each of the vertices, similar calculations do not have to be performed for coordinates orthogonal to the k axis (as was necessary for the bounding box offsets).

Referring to FIG. 22(B), the distance along the k axis between the left-most vertex of the projection 230 of a child node of root node 32 onto the test plane to the right-most vertex is shown. This offset, KDIAG, is calculated by constructing a line parallel to line 74k shown in FIG. 22(A) (and thus perpendicular to the k axis) passing through the right-most vertex. Because this distance is exactly the same for each of the children nodes of root node 32, it does not matter which child node projection is used to perform this calculation.

Given the offsets shown calculated in FIGS. 22(A)-22(B), the locations of the left-most and right-most vertices of the projection of any of the eight children nodes of root node 32 onto the cut plane test plane may be located. For instance, the left-most vertex of the projection of child node 4 of root node 32 is given by NPK+ak4, and the right-most vertex of this child node is given by NPK+ak4+KDIAG. The locations of the vertices of the projections of any descendent of root node 32 onto the cut plane test plane may similarly be calculated, merely by dividing the appropriate ak offset and KDIAG by an appropriate factor of 2, depending upon the level of the descendent in the octree.

Figure 23A:
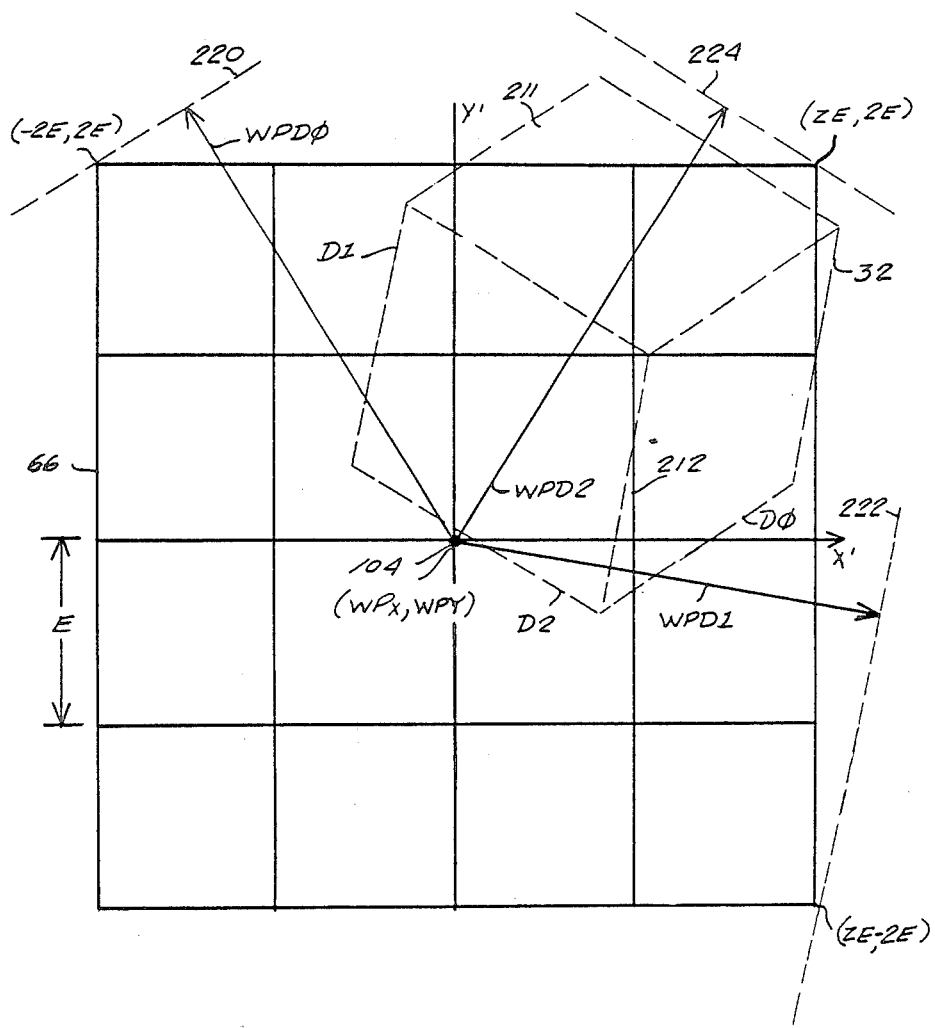
FIG. 23(A) is a graphic illustration of offsets from the origin of the quadtree universe to the critical vertex corners of a 4×4 window array each window of which is the size of the Display Screen, relative to the D0, D1 and D2 edges of the root node projection, and also defines the dimensions of the children windows in the 4×4 array.

Referring to FIGS. 23(A) and 43(A), shown is a 4×4 window array each window of which is of size E (the size of Display Screen 212). View plane 66 has origin 104, which is located at the lower left-hand corner of Display Screen 212. The 4×4 array has been selected so that the center of the array coincides with origin 104, as shown in FIG. 43(A). The configuration shown is arbitrarily defined in the presently preferred embodiment to be the "window packet" at window level 0.

It will be recalled that for both the PI and E tests, it is necessary to construct lines which pass through a selected critical vertex of the window under test and which are parallel to lines defined by the various edges of a node projection. A line defined by any given edge (interior or exterior) of a node projection must be parallel to either edge D0, edge D1 or edge D2 of the projection. Likewise, any such line will exclude one of the two pairs of opposite vertices of any given window from serving as a possible critical vertex for the PI and the E tests as a function of slope alone (it will be recalled from the discussion of FIGS. 9 and 11 that one vertex of the pair not so excluded is selected as the critical vertex for the PI test, while the other is selected as the critical vertex for the E test; which vertex is used for which test is a function of the orientation of the edge of interest with respect to the interior of the node). Because of these constraints, it is not necessary to locate the position of lines parallel to each of edges D0-D2 passing through each of the four vertices of a given window. Instead, the position of only six lines for each window (two parallel to each of edges D0, D1, D2) need be ascertained for any given window.

A line 220 is constructed through point (−2E,2E) (one of the two vertices of the 4×4 array not excluded from serving as a critical vertex for edge D0 for the PI and the E test) parallel to edges D0 of the projection 211 of root node 32 (note that line 220 could have been constructed through (2E,−2E) just as well). A line segment WPD0 is constructed from origin 104 of view plane 66 perpendicular to line 220 and intersecting that line. Analogously, a line 222 parallel to edge D1 of the projection of root node 32 is constructed through point (2E,−2E), and a line segment WPD1 is constructed from origin 104 perpendicular to line 222 and intersecting that line. Finally, a line 224 is constructed through point (2E,2E) parallel to edge D2 of the projection 211 of root node 32, and a line segment WPD2 is constructed from origin 104 to and perpendicular to line 224.

Figure 23B:
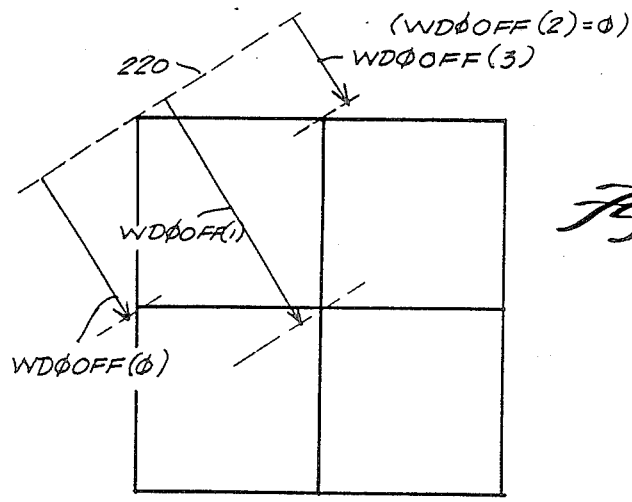
FIG. 23(B) is a graphic illustration of offsets defining the displacements from the vertex defined relative to the D0 edge of the root node projection shown in FIG. 23(A) to each of the other critical vertices (for the D0 edge) of a given quadtree window overlay.
Figure 23C:
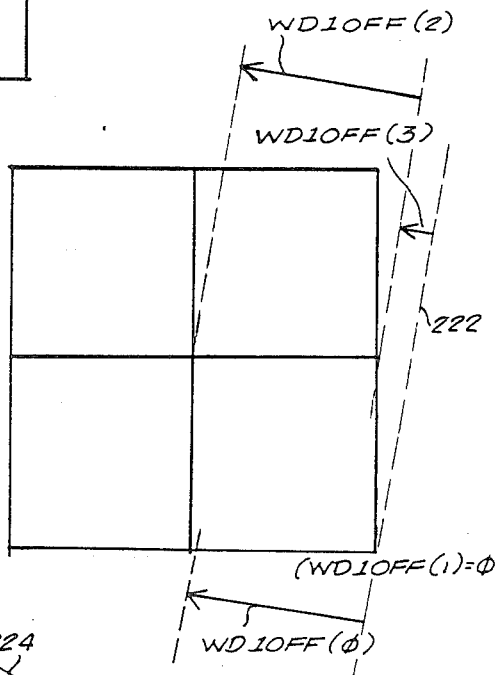
FIG. 23(C) is a graphic illustration of offsets defining the displacements from the vertex defined relative to the D1 edge of the root node projection shown in FIG. 23(A) to each of the other critical vertices (for the D1 edge) of a given quadtree window overlay.
Figure 23D:
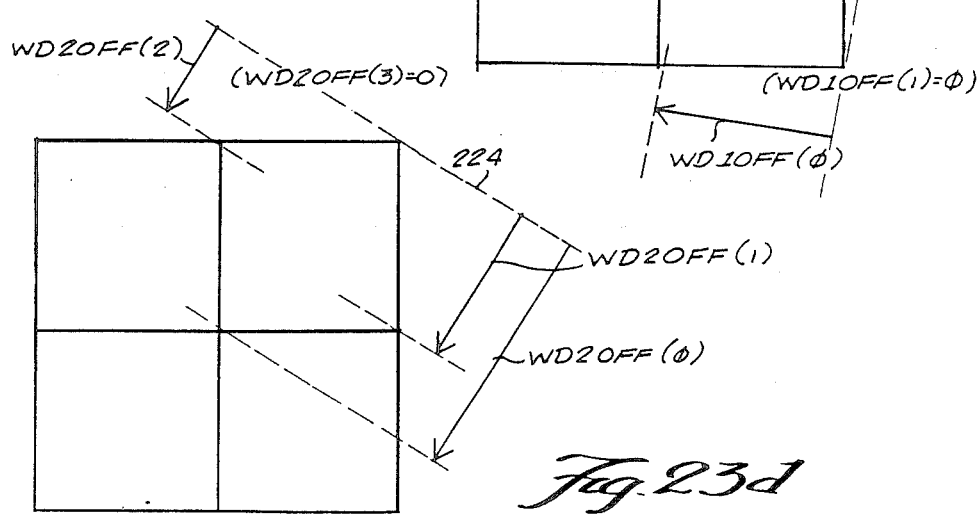
FIG. 23(D) is a graphic illustration of offsets defining the displacements from the vertex defined relative to the D2 edge of the root node projection shown in FIG. 23(A) to each of the other critical vertices (for the D2 edge) of a given quadtree window overlay.

The presently preferred embodiment uses the lines defined by each of offsets WPD0, WPD1 and WPD2 as reference lines to which additional offsets are added to obtain the position of appropriate lines intersecting any critical vertex of any given window in the 4×4 window array. Referring to FIGS. 23(B)–23(D), shown are the offsets from each of lines 220, 222 and 224, respectively, to corresponding vertices of each of the four windows in a window overlay. Referring to FIG. 23(B), the offsets from line 220 (shown in FIG. 23(A)) to each of the corresponding critical vertices in a window overlay is shown. These offsets are calculated by constructing lines through each of the critical vertices parallel to line 220 (and thus parallel to edge D0 of the projection of root node 32), and constructing line segments from line 220 to each of these lines and perpendicular to those lines. FIGS. 23(C)–23(D) show analogous offsets for the D1 and D2 edges.

Figure 23E:
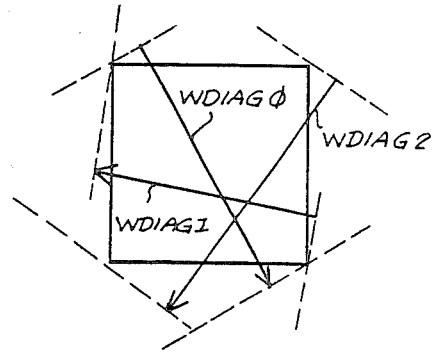
FIG. 23(E) is a graphic illustration of offsets between opposite vertices of a given quadtree window relative to each of the D0, D1 and D2 edges of the root node projection shown in FIG. 23(A)

Referring to FIG. 23(E), shown are three offsets used to locate the opposite critical vertex of a window from the critical vertex located in FIGS. 23(B)–23(D). One of these offsets is used for each of the D0–D2 edges. It will be understood that some of the offsets shown in FIG. 23(E) are the same as some of the offsets calculated in FIGS. 23(B)–23(D); while these offsets are shown separately for the sake of clarity, the presently preferred embodiment does not calculate them separately for efficiency reasons.

Given the offsets calculated in FIGS. 23(A)–23(E), the distance from origin 104 of view plane 66 to lines passing through the critical vertex of any window in the level 0 node packet shown in FIG. 23(A) may be calculated. It will be recalled from the discussion of FIGS. 6(D)–6(F) that the presently preferred embodiment selects single windows from a 4×4 window array (i.e. a window packet) by first selecting a 3×3 window array from the 4×4 array, then selecting a window overlay from the selected 3×3 array, and finally, selecting the one window from the window overlay. The calculations used to locate the critical vertices of a single window follow this same sequence. Of course, those skilled in the art will be readily able to devise other, possibly more direct methods of locating the critical vertices of a single window on the view plane, the particular method used by the presently preferred embodiment being only one such method.

Referring to FIGS. 6(D)–6(F) and FIGS. 23(A)–23(E), the critical vertices of a 3×3 array may be calculated by adding to WPD0 an appropriate one of offsets WD0OFF(0)–WD0OFF(3) as a function of the WBITS. Thus, for example, the critical vertex for the D0 edge of projection 211 of the root node for the 3×3 array given by W3×3X=1, W3×3Y=1 may be calculated as $WPD0(3\times3) = WPD0 - WD0OFF(3)$. The locations of the critical vertices for the D1 and the D2 edges for the selected 3×3 array may be similarly calculated.

Once the positions of the critical vertices for the 3×3 array are known, the critical vertices for a window overlay selected from the 3×3 array may be calculated by merely adding offsets as the functions of the value W2×2X and W2×2Y. For example, for the window overlay given by W2×2X=1, W2×2Y=0, the critical vertex for the overlay for the D0 edge of the projection 32 of the root node may be calculated as $WCD0 = WPD0(3\times3) - WD0OFF(1)$. The position of the critical vertices for the D1 and D2 edges would be similarly calculated.

Once the position of the critical vertices for the window overlay are calculated, the critical vertices for any one of the four windows in the overlay may be calculated by adding appropriate ones of the WDnOFF values shown in FIGS. 23(B)–23(D) and the WDIAGn values shown in FIG. 23(E) as a function of the value of WNUM. For example, the set of two critical vertices for the D0 edge for window 00 in the window overlay is given by WCD0+WD0OFF(0) and WCD0+WD0OFF(0)+WDIAG0. One of these two vertices will be used as the critical vertex for an edge parallel to the D0 edge for the PI test, while the other vertex will be used for the same edge for the E test (which vertex is used for which test depends upon the orientation of the edge with respect to the interior of the node projection). Critical vertices for edges parallel to edge D1 and D2 will be calculated analogously.

Figure 24A:
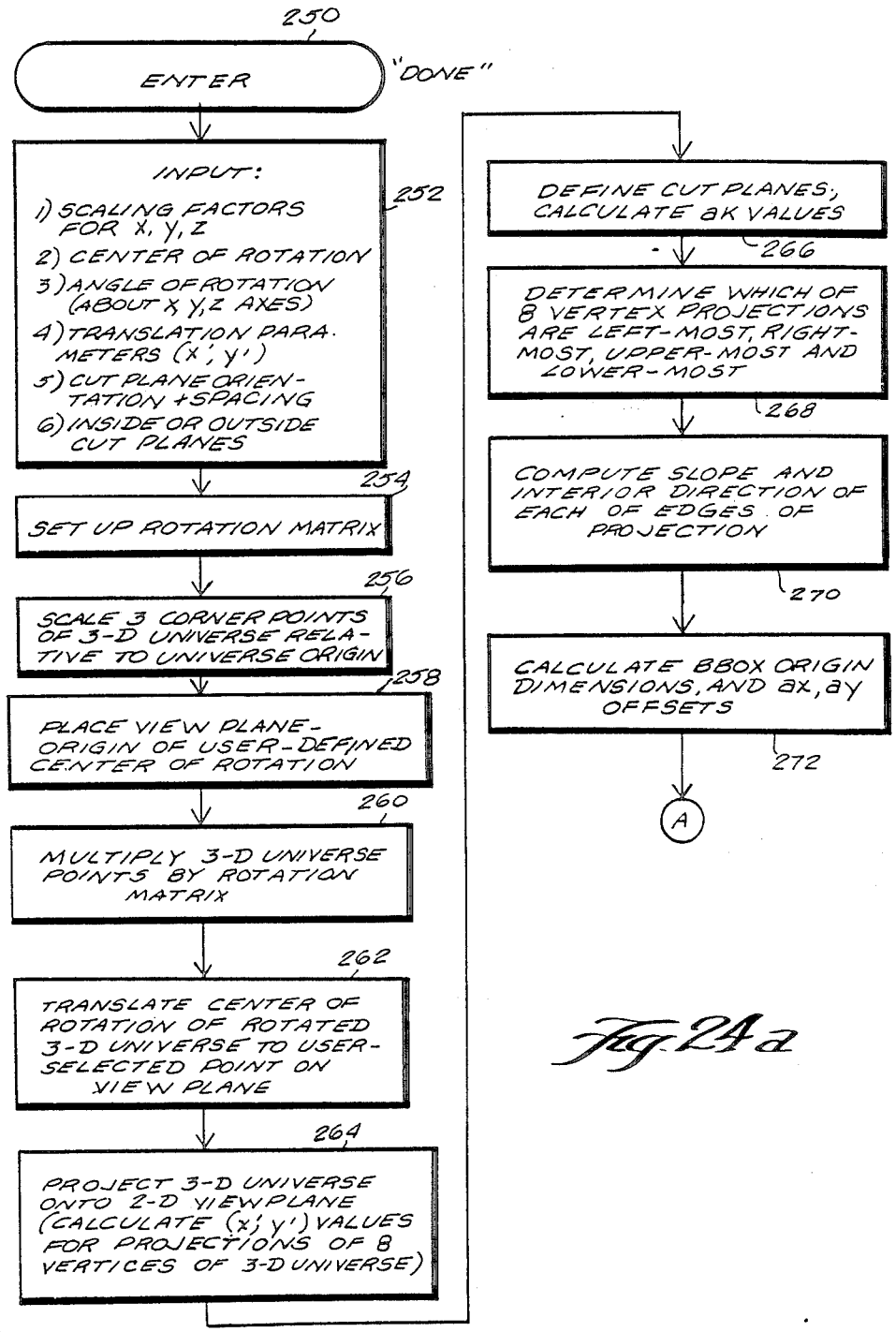
FIGS. 24(A)-24(B) show a flow chart illustrating the function of the Initializing Controller block shown in FIG. 15.
Figure 24B:
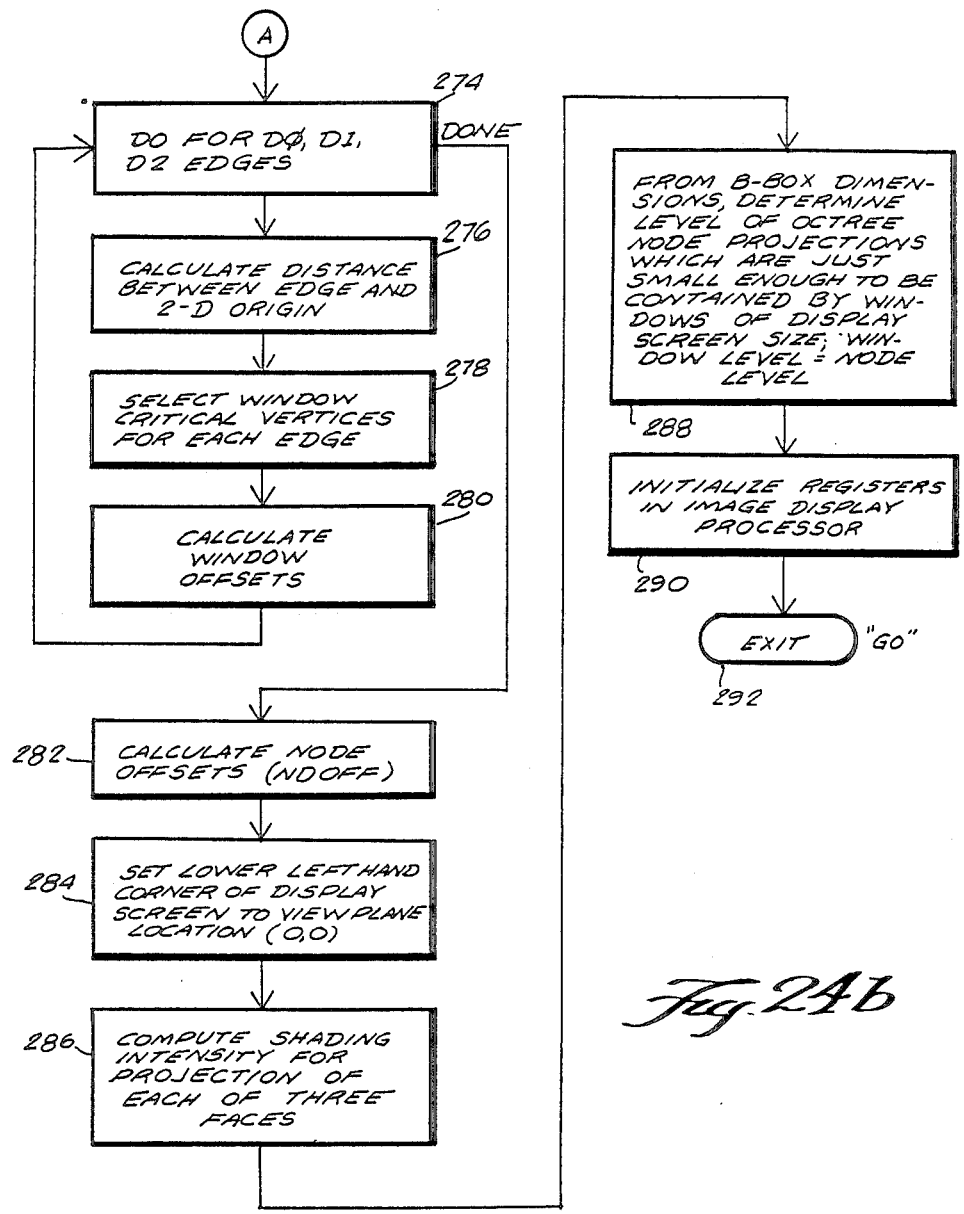
Figure 24C:
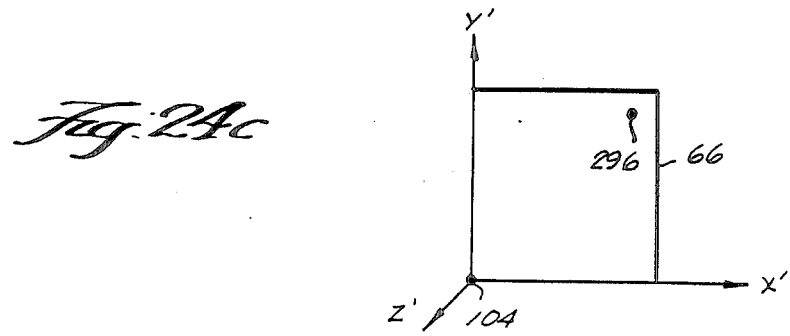
FIG. 24(C) is a graphic illustration of the view plane shown in FIG. 5 defined within its own three-dimensional coordinate system, wherein one point on the view plane is defined by a user for locating the projection of the three-dimensional universe onto the view plane.
Figure 24D:
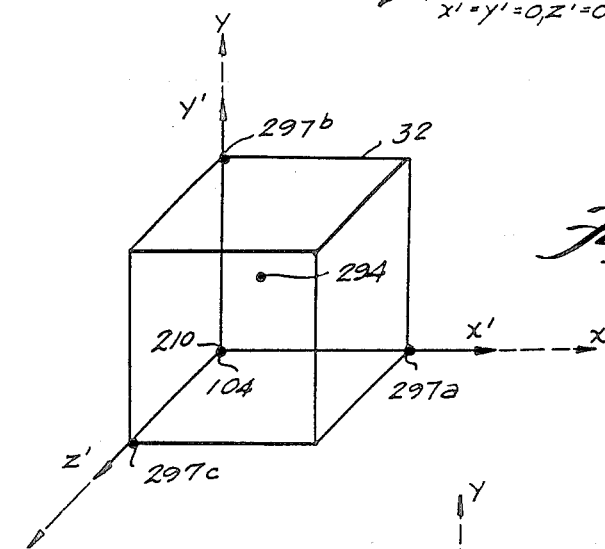
FIG. 24(D) is a graphical illustration of the three-dimensional octree universe and the coordinate system which it defines, the coordinate system shown in FIG. 24(C) defined by the view plane being superimposed onto the coordinate system defined by the three-dimensional universe, wherein a center of rotation about which the three-dimensional universe may be rotated is defined by the user.

The Initializing Controller block 160 shown in FIG. 15 is implemented in the presently preferred embodiment by a software program executing on a Model 68000 microcomputer manufactured by Motorola, Inc. A copy of this software program is appended hereto as Appendix B. Referring to FIGS. 24(A)–24(B), shown is a flow chart describing the algorithm executed by the Initializing Controller block 160. The algorithm is entered through terminal block 250, and first enters INPUT block 252. INPUT block 252 accepts a number of inputs from a user through various I/O devices, including scaling factors for each of the x, y and z dimensions of the three-dimensional universe, the location of a center of rotation 294 for the three-dimensional universe (as shown in FIG. 24(D)), angles of rotation in each of three orthogonal directions in the three-dimensional universe, the location of a point 296 on view plane 66 to which the center of rotation 294 of the three-dimensional coordinate system is to be translated (as shown in FIG. 24(C)), the orientation and distance between a pair of cut planes, and whether the region to be displayed defined by the cut planes is inside or outside of the cut planes.

The algorithm then proceeds to block 254, which sets up a rotation matrix. The use of a rotation matrix to permit linear transformations of a three-dimensional coordinate system is well known in the art, and is discussed in Newman, W. M. and Sproull, R. F., *Principles of Interactive Computer Graphics*, 2d. Ed., McGraw-Hill, New York, 1979, Appendix II, pp. 491–501.

Figure 24E:
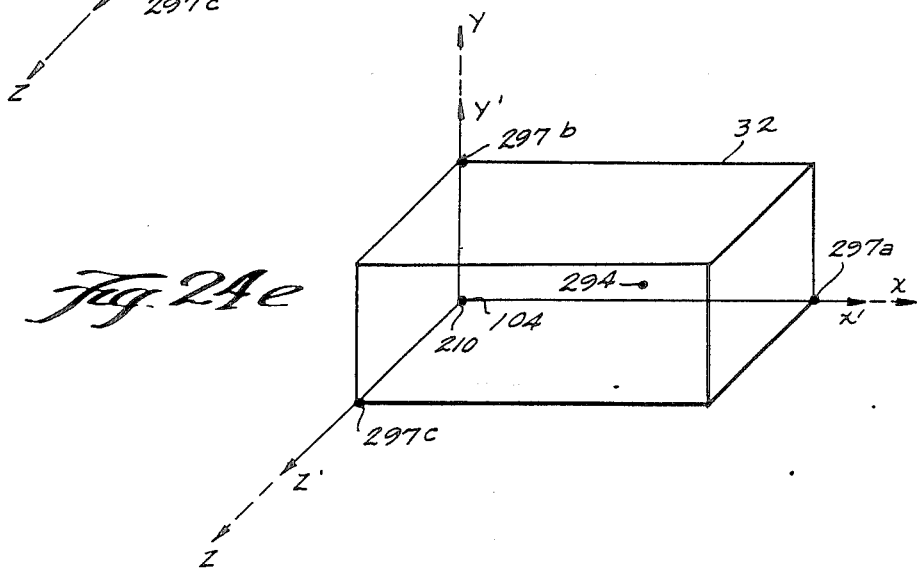
FIG. 24(E) is a graphical illustration of the three-dimensional universe shown in FIG. 24(D) after it has been scaled by block 256 shown in FIG. 24(A)

As shown in FIG. 24(E), block 256 scales the three-dimensional universe relative to the three-dimensional coordinate system using the independent scaling factors for each of the x, y, and z directions input in block 252 by floating point multiplication on the microcomputer. As shown in FIG. 24(F), block 258 then translates the origin 104 of the view plane coordinate system to the point 294 defined by the user as the center of rotation. Block 260 uses the rotation matrix set up in block 254 to rotate the three-dimensional universe about center of rotation 294 (which may be a point defined by the user anywhere in the three-dimensional universe) by the desired user-input angles of rotation, as is shown in FIG. 24(G) (note that this linear transformation is performed not on the three-dimensional coordinate axes, but rather on points of the three-dimensional universe, suitably the three (non-origin) vertices 297a, 297b and 297c of the parallelepiped-shaped universe that intersect the coordinate axes of the local coordinate system of the universe (and the origin of the universe). A first user-specified angle of rotation rotates the three-dimensional universe in the y'-x' plane (from y' to x'). A second user-specified angle of rotation rotates the three-dimensional universe in the y'-z' plane (from y' to z') A third user-specified angle of rotation rotates the three-dimensional universe in the x'-z' plane (from x' to z'). Each of these rotation angles may be independent.

Figure 24I:
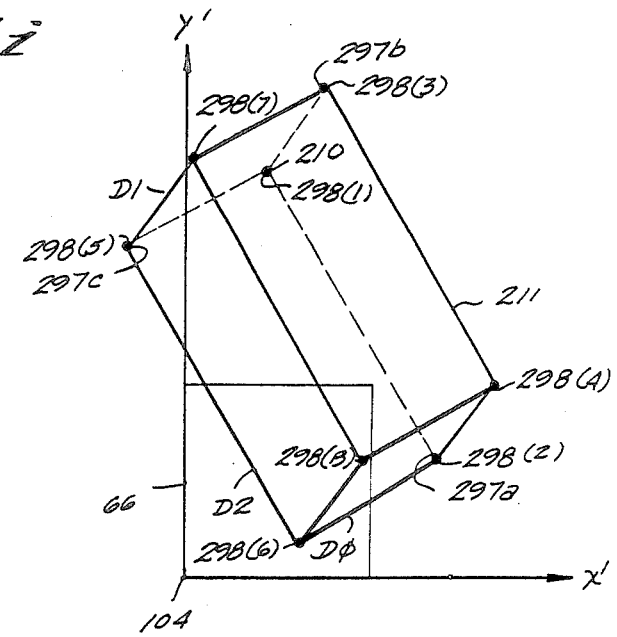
FIG. 24(I) is a graphical illustration of the three-dimensional universe shown in FIG. 24(H) projected onto the view plane by block 264 of FIG. 24(A)

Once the universe is rotated, as is shown in FIG. 24(H), block 262 translates the center of rotation 294 of the universe to the point 296 on the view plane selected by the user. Block 264 then "projects" the three-dimensional universe onto the view plane by calculating the two-dimensional coordinate values (x', y') for each of the eight vertices 298(1)-298(8) of the cuboid three-dimensional universe, as is shown in FIG. 24(I). (Note that the projection process is performed by block 264 by setting the z' coordinate of every one of the eight vertices 298(1)-298(8) to 0).

Block 266 defines the pair of parallel cut planes in the three-dimensional universe, and calculates the ak offsets and the value of KDIAG (as shown in FIGS. 22(A)-22(B) (by projecting the unrotated three-dimensional universe onto a test plane in a manner similar to that performed in block 264).

Figure 24J:
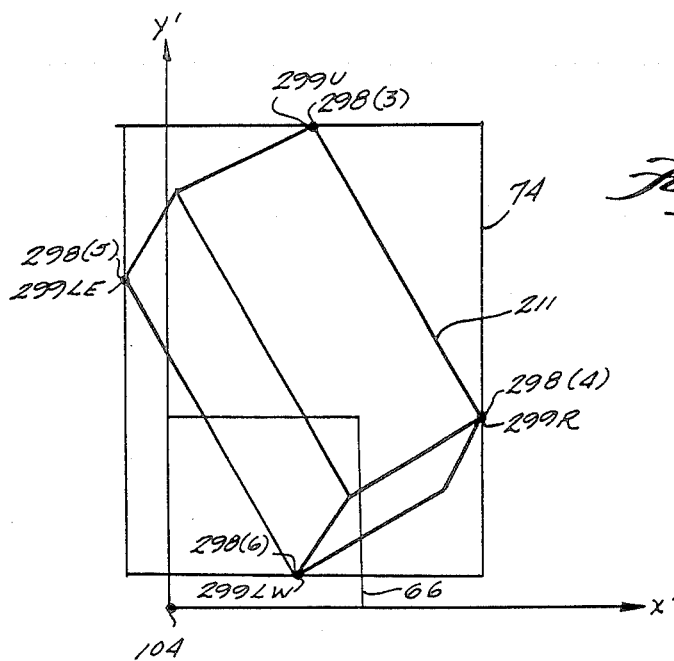
FIG. 24(J) is a graphical illustration of the bounding box defined by the three-dimensional universe shown in FIG. 24(I) as located by block 268 of FIG. 24(A)

As shown in FIG. 24(J), block 268 determines which of the eight vertices 298(1)-298(8) of the projection of the three-dimensional universe is the left-most one (299LE), the right-most one (299R), the upper-most one (299U) and the lower-most one (299LW) by simple arithmetic comparisons of their coordinates as calculated by block 264. Block 270 constructs edges between each pair combination of the eight vertices, defines which of these edges are the D0, D1 and D2 edges, and determines the slope and orientation of each edge with respect to the interior of the node projection. The slope may be easily arithmetically computed, while the interior direction is ascertained by keeping track of which edges of the projection correspond to edges of the parallelepiped universe which lie on the three-dimensional orthogonal coordinate axes.

Box 272 uses the results of box 268 to determine the origin and dimensions of the bounding box defined by the projection of the root node (as shown in FIG. 20(B)), and determines the various ax and ay offsets shown in FIG. 20(C). The method of computing these locations, dimensions and offsets is well-known in the art. Blocks 274–280 calculate the offsets shown in FIG. 20(A), ascertains the critical vertices of a given window for each edge D0, D1 and D2 of the node projection (as shown in FIGS. 9(A)-9(D) and 11(A)-11(D)) based on the information determined by block 270, and calculates the window offsets shown in FIGS. 23(A)-23(E). Block 282 calculates the node offsets shown in FIGS. 21(A)-21(F).

Block 284 establishes the lower left-hand corner of the Display Screen to the origin of the view plane, as shown in FIGS. 20(A) and 43(A). Block 286 computes a unique shading for each of the three faces of the node projection based upon the orientation of that face. An imaginary point light source infinitely far away from the object is assumed. It is typically located at the same point as the viewer, but can be located anywhere. A surface normal vector for each face is constructed. The intensity of each face may be computed as the dot product of the surface normal vector and a vector to the light source, as is discussed in Newman and Sproull, cited above, pages 393–395.

An alternative and more sophisticated method of calculating the intensity of each window to be painted is to compute an intensity for each FULL node in the octree structure. This technique, which is referred to as "surface normal shading," will paint every window enclosed by the same FULL node with the same intensity. The intensity for each node in the octree structure is calculated by approximating the node as a point on the surface of the object to be displayed, and constructing a plane intersecting that point and tangent to the surface of the object. A surface normal vector for this tangent plane is constructed, and the intensity value to be attached to that node may be computed as the dot product of the surface normal vector and a vector directed toward the viewpoint. Surface normal shading may require a property memory (as discussed previously) for storage of the intensity value of each terminal node. Computation of surface normal shading intensity values can be performed by a separate pass through the octree structure. Those skilled in the art will readily recognize a variety of different ways in which the orientation of the tangent plane may be determined (such as visiting nodes neighboring the node the intensity of which is to be determined to discover if they are FULL or EMPTY in order to determine the local profile of the surface of the object).

Block 288 determines from the dimensions of the bounding box calculated in block 272 which level of the octree produces node projections which are smaller than windows of level 0 in the quadtree (i.e. windows of the size of the Display Screen). The node level is set equal to the window level so that the window overlay will have the proper relationship to the node projection, as was discussed previously.

Block 290 performs the output step of the Initializing Controller block by down-line loading the various registers in the Image Display Processor block 152 (shown in FIG. 15) to initialize it. The Initializing Controller block exits through terminal block 292, and generates a "GO" signal to the Image Display Processor block 152 to inform it that initialization is complete and that image generation may begin.

IMAGE DISPLAY PROCESSOR

Referring to FIGS. 15 and 25, shown is a detailed block diagram of the Image Display Processor block 152 of FIG. 15. The function of the Image Display Processor is to generate a single image of the projection of the three-dimensional universe represented by the octree structure onto the two-dimensional view plane according to the selected view. The Image Display Processor block 152 accepts as an input initializing values from the Initializing Controller block 160 specifying a desired view, accesses the octree structure stored in the Octree Encoded Object Storage block 140, and outputs the image which it generates to the Image Display block 154.

The Image Display Processor 152 comprises a Memory Address Processor block 300 and its associated Memory Address Stack 400, and Object Node Packet Processor block 500 and its associated Object Node Packet Stack 410, a Node Select Logic block 600, an Object Node Geometry Processor 700 and its associated Object Node Geometry Stack 420, an Image Window Memory block 800, an Image Window Packet Processor 900 and its associated Image Window Packet Stack 430, an Image Window Geometry Processor block 1000 and its associated Image Window Geometry Stack 440, a Window Overlay Select Logic block 1100 and its associated WBITS Stack 450, a Window Select Logic block 1200 and its associated BBOX Results Stack 460, a Cut Plane Processor block 1300 and its associated Cut Plane Geometry Stack 470, a Window Writer block 1400, a Cycle Results block 1500 and a Sequence Controller block 1600.

The function of the Memory Address Processor block 300 is to obtain a specified node packet from the Octree Encoded Object Storage block 140 and to reorder the eight nodes in the obtained node packet according to the traversal sequence for the selected view. In addition, the Memory Address Processor block 300 keeps track of the absolute address of the node packets being accessed, and calculates the absolute address in the Octree Encoded Object Storage block 140 of the next node packet to be retrieved.

The function of the Object Node Packet Processor block 500 is to demand node packets from the Memory Address Processor block 300 by providing the child number (CNUM0) of the child node in the current node packet to be subdivided. The output of the Object Node Packet Processor block 500 is the current node packet NPROP, which provides the E, P or F property values for the nodes yet to be processed in the current node packet. The Object Node Packet Processor block 500 also keeps track of which nodes have already been processed so that they will not be processed again.

The Node Select Logic block 600 accepts as an input NPROP, the current node packet, and generates several outputs. One output (CNUM) indicates the number of the first non-Empty node in the seven-to-zero traversal sequence in the current node packet. The Node Select Logic block 600 also generates two other outputs, both of which are applied as inputs to the Sequence Controller block 1600. The first output indicates whether the current node is P or F (the current node cannot be E, so E nodes are skipped over); the second output 169 (NREM) indicates whether or not the current node packet has been completely processed (and thus indicates when the next node packet must be retrieved).

Object Node Geometry Processor block 700 derives the geometry of the current node from the various locations and offset values (which may be characterized as families of x and y values used for the BBOX test and families of D0, D1 and D2 values used for the PI and E tests) generated by the Initializing Controller block 160, the child number (CNUM) produced by the Node Select Logic block 600, and the node level (NLEV, not shown) which is generated by the Sequence Controller block 1600. In this way, the Object Node Geometry Processor block 700 keeps track of the position of the current node projection on the view plane.

The Image Window Memory block 800 organizes and stores the windows in the view plane in a quadtree structure, and continually updates the quadtree structure as new windows are printed by the Image Display Processor 152 to the Image Display block 154. It accepts an input WPROP (the E, P or F property values of the current 4×4 window array) together with the geometry of the current window overlay, and outputs the next window packet.

The Image Window Packet Processor block 900 processes window packets produced by the Image Window Memory block 800 by generating the output WPROP discussed above. The Image Window Packet Processor block 900 must also update the quadtree as stored in the Image Window Memory block 800 as new windows are painted (by marking windows F as they are painted and changing the ancestors of those windows to P or F, as appropriate, whenever the Image Display Processor POPs up a level), and must further provide updated property values for the current windows even before the Image Window Memory 800 has been updated (the quadtree structure is updated only as it is traversed upward to increase efficiency).

The Image Window Geometry Processor block 1000 generates information concerning the geometry of the current windows. The Image Window Geometry Processor block 1000 derives the geometry of the current window(s) under test from the various locations and offsets calculated by the Initializing Controller block 160, the window number (WBITS and WNUM) of the window(s) currently under test, and the Window Level (WLEV, not shown) generated by the Sequence Controller block 1600.

The Window Overlay Select Logic block 1100 selects the window overlay for the current node from the current node packet WPROP. The Window Overlay Select Logic block 1100 accepts as an input WPROP (the E, P or F property values for each of the sixteen windows in the current 4×4 window array) and outputs the E, P or F property values for each of the windows in the 2×2 window overlay which it selects from the 4×4 array. The Window Overlay Select Logic block 1100 also generates the WBITS (W3×3X, W3×3Y, W2×2X and W2×2Y) indicating the window overlay which it selects (encoded as shown in FIGS. 6(D)–6(E)).

The Window Select Logic block 1200 accepts as an input the property values of the current window overlay, and generates an output WNUM which selects the next window in the overlay to be processed and the property value of the selected window. The selection of a window is affected by the results of the BBOX test, so the Window Select Logic block 1200 must discriminate between those windows which have passed the BBOX test and those which have failed it. The Window Select Logic block 1200 also generates a signal (WREM) which indicates if there are any windows remaining in the current window overlay to be processed.

The Cut Plane Processor block 1300 accepts as an input the child number (CNUM) of the node currently being processed and the node level (NLEV, not shown). The Cut Plane Processor block 1300 derives the geometry of the projection of the current node onto the cut plane test plane and performs the cut plane test described in connection with FIG. 14(B). The Cut Plane Processor block 1300 generates two outputs: a signal Cut Plane OK which is asserted if the current node lies at least partially within the region defined by the cut planes to be displayed; and a signal Cut Plane INT which is asserted if the current node is intersected by one of the cut planes. These signals are provided to the Cycle Results block 1500 and the Sequence Controller block 1600, respectively.

The Cycle Results block 1500 performs the BBOX, PI and E tests and generates an output indicating pass and fail results. It accepts as inputs the geometry of the current node projection (the families of X, Y, D0, D1 and D2 offset values) produced by the Object Node Geometry Processor block 700, and the geometry of current windows (the families of X, Y, D0, D1 and D2 offset values) from the Image Window Geometry Processor block 1000. The Cycle Results block 1500 also accepts as an input the WBITS generated by the Window Overlay Select Logic block 1100 selecting a window overlay from the current 4×4 window packet in order to determine which four of the sixteen windows form the overlay and, therefore, are to be tested by the BBOX, PI and E tests. Finally, the Cycle Results block 1500 accepts as inputs the E, P or F property value information of the selected four window overlay and the Cut Plane OK signal from the Cut Plane Processor block 1300. The Cycle Results block 1500 reduces these multiple inputs to a small number of outputs as it performs the various tests on command of the Sequence Controller block 1600.

The Cycle Results block 1500 performs the BBOX test on all four windows in the current window overlay simultaneously, and generates four outputs (BPASS0, BPASS1, BPASS2 and BPASS3), each of which indicates the result of the BBOX test for one of the four windows. These four BBOX result outputs are sent to the Window Select Logic block 1200 to permit selection of which ones of the four windows in the current window overlay must be further processed by the PI and E tests. The Cycle Results block 1500 also, on command of the Sequence Controller block 1600, performs the PI test and possibly the E test on single windows from the overlay and generates an output to the Sequence Controller block indicating whether the particular window has passed or failed the test performed. If, for an F node, a window passes the BBOX, Cut Plane, PI and E tests (and is Empty), the Cycle Results block 1500 generates an output PAINT indicating that the window must be painted, and a Face Number output, which indicates which color or shading the window is to be painted. These two outputs are sent to the Window Writer block 1400.

The Window Writer block 1400 converts the location and dimensions of a window to be painted to an area of pixels on the Image Display block 154. The Window Writer block 1400 accepts as inputs the geometry of the current 4×4 array of windows, the WBITS (indicating the location of the current window overlay within that 4×4 array), WNUM (which locates the one window to be painted within that window overlay) and WLEV (the window level, not shown); from those inputs, it generates the address of each pixel in the area on the Image Display 154 corresponding to that window.

If the Window Writer block 1400 receives the PAINT signal from the Cycle Results block 1500, it will control the Image Display 154 to paint an area of the Display Screen corresponding to that window an appropriate color or shading (as determined corresponding to the Face Number of the projection of the node which encloses the window). (Note that at the same time that the Window Writer block 1400 PAINTS a window, the Image Window Packet Processor block 900, which also receives the PAINT signal, must update the quadtree structure stored in the Image Memory block 800 so that the same window is not painted again later on.)

The Sequence Controller block 1600 controls the sequence in which all of the other blocks of the Image Display Processor 152 perform their tasks. The Sequence Controller 1600 also determines when windows and/or nodes must be subdivided. The Sequence Controller block 1600 thus steps the Image Display Processor 152 through the algorithm shown in FIGS. 18(A)–18(B).

It will be noted that the various blocks of the Image Display Processor labelled Stack have yet to be described. A Memory Address Stack 400 is connected to the Memory Address Processor block 300; a Object Node Packet Stack 410 is connected to the Object Node Packet Processor block 500; a Object Node Geometry Stack 420 is connected to the Object Node Geometry Processor block 700; an Image Window Packet Stack 430 is connected to the Image Window Packet Processor block 900; a Image Window Geometry Stack 440 is connected to the Image Window Geometry Processor 1000; a WBITS stack 450 is connected to the Window Overlay Select Logic block 1100; a BBOX Results Stack 460 is connected to the Window Select Logic 1200; and a Cut Plane Geometry Stack 470 is connected to the Cut Plane Processor block 1300. The Memory Address Stack 400, Object Node Packet Stack 410, Object Node Geometry Stack 420 and the Cut Plane Geometry Stack 470 all have the same function of storing information about the current node packet being processed when the Octree structure is traversed to the next node level, and producing that information once the Octree is traversed back to that level so that the Image Display Processor may continue processing that node packet where processing was left off. Likewise, the Image Window Packet Stack 430, Image Window Geometry Stack 440, WBITS Stack 450 and BBOX Results Stack 460 have the same function of storing information about the current windows being processed when the quadtree structure is traversed to the next level down (i.e. the current windows are subdivided), and producing the information about that window packet when the quadtree structure is traversed back up to that window level.

Each of these Stack blocks is a LIFO stack upon which the operations of PUSH and POP may be performed. The Memory Address Stack 400, Object Node Packet Stack 410, Object Node Geometry Stack 420 and the Cut Plane Geometry Stack 470 all push information in response to a NPUSH (node push), and all pop information in response to NPOP (node pop) operation. Likewise, the Image Window Packet Stack 430, Window Image Geometry Stack 440, WBITS Stack 450 and BBOX Results Stack 460 all push information in response to a WPUSH (window push) command, and all pop information in response to a WPOP (window pop) command.

The stack blocks permit the Image Display Processor to execute the recursive sections of the algorithm shown in FIGS. 18(A)-18(B), and thus permit both the octree and the quadtree structures to be traversed together in "lockstep," or independently. While each of these stack blocks stores different information (i.e. the working values of the block to which it is attached), they are all implemented in precisely the same manner and all have similar functions. (Indeed, the "window" stacks may suitably be implemented as a single stack of sufficient width, while the "node" stacks may suitably be implemented as a second sufficiently-wide stack.)

Each of the different blocks comprising the Image Display Processor 152 will now be discussed in further detail according to function and implementation of the presently preferred embodiment of the present invention.

Memory Address Processor

Referring to FIGS. 15, 25 and 26(A)-26(B), shown is a schematic diagram of the Memory Address Processor 300 in accordance with the preferred embodiment of the present invention. The function of the Memory Address Processor 300 is to address the Octree Encoded Object Storage block 140 to obtain the next node packet, and to calculate the absolute address of the node packets containing the children of the current node packet in the Octree Encoded Storage. Referring to FIG. 17, it will be recalled that node packets are stored in Relative Address Format in words of memory in the Octree Encoded Object Storage block 140. The lower sixteen bits of each word contains the E, P or F property values for each of the eight children stored in the node packet, while the upper sixteen bits contain an address offset which is added to the absolute address of the node packet to obtain the address of the block of node packets containing the children of the nodes contained in the node packet.

Figure 26B:
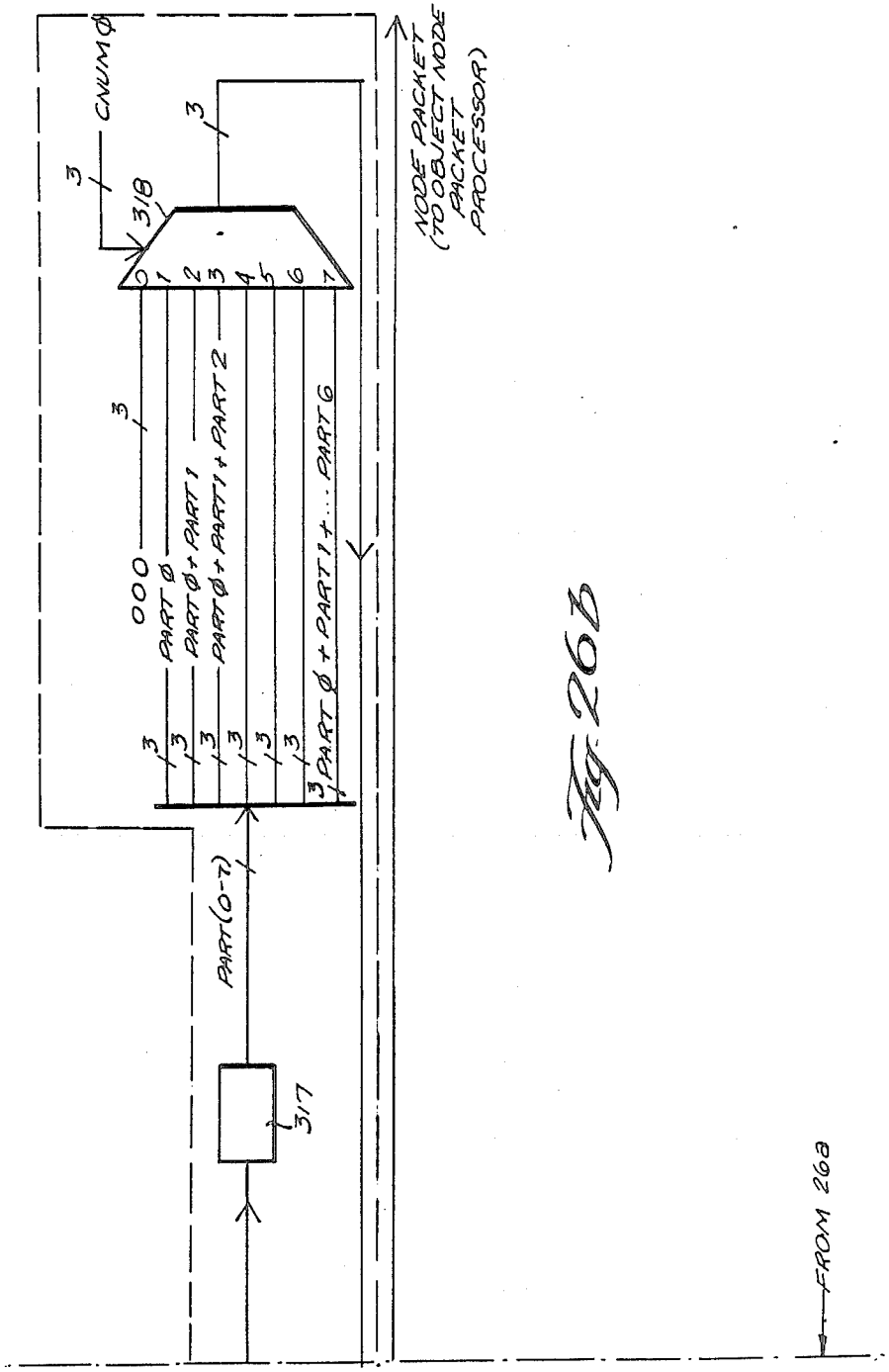

Referring more particularly to FIGS. 26(A)-26(B), node packets are read into the Memory Address Processor block 300 through the DATA line (which is suitably 32 bits wide). The lower half of the node packet (which stores the E, P or F property values of each of the eight nodes) is stored in a Node Packet Register 302, while the upper sixteen bits (representing address offset information) is stored in an Offset Register 304. An Address Register 306 stores the absolute address in the Octree Encoded Object Storage block 140 of the current node packet (this Address Register 306 must be initialized by the Initializing Controller block 160 at the beginning of an image generation to the absolute address of the node packet containing the children of the root node).

The output of the Address Register 306 and the output of the Offset Register 304 are added together by an Adder 308 to generate the address of the block of node packets containing the children of the nodes of the current node packet (as discussed above in describing FIG. 17). This block address value is connected to the input of an Address Multiplexer (MUX) 310, the output of which is connected to a Block Pointer Register 312. The input of the Address MUX 310 connected to Adder 308 is selected during a NPUSH operation initiated by the Sequence Controller block 1600, and permits the nodes of the present node packet to be subdivided into their children.

The output of the Block Pointer Register 312 is connected to the input of the Memory Address Stack 400; the output of the Memory Address Stack is connected to a second input of the Address MUX 310, and is selected by the MUX 310 during an NPOP operation. After a node packet has been subdivided into its children and the children and their descendents have been processed, a NPOP will be performed on the Memory Address Stack 400 to traverse back up the octree structure. At this time, the former contents of the Block Pointer Register 312 (which were pushed onto the Memory Address Stack 400 before the subdivision occurred) are output by the Memory Address Stack, multiplexed through the Address MUX 310, and reloaded into the Block Pointer Register 312. Processing of the POPped block of node packets may continue where it was left off before the subdivision of the octree was initiated.

As will be recalled, the presently preferred embodiment stores some of the node packets in the higher levels of the octree in "Long" Relative Address Format rather than "Short" Relative Address Format (in order to increase the range of memory which can be used to store the octree). Those node packets stored in the "long" format are stored in 64-bits of memory (i.e. two sequential words in the Octree Encoded Object Storage 140) rather than in a single word. In order to properly access these 64 bit node packets, a "double fetch" cycle is employed.

The Sequence Controller block 1500 can determine whether a node packet being retrieved from the Octree Encoded Object Storage is stored in short or long format (the top packet is in long format and a bit in the otherwise unused short offset field indicates when the subtree will only use short address format packets). If the node packet being retrieved is stored in long format, the first word of the node packet is retrieved and stored in Registers 302 and 304 as discussed previously. If the Sequence Controller block 1500 determines (from the packet size of the parent and the value of a flag bit in the short address field if the parent was in long format) that a second fetch is required, it applies a logic one to an Adder 307 on the output of Address Register 306 to increment the address by one, and stores the second 32-bit word which appears on the Data line in a Register 305 (this information represents the 32-bit long offset). The output of Register 305 is added to the sum of the output of Offset Register 304 and the output of Adder 307 to produce the offset in memory from the current node packet to the node packet next to be retrieved.

As noted above, one of the bits in the first word of each "long" node packet is used as a flag bit which indicates that its children are "long" rather than "short"; in this way, "long" node packets can occur at any level of the octree, and some of the node packets at a given level of the octree can be "long" while others are short. Of course, all ancestors of a long packet must be long. Alternatively, one skilled in the art could easily devise modifications to the Memory Address Processor block 300 to permit some node packets to be in Relative Address Format while other node packets contain the Absolute Address of the block of children node packets.

The current node packet stored in the Node Packet Register 302 is one of the outputs of the Memory Address Processor 300, and is connected to the Object Node Packet Processor block 500. In addition, the bits produced at the output of the Node Packet Register 302 are conventionally combined together by Logic Array 313 (suitably a bank of inverters followed by a bank of two-input AND gates not shown) to generate eight outputs, each of which is asserted if a corresponding node in the current node packet has a P property value (it will be recalled that in the preferred embodiment of the present invention P is encoded as 01). These eight values are connected through a MUX 314 to a Node Displacement Register 316.

The output of the Node Displacement Register 316 is connected through a Logic Array 317 (another conventional array of combinational logic) to generate seven values, PART0 (which is asserted when the right-most node as stored in the node packet is marked P), PART0+PART1 (which is equal to the arithmetic sum of the number of P nodes in the two right-most positions of the node packet), PART0+PART1+PART2 (which is equal to the sum of the number of nodes marked P in the three right-most positions of the node packet), . . . , and PART0+PART1+PART2+PART4+PART5+PART6 (the number of nodes marked P in the seven right-most positions of the node packet stored in Node Packet Register 302). These seven lines (each suitably 3 bits wide) together with a zero value are connected to the eight inputs of MUX 318, the select lines of which are connected to the CNUM0 signal (representing the child number of the node currently being processed in the current node packet produced by the Object Node Packet Processor block 150.

The output of MUX 318 is the offset within the node packets pointed to by the Block Pointer Register 312 of the node packet containing the children of the current node being processed. This offset is added to the address stored in the Block Pointer Register 312 by an Adder 320 to generate the absolute address of the child node packet (i.e. the node packet containing the children of the current node packet), and is applied to the input of the Address Register 306. If the Sequence Controller block 1600 commands a NPUSH, this value will be clocked into Address Register 306, and the Memory Address Processor 300 will access the children of the current node, thus traversing one level down the octree.

The output of the Node Displacement Register 316 is also connected to the input of the Memory Address Stack 400, and the output of the Memory Address Stack is connected to an input of the MUX 314. When a NPUSH is performed, the contents of the Node Displacement Register 316 will be stored in the Memory Address Stack 400; likewise, when an NPOP is performed, the Node Displacement information will be returned from the Memory Address Stack through the MUX 314 and back into the Node Displacement Register 316. In this way, Node Displacement information is saved when the octree is traversed down one level, and processing may resume where left off when the octree is traversed back up to the present level.

The Memory Address processor block 300 can be placed in an "unpacked" mode to handle unpacked octrees. In this case, block 313 is forced to indicate that all nodes are P nodes (no matter how many P nodes are actually contained in register 302).

Memory Address Stack

Referring to FIG. 27, shown is a schematic diagram of the Memory Address Stack 400. As discussed previously, the Object Node Packet Stack 410, the Object Node Geometry Stack 420, the Image Window Packet Stack 430, the Image Window Geometry Stack 440, the WBITS Stack 450, the BBOX Results Stack 460 and the Cut Plane Geometry Stack 470 are all implemented in precisely the same manner as the Memory Address Stack 400. Thus, FIG. 27 actually shows a generalized stack 480. Stack 480 comprises a Random Access Memory (RAM) 482 and a DATA Register 484. RAM 482 is suitably a semiconductor static Random Access Memory as wide as needed for the particular stack application, the number of locations of which is determined by the number of levels that stack 480 must store. If stack 480 stores Node information, such as the Memory Address Stack 400, Object Node Packet Stack 410, Object Node Geometry Stack 420 or Cut Plane Geometry Stack 470, then it suitably has sixteen locations for a 1-part-in-65,536 resolution (in each dimension) octree. Additional levels are used for higher resolution objects. If stack 480 stores window information (such as do the Image Window Packet Stack 430, Image Window Geometry Stack 440, WBITS Stack 450 or BBOX Results Stack 460) then the stack suitably has nine locations for a 512 pixel display screen, to store the nine upper levels of the 10 level quadtree. Additional levels can be used for higher resolution images.

The Address Input of RAM 482 is connected to either the node level signal NLEV (for the "node stacks") or the window level signal WLEV (for the "window stacks") generated by the Sequence Controller block 1600. The Sequence Controller block 1600 performs a NPUSH by simply incrementing NLEV (and enabling the write control on RAM 482) and performs a NPOP by decrementing NLEV (and clocking Data Register 484). The Sequence Controller block 1600 analogously performs a WPUSH operation by incrementing WLEV (and enabling the write control on RAM 482) and performs a WPOP by decrementing WLEV (and clocking Register 484).

The DATA OUT output of RAM 482 is connected to the input of Register 484. Register 484 always contains the *last* value stored in RAM 482 (thus implementing a LIFO Stack). The Data In input of RAM 482 is the input of stack 480, upon which is placed the value to be stored by the stack during the next PUSH operation. It will be understood by those skilled in the art that register 484 could be eliminated provided that the resulting complexity in assuring that proper signals were available from the stack at the proper time could be tolerated.

Object Node Packet Processor and Node Select Logic

Figure 28:
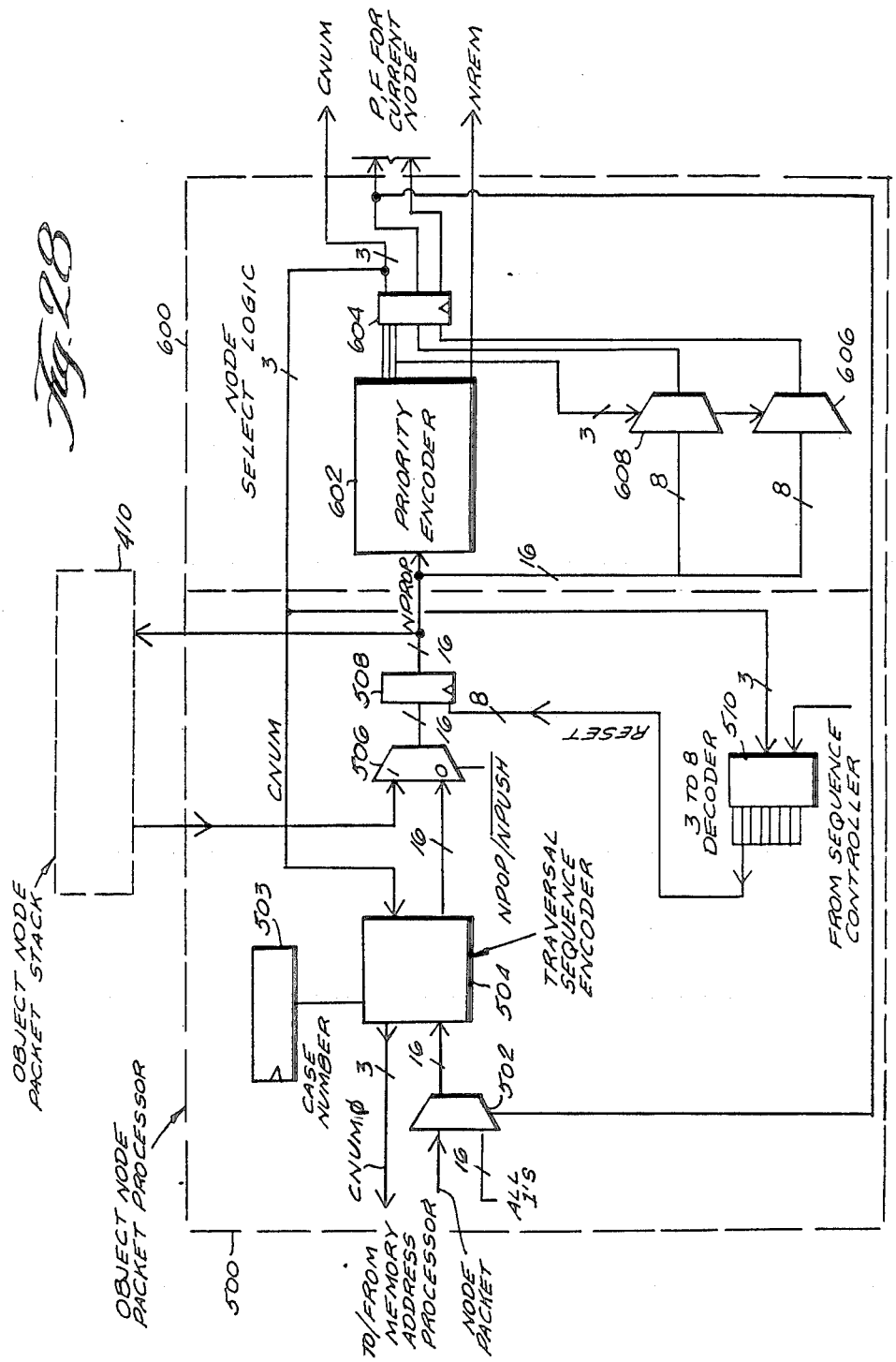
FIG. 28 is a schematic diagram of the Object Node Packet Processor block shown in FIG. 25.

Referring to FIG. 28, shown is a schematic diagram of the Object Node Packet Processor 500 and the Node Select Logic 600 shown in FIG. 25.

The function of the Object Node Packet Processor 500 is to accept a node packet from the Memory Address Processor block 300, to reorder the nodes in that node packet according to the traversal sequence for a given viewing angle, and to keep track of the nodes in the node packet that have already been processed. The Object Node Packet Processor 500 generates a reordered node packet NPROP (which comprises the E, P or F property values for the reordered node packet) and sends it to the Node Select Logic block 600. The Node Select Logic block 600 selects the next non-Empty node in the seven-to-zero traversal sequence in the node packet NPROP. The Node Select Logic block 600 generates the P or F property value for the current node (E nodes are skipped), and also generates a value CNUM, which indicates which child number in the (reordered) node packet is the current node. The Node Select Logic block 600 also generates a signal NREM which is asserted when there is one or more non-Empty nodes left in the NPROP node packet.

The Object Node Packet Processor block 500 accepts as an input the node packet generated by the Memory Address Processor 300. This node packet (suitably 16 bits wide, i.e. 2 bits per node) is applied as an input to a Traversal Sequence Encoder 504. The Traversal Sequence Encoder block 504 rearranges the position of all of the nodes in the node packet according to the traversal sequence for a given viewing angle. Referring to FIGS. 4(A) and 17, it will be recalled that the nodes in any given node packet are arbitrarily numbered and stored in the Octree Encoded Object Storage block 140 according to the seven-to-zero traversal sequence for an arbitrary viewing angle. The viewing angle selected by a user through the Interaction With User block 150 will determine the sequence (one of eight) in which the nodes in a node packet must be accessed according to the viewing angle (so that hidden surfaces are not displayed).

The traversal sequence for a given viewing angle is determined by which of the eight octants of the octree coordinate system shown in FIG. 4(A) the octree universe is viewed from. Since there are eight octants in a three-dimensional coordinate system, there will be eight different traversal sequences, one for each octant. The Interaction With User block 150 of FIG. 15 determines which octant the three-dimensional universe is being viewed from by monitoring the position of the Trackball, and generates a Case Number value (suitably 3 bits wide) which is stored in Case Number Register 503 at the beginning of each image generation.

The following table is a suitable encoding for Case Number as a function of the octant in the three-dimensional universe from which the object to be displayed is viewed, showing also the traversal sequence of nodes as numbered in FIG. 4(A):

TABLE I

| Case Number | Traversal Sequence | Octant | | |
|---|---|---|---|---|
| | | x | y | z |
| 000 | 7 6 5 4 3 2 1 0 | + | + | + |
| 001 | 6 2 4 0 7 3 5 1 | + | + | − |
| 010 | 5 1 7 3 4 0 6 2 | + | − | + |
| 011 | 4 5 6 7 0 1 2 3 | + | − | − |
| 100 | 3 7 1 5 2 6 0 4 | − | + | + |
| 101 | 2 3 0 1 6 7 4 5 | − | + | − |
| 110 | 1 0 3 2 5 4 7 6 | − | − | + |
| 111 | 0 4 2 6 1 5 3 7 | − | − | − |

Referring once again to FIG. 28, the Traversal Sequence Encoder block 504 is suitably a combinational logic array with dual functions: (1) to reorder the node packet sent by the Memory Address Processor block 300 so that the nodes appear in the traversal sequence as a function of the Case Number value; and (2) to translate the CNUM (child number) value generated by the Node Select Logic block 600 from a format which indicates the child number of the current node according to the traversal sequence of the given viewing angle as specified by the Case Number to the corresponding node number as it is stored in the Octree Encoded Object Storage block 140 (i.e. before it is reordered).

Thus, the Traversal Sequence Encoder block 504 accepts three inputs, the node packet generated by the Memory Address Processor block 300 (suitably 16 bits wide), the CNUM value generated by the Node Select Logic block 600 (suitably 3 bits wide), and the case number from the Case Number Register 503. The Traversal Sequence Encoder block 504 generates two outputs: CNUM0, the translated CNUM value (suitably 3 bits wide), and the reordered node packet NPROP (suitably 16 bits wide). One skilled in the art could readily design a conventional logic array to perform this one-to-one mapping of CNUM into CNUM0 and the node packet into NPROP using conventional logic elements.

A multiplexer 502 is connected to the node packet input of the Traversal Sequence Encoder 504, and selects between the node packet produced by the Memory Address Processor block 300 and a set of hard-wired logic 1 inputs. The select line of MUX 502 is connected to the property value of the current node produced by the Node Select Logic block 600. If the current node is F, MUX 502 selects the hard-wired logic 1 inputs to generate or "simulate" the node packet containing the children of the F node (it will be recalled that the octree structure is "trimmed" to remove all of the children of both E and F nodes; however, an F node must be subdivided if it is intersected by a cut plane). Otherwise, the child node packet accessed by the Memory Address Processor block 300 is selected by the MUX 502 to be input to the Traversal Sequence Encoder 504.

The translated CNUM0 value is output from the Object Node Packet Processor block 500 to the Memory Address Processor block 300, and is used to determine the address offset within a block of node packets. The reordered node packet NPROP produced by the Traversal Sequence Encoder 504 is connected to the input of a MUX 506, the output of which is applied to a NPROP Register 508. The output of the NPROP Register 508 is applied to the input of the Object Node Packet Stack 410, the output of which is connected to the other input of the MUX 506. On an NPUSH, the value currently stored in the NPROP Register 508 is pushed onto the Object Node Packet Stack 410. (At this point, a new, subdivided node packet will be sent to the Object Node Packet Processor block 500 by the Memory Address Processor block 300, will be reordered by the Traversal Sequence Encoder block 504, selected by the MUX 506 and stored in the NPROP Register 508 as a new node packet.) On an NPOP, MUX 506 selects the output of the Object Node Packet Stack 410, and thus the last NPROP value stored on the stack 410 is clocked into the NPROP Register 508 so that processing of that node packet packet may resume where it was left off before it was pushed onto Stack 410.

The output of the NPROP Register 508 is also output from the Object Node Packet Processor block 500 to the Node Select Logic block 600. The Object Node Packet Processor block 500 receives from the Node Select Logic block 600 an input CNUM, which is the child number of the node of node packet NPROP currently being processed. As mentioned before, CNUM is applied as an input to the Traversal Sequence Encoder 504 so that it may be translated into CNUM0. In addition, CNUM is applied as an input to a three-to-eight Decoder 510 which is also gated by the Sequence Controller block 1600. The 3-to-8 Decoder 510 has eight Reset lines as outputs, each of which is applied to one of the eight sets of 2-bits of the NPROP Register 508 which stores the property value of a child node. Whenever CNUM is updated (indicating that the processing of the current node is completed and that the next non-Empty node must be processed), one of these eight Reset lines is asserted to clear (to Empty) that particular node in NPROP Register 508. In this way, the Object Node Packet Processor block 500 keeps track of which nodes in the current node packet have already been processed.

The Node Select Logic block 600 accepts as an input the current node packet NPROP from the Object Node Packet Processor block 500. It generates three outputs: CNUM (suitably a 3-bit value indicating the child number of the node in node packet NPROP currently being processed); the P or F property value for child number CNUM; and NREM, which is asserted if there are any "active" (i.e. non-Empty) unprocessed nodes remaining in NPROP.

The node packet NPROP is connected to the input of a Priority Encoder 602 (suitably comprising 74F148 Priority Encoders). The output of the Priority Encoder 602 is a 3-bit value indicating the next non-Empty node (in the seven-to-zero traversal sequence) in NPROP. This 3-bit output is connected to the input of a CNUM Register 604, and is clocked into that Register whenever the Sequence Controller block 1600 determines that the processing of the current node is complete. The output of the CNUM Register 604 is CNUM, the number of the current node NPROP being processed.

NPROP is divided into two sets of 8-bits each. One set of 8 bits comprises the lower property value bits of the eight nodes in NPROP, while the other set of 8 bits comprises the upper property value bits of the eight nodes in NPROP. These are each sent to an 8-to-1 MUX (MUX 606 and MUX 608, respectively). MUXes 606 and 608 are selected by the same 3-bit select line, the 3-bit (unregistered) output from Priority Encoder 602. Thus, MUX 606 and MUX 608 together select the P or F information for the next non-Empty node in NPROP. The output of MUXes 606 and 608 are both connected to the CNUM Register 604, and are clocked into the register together with the new value of CNUM. The CNUM Register 604 at any given time contains the P or F property value for the CNUM child number of node packet NPROP as well as CNUM.

The Node Select Logic block 600 generates one more output, NREM, suitably a 1-bit value which is asserted whenever there is a non-Empty unprocessed node remaining in NPROP. The P or F property value for current node CNUM and the value NREM are both sent to the Sequence Controller block 1600 so that the Sequence Controller can determine the property value of the current node being processed, as well as when the current node packet NPROP has been completely processed. As nodes in the current node packet are processed, their property values are cleared from the NPROP Register 508 of the Object Node Packet Processor block 500, so that the Object Node Packet Processor block together with the Node Select Logic block 600 keep track of which nodes in the current node packet have been processed. The NREM signal is asserted by Priority Encoder block 602 when any of the 16 bits NPROP are asserted (a signal conventionally provided by off-the-shelf gates).

Object Node Geometry Processor

Referring to FIG. 25, the function of the Object Node Geometry Processor block 700 is to supply information concerning the geometry of the current node to the Window Overlay Select Logic block 1100 (to permit selection of a window overlay) and the Cycle Results block 1500 (to permit it to perform the BBOX, PI and E tests). The Object Node Geometry Processor 700 accepts as an input the value CNUM from the Node Select Logic block 600 (representing the number of the node currently being processed in the current node packet). It generates five families of outputs, the geometries of the current node being processed in each of the X', Y', D0, D1 and D2 dimensions (see FIGS. 20(A)-20(C) and 21(A)-21(F)).

Figure 29:
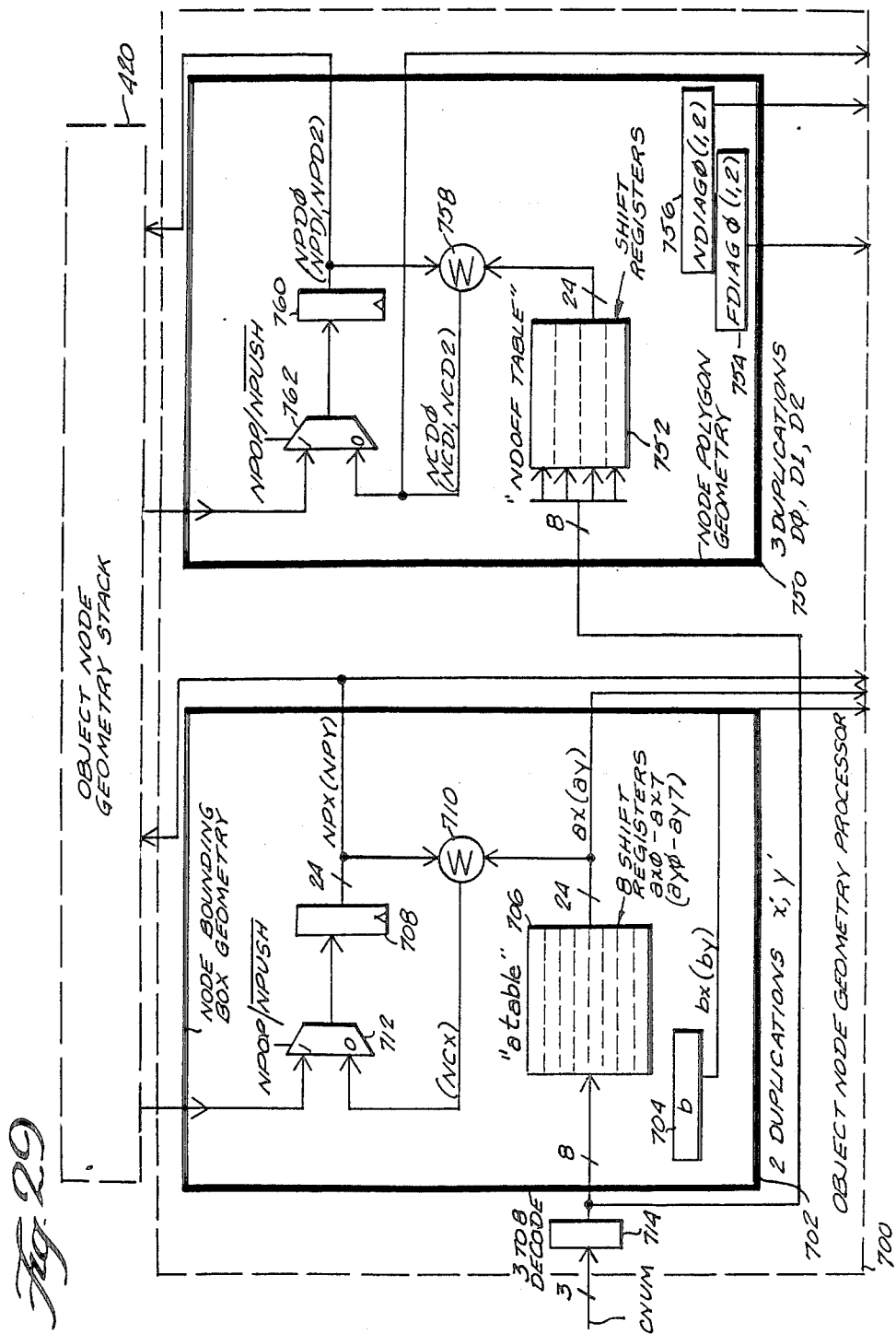
FIG. 29 is a schematic diagram of the Object Node Geometry Processor block shown in FIG. 25.

Referring to FIG. 29, the Object Node Geometry Processor 700 is divided into two basic sections, the Node Bounding Box Geometry block 702 and the Node Polygon Geometry block 750. While only two blocks are shown, actually the Node Bounding Box Geometry block 702 is duplicated twice (once for x' and once for y'), while the Node Polygon Geometry block 750 is duplicated three times (once for each of the D0, D1 and D2 dimensions).

The Object Node Geometry Processor block 700 contains several shift registers which are initialized by the Initialization Controller block 160, and are shifted one place right for a node PUSH and one place to the left for a node POP. They are thus shifted an appropriate number of bits to the left or to the right according to the node level NLEV (a value generated by the Sequence Controller block 1600 indicating the level of the octree at which the node currently being processed is located). The b Register 704 is initialized by the Initializing Controller block 160 to the value bx (or by for the duplication of the Node Bounding Box Geometry block 702 in the y' dimension) calculated as shown in FIG. 20(B). The a Table 706 is a bank of eight shift registers containing the ax0–ax7 offsets (or ay0–ay7 offsets for the duplication of the Node Bounding Box Geometry block 702 in the y' direction) shown calculated in FIG. 20(C). Likewise, the NDOFF Table 752 comprises four shift registers, each of which are initialized to an appropriate one of the three ND0OFF values or zero (the ND1OFF values for the D1 duplication of the Node Polygon Geometry block 750 and the ND2OFF values for the D2 duplication of the Node Polygon Geometry block 750) shown calculated in FIGS. 21(D)-21(F). Likewise, the FDIAG Register 754 is initialized to the FDIAG0 value (the FDIAG1 value for the D1 duplication of the Node Polygon Geometry block 750, and the FDIAG2 value for the D2 duplication of the Node Polygon Geometry block) shown calculated in FIGS. 21(D)-21(F). Similarly, an NDIAG Register 756 is initialized to the NDIAG0 value (the NDIAG1 and the NDIAG2 values for the D1 and D2 duplications of the Node Polygon Geometry block 750, respectively) shown calculated in FIGS. 21(D)-21(F). Each of the geometric values is suitably 24 bits wide to provide a desired degree of precision.

The shift registers used to implement the b Register 704, FDIAG Register 754, NDIAG Register 756, a Table 706 and NDOFF Table 752 are suitably substantially wider than 24 bits, but generate only 24 bit outputs. The remainder of the width of these shift register provide "underflow capability," meaning that the values shifted "out" of the 24 bits generating an output are not lost, but are stored elsewhere so that they may be shifted back into the shift registers. This "underflow capability" may suitably be implemented either by long shift registers, or by an auxiliary storage element, such as a RAM.

All of these shift registers are shifted the same number of bits dependent upon the signal NLEV. It will be recalled that because the dimensions of any given node are exactly one-half those of its parent, all of the values calculated as shown in FIGS. 20(B)-20(C) and 21(A)-21(F) can be used at any node level by merely dividing them by an appropriate factor of 2. As will be understood by those skilled in the art, division of a binary number by an appropriate factor of 2 may be accomplished by merely shifting the number an appropriate number of bits to the right. Thus, the b Register 704, FDIAG Register 754, NDIAG Register 756, and the registers in each of the a Table 706 and NDOFF Table 752 are shifted one place to the right each time the octree structure is traversed downward to subdivided nodes (NPUSH) in order to calculate the appropriate node geometry values for the current node level, and are shifted back to the left one place each time the octree structure is traversed one level back up toward the root node (NPOP).

The Node Bounding Box Geometry block 702 also comprises a Bounding Box Origin Register 708, which is initialized by the Initializing Controller block 160 to contain the NPX (NPY for the Y' duplication of the Node Bounding Box Geometry block 702) value calculated as shown in FIG. 20(B) (it will be recalled that (NPX, NPY) is the origin of the bounding box for the octree universe). The output of Register 708 is connected to the input of an Adder 710, the other input of which is connected to the output of the a Table 706.

As mentioned previously, the a Table 706 stores the values ax0–ax7 (ay0–ay7 for the y' duplication of the Node Bounding Box Geometry block 702). Each of these values corresponds to the bounding box offset for one of the eight nodes in the current node packet. A 3-to-8 Decoder 714 accepts CNUM as an input from the Node Select Logic block 600, and generates one of eight mutually exclusive outputs, each of which is used to select one of the eight shift registers in the a Table 706. Thus, the appropriate ax (ay) value for the node currently being accessed in the current node packet will be applied to Adder 710.

The output of Adder 710 thus represents the origin of the bounding box for the child of the current node, NCX (NCY). This output NCX is connected to the input of a MUX 712, the output of which is connected to the input of the Bounding Box Origin Register 708. The other input of the MUX 712 is connected to the output of the Object Node Geometry Stack 420. The input of the Object Node Geometry Stack 420 is connected to the output of the Register 708. During a NPUSH, the MUX 712 selects the NCX input, and NCX is clocked into the Register 708; at the same time, the current value of NPX is pushed onto the Object Node Geometry Stack 420. During a NPOP, the MUX 712 selects the output of the Object Node Geometry Stack 420 (the NPX (NPY) value of the parent node), which is clocked back into Register 708. In this way, the Object Node Geometry Processor 700 generates the appropriate values for the bounding box origin (NPX, NPY) when the octree is traversed up or down a level.

The output of the 3-to-8 Decoder 714 is also applied to select the appropriate one of the four NDOFF values from the NDOFF Table 752. The output of the NDOFF Table 752 is connected to one input of an Adder 758, the other input of which is connected to the output of a NPD Register 760. The NPD Register is initialized by the Initializing Controller block 160 to contain the value NPD0 (NPD1 and NPD2 for the D1 and D2 duplications of the Node Polygon Geometry block 750, respectively) calculated as shown in FIG. 20(A). The output of Adder 758 is thus the offset from the origin 104 of the Display Screen 212 (as shown in FIG. 20(A)) to the D0 (D1 or D2) edges of the projection of child node CNUM of the parent node stored in the NPD Register 760. This value is output to the Cycle Results block 1500, and is also applied to an input of a MUX 762, the output of which is connected to the input of the NPD Register 760. The output of the NPD Register 760 is also connected to the input of the Object Node Geometry Stack 420, the output of which is connected to the other input of MUX 762. During an NPUSH, the contents of the NPD Register 760 is pushed onto the Object Node Geometry Stack 420, and the output of the Adder 758 is selected by the MUX 762 and clocked into the NPD Register; in this way, the NPD0 (NPD1 and NPD2) displacement for a child node projection are derived from those of its parents. Likewise, during a NPOP, the output of the Object Node Geometry Stack 420 is selected by the MUX 762, and is clocked into the NPD Register 760 to return the NPD0 (NPD1 and NPD2) displacement to the NPD Register when the octree is traversed back up a level upon completion of the processing of a subdivision.

Image Window Memory

Figure 30B:
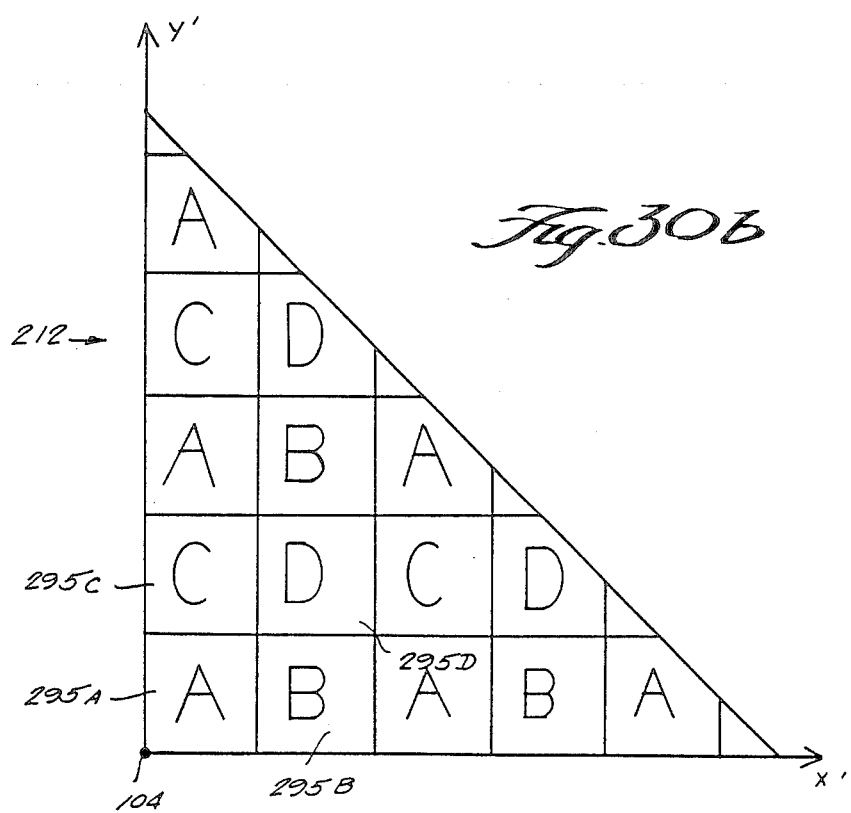
FIG. 30(B) is a graphic illustration of a part of the Display Screen subdivided into windows at some arbitrary level of the quadtree showing how the windows are stored by the interleaved arrays (A, B, C and D) shown in FIG. 30(A)
Figure 30A:
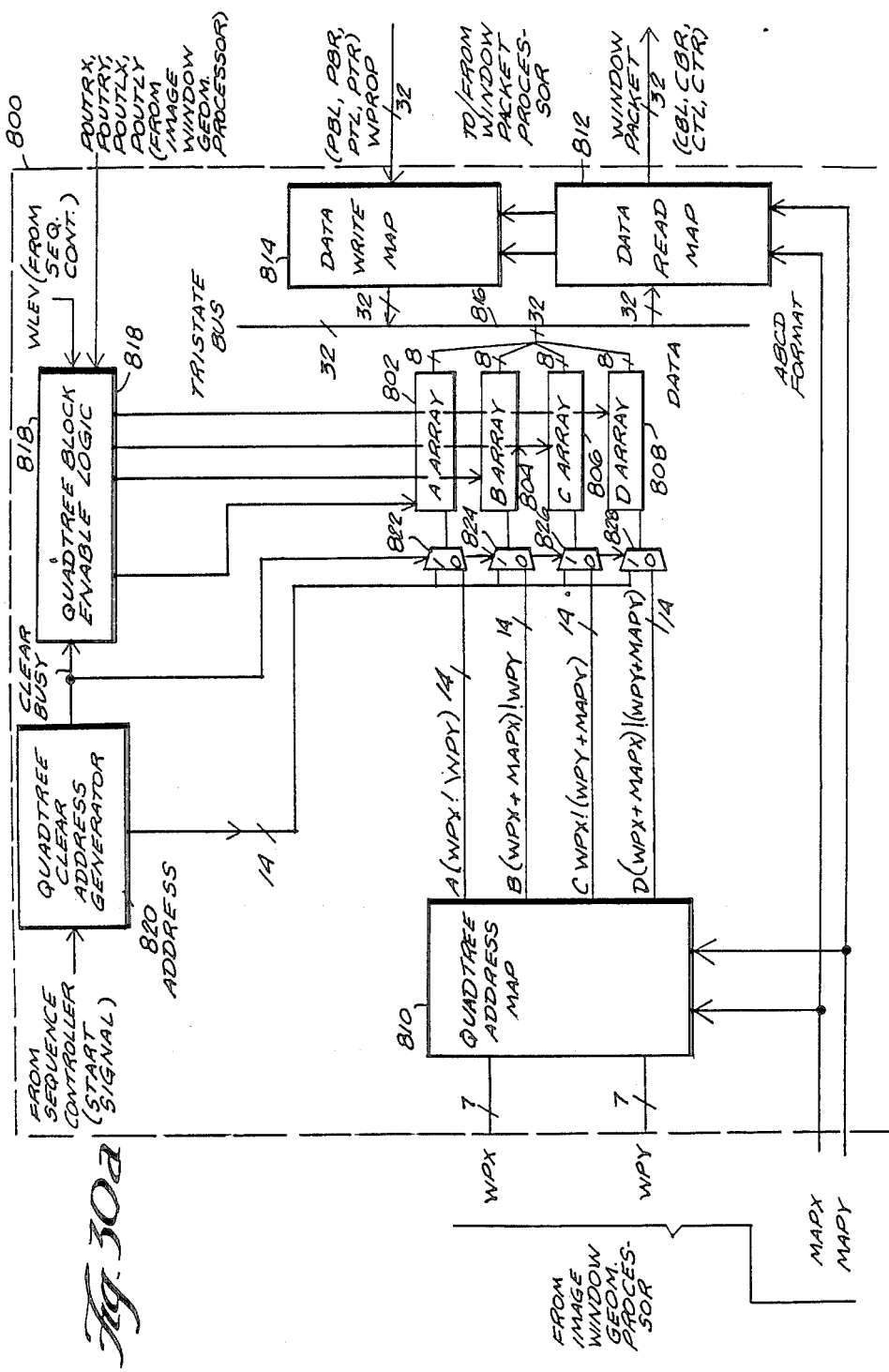
FIG. 30(A) is a schematic diagram of the Image Window Memory block shown in FIG. 25.
Figure 30C:
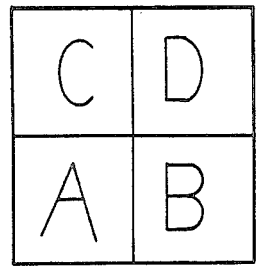
FIGS. 30(C)-30(F) show the four possible configurations of a given window overlay with respect to the interleaved Arrays (A, B, C, D) shown in FIG. 30(A)
Figure 30D:
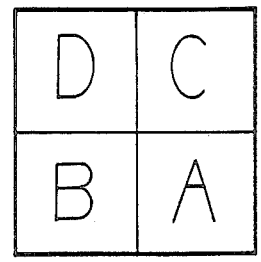
Figure 30E:
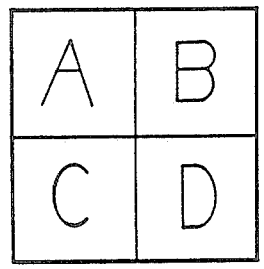
Figure 30F:
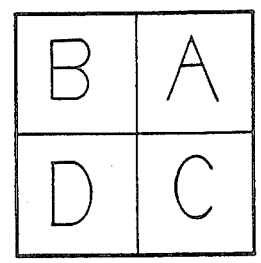

Referring to FIG. 30(A), shown is a detailed block diagram of the Image Window Memory block 800 of FIG. 25. The function of the Image Window Memory 800 is to represent the windows of the view plane in a quadtree structure, to retrieve a selected window packet on demand, and to update the quadtree by changing painted windows to F and changing the ancestors of painted windows to P (or F, as appropriate).

Unlike the Octree Encoded Object Storage block 140, which produces an entire node packet of eight children nodes whenever it is accessed, the Image Window Memory block 800 must produce a window packet comprising the four children of each of the four parent windows in the parent window overlay (resulting in a total of 16 windows). The Window Overlay Select Logic block 1100 then selects a new window overlay of four contiguous windows from among those 16 windows. This added complexity exists because a window overlay is defined as four contiguous windows guaranteed to enclose a given node projection; these four contiguous windows are *not* guaranteed to be the children of the same parent window. Also, all 16 windows may be needed simultaneously during a WPOP operation because they all may need to be examined in order to generate the four reduced parent values.

In order to permit the simultaneous access of the four children of any four contiguous windows in the current 4×4 window array, the presently preferred embodiment of the present invention utilizes an interleaved memory comprising four different memories which are physically separate (and separately addressed), each of which stores one-fourth of the quadtree structure. Referring to FIG. 30(B), all of the windows at any (every) level of the quadtree comprising the Display Screen 212 are organized into A, B, C and D windows, as shown. An "A" window is arbitrarily located so that its lower left-hand vertex corresponds to origin 104, and B, C and D windows are arranged to surround it as shown.

Referring to FIGS. 30(A) and 30(B), the children of A windows are stored in the A array 802, the children of B windows are stored in the B array 804, the children of C windows are stored in C array 806, and the children of D windows are stored in D array 808. A family of four children windows are stored in the same word in their respective arrays. If the same address is applied to all of the Arrays 802, 804, 806 and 808, the sixteen grandchildren of some parent window will be produced (for example, windows 295A-295D).

As mentioned above, it cannot be predetermined which four windows of a 4×4 window array will be selected as a window overlay. Referring to FIGS. 30(B)-30(F), it will be understood that *any* window overlay will comprise an "A" window, a "B" window, a "C" window and a "D" window, and that only four different arrangements of these windows are possible. These four possible arrangements are suitably encoded in two bits, MAPX and MAPY, as shown.

Referring once again to FIG. 30(A), the Quadtree Address Map 810 accepts as inputs the values WPX and WPY (describing the origin of a window overlay to be subdivided). In addition, the Quadtree Address Map 810 accepts the MAPX bit and the MAPY bit, which determines how the various windows in the window overlay are to be mapped into Arrays 802, 804, 806 and 808 (i.e. which window is to be produced by which array). The Address (WPX, WPY) actually specifies a window overlay in the interleaved memory arranged in the format shown in FIG. 30(C). The MAPX and MAPY may be viewed as least significant bits to permit variations in this format.

The Quadtree Address Map 810 performs a 1-to-1 mapping of the 16 bits (WPX and WPY are suitably 7 bits each, while MAPX and MAPY are suitably 1 bit each) applied to its input into addresses for the A, B, C and D Arrays (802, 804, 806, 808, respectively). The addresses for each array are calculated as follows:

A Array Address=WPX!WPY
B Array Address=(WPX+MAPX)!WPY

C Array Address=WPX!(WPY+MAPY)
D Array Address=(WPX+MAPX)!(WPY+MAPY)
(where ! is the operation of catenation and + is arithmetic addition).

It will be understood by those skilled in the art that the A, B, C and D addresses will all be the same when the MAPX and MAPY bits are both 0 (thus constituting the specific case where the window overlay being subdivided comprises four children windows of the same parent window). In the case where MAPX and MAPY are not both 0, the address actually applied to Arrays 802-808 will not be equal. For this reason, while the Quadtree Address Map 810 performs a unique 1-to-1 mapping (meaning that any given location in any one of the Arrays 802, 804, 806 and 808 can be arrived at only through one unique combination of WPX, WPY, MAPX and MAPY), information is not stored sequentially in each of the arrays but rather in a seemingly random fashion (although the address of any given piece of information may be readily calculated).

For any given set of values of WPX, WPY, MAPX and MAPY, a window packet comprising 32 bits of data (the 2-bit property values of each of the four children windows of each of the four parents comprising the 2×2 window overlay being subdivided) will be generated by the A, B, C and D Arrays (802, 804, 806 and 808). This data must be reordered to remain consistent with the arbitrary traversal sequence of a window overlay shown in FIG. 6(F). The reordering is accomplished by the Data Read Map 812, which reorders the information according to the values of MAPX and MAPY.

The Image Window Memory 800 must be written into as well as read from, since the quadtree structure must be continually updated every time a window is painted by the Image Display block 154 to assure that hidden surfaces are not displayed in the image (compare the Octree Encoded Object Storage block 140, which is only read from and never written to; this is because a given window may be accessed numerous times but only pained once, while a given node will only be accessed once). A Data Write Map 814 performs a task similar to that of the Data Read Map 812 by reordering WPROP (a window packet already updated by the Image Window Packet Processor 900 to be discussed shortly) from the traversal sequence shown in FIG. 6(F) to a format suitable for storage into the A, B, C and D Arrays 802, 804, 806 and 808. A bi-directional Tri-State Bus 816 is used to connect the data input/output of the A, B, C and D Arrays (802, 804, 806 and 808, respectively) to either the output of the Data Write Map 814 or the input of the Data Read Map 812.

A Quadtree Block Enable Logic block 818 is used to selectively enable any combination of the four Arrays 802, 804, 806 and 808. In general, the Quadtree Block Enable Logic 818 will enable all of the arrays. However, as will be explained shortly, it is possible that a given window overlay will not be entirely on the Display Screen 212. As mentioned previously, only the Display Screen section of the view plane is organized into the quadtree structure; thus, only windows on the Display Screen will be stored in the Image Window Memory 800. An F node located at the very edge of the Display Screen 212 may define a window overlay of four windows only some of which are part of the Display Screen. The Quadtree Block Enable Logic block 818 enables only those Arrays 802, 804, 806 and 808 corresponding to windows actually on the Display Screen (determining which windows are on the Display Screen from four values, POUTRX, POUTRY, POUTLX and POUTLY, produced by the Image Window Geometry Processor block 1000).

Finally, every window at every level of the quadtree structure must be initialized to E (00) before an image is generated (since the Display Screen is blank before each image is generated). The function of clearing the quadtree before each image is generated is performed by the Quadtree Clear Address Generator 820 together with address MUXes 822, 824, 826 and 828. The Quadtree Clear Address Generator receives a "start" signal from the Sequence Controller 1600 before an image is to be generated. In response to that start signal, the Quadtree Clear Address Generator 820 asserts a Clear Busy signal, which is connected to the Quadtree Block Enable Logic block 818 and to the select inputs of the four MUXes 822, 824, 826 and 828. MUXes 822-828 are placed in the address lines between the Quadtree Address Map 810 and the A, B, C and D Arrays 802, 804, 806 and 808, respectively. MUXes 822, 824, 826 and 828 select between the outputs of the Quadtree Address Map 810 and a single parallel address generated by the Quadtree Clear Address Generator 820 depending upon whether or not the Clear Busy line is asserted (selecting the address generated by the Quadtree Clear Address Generator 820 when the Clear Busy line is asserted). The address generated by the Quadtree Clear Address Generator 820 begins at location 0 and is stepped through every location in Arrays 802, 804, 806 and 808. Meanwhile, Arrays 802, 804, 806 and 808 are all enabled by the Quadtree Block Enable Logic block 818, and all bits of the Tri-State Bus 816 are forced to logic level 0 so that 0 data appears at the data inputs of all of the Arrays. In this way, 0 values are stored in every location of each of the four Arrays 802, 804, 806 and 808, thus initializing the quadtree structure to all Empty windows.

Referring to FIG. 31(A), shown is a schematic diagram of the Quadtree Address Map 810. As mentioned above, the Quadtree Address Map 810 combines the (suitably 7-bit) values WPX and WPY with the (suitably 1-bit) values MAPX and MAPY to produce four addresses, one for each of the Arrays 802, 804, 806 and 808. WPX and MAPX are added together by an Adder 822 to produce the value (WPX+MAPX), while WPY and MAPY are added by an Adder 824 to produce the value (WPY+MAPY). The various catenations shown in the equations are accomplished by simply parallelling the appropriate lines. The four address outputs are connected to the MUXes 822, 824, 826 and 828, respectively, and are used to address Arrays 802, 804, 806 and 808, respectively.

Referring to FIG. 31(B), shown is a schematic diagram of one of the four Arrays 802, 804, 806 and 808

(the schematic diagram of each of the four Arrays is exactly the same). Each Array 802–808 is comprised of nine sections. Eight of these sections are RAMs (or portions of RAMs), each of which stores windows at a different level of the quadtree structure. Thus, RAM 826 stores windows at level 2 of the quadtree, RAM 828 stores windows at level 7 of the quadtree, RAM 830 stores windows at level 8 of the quadtree and RAM 832 stores windows at level 9 of the quadtree. As will be understood, the size of the RAM must increase as the quadtree level increases, since each change in level represents a four-fold increase in the number of windows. Thus, the RAM 826 (level 2) has 1 location, the RAM 828 (level 7) has 32×32 locations, and the RAM 832 (level 9) has 128×128 locations. Each location in each RAM is an 8-bit word storing the property values of four children of one of the four windows in the window overlay being subdivided (thus, A Array 802, for example, produces the property values of the A, B, C and D children of an A window).

In the present design, for a 512 by 512 pixel screen, at level 9, the four arrays (802–808) each contain a 128 by 128 location RAM (832), each location representing four pixels. Thus, all 512 by 512 pixels are represented. The method is easily scaled up or down for other display screen sizes. In practice, the memory for multiple levels may be combined into the same physical memory chips by placing them in separate regions of addressing space. Also, at level 9, only one bit per pixel (four bits per location) is needed because only E and F nodes need be represented (there can be no P nodes at the lowest level of the quadtree, level 9). This results in a memory savings.

Each of these eight RAMs 826–832 have an Enable line connected to them so that only one RAM will be enabled at any given time (except during a clearing operation, when they are all enabled at once). The eight RAMs are addressed by a common address line generated by the Quadtree Address Map 810, and all of their data lines are connected to a common Tri-State, bi-directional Data Bus 816A (part of the same Tri-State Bus shown in FIG. 30(A)). The level 9 RAM 832 requires 14 bits of address information, the level 8 RAM 830 requires only 12 bits, etc.; the most significant bits in each of the WPX and WPY expressions produced by the Quadtree Address Map block 810 (shown in FIG. 31(A)) are suitably discarded for RAMs storing lower levels of the quadtree.

A combinational logic block 833 comprising a MUX 834, a Tri-State Bus Driver 836 and an OR gate 838 performs several functions to handle various "special cases." Block 833 places all zeros on Bus 816A during a quadtree clear operation; it places all "1"s onto the Bus when a window outside of the Display Screen 212 is accessed; and finally, it emulates a level 1 RAM, as will be explained shortly.

The first function of combinational logic block 833 is to place all zeros onto Bus 816A during a quadtree clear operation. When the Quadtree Clear Busy line (produced by the Quadtree Clear Address Generator block 820 shown in FIG. 30(A)) is asserted, MUX 834 selects an input of all zeros and applies it to Bus Driver 836. Meanwhile, the output of OR gate 838 is asserted, enabling the output of Bus Driver 836 onto Bus 816A. In this way, all zeros appear at the inputs of all of RAMs 826–832.

This combinational logic also handles the case where the window being accessed is not on the Display Screen. The Quadtree Block Enable Logic block 818 (of FIG. 30(A)) generates a signal OUT (one for each of Arrays 802, 804, 806 and 808) indicating that the address applied to that particular array is not for a window on the Display Screen, and thus is not a meaningful address in the Array. (While each of the Arrays 802, 808 could be constructed large enough to contain all possible windows that could be addressed, the presently preferred embodiment of the present invention reduces the size of the memory needed to a minimum by simulating memory for those windows not on the screen.) If the OUT signal is asserted, the Tri-State Bus Driver 836 is enabled, and the OUT signal itself is selected by the MUX 834 so as to place all F information onto Data Bus 816 (it will be recalled that an F window will never be painted; all windows not on the Display Screen will be discarded). The OUT signal will be used (as described below) to place all E information onto Data Bus 816.

Level 1 of the quadtree structure may be regarded as a specific case of handling windows which are not on the Display Screen. It will be recalled that windows at level 1 of the quadtree are the children of windows the size of the display screen (level 0 windows). Referring to FIGS. 20(A), 43(A) and 30(B), the selection of a window overlay comprising windows of the size of the Display Screen is constrained so that the window corresponding to the Display Screen will be both the lower left-hand window in the overlay and an "A" window (thus, the overlay will have the arrangement shown in FIG. 30(C) wherein the A window is the Display Screen). Hence, the children of B, C and D windows, by definition, will not be on the Display Screen, and must be forced to F, as discussed above. While the A window could conceivably also be F (meaning that it is entirely enclosed by a face of a single node projection), the presently preferred embodiment subdivides the Display Screen anyway in this case. This is assured by producing all zeros on the Bus 816A for the A Array 802 (so that its four children are all Empty).

Referring once again to FIG. 31(B), when the Enable Block 1A line is asserted, OR gate 838 produces an output which enables Bus Driver 836 onto Bus 816A. Meanwhile, the OUT line is selected by MUX 834 and is applied to the data input of Bus Driver 836, so that the OUT value is placed onto Bus 816A. The Quadtree Block Enable Logic block 818 (shown in FIG. 30(A)) assures that when Level 1 of the quadtree is being accessed, OUTA has the value of zero while OUTB, OUTC and OUTD all have the values of all ones. In this way, the Display Screen (window A in the window overlay of windows the size of the Display Screen) will always be subdivided, while the remaining windows will be discarded.

Referring to FIG. 32, shown is a schematic diagram of the Quadtree Block Enable Logic block 818 shown in FIG. 30(A). The function of the Quadtree Block Enable Logic block 818 is to enable the appropriate level RAM of each of Arrays 802, 804, 806 and 808, and to produce the OUTA-OUTD signals indicating windows that are not part of the Display Screen. A signal WLEV (generated by the Sequence Controller block 1600) is applied to a 4-to-16 Decoder 836 which generates a plurality of mutually exclusive level lines, one for each of the levels of the quadtree (note that WLEV may suitably take on only 10 of 16 possible values, so that only 10 of the 16 output lines of Decoder 836 will ever be asserted). Each one of these 10 level lines output by Decoder 836 is connected to a duplication of Decoder Block 837. Each of Decoder Blocks 837 comprises four 2-input AND gates 838, 840, 842 and 844, the output of each of which is connected to one of the inputs of an OR gate 846, 848, 850 and 852.

The Image Window Geometry Processor 1000 (shown in FIG. 25) generates four signals, POUTRX, POUTRY, POUTLX and POUTLY, which indicates the windows in the current window overlay which are not on the Display Screen. These signals must be translated to specify which of the A, B, C and D windows are not on the Display Screen. Each of these signals is applied to one of the inputs of two of a bank of four 2-input OR gates 854, 856, 858 and 860 to generate the following signals:

POUTA = POUTRX OR POUTRY
POUTB = POUTRY OR POUTLX
POUTC = POUTRX OR POUTLY
POUTD = POUTLX OR POUTLY

Each one of these lines POUTA, POUTB, POUTC and POUTD is inverted to form INA, INB, INC and IND, respectively, each of which is applied to one of AND gates 838, 840, 842 and 844 in each of Decoder blocks 837. The second input of each of OR gates 846, 848, 850 and 852 are connected in common to the Clear Busy line generated by the Quadtree Clear Address Generator 820. Likewise, each of the second inputs of AND gates 838-844 in each of Decoder blocks 837 are connected in common to one of the outputs of Decoder 836.

Each block enable output (the output of each OR gate 846, 848, 850 and 852) of a given Decoder block 837 is asserted either when the Clear Busy line is asserted (all of the level RAMs for all four of Arrays 802, 804, 806 and 808 are enabled during the period which the Quadtree Clear Address Generator 820 clears the Image Window Memory 800) or when the window addressed is inside the Display Screen (as indicated by INA, INB, INC or IND) and that level RAM is selected by Decoder 836. If one or more of the windows are not on the Display Screen, the block enable output generated by the corresponding one of OR gates 846, 848, 850 or 852 is not asserted, but rather the corresponding one of POUTA, POUTB, POUTC or POUTD is asserted. POUTA-POUTD are each connected to one of gates 892, 894, 896 and 898 to produce the following signals:

OUTA = POUTA AND $\overline{LEVEL1}$
OUTB = POUTB OR LEVEL1
OUTC = POUTC OR LEVEL1
OUTD = POUTD OR LEVEL1

These signals are applied to combinational logic block 833 shown in FIG. 31(B) and discussed previously.

Referring to FIG. 33, shown is a schematic diagram of the Quadtree Clear Address Generator block 820 shown in FIG. 30(A). The Quadtree Clear Address Generator 820 accepts as an input a single bit from the Sequence Controller block 1600 shown in FIG. 25 called the Start signal, which commands that the entire Quadtree Structure stored in the Image Window Memory 800 be initialized to all E windows. The Start signal sets a Set-Reset Flip-Flop 862, the output of which is gated through an AND gate 864 with the output of a free running crystal oscillator 865. The output of AND gate 864 is connected to the clock input of a 14-bit binary counter 866, the output of which is applied to one of the inputs of each of the MUXes 822, 824, 826 and 828 shown in FIG. 30(A).

Referring to FIGS. 30(A) and 33, the output of the SR Flip-Flop 862 is also output to the Quadtree Block Enable Logic 818 and to the select inputs of MUXes 822-828 as the Clear Busy signal. Hence, the MUXes are controlled to select the output of Counter 866 rather than the output of the Quadtree Address Map 810, and apply the counter output as the address input to Arrays 802, 804, 806 and 808. At the same time, the Clear Busy input to the Quadtree Block Enable Logic 818 forces all of the RAMs in all of Arrays 802, 804, 806 and 808 to be enabled, and places all zero data onto Data Bus 816. Counter 866 cycles from all zeros to 3FFF$_H$, thus cycling through each address in each of Arrays 802, 804, 806 and 808, clearing each location as it cycles.

Referring to FIG. 34(A), shown is a schematic diagram of the Data Read Map 812 shown in FIG. 30(A). The function of the Data Read Map 812 is to reorder the 4×4 window array produced by the Arrays 802, 804, 806 and 808 (shown in FIG. 30(A)) into the traversal sequence shown in FIG. 6(F) (i.e. the bottom-left, bottom-right, top-left and top-right arbitrary traversal sequence in which any given window overlay is accessed). Referring to FIG. 34(A), four eight-bit wide data inputs produced by Arrays 802, 804, 806 and 808 are applied to each of four 32-to-8 bit MUXes 868, 870, 872 and 874 (each of MUXes 868, 870, 872 and 874 may suitably be a bank of eight 4-to-1 bit MUXes). Each of MUXes 868-874 selects the outputs from a different one of the Arrays A-D at any given time.

While the data inputs to each of MUXes 868, 870, 872 and 874 are identical, the signals applied to their select inputs are not. The select inputs of MUX 868 are MAPX and MAPY; the select inputs of MUX 870 are $\overline{MAPX}$ and MAPY; the select inputs to MUX 872 are MAPX and $\overline{MAPY}$; and the select inputs of MUX 874 are $\overline{MAPX}$ and $\overline{MAPY}$. Thus, the 8-bit wide output of each of MUXes 868, 870, 872 and 874 are different; depending upon the values of MAPX and MAPY, the output of each of Arrays 802, 804, 806 and 808 shown in FIG. 30(A) will be routed to the output of one of MUXes 868, 870, 872 or 874. In this way, the Data Read Map 812 performs a one-to-one mapping of the outputs of the Arrays 802-808 into the Window Packet.

Referring to FIG. 34(B), shown is a schematic diagram of the Data Write Map 814 shown in FIG. 30(A). The function of the Data Write Map 814 is the converse of that of the Data Read Map 812; the Data Write Map must reorder four families of four children from the quadtree traversal sequence order shown in FIG. 6(F) to the appropriate one of the four arrangements shown in FIGS. 30(C)–30(F) so that the proper locations in the proper Arrays 802, 804, 806 and 808 (shown in FIG. 30(A)) will be updated. The Data Write Map 814 may suitably be implemented in precisely the same way as the Data Read Map 812 using four 32-to-8 bit MUXes 876, 878, 880 and 882. The select inputs for MUXes 876, 878, 880 and 882 are exactly the same as those of MUXes 868, 870, 872 and 874, respectively. MUXes 876, 878, 880 and 882 are also suitably provided with Tri-State Enable inputs (suitably enabled during a window POP) to enable the outputs of the MUXes onto the Tri-State Bus 816 shown in FIG. 30(A). The write enables of Arrays 802–808 are also enabled at this time.

Image Window Packet Processor

Figure 35:
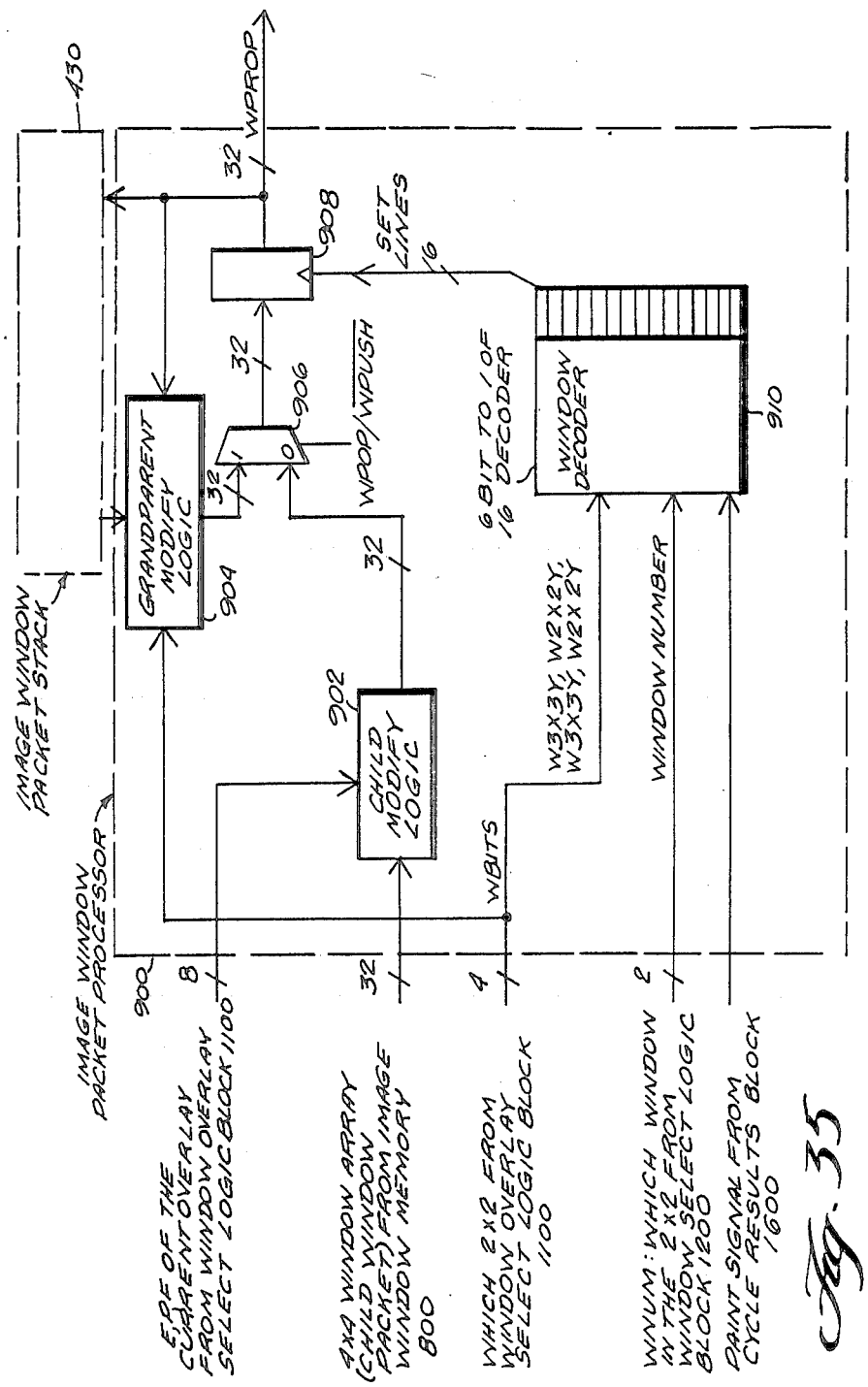
FIG. 35 is a schematic diagram of the Image Window Packet Processor block shown in FIG. 25.

Referring to FIGS. 25 and 35, shown is a schematic diagram of the Image Window Packet Processor 900. The function of the Image Window Packet Processor 900 is to demand window packets from the Image Window Memory 800, to modify those window packets as new windows are painted by the Window Writer 1400 so that the quadtree structure stored in the Image Window Memory 800 is accurate, and to modify window packets as they are accessed (but before they have been stored back in the Image Window Memory 800) so that the section of the quadtree being processed is always accurate (even though the quadtree structure stored in the Image Window Memory may not have yet been modified). The Image Window Packet Processor 900 comprises a Child Modify Logic block 902, a Grandparent Modify Logic block 904, a MUX 906, a WPROP Register 908 and a Window Decoder 910.

As previously discussed, a window packet comprising a 4×4 array of windows made up of the four children of each of four contiguous (but not necessarily sibling) parent windows is obtained from the Image Window Memory 800. This window packet is input to the Child Modify Logic block 902. Also applied as inputs to the Child Modify Logic block 902 are the E, P or F property values of the four parent windows (obtained from the Window Overlay Select Logic block 1100).

The function of the Child Modify Logic block 902 is to modify the children of any F window in the current window overlay to also be F. This is necessary because a window may be painted at a high level and therefore marked F, but the processor does not bother to mark all descendant nodes as F (they will all remain E). The Child Modify Logic block 902 automatically marks all such nodes below an F node F as they are accessed. The modified window packet is connected to an input of a MUX 906, the output of which is connected to the input of the WPROP Register 908. The output of the WPROP Register 908 is connected to the input of the Image Window Packet Stack 430, the output of which is connected to the input of the Grandparent Modify Logic block 904. The Grandparent Modify Logic block 904 also requires the output of the WPROP Register 908 directly and the WBITS produced by the Window Overlay Select Logic block 1100 (W3×3X, W3×3Y, W2×2X and W2×2Y, which specify the window overlay in the current 4×4 window packet WPROP which is being processed).

The function of the Grandparent Modify Logic block 904 is to modify the parents of the current window overlay before a WPOP (i.e. a traversal of the quadtree from a lower to a higher level) to mark F the parent of four children windows marked F, and to mark P any parent window having one or more children marked P or some but not all children marked F. The output of the Grandparent Modify Logic block 904 is connected to the other input of the MUX 906, and is selected by the MUX and clocked into the WPROP Register 908 when a WPOP is performed (i.e. when the quadtree is traversed back up from children to parent windows) so that the contents of the WPROP Register are always correct. Likewise, the output from the Child Modify Logic block 902 is selected by the MUX 906 and clocked into the WPROP Register 908 when a WPUSH is performed (i.e. when the quadtree structure is traversed downward to subdivide a current window overlay into a 4×4 array). The output of the WPROP Register 908 is connected to the input of the Image Window Memory 800 (among other places), and is used to update the quadtree structure stored in the Image Window Memory whenever a WPOP is performed.

When a window is painted by the Window Writer 1400, that window must be marked F in the quadtree structure so that it (and none of its descendents) will ever be painted again. The Window Decoder 910 performs this function by setting the bits in the WPROP Register 908 corresponding to windows that are written by the Window Writer 1400 to F. The Window Decoder 910 accepts as inputs the WBITS (W3×3X, W3×3Y, W2×2X and W2×2Y) and WNUM. These signals are encoded as shown in FIGS. 6(D)–6(F). In addition, the PAINT signal from the Cycle Results block 1500 (which is asserted when the current window is to be painted) is applied to the Window Decoder 910. The output of the Window Decoder 910 is one of 16 mutually exclusive set lines, one for each of the 16 windows in the 4×4 window packet WPROP. When one of these 16 lines is asserted, the appropriate 2-bits in the WPROP Register 908 are set to F (11).

The Window Decoder block 910 is suitably implemented by combinational logic. The Truth Table describing the outputs of the Window Decoder 910 as related to its inputs (from which one skilled in the art could easily construct the combinational logic array required) is as follows:

TABLE II

| WBITS | | | | WNUM | | | | |
|---|---|---|---|---|---|---|---|---|
| W3 × 3X | W2 × 2X | W3 × 3Y | W2 × 2Y | 00 | 01 | 10 | 11 | |
| 0 | 0 | 0 | 0 | 0 | 1 | 2 | 3 | OUTPUT |
| 0 | 0 | 0 | 1 | 2 | 3 | 8 | 9 | LINE |
| 0 | 0 | 1 | 0 | 2 | 3 | 8 | 9 | ASSERTED |
| 0 | 0 | 1 | 1 | 8 | 9 | 10 | 11 | |
| 0 | 1 | 0 | 0 | 1 | 4 | 3 | 6 | |
| 0 | 1 | 0 | 1 | 3 | 6 | 9 | 12 | |
| 0 | 1 | 1 | 0 | 3 | 6 | 9 | 12 | |
| 0 | 1 | 1 | 1 | 9 | 12 | 11 | 14 | |
| 1 | 0 | 0 | 0 | 1 | 4 | 3 | 6 | |
| 1 | 0 | 0 | 1 | 3 | 6 | 9 | 12 | |
| 1 | 0 | 1 | 0 | 3 | 6 | 9 | 12 | |
| 1 | 0 | 1 | 1 | 9 | 12 | 11 | 14 | |
| 1 | 1 | 0 | 0 | 4 | 5 | 6 | 7 | |
| 1 | 1 | 0 | 1 | 6 | 7 | 12 | 13 | |
| 1 | 1 | 1 | 0 | 6 | 7 | 12 | 13 | |
| 1 | 1 | 1 | 1 | 12 | 13 | 14 | 15 | |

In the above Table, all of the four possible combinations of the WBITS (W3×3X, W3×3Y, W2×2X and W2×2Y) and WNUM are listed horizontally. Thus, for every combination of these 6-bits, *one* of the 16 output lines from the Window Decoder 910 is specified as being asserted. The encoding shown in Table II directly corresponds to that shown graphically in FIGS. 6(D)-6(F). It should be noted that this one output line is enabled only if the PAINT signal from the Cycle Results block 1500 is asserted.

Referring to FIG. 36(A), shown is a schematic diagram of the Child Modify Logic block 902 of FIG. 35. The Child Modify Logic block 902 accepts the 4×4 window packet from the Image Window Memory block 800 of FIG. 25 (suitably 32-bits wide) as an input. The property values of each of the families of four children windows in the 4×4 array are ORed by one of OR gates 912, 914, 916 or 918 (each of which is suitably a bank of eight 2-input OR gates) with one of four "Full" signals generated by the Window Overlay Select Logic block 1100, which are asserted if the parent of the four children windows has been marked F. Thus, the output of each of the four OR gates 912, 914, 916 and 918 are the E, P or F property values of one family of four children windows, those property values having been "overwritten" by all F values if the parent of those four children windows has been marked F (i.e. painted). Hence, the subdivision of a F window will always result in F children.

Referring to FIG. 36(B), shown is a schematic diagram of the Grandparent Modify Logic block 904 shown in FIG. 35. The function of the Grandparent Modify Logic block 904, as discussed above, is to "overwrite" a window property value obtained from the Image Window Packet Stack 430 on a WPOP to reflect the painting of any one or more of its descendent windows. The Grandparent Modify Logic block 904 performs this function every time a WPOP is performed to traverse back up one level in the quadtree structure.

Each output from the Image Window Packet Stack 430 is connected to one input of a 5-input OR gates 920-930 (for a total of 32 OR gates, one for each bit output from the stack). Each bit in each pair of 16 bits output from the Image Window Packet Stack 430 indicates either P (least significant bit) or F (most significant bit) information about one of the 16 windows in the window packet containing the window overlay which was subdivided to obtain the current window packet. Each one of these bits will be overwritten if anyone of the other four inputs of its respective OR gate is asserted.

The output of the WPROP Register 908 (the current window packet) is applied to the input of the Parent Reduction Logic block 932, which groups the four families of four children in WPROP together, examines the E, P or F property values of each family of four children, and determines if the parent of that family should be marked E, P or F (as mentioned above, the parent of four children marked F must be marked F, and the parent of four children some but not all of which are marked F or having one or more children marked P must be marked P). The Parent Reduction Logic block 932 generates eight outputs, P0P, P0F, P1P, P1F, P2P, P2F, P3P and P3F, indicating whether the four parents (0-3) of the current 4 by 4 window packet containing the window overlay should be marked P or F, respectively.

Referring to FIG. 37, shown is a schematic diagram of one fourth of the Parent Reduction Logic block 932 (i.e. the fourth which generates the outputs P0P and P0F). FIG. 37 shows an 8-input OR gate 934 which generates the P0P output, and a 4-input AND gate 936 which generates the P0F information. It will be recalled that window property values are encoded 00 for E, 01 for P and 11 for F. Thus, if the most significant bit of a property value of a given window is logic 1, then that window is F. The most significant bits of the property values of each of the four children windows are input to AND gate 936. If all four bits are logic 1 (indicating that all four children are F), the AND gate generates a logic 1 output for P0F (indicating that the parent of those four windows is marked F). This is used to overwrite the most significant bit of the property value of the parent window of these children with a logic 1.

Likewise, if any bit of any of the property values of any of the four children is logic 1, then the least significant bit of the property value of the parent of the four windows should be marked logic 1 (as all of the children are not E, the parent must be either P or F, both of which are encoded to have a logic 1 in the least significant bit of the property value). Thus, OR gate 934 and AND gate 936 together generate the property value of a parent window from the four property values of the children of the window. Each of the 8 bits of the current WPROP window packet (representing four sets of four children each) are processed similarly to generate the property values of each of four parents.

Referring once again to FIG. 36(B), each of the eight outputs of the Parent Reduction Logic block 932 are connected to an input of one of eight Grandparent Window Decoder blocks 938-952. Output P0P is connected to the input of Grandparent Window Decoder block 938, P0F is connected to the input of the Grandparent Window Decoder block 940, P1P is connected to the input of Grandparent Window Decoder block 942, . . . , and P3F is connected to the input of Grandparent Window Decoder block 952 (for a total of eight Grandparent Window Decoder blocks 938-952, one for each output of the Parent Reduction block 932). The WBITS (W3×3X, W2×2X, W3×3Y and W2×2Y) produced by the Window Overlay Select Logic block 1100 (shown in FIG. 25) are connected to another input of each of Grandparent Window Decoder blocks 938-952. The Grandparent Window Decoder blocks 938-952 serve to map the P0P-P3F signals into the appropriate OR gates 920-930. In other words, the Grandparent Window Decoder blocks 938-952 determine which of signals P0P-P3F (specifying the property value of a four window overlay the children of which constitute the current window packet) correspond to which four of the 16 windows in the 4×4 window packet the current window overlay was subdivided from.

Grandparent Window Decoder blocks 938-952 are implemented by combinational logic arrays. In the presently preferred embodiment of the present invention, identical arrays are used to implement each of Grandparent Window Decoder blocks 938-952. Each of blocks 938-952 function according to the following Truth Table:

the Grandparent Window Decoder blocks 938-952, and serve to assign a pair of Grandparent Window Decoder blocks to each of window numbers 0-3 (thus, only the first column of outputs under the Hard-Wired Window Assignment 00 is valid for the pair of Grandparent Window Decoder blocks 938 and 940; likewise, only the output columns under the Hard-Wired Window Assignment values 01, 10 and 11 are valid for the pairs of Grandparent Window Decoder blocks 942 and 944, 946 and 948, and 950 and 952, respectively). The output of each Grandparent Window decoder blocks 938-952 is enabled by the input which it receives from the Parent Reduction Logic block 932.

One of the 16 outputs of each of the "P" Grandparent Window Decoder blocks 938, 942, 946 and 950 are connected to every other one of the OR gates (the "P" gates 920, . . . , 924 and 928) corresponding to the least significant bit of the property values for the 4×4 window packet output from the Image Window Packet Stack 430. Likewise, one of the 16 outputs of each of the "F" Grandparent Window Decoder blocks 940, 944, 948 and 952 are connected to the other set of every other OR gate (the "F" gates 922, . . . , 926, and 930) corresponding to the most significant bit of each property value of the 4×4 window packet output by the Image Window Packet Stack 430.

In this way, the P and F property value determinations for four windows produced by the Parent Reduction Logic block 932 are mapped into the 4×4 window packet produced by the Image Window Packet Stack 430 by the Hard-Wired Window Assignment (of Table III) together with the WBITS (W3×3X, W3×3Y, W2×2X and W2×2Y). The outputs of each P and F pair of OR gates 920-930 represents the "overwritten" property value for one of the 16 windows in the 4×4.

Image Window Geometry Processor

Figure 38:
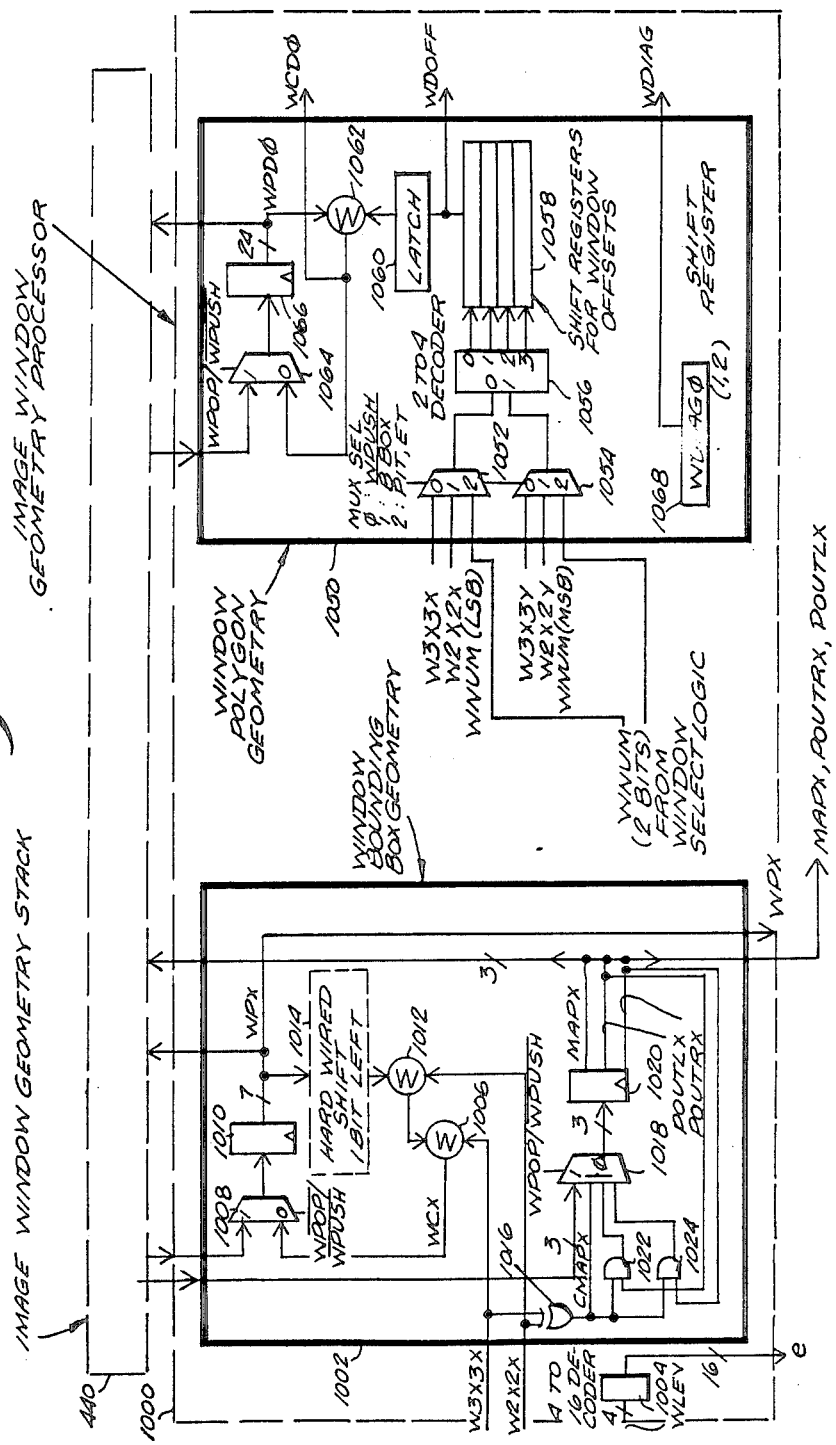
FIG. 38 is a schematic diagram of the Image Window Geometry Processor block shown in FIG. 25.

Referring to FIG. 38, shown is a schematic diagram of the Image Window Geometry Processor block 1000 of FIG. 25. The function of the Image Window Geometry Processor 1000 is to determine the position of a given window overlay on the view plane, and to determine whether the window is on the Display Screen.

TABLE III

| WBITS | | | | Hard-wired Window Assignment | | | | |
|---|---|---|---|---|---|---|---|---|
| W3 × 3X | W2 × 2X | W3 × 3Y | W2 × 2Y | 00 | 01 | 10 | 11 | |
| 0 | 0 | 0 | 0 | 0 | 1 | 2 | 3 | NUMBER |
| 0 | 0 | 0 | 1 | 2 | 3 | 8 | 9 | OF WIN- |
| 0 | 0 | 1 | 0 | 2 | 3 | 8 | 9 | DOW |
| 0 | 0 | 1 | 1 | 8 | 9 | 10 | 11 | SELECTED |
| 0 | 1 | 0 | 0 | 1 | 4 | 3 | 6 | IN 4 × 4 |
| 0 | 1 | 0 | 1 | 3 | 6 | 9 | 12 | WINDOW |
| 0 | 1 | 1 | 0 | 3 | 6 | 9 | 12 | OVERLAY |
| 0 | 1 | 1 | 1 | 9 | 12 | 11 | 14 | |
| 1 | 0 | 0 | 0 | 1 | 4 | 3 | 6 | |
| 1 | 0 | 0 | 1 | 3 | 6 | 9 | 12 | |
| 1 | 0 | 1 | 0 | 3 | 6 | 9 | 12 | |
| 1 | 0 | 1 | 1 | 9 | 12 | 11 | 14 | |
| 1 | 1 | 0 | 0 | 4 | 5 | 6 | 7 | |
| 1 | 1 | 0 | 1 | 6 | 7 | 12 | 13 | |
| 1 | 1 | 1 | 0 | 6 | 7 | 12 | 13 | |
| 1 | 1 | 1 | 1 | 12 | 13 | 14 | 15 | |

The 4-bit combinations along the horizontal edge of Table III are the various combinations of the WBITS (W3×3X, W2×2X, W3×3Y and W2×2Y). Also, along the top of Table III are the four possible combinations of 2-bits, labelled "Hard-Wired Window Assignment." These 2-bits are hard-wired inputs for each of The Image Window Geometry Processor 1000 is divided into two general parts, the Window Bounding Box Geometry block 1002 (which determines the families of window geometric values in the X and Y dimensions), and the Window Polygon Geometry block 1050 (which determines the families of window geometric values in the D0, D1 and D2 directions). The Window Bounding Box Geometry block 1002 shown in FIG. 38 is duplicated twice, once for X' and once for Y'; likewise, the Window Polygon Geometry block 1050 is duplicated three times, one duplication for each for D0, D1 and D2.

The Image Window Geometry Processor 1000 accepts as inputs the WBITS (W3×3X, W2×2X, W3×3Y and W2×2Y) generated by the Window Overlay Select Logic block 1100 shown in FIG. 25, and the signal WLEV (specifying the level of the quadtree at which the current windows are found) generated by the Sequence Controller block 1600. The WLEV signal is connected to the input of a 4-to-16 Decoder 1004, which asserts one of 16 mutually exclusive outputs, which together specify e, the size of the windows at the current level (the value of E as shown in FIG. 23(A) divided by an appropriate multiple of 2).

The W3×3X signal (W3×3Y for the Y' duplication of the Window Bounding Box Geometry block 1002) is applied to the input of an Adder 1006, the output of which is connected to an input of a MUX 1008. The output of MUX 1008 is connected to the input of a WP Register 1010. The WP Register 1010 is initialized at the beginning of the generation of an image to the origin 104 of view plane 66 WPX (WPY for the Y duplication of the Window Bounding Box Geometry block 1002) shown in FIG. 23(A). The output of the WP Register 1010 is connected to the input of the Image Window Geometry Stack 440, the output of which is connected to the other input of the MUX 1008.

On a WPUSH, the output of Adder 1006 is selected by MUX 1008 and is clocked into the WP Register 1010 while the old contents of the WP Register 1010 is pushed onto the Image Window Geometry Stack 440, thus placing the origin of a parent window overlay onto the Window Geometry Stack and placing the origin of the child window overlay into the WP Register 1010. On a WPOP, MUX 1008 selects the output of the Image Window Geometry Stack 440, which is clocked into the WP Register to restore the origin of the parent window overlay into the register (when the quadtree is traversed back up after a subdivision has been processed).

The output of the WP Register 1010 is connected to the input of an Adder 1012 after being hard-wire shifted one bit to the left by block 1014 (note that block 1014 merely represents the connection of a logic 0 to the LSB of Adder 1012, and the connection of the output of the WP Register 1010 to the remaining bits of the Adder, so that the output of the register is actually multiplied by 2 before being applied to the Adder). The other input of Adder 1012 is connected to W2×2X (W2×2Y for the Y duplication of the Window Bounding Box Geometry block 1002). The output of Adder 1012 is connected to the other input of the Adder 1006. Thus, the output of Adder 1006 $WCX=(WPX*2)+(W2\times 2X+W3\times 3X)$ [$(WPY*2)+(W2\times 2Y+W3\times 3Y)$ for the Y' duplication of the Window Bounding Box Geometry block 1002]. This value is the origin of the window overlay selected within the current 4×4 array, the selection of which was discussed previously in the discussion of FIGS. 6(D)-6(F).

The W3×3X and W2×2X bits (W3×3Y and W2×2Y bits for the Y' duplication of the Window Bounding Box Geometry block 1002) are also both connected to a 2-input XOR gate 1016, the output of which is the CMAPX bit (CMAPY bit for the Y' duplication of the Window Bounding Box Geometry block 1002) for the next subdivision of windows, as previously discussed in conjunction with FIGS. 30(C)-30(F). The output of the XOR gate 1016 is applied to the input of a MUX 1018; the output of the MUX is connected to the MAP Register 1020. The output of the XOR gate 1016 is also connected to one input each of two 2-input AND gates 1022 and 1024. The output of the AND gates 1022 and 1024 are also applied to the MUX 1018, and thus to the input of the MAP Register 1020.

The Map Register 1020 contains three values, the MAPX (MAPY) bit; and the POUTLX and POUTRX bits (POUTLY and POUTRY bits for the Y' duplication of the Window Bounding Box Geometry block 1002), which indicate which (if any) windows in the current window overlay are not on the Display Screen (this register must be initialized before each image is generated). The POUTLX (POUTLY) output of the MAP Register 1020 is connected to the other input of AND gate 1022, while the POUTRX (POUTRY) output of the MAP Register 1020 is connected to the other input of the AND gate 1024. In this way, which of the windows in the child window overlay are not on the Display Screen is determined from which of the parent windows in the current window overlay are off of the screen and the location of the child window overlay within the 4×4 array (specified by the WBITS).

The outputs of the MAP Register 1020 is also connected to the input of the Image Window Geometry Stack 440, the output of which is connected to inputs of the MUX 1018. On a WPUSH, the output of the MAP Register 1020 is pushed onto the Image Window Geometry Stack 440, and the MAPX, POUTLX and POUTRX (MAPY, POUTLY and POUTRY) values for the subdivided overlay are clocked into the MAP Register so that the appropriate child values are present in the register when the quadtree is traversed down one level. Likewise, on a WPOP, the output of the Image Window Geometry Stack 440 is selected by the MUX 1018 and clocked into the MAP Register 1020 so that the former values are reloaded into Register 1020 when the quadtree is traversed back up a level.

The Window Polygon Geometry block 1050 of the Image Window Geometry Processor 1000 is duplicated three times, once each for D0, D1 and D2. The Window Polygon Geometry block 1050 accepts as an input the WBITS (W3×3X, W2×2X, W3×3Y and W2×2Y) together with WNUM (specifying which window of the four windows in the current window overlay is being processed), generated by the Window Overlay Select Logic block 1100 and the Window Select Logic block 1200, respectively. W3×3X, W2×2X and one of the 2 bits of WNUM are connected to the inputs of a 3-to-1 MUX 1052, while W3×3Y, W2×2Y and the other bit of WNUM are connected to the inputs of a 3-to-1 MUX 1054.

Both MUXes 1052 and 1054 select these three inputs according to select inputs from the Sequence Controller block 1600. W3×3X and W3×3Y are selected by MUXes 1052 and 1054, respectively, during a WPUSH; W2×2X and W2×2Y are selected during a BBOX test; and WNUM is selected during a PI test and an E test. The outputs of MUXes 1052 and 1054 are connected to a 2-to-4 Decoder 1056, which generates one of four mutually exclusive outputs. These outputs of the Decoder 1056 are used to select one of four Shift Registers in a WDOFF Table 1058. The WDOFF Table 1058 is initialized with zero and three appropriate window offsets, as mentioned previously in the discussion of FIGS. 23(B)-23(D).

The output of the WDOFF Table 1058 is connected to a Latch 1060, the output of which is connected to one input of an Adder 1062. The output of Adder 1062 is connected to an input of a MUX 1064, the output of which is connected to the input of a WPD Register 1066 (which is initialized at the beginning of each image generation to WPD0, WPD1 or WPD2 as shown in FIG. 23(A), one for each duplication of Window Polygon Geometry block 1050 for D0, D1 and D2). The output of the WPD Register 1066 is connected to the other input of Adder 1062. The output of the WPD Register 1066 is also connected to the input of the Image Window Geometry Stack 440, the output of which is connected to the other input of MUX 1064. MUX 1064 selects the output of the Image Window Geometry Stack 440 during a WPOP, which is clocked into the WPD Register 1066. On a WPUSH, the MUX 1064 selects the output of Adder 1062, which is clocked into the WPD Register 1066.

It will be recalled from the discussion of FIGS. 23(A)-23(D) that the preferred embodiment calculates the critical vertices of a given window in the current window overlay from the critical vertices of the current 4×4 window array in three stages: first, a 3×3 window array is selected from the 4×4 window array, and the critical vertices of the 3×3 array are determined; then, a window overlay (a 2×2 window array) is selected from the selected 3×3 array, and the critical vertices for the overlay are determined; finally, a single window is selected from the window overlay, and its critical vertices are determined.

Immediately after a WPUSH, the WPD Register 1066 contains the WPD0 (WPD1, WPD2) offsets for the 4×4 window array (as shown in FIG. 23(A)). At this time, MUXes 1052 and 1054 select the W3×3X and W3×3Y bits, respectively, to select from the WDOFF Table 1058 the appropriate offset to calculate the critical vertices of the 3×3 array selected from the 4×4 array. This offset value is latched into Latch 1060 and is applied to Adder 1062 so that the offset from the origin of the view plane to the critical vertex of the 3×3 array is applied to the input of MUX 1064.

Once Latch 1060 has latched, the output of the WDOFF Table 1058 is free to change without affecting the calculated result of Adder 1062. After the WPUSH, a BBOX cycle is begun. The W2×2X and W2×2Y inputs of MUXes 1052 and 1054 are selected, which select from the WDOFF Table 1058 the appropriate window offset for computing the critical vertices of the selected window overlay. The value discussed above for the 3×3 array is clocked into the WPD Register 1066, and the window offset for the window overlay is latched in Latch 1060. As before, a new value is produced by Adder 1062; this time, it is WCD0, the offset from the view plane origin to the critical vertex of the selected window overlay. WCD0 is output from the Image Window Geometry Processor block 1000.

Once Latch 1060 has latched a second time (for a BBOX cycle) if a PIT (or ET) cycle is entered, MUXes 1052 and 1054 select the WNUM value, which is used to select from the WDOFF Table 1058 the appropriate offset for calculating the critical vertex of individual windows in the window overlay. Recall that all four windows in the overlay are tested simultaneously during a BBOX test and, in fact, the diagonal (D0, D1, D2) information is not needed (it's simply updated from the 3 by 3 to the 2 by 2 in preparation for a BBOX or E test. For a PI or E test, however, the diagonal information for a single window is needed, and therefore, generated from the 2 by 2 values. As WNUM changes (as the PI and E tests are performed on different ones of the windows in the window overlay), the output WOFF changes. A new value of WCD0 will not however be produced until the next WPUSH (or WPOP).

Also contained in the Window Polygon Geometry block 1050 is a WDIAG Shift Register 1068, which is initialized by the Initializing Controller block 160 at the start of each image generation to contain the value WDIAG0 (WDIAG1 and WDIAG2 for the D1 and D2 duplications of the Window Polygon Geometry block 1050) calculated as shown in FIG. 23(E). As with all of the Shift Registers previously discussed, the WDIAG register shifts one bit to the right for every WPUSH, and one bit to the left on every WPOP, to keep the value which it contains correct for the level of the quadtree being accessed.

Window Overlay Select Logic

Referring to FIGS. 39(A) and 39(B), shown is a schematic diagram of the Window Overlay Select Logic block 1100 of FIG. 25. The function of the Window Overlay Select Logic block 1100 is to select the appropriate window overlay from the 4×4 window array comprising the current window packet. The Window Overlay Select Logic block 1100 comprises two blocks: the WBITS Processor 1102 (which is duplicated twice, once for X' and once for Y'); and the WPROP Reduction Logic block 1198. The WBITS Processor block 1102 calculates the WBITS as previously discussed and shown in FIGS. 6(D)-6(E). Although the WBITS Processor block 1102 is duplicated for each of x' and y', only the x' duplication will be discussed; the y' duplication is directly analogous.

The WPX signal generated by the Image Window Geometry Processor 1000 is input to a Barrel Shifter 1104, which shifts WPX a predetermined number of places to the left depending upon the value of WLEV generated by the Sequence Controller block 1600. The Barrel Shifter 1104 suitably shifts the WPX value between 0 to 8 places to the left; at the bottom level of the quadtree (level 9, the smallest window size), the Barrel Shifter will shift 0 places to the left, while at quadtree level 1 (the largest size windows in the quadtree structure), the Barrel Shifter will shift eight places to the left. The output of Barrel Shifter 1104 is the signal WPX*2e which is the origin of the 4×4 window array *in units of pixels* (this conversion is required because the location of nodes are specified in units of pixels). The WPX value is a parent value and is thus multiplied by 2e rather than e to obtain the 4×4 origin.

The output of Barrel Shifter 1104 is connected to one input of an Adder 1106, the other input of which is connected to the value e (the size of windows in pixels at the current level of the quadtree). The output of Adder 1106 is thus equal to (WPX*2e)+e (the location of line a in FIG. 6(D)).

Each of the bits of e are gated with the value W3×3X by AND gate 1108 (suitably a bank of 16 2-input AND gates), the output of which is connected to an input of an Adder 1110. Thus, the output of Adder 1110 is equal to (WPX*2e)+e+(e·W3×3X) (the location of line c shown in FIG. 6(E)).

NPX and NPY are also input to the Window Overlay Select Logic block 1100. It will be recalled that (NPX, NPY) is the origin 76 of bounding box 74 of node projection 68 shown in FIG. 6(B). NPX is connected to the input of an Adder 1112, the other input of which is connected to the value ax(CNUM) generated by the Object Node Geometry Processor block 700. The output of Adder 1112 is thus NPX+ax(CNUM), the origin of the bounding box of the child node projection.

The output of Adder 1106 and the signal NPX are connected to the inputs of a Magnitude Comparator 1114; the output of Magnitude Comparator 1114 is asserted when $NPX \geq (WPX*2e)+e$. Likewise, the outputs of Adders 1110 and 1112 are connected to the two inputs of a Magnitude Comparator 1116. The output of Comparator 1116 is asserted when $NPX+ax(CNUM) \geq (WPX*2e)+e+(e·W3 \times 3X)$. Finally, the output of Adder 1112 is also suitably connected to an input of a Magnitude Comparator 1118, the other input of which is connected to logic 0. The output of Comparator 1118 is asserted when $NPX+ax(CNUM) \geq 0$.

The outputs of Comparators 1114, 1116 and 1118, together with WNUM (the output from the Window Select Logic block 1200 of FIG. 25 which indicates which one of the four windows in the current window overlay is being processed) are input to various inputs of one of two MUXes 1120 and 1122. MUXes 1120 and 1122 select between these inputs to calculate the WBITS, depending upon various relationships between node level and window level. MUXes 1120 and 1122 have their select inputs connected in parallel to a signal generated by the Sequence Controller block 1600 (not shown).

The input selected when MUXes 1120 and 1122 have a 00 placed on their select lines are both "don't cares"; (can be set to either 0 or 1) these inputs are selected when the projection of the object node is larger than the size of the Display Screen (i.e. the node level is above the screen level). Since a window overlay cannot be found within the quadtree structure which will enclose the bounding box of a node projection which is larger than the Display Screen, this is a special case which the Image Display Processor block 152 processes without requiring WBITS information. Those skilled in the art will recognize that this special case could have been avoided if the Image Window Memory block 1800 stored a quadtree structure larger than the Display Screen (large enough to enclose the projection of the universe when scaled up by the maximum scale factor). However, in the presently preferred embodiment of the present invention, only the Display Screen is subdivided by the quadtree structure and stored in the Image Window Memory block 800 in order to save in hardware costs (information that will never be displayed is not stored, so that a much smaller memory may be used) and to decrease processing time (little time is spent discarding windows not on the Display Screen).

When the select lines to MUXes 1120 and 1122 are set to 01, MUX 1120 selects a logic 1 input, while MUX 1122 selects the output from Comparator 1118. This occurs when the quadtree level 0 is accessed (i.e. each of the 16 windows in the current window packet is the size of the Display Screen). In this case, W3×3X and W3×3Y are both set to logic 1, thus selecting the upper right-hand 3×3 within the 4×4 window packet, as shown in FIG. 6(D). Referring to FIGS. 6(D) and 43(A), the Display Screen 212 is defined to be the center window of this 3×3 (i.e. window 12 in FIG. 6(D)), so that the Display Screen will be included in any of the 4-window arrays selected from the 3×3. The values of W2×2X and W2×2Y select the window overlay within the 3×3 depending upon whether the bounding box of the node projection is above the x' axis and whether it is to the right of the y' axis of the view plane.

When the value 10 is applied to the select inputs of MUXes 1120 and 1122, MUX 1120 selects the output of Comparator 1114, while MUX 1122 selects the output of Comparator 1116. This is the general case, where the node and window levels are equal and four contiguous windows in the current window packet can be found to form a window overlay which encloses the bounding box of the node projection. In this general case, the WBITS must be determined arthimetically.

As shown in FIG. 6(D), the position of the left edge of the bounding box of the node projection is compared with the position of line a to determine the value of W3×3X, and similarly, within the selected 3×3, the position of the left edge of the bounding box defined by the node projection is compared with the position of line c in the 3×3 shown in FIG. 6(E) to determine W2×2X. These comparisons are implemented by comparators 1114 and 1116. Analogous comparisons are made with respect to lines b and d shown in FIGS. 6(D)–6(E) to determine W3×3Y and W2×2Y.

When the value 11 is applied to the select input of MUXes 1120 and 1122, the MUXex both select the least significant bit of WNUM (the most significant bit of WNUM is selected by the Y duplication of the WBITS Processor block 1102). As shown in FIG. 6(F), this provides selection of one window from the window overlay selected by the WBITS.

The output of MUX 1120 is connected to an input of a MUX 1124, while the output of MUX 1122 is connected to an input of MUX 1126. The outputs of MUXes 1124 and 1126 are connected to the input of the W3×3 Register 1128 and the W2×2 Register 1130, respectively. The output of Registers 1128 and 1130 (the WBITS for the current window overlay) are connected to the input of the WBITS Stack 450, the output of which is connected to the other inputs of MUX 1124 and MUX 1126. MUXes 1124 and 1126 select the output of MUXes 1120 and 1122, respectively, during a WPUSH and BBOX test, which are then clocked into Registers 1128 and 1130, respectively. On a WPOP, MUXes 1124 and 1126 select the output of the WBITS Stack 450, which is clocked into Registers 1128 and 1130 to relocate a parent window overlay after some of its children have been subdivided.

The outputs of Registers 1128 and 1130 are, it will be recalled, connected to a number of the blocks in the Image Display Processor block 152 (for instance, the WBITS are used by the Image Window Packet Processor 900, the Image Window Geometry Processor 1000, the Window Writer block 1400, and the Cycle Results block 1500). These outputs are also further processed within the Window Overlay Select Logic block 1100 by the WPROP Reduction Logic block 1198. The function of this block is to take the WBITS together with WPROP (the current 4×4 window packet generated by the Image Window Packet Processor block 900) to generate the E, P or F property values of the four windows in the current window overlay. The WPROP Reduction Logic block 1198 is implemented in the presently preferred embodiment by a combinational logic array implementing the following Truth Table:

Window Select Logic

Referring to FIG. 40, shown is the Window Select Logic block 1200 of FIG. 25. The function of the Window Select Logic block 1200 is to supply from the current window overlay those non-Full windows which have passed the BBOX test. The Window Select Logic block 1200 accepts as an input the results of the BBOX test (suitably four 1-bit signals BPASS0, BPASS1, BPASS2 and BPASS3 supplied by the Cycle Results block 1500, which are asserted if their respective windows (encoded as shown in FIG. 6(F)) passed the BBOX test *and* are non-Full), together with the E, P or F property values of the current window overlay (generated by the Window Overlay Select Logic block 1100).

The BBOX Results signals are connected to an input of a MUX 1202, the output of which is connected to the input of the BBOX Results Register 1204. The output of Register 1204 is connected to the input of the BBOX Result Stack 460, the output of which is connected to the other input of MUX 1202. On a WPUSH, the MUX 1202 selects the BBOX Results inputs (BPASS0, BPASS1, BPASS2 and BPASS3) generated by the Cycle Results block 1500, and clocks these values into the BBOX Results Register 1204. On a WPOP, MUX 1202 selects the output of the BBOX Results Stack 460, which is clocked into Register 1204. Thus, the BBOX Results values are saved in the BBOX Results Stack 460 on a WPUSH, and are retrieved after a subdivision of the current window overlay has been processed and a WPOP is executed.

The output of the BBOX Results Register 1204 is connected to the input of a Priority Encoder 1206. Priority Encoder 1206 generates a 1-bit output WREM, which is asserted if any bit at the output of Register 1204 is asserted; thus, WREM is asserted if at least one of the windows in the current window overlay is non-Full and passed the BBOX test (i.e. needs to be further processed). WREM is applied as an input to the Sequence Controller block 1600.

Priority Encoder block 1206 also generates an output WNUM, suitably a 2-bit value which indicates the window number in the window overlay next to be pro-

TABLE IV

| WBITS | | | | OVERLAY WINDOW NUMBER | | | | |
|---|---|---|---|---|---|---|---|---|
| We × 3X | W2 × 2X | W3 × 3Y | W2 × 2Y | 0 | 1 | 2 | 3 | |
| 0 | 0 | 0 | 0 | 0 | 1 | 2 | 3 | WINDOW |
| 0 | 0 | 0 | 1 | 2 | 3 | 8 | 9 | PROPERTY |
| 0 | 0 | 1 | 0 | 2 | 3 | 8 | 9 | VALUES |
| 0 | 0 | 1 | 1 | 8 | 9 | 10 | 11 | OUTPUT |
| 0 | 1 | 0 | 0 | 1 | 4 | 3 | 6 | |
| 0 | 1 | 0 | 1 | 3 | 6 | 9 | 12 | |
| 0 | 1 | 1 | 0 | 3 | 6 | 9 | 12 | |
| 0 | 1 | 1 | 1 | 9 | 12 | 11 | 14 | |
| 1 | 0 | 0 | 0 | 1 | 4 | 3 | 6 | |
| 1 | 0 | 0 | 1 | 3 | 6 | 9 | 12 | |
| 1 | 0 | 1 | 0 | 3 | 6 | 9 | 12 | |
| 1 | 0 | 1 | 1 | 9 | 12 | 11 | 14 | |
| 1 | 1 | 0 | 0 | 4 | 5 | 6 | 7 | |
| 1 | 1 | 0 | 1 | 6 | 7 | 12 | 13 | |
| 1 | 1 | 1 | 0 | 6 | 7 | 12 | 13 | |
| 1 | 1 | 1 | 1 | 12 | 13 | 14 | 15 | | cessed according to the quadtree traversal sequence shown in FIG. 6(F). This output is connected to the input of a WNUM Register 1208. The (unregistered) output also is connected to the select inputs of a MUX 1210, the inputs of which are the E, P and F property values of the four windows in the current window overlay. Thus, the property value of the one window in the window overlay selected by WNUM is generated at the output of MUX 1210; this output is also connected to the input of the WNUM Register 1208. The output of the WNUM Register 1208 comprises both a signal indicating which one of the four windows in the current window overlay is next to be processed, and the E, P or F property value of that window.

The WNUM output of the WNUM Register 1208 is also connected to the input of a 2-to-4 Decoder 1212, which also receives a gating input from the Sequence Controller block 1600. The output of Decoder 1212 is four mutually exclusive 1-bit lines which are connected to the Reset inputs of the BBOX Register 1204. When the value WNUM of the next window in the current window overlay to be processed is clocked into the WNUM Register 1208, the Decoder 1212 clears the BBOX Results value corresponding to that window in the BBOX Results Register 1204 so that Priority Encoder 1206 is informed that the window has already been processed, and therefore will not select that window again.

Cut Plane Processor

Referring to FIG. 41, shown is a detailed block diagram of the Cut Plane Processor block 1300 of FIG. 25. The function of the Cut Plane Processor block 1300 is to determine whether the current node lies at least partially within the region to be displayed defined by the cut planes, and if so, whether it is intersected by a cut plane. The Cut Plane Processor block 1300 produces two outputs: a signal Cut Plane OK is asserted if at least a portion of the current node lies within the region to be displayed; and Cut Plane INT is asserted if the current node is intersected by a cut plane. If Cut Plane OK is asserted and Cut Plane INT is not, then the node must lie entirely within the region to be displayed.

The Cut Plane Processor block 1300 comprises a Cut Plane Geometry block 1301 and a Cut Plane Arithmetic block 1350. There is one set of these blocks for each pair of cut planes used to define the region to be displayed. The Cut Plane Geometry block 1301 accepts as an input the signal CNUM (produced by the Node Select Logic block 600), which specifies which of the eight nodes in the current node packet is being processed. CNUM is connected to the input of a 3-to-8 decoder 1302 which produces eight mutually exclusive output lines, one for each node in the node packet. The output lines of the 3-to-8 decoder 1302 are used to select one of eight shift registers in the ak Table 1304. The ak Table 1304 together with Adder 1306, MUX 1308 and an NPK Register 1310 produce the various geometric locations of the left-most and right-most vertices of the projection of the current node onto the cut plane test plane shown and discussed in conjunction with FIG. 14(B). The operation of these components is very much similar to equivalent structures in the Node Bounding Box Geometry block 702 of the Object Node Processor block 700 shown in FIG. 29. Cut Plane Geometry Stack 470 permits storage and recovery of computed offset values when the octree structure is traversed downward and upward, respectively.

The Cut Plane Geometry block 1301 contains two additional registers, the KDIAG Register 1312 and the LDIAG Register 1314. It will be understood that the ak Table 1304, the KDIAG Register 1312, the LDIAG Register 1314 and the NPK Register 1310 are all initialized to the values shown computed in FIGS. 14(B), 22(A) and 22(B). The ak Table 1304 and the KDIAG Register 1312 are both shift registers which shift according to the level of the octree currently being accessed. The NPK Register 1310 and the LDIAG Register 1314 are both fixed registers.

Cut Plane Geometry block 1301 produces three values: NCK (the location of the left-most vertex of the projection of the current node onto the cut plane test plane), KDIAG (the offset from the left-most vertex of that node projection to the right-most vertex) and LDIAG (the distance between the two cut planes). These three signals are sent to the Cut Plane Arithmetic block 1350, which performs the cut plane test discussed previously in conjunction with FIG. 14(B). IN IN/OUT Register 1370 is a single-bit register which is initialized by the Initializing Controller block 160 to either logic 1 or logic 0, depending upon whether the region to be displayed is that region defined between the cut planes or that region outside of the region between the two cut planes. The output of the IN/OUT Register 1370 is used to select a MUX 1368, which selects an IN and an OUT input, as appropriate. The IN and OUT signals are produced by Adder 1352, Magnitude Comparators 1354, 1356, 1358 and 1360, AND gate 1362 and OR gate 1364, which perform the arithmetic comparisons for the cut plane test previously described in the discussion of FIG. 14(B). AND gate 1366 produces the Cut Plane INT signal (which is sent to the Sequence Controller block 1600 of FIG. 25), while an OR gate 1372 produces the Cut Plane OK signal (which is sent to the Cycle Results block 1500 of FIG. 25).

It will be understood by those skilled in the art that by duplicating the pair of Cut Plane Geometry block 1301 and the Cut Plane Arithmetic block 1350, the region to be displayed may be further restricted to that defined by two pairs of cut planes. The Cut Plane INT signal of both the duplications of the Cut Plane Arithmetic block 1350 are ORed together, while the Cut Plane OK signal are ANDed together. Additional cut planes and more sophisticated visibility determination criteria are easily added.

Cycle Results

Referring to FIG. 42, shown is a detailed block diagram of the Cycle Results block 1500 of FIG. 25. The Cycle Results block 1500 comprises four blocks, the Screen Intersection Logic block 1502, the BBOX Arithmetic block 1520, the PI Test Arithmetic block 1540 and the E Test Arithmetic block 1560.

The BBOX Arithmetic block 1520 performs the Bounding Box test on the four windows in the current window overlay simultaneously, and generates four single-bit outputs, each of which indicate whether one of the four windows in the overlay passed the BBOX test. These outputs are each ANDed with the most significant bit of the E, P or F property value of the corresponding window (indicating Full or not-Full) by four 2-input AND gates 1582, 1584, 1586 and 1588. The outputs of AND gates 1582, 1584, 1586 and 1588 are the signals BPASS0-BPASS3 previously discussed in the description of FIG. 40.

The four outputs BPASS0-BPASS3 are also ORed together by OR gate 1590 the output of which is ANDed with the Cut Plane OK signal (produced by the Cut Plane Processor block 1300) to generate a single output BPASS which indicates whether any one of the four windows in the current window overlay have passed the BBOX test, are at least partially within the region defined by the cut planes to be displayed, and are non-Full. The BPASS signal is sent to the input of the Sequence Controller block 1600 to enable it to determine whether further testing of the window overlay by the PI and E tests is necessary.

The Screen Intersection Logic block 1502 performs the BBOX test in a special case, when the size of the windows in the current window overlay is equal to or greater than the size of the Display Screen. It will be recalled that the only section of the view plane which is organized into the quadtree structure is the Display Screen, since only those nodes which project onto the Display Screen will be visible to a viewer. When the current window size is equal to or greater than the size of the Display Screen, the preferred embodiment of the present invention simplifies the BBOX Test into a simpler Screen Intersection test, which merely determines whether the Display Screen (the only window of interest in an array of windows of size equal to or greater than the size of the display screen) intersects any portion of the bounding box defined by the projection of the current node. The Screen Intersection Logic block 1502 generates a single output, SPASS, which is asserted when the bounding box intersects the Display Screen.

The PI Test Arithmetic block 1540 performs the Polygon Intersection Test on individual windows in the current window overlay to determine if those windows intersect the projection of the current node. The PI Test Arithmetic block 1540 generates a single output, PPASS, which indicates that the window under test has passed the Polygon Intersection Test.

The E Test Arithmetic block 1560 performs the Enclosure Test on individual windows in the current window overlay to determine if those windows are enclosed by one of the three faces of the current node projection. A given window suitably is tested simultaneously for the Enclosure Test with respect to all of the three faces of the node projection. The E Test Arithmetic block 1560 generates the PAINT signal, which is asserted when the window under test passes the E Test with respect to any one of the three faces of the node projection. It will be understood that a given window may be enclosed by, at most, one of the three faces; due to finite precision arithmetic operations, however, sometimes the E test will indicate that a given window is enclosed by more than one face at the same time. In such an instance, one of such faces is arbitrarily chosen. The E test arithmetic block 1560 also generates the FACE NUMBER signal, suitably a 2-bit value indicating which of the three faces of the node projection encloses the window under test (if it is in fact enclosed by any of them).

It will be seen from FIG. 42 that each of the BBOX Arithmetic block 1520, PI Test Arithmetic block 1540 and E Test Arithmetic block 1560 inputs the geometry of current windows (the family of values describing the location of the current window overlay and the single window under test in the X, Y, D0, D1 and D2 dimensions) and the geometry of the current node (the family of values indicating the position of the current node projection in the X, Y, D0, D1 and D2 dimensions), generated by the Image Window Geometry Processor block 1000 and the Object Node Geometry Processor block 700, respectively. Because the location of the Display Screen is fixed, the Screen Intersection Logic block 1502 requires only the information containing the geometry of the current node.

Referring to FIG. 43(A), shown is a graphical illustration of the special case in which the Screen Intersection Logic block 1502 is used to perform a simplified BBOX test in order to determine if the Display Screen intersects the current node projection. As mentioned above, the Screen Intersection Logic block 1502 is used instead of the BBOX Arithmetic block 1520 to perform the BBOX test whenever the size of the windows in the current window packet is equal to or greater than the size of the Display Screen. It will be recalled from the discussion of FIG. 20(A) that the lower left-hand corner of the Display Screen 212 is located at point (WPX, WPY)=(0, 0) (the origin 104 of view plane 66), and that the dimensions of Display Screen 212 are 512×512 pixels. It will be readily understood to those skilled in the art that if any of the four following equations are true, then the bounding box 76 of the current node projection 68 (referring to FIG. 7) does not intersect with the Display Screen:

$$NPX + ax(CNUM) \geqq 512$$

$$NPX + ax(CNUM) + bx \leqq 0$$

$$NPY + ay(CNUM) \geqq 512$$

$$NPY + ay(CNUM) + by \leqq 0.$$

(The above equations determine respectively whether the left edge of the bounding box of the current node projection is to the right of the right edge of the screen, whether the right edge of the bounding box is to the left of the left edge of the screen, whether the bottom edge of the bounding box is above the top edge of the Display Screen, and whether the top edge of the bounding box of the node projection is below the bottom of the Display Screen). These equations are conventionally implemented by ADDERs 1504, 1506, 1508 and 1510 and Magnitude Comparators 1512, 1514, 1515 and 1516. The output of Comparators 1512, 1514, 1515 and 1516, (each representing the results of the comparison of one of the equations above) are connected to the input of a 4-input NOR gate 1518, the output of which will be asserted only if none of the four equations are satisfied. The output of NOR gate 1518 is the signal SPASS, which indicates that the bounding box of the current node projection intersects the Display Screen.

The presently preferred embodiment does not permit windows of the view plane to be larger than the display screen, but instead, subdivides nodes until their projections define a window overlay comprising windows of level 0 (the size of the display screen). The screen intersection test may be applied to any node projection, no matter how large.

Referring to FIG. 44(B), shown is a schematic diagram of a portion of the BBOX Arithmetic block 1520 shown in FIG. 42. Referring to FIGS. 7 and 44(B), the operation of the BBOX Arithmetic block 1520 may be better understood in conjunction with the geometry of the BBOX Test. The BBOX Arithmetic block 1520 performs the BBOX test simultaneously for the four windows in the current window overlay, generating four output signals BPASS0-BPASS3, indicating respectively if windows 0-3 (labeled as shown in FIG. 6(F)) of the current window overlay pass the BBOX test.

Referring to FIG. 44(B), the logic array block 1529 required to determine if one of the windows in the current window overlay intersects the bounding box of the current node projection is shown (four logic array blocks 1529 are required, one for each window in the window overlay). Adders 1522, 1524, 1526 and 1528 together with Magnitude Comparators 1530, 1532, 1534 and 1536 implement the following equations:

$$(WX+e) > NPX + ax \text{ (CNUM)}$$

$$WX < NPX + ax \text{ (CNUM)} + bx$$

$$(WY+e) > NPY + ay \text{ (CNUM)}$$

$$WY < NPY + ay \text{ (CNUM)} + by.$$

(These equations are satisfied if the right edge of the window under test is to the right of the left edge of the bounding box of the current node projection, the left edge of the window under test is to the left of the right edge of the bounding box, the top edge of the window is above the bottom edge of the bounding box, and the bottom edge of the window is below the top edge of the bounding box, respectively). The output of Comparators 1530, 1532, 1534 and 1536 are connected to a 4-input AND gate 1538, the output of which is asserted only if all four equations are satisfied (i.e. when the window under test intersects the bounding box of the current node projection).

Referring to FIG. 44(A), shown is a block diagram of the Window Location Logic block 1521 contained in the BBOX Arithmetic Logic block 1520. The Window Location Logic block 1521 generates eight outputs, the X' and Y' coordinate values (in pixels) of each of the four windows in the current window overlay. The Window Location Logic block 1521 requires as inputs WLEV (the window level of the current overlay), e (the size of the current windows), WPX and WPY (the origin of the current 4×4 array) and the WBITS (W3×3X, W3×3Y, W2×2X and W2×2Y, specifying the current window overlay within the 4×4 window array). The Window Location Logic block 1521 generates the outputs WX0, WY0, WX1, WY1, WX2, WY2, WX3 and WY3, each pair respectively specifying the location of the lower left-hand vertex (i.e. the window origin) of each of the four windows in the current window overlay. The values WX0 and WY0 are connected to the WX and WY inputs of the duplication of the logic block 1529 shown in FIG. 44(B) for the 0 window in the current window overlay, WX1 and WY1 are connected to the WX and WY inputs for the duplication of logic array block 1529 for window 1, etc.

The Window Location Logic block 1521 is suitably a combinational logic array implementing the following equations:

$$WX0 = WX2 = (WPX*2e) + (e \text{ AND } W3\times3X) + (e \text{ AND } W2\times2X)$$

$$WX1 = WX3 = WX0 + e$$

$$WY0 = WY1 = (WPY*2e) + (e \text{ AND } W3\times3Y) + (e \text{ AND } W2\times2Y)$$

$$WY2 = WY3 = WY0 + e$$

(Those skilled in the art will recognize that these equations may be implemented with binary Adders, Barrel Shifters, and logic function gates, keeping in mind that the value e is a power of 2).

Figure 45:
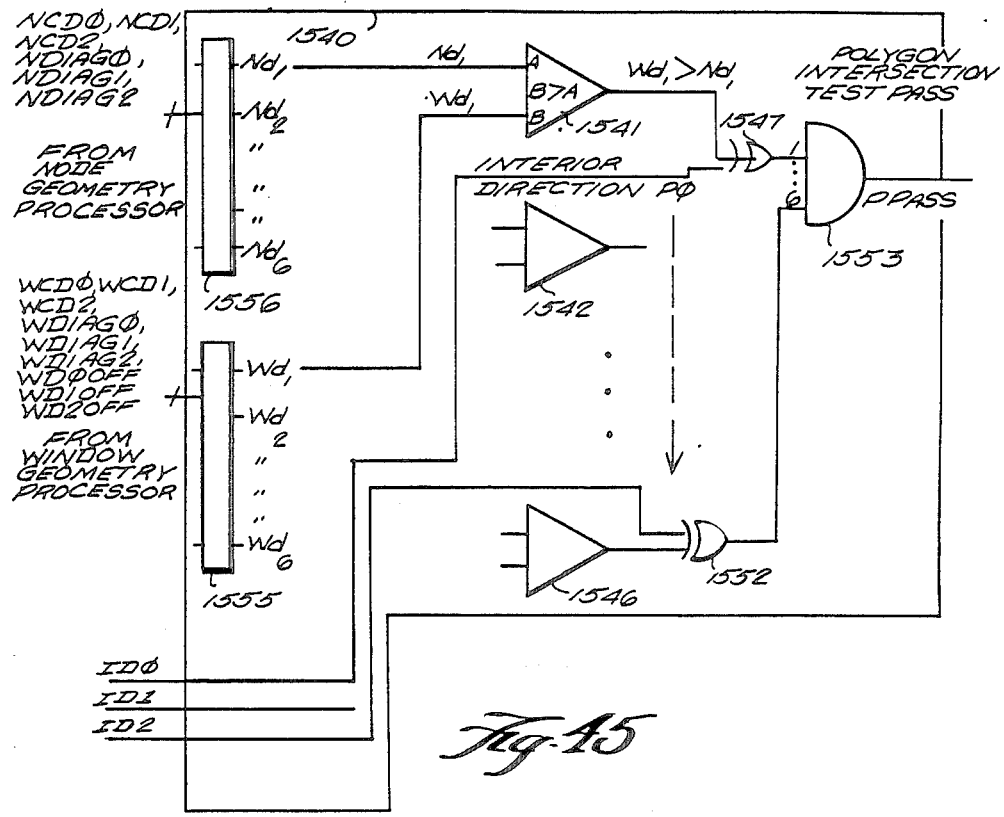
FIG. 45 is a schematic diagram of the Polygon Intersection Arithmetic block shown in FIG. 42.

Referring to FIG. 45, shown is the schematic diagram of the PI Test Arithmetic block 1540 shown in FIG. 42. Referring to FIGS. 10 and 44, the PI Test Arithmetic block 1540 performs the polygon intersection test on one of the four windows in the current window overlay by selecting a critical vertex of the window for each of the six edges of the node projection, and then comparing the position of each one of the six edges with its corresponding critical vertex to determine if the window intersects the node projection. As shown in FIG. 9, the selection of one of the four vertices of the window as the critical vertex for a given edge of the node projection is dependent upon the slope of the edge and the orientation of the edge with respect to the interior of the node projection (note that the critical vertex selection is the same for the projection of any node in the octree structure with respect to any window in the quadtree structure for a given viewing angle).

Referring to FIG. 45, the PI Arithmetic block 1540 comprises six Magnitude Comparators 1541–1546. The output of each Comparator 1541–1546 is connected to an input of one of six 2-input XOR gates 1547–1552. The outputs of each of the six XOR gates 1547–1552 are all ANDed together by a 6-input AND gate 1553, the output of which is the PPASS signal (which indicates that the window under test has passed the Polygon Intersection test). The function of XOR gates 1547–1552 is to reverse the inequality sign of the comparison implemented by Comparators 1541–1546, depending upon the orientation of the interior direction of the node projection with respect to the corresponding edge being compared (as discussed previously). The other input of each of the XOR gates is connected to one of three outputs ID0–ID2 of a Interior Direction Register 1554 (shown in FIG. 42) which is loaded by the Initializing Controller block 160 of FIG. 15 at the start of each new image generation with three single-bit values, each of which respectively indicate the interior direction of the node projection for each of edges D0, D1 and D2.

The PI Test Arithmetic block 1540 also comprises Binary Adders 1555 and 1556 to generate the following values:

| | |
|---|---|
| $ND_1 = NCD0$ | $WD_1 = WCD0 + WD0OFF(WNUM)$ |
| $ND_2 = NCD2$ | $WD_2 = WCD2 + WD2OFF(WNUM)$ |
| $ND_3 = NCD1$ | $WD_3 = WCD1 + WD1OFF(WNUM)$ |
| $ND_4 = NCD0 + NDIAG0$ | $WD_4 = WD_1 + WDIAG0$ |
| $ND_5 = NCD2 + NDIAG2$ | $WD_5 = WD_2 + WDIAG2$ |
| $ND_6 = NCD1 + NDIAG1$ | $WD_6 = WD_3 + WDIAG1$ |

In the preferred embodiment of the present invention, XOR gate 1547 (connected to the output of the Comparator 1541 comparing $WD_1$ with $ND_1$) and XOR gate 1550 (not shown, connected to the output of the comparator 1544 (also not shown) comparing $ND_4$ with $WD_4$) have an input connected to the output ID0 of the Interior Direction Register 1554 (which is asserted when the half-plane defined by edge D0 of the current node projection lying below the edge contains the interior of the node projection), XOR gates 1549 and 1552 (not shown, connected to comparators 1543 and 1546 comparing $ND_3$ with $WD_3$ and $ND_6$ with $WD_6$, respectively) each have an input connected to the output ID1 of the Interior Direction Register 1554 (which is asserted when the half-plane defined by the line passing through the edge D1 to the left of line D1 contains the interior of the node projection) and XOR gates 1548 and 1551 (not shown, connected to comparators 1542 and 1545 comparing ND2 with WD2 and ND5 with WD5) are connected to an output ID2 of the Interior Direction Register 1554 (which is asserted when the half-plane defined by a line extending through edge D2 of the node projection and lying below edge D2 contains the interior of the node projection).

Figure 46:
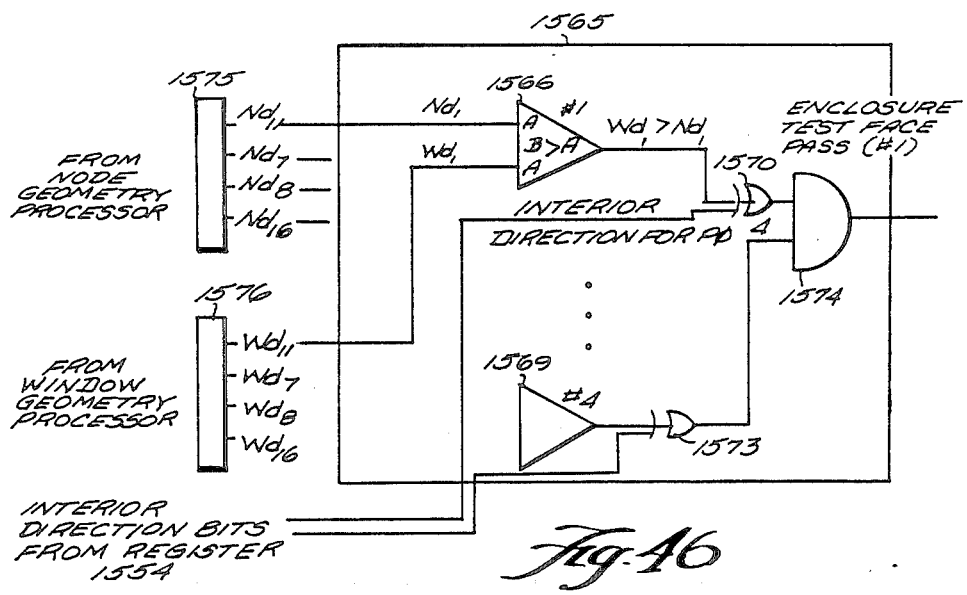
FIG. 46 is a schematic diagram of a one of the Face Arithmetic blocks shown in FIG. 42 (used to perform the E test on one of the three faces of a node projection)

Referring to FIG. 46, shown is a schematic diagram of one of blocks 1565 of the E Test Arithmetic block 1560 shown in FIG. 42 (i.e. the block which performs the enclosure test for face #3 of the node projection shown in FIG. 12). The E Test Arithmetic block 1560 performs the enclosure test simultaneously for each of the three faces of the node projection with respect to a given window under test. Magnitude Comparators 1566, 1567, 1568 and 1569 assert an output if WD11>ND11, WD7 >ND7, WD8<ND8 and WD16<ND16, respectively. The output of each of Comparators 1566–1569 are connected to an input of 2-input XOR gates 1570–1573, the other input of which is connected to one of three outputs of Interior Direction Register 1554 (shown in FIG. 42). The purpose of XOR gates 1570–1573 is to permit the direction of the inequality sign of each of the comparisons performed by Comparators 1566–569 depending upon the orientation of the various edges with respect to the interior of the face of the node projection.

Arithmetic Blocks 1575 and 1576 (suitably comprised of binary Adders, not shown) calculate the following values for the duplication of the Arithmetic Block 1565 for Face #3 of the node projection:

| | |
|---|---|
| $Nd11 = NCD0$ | $Wd11 = WCD0 + W0OFF(WNUM) + WDIAG0$ |
| $Nd8 = NCD0 + FDIAG0$ | $WD8 = WCD0 + W0OFF(WNUM)$ |
| $Nd7 = NCD1 + FDIAG1$ | $WD7 = WCD1 + W1OFF(WNUM) + WDIAG1$ |
| $Nd16 = NCD1 + NDIAG1$ | $WD16 = WCD1 + W1OFF(WNUM)$ |

From the geometric diagram shown in FIG. 12, 21(A)–21(F), and FIGS. 23(A)–23(E), those skilled in the art will be able to calculate the equations to be implemented by the duplications of Arithmetic Blocks 1575 and 1576 for the other two faces of the node projection.

Window Writer

Referring to FIGS. 47(A)–(B), shown is a schematic diagram of the Window Writer block 1400 shown in FIG. 25. The function of the Window Writer is to paint all of the pixels on the Image Display block 154 of FIG. 15 corresponding to a window in the quadtree for which the Cycle Results block 1500 has issued a PAINT signal. The Image Display block 154 is addressed on the pixel level. Thus, the Window Writer block 1400 must convert the values describing the origin of the window to be painted (WPX, WPY, the WBITS and WNUM) together with WLEV (which determines the size of the window to be painted) into addresses of adjacent pixels of the Image Display block 154 corresponding the area occupied by the window to be painted.

Adders 1402, 1404 and 1406 are cascaded to generate the X' coordinate value of the origin of the window to be painted as (W3×3X+WPX)+W2×2X+WNUM (LSB), as is shown in FIGS. 6(D)–(F). Likewise, Adders 1408, 1410 and 1412 compute the Y' coordinate value of the origin of the window to be painted as (W3×3Y+WPY)+W2×2Y+WNUM (MSB). These values are shifted by Barrel Shifters 1414 and 1416, respectively. The shift select inputs of both of Barrel Shifters 1414 and 1416 (i.e. the inputs which control the number of places shifted) are connected to WLEV, which indicates the level in the quadtree at which the current window is located. The function of Barrel Shifters 1414 and 1416 are thus to convert the address of the origin of the window to be painted to an appropriate pixel location on the Image Display block 154 (Barrel Shifters 1414 and 1416 shift the address of the window at the bottom level of the quadtree zero places, a window at the next to bottom level of the quadtree one place, etc.).

The output of Barrel Shifter 1414 is connected to the input of a programmable counter 1418, while the output of Barrel Shifter 1416 is connected to the input of a programmable counter 1420. A Register 1422 and a Register 1424 are each loaded with the value e, the size of the window to be painted.

Counter 1418 is sequentially incremented by one through all values from its starting value to its starting value +e, thus addressing every pixel in the Image Display block 154 on the bottom row of the area of the Image Display to be painted. At that point, the Counter Control block 1426 increments counter 1420 by one, and loads counter 1418 to its starting value again. Counter 1418 once again is incremented from its starting value to its starting value +e, thus addressing every pixel in the second row from the bottom of the area of the Image Display block 154 corresponding to the window to be painted. This process continues, where counter 1420 is held at a constant value while counter 1418 is incremented through every address in a row of an area to be painted, following which counter 1420 is incremented by one, counter 1418 is loaded to its initial value and is once again incremented to another row, until counters 1418 and 1420 both contain their initial values +e (indicating that the entire area of the Image Display block 154 to be painted has been addressed). Once this occurs, the window has been completely painted on the Image Display block 154, and a signal (not shown) is sent to the Sequence Controller block 1600 (of FIG. 25) indicating the painting process is complete.

The output of a MUX 1428 is sent to the Image Display block 154 (along with the outputs of counters 1418 and 1420), which provides information concerning color of the pixels to be painted. MUX 1428 selects between the outputs of three registers, the FACE1 Register 1430, the FACE2 Register 1432 and the FACE3 Register 1434, which are loaded by the Initializing Controller block 160 before the start of each image generation to contain a different color and intensity value (suitably 24 bits wide comprising 8 bits each for red, green and blue) for each of the three faces of a given node projection.

The select input of MUX 1428 is connected to the FACE NUMBER output generated by the Cycle Results box 1500 to select the color of the pixels to be painted depending upon which face of the current node projection the window to be painted is enclosed by. As mentioned previously, providing different colors and intensities for the projections of the different faces of the node projection adds three-dimensional realism to the final image.

It will be understood by those skilled in the art that the color of pixels to be painted could be affected by factors other than just the FACE NUMBER (such as property value information other than the P or F property value of the current node) to permit object nodes corresponding to sections of the object having different densities to be painted different colors.

The presently preferred embodiment provides an optional enhancement to the generated image by "anti-aliasing" pixels when painting windows at level 9 (the bottom) of the quadtree. Rather than having windows at level 9 of the quadtree correspond one-to-one with pixels of the Image Display block 154, the presently preferred embodiment in fact optionally addresses the Image Display as a 256×256 array of pixels (each representing four "subpixel" cells, corresponding to four of the lowest level windows in the quadtree). To paint a level 9 quadtree window, one-fourth of the window-intensity value is summed (instead of written) into the associated Image Display pixel. Of course, the Image Display must be cleared before the image generation process begins. Additional "levels" of anti-aliasing can be performed (one pixel can be summed into by 4 level 8 quadtree windows or 16 level 9 windows, for example).

The purpose of anti-aliasing is to average sets of pixels into single pixels (4 to 1 in this case) so as to reduce the 2-D spatial frequency components of the image. Edges of objects then appear as lines or curves rather than as staircases. Surfaces also appear smoother. The result is an image which is more pleasing to the human eye. When implemented as described above, anti-aliasing is carried on only when writing windows of level 9 in the quadtree.

Sequence Controller

Figure 48:
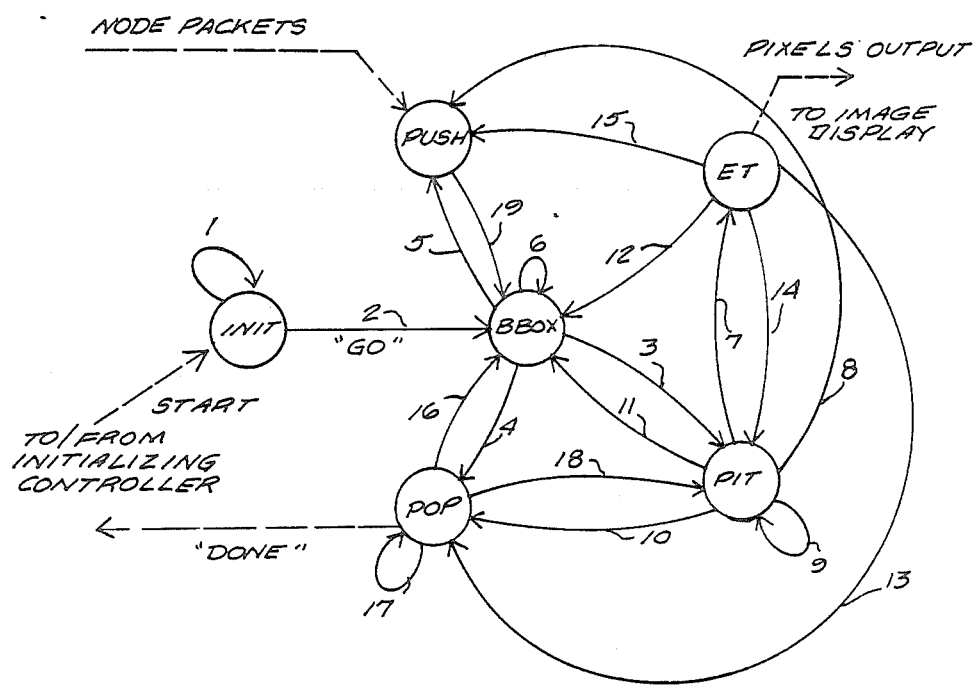
FIG. 48 is a state diagram illustrating the functional operation of the Sequence Controller block shown in FIG. 25.

Referring to FIG. 48, shown is a state diagram of the Sequence Controller block 1600 of FIG. 25. The function of Sequence Controller block 1600 is to provide signals to control the sequence of events occurring in the Image Display Processor block 152, and thus to directly to control the operation of each of the blocks in the Image Display Processor.

It will be understood by those skilled in the art that a considerable number of timing problems involving the sequence of operation of all of the various components of a digital logic device of this complexity result during implementation which must be solved in order to ensure that proper values are calculated and reach their destination before they are required. It will likewise be understood that the speed of operation of the various components used to implement the digital logic device determine the speed at which it may operate. Since many of these design choices are entirely arbitrary and well within the capabilities of those skilled in the art, they are not discussed in this application.

The Image Display Processor block 152 in the preferred embodiment of the present invention is implemented as a finite-state synchronous sequential circuit having eight states: NPUSH, WPUSH, BBOX, PIT, ET, NPOP and WPOP. Referring to FIG. 48, only six states are shown, because the PUSH state is actually divided into a WPUSH and a NPUSH position, while the POP state is actually divided into a NPOP and WPOP position. If the Image Display Processor block 170 is either in the WPUSH or the NPUSH or both, the processor is said to be in the POP state; likewise, if the Image Display Processor block 170 is either in the NPOP or the WPOP state or both, it is said to be in the POP state.

The Initializing Controller block 160 (of FIG. 15) starts the operation of the Image Display Processor block 152 by sending a start signal which forces the machine into the INIT state. The INIT state continues to loop upon itself through path 1 so long as the signal GO (which is asserted when the Initializing Controller block 160 has completed generating the values of all of the appropriate node and window geometry values and initializes the Image Display Processor block 160 with those values) is unasserted. When the GO signal is asserted, the machine changes state along path 2 and enters the BBOX state.

There are five state transition paths from the BBOX state; the machine will traverse one of these five paths depending upon the results of the BBOX test. Whenever the size of the current windows is smaller than the size of the Display Screen and one of the four windows in the current window overlay passes the BBOX test, the PI test is to be performed on the first window in the quadtree traversal sequence which passed. Path 3 is traversed to the PIT state.

Path 4: state transition path 4 is traversed to perform a NPOP and/or a WPOP. If all of the windows in the current window overlay fail the BBOX test, the machine is in lockstep (meaning that the node and window levels are the same, as discussed previously) and there are no non-E nodes remaining in the current node packet, a NPOP is performed. Likewise, if the size of the current windows is equal to or greater than the size of the Display Screen and the projection of the current node does not intersect the Display Screen (i.e. the screen intersection test has failed) and no nodes remain in the current node packet, a NPOP is likewise performed. When the current window size is less than the size of the Display Screen, and all of the windows in the current window overlay fail the BBOX test and there are no nodes remaining in the current node packet, a WPOP is performed. Finally, when the size of the current window is less than the size of the Display Screen and all of the current windows in the window overlay fail the BBOX test and the machine is not in lockstep (meaning that the node level is not the same as the window level, i.e. that a full node has been encountered and the windows that intersect it have been further subdivided to locate which windows are fully enclosed by that full node) a WPOP must be performed.

Path 5: Path 5 is traversed from the BBOX state to the PUSH state, and must also be separated into a WPUSH and a NPUSH. Path 5 is traversed from the BBOX state to the PUSH state to perform a NPUSH whenever the size of the current windows is equal to or greater than the size of the Display Screen and the Display Screen intersects the current node projection (i.e. the screen intersection test is passed). A WPUSH is also performed in the case where the size of the current windows is equal to the size of the Display Screen (i.e. when the windows are at level 0 of the quadtree structure).

Path 6: Path 6 causes the transition of the BBOX state back to the BBOX state. Path 6 is traversed when the size of the current windows is less than the size of the Display Screen, none of the current windows of the window overlay passes the BBOX test, and there are non-Empty nodes left in the current node packet. In this case, the next node (according to the 7-to-0 traversal sequence of the octree) in the current node packet is selected and the BBOX test is performed on it. This path is also traversed when the size of the current windows is equal to or greater than the size of the Display Screen, the screen intersection test fails and there are nodes remaining in the current node packet.

Once the machine is in the PIT state, it performs the polygon intersection test for one of the windows in the current window overlay as discussed previously. It may exit the PIT state through paths 7, 8, 9, 10 or 11.

Path 7. Path 7 causes a change of state from the PIT state to the ET state; this occurs in one of two cases. Path 7 is traversed whenever the PI test is passed, the current node is F, the current window is E, and the machine is not in lockstep (i.e. the node level does not equal the window level because windows have been subdivided to find those windows which intersect the Full node). The other case is when the PI test is passed and the current window is at the very bottom level of the quadtree (so that it cannot be further subdivided). Note that the ET state (which performs the enclosure test) is only performed on F nodes because P nodes must be further subdivided before they can be so processed (recall that those windows enclosed by a Full node only are painted). Likewise, the ET state is only entered if the current window is E because P windows must be further subdivided while F windows are discarded (since only E windows are ever painted).

Path 8. Path 8 is traversed to change the machine from state PIT to the PUSH state. Path 8 is traversed to cause a NPUSH whenever the PI test is passed and either: the current node is P; or the current node is F, the windows in the window overlay for the current node projection are not at the bottom level of the quadtree and the current node is intersected by a cut plane; in this case, the current node must be subdivided. Path 8 is traversed to cause a WPUSH when the PI test is passed and the current window is P (to subdivide the window). Likewise, path 8 is traversed to cause a WPUSH if the PI test is passed and the machine is in lockstep (i.e. node level equals window level) and the window level is not at the bottom level of the quadtree; the ET state is never entered when the machine is in lockstep because in this condition the current window is by definition larger than the current node projection (even though the current window may intersect the current node projection, it cannot enclose the node).

Path 9. When path 9 is traversed, the machine changes from the PIT state back to the PIT state. This occurs whenever a PI test fails but there are still windows remaining in the current window overlay; in this case, the next window in the window overlay (according to the quadtree traversal sequence) is obtained and the PI test is peformed on it.

Path 10. Path 10 changes the state from the PIT state to the POP state. A NPOP is performed whenever the PI test fails, there are no windows remaining in the current window overlay, there are no non-E nodes remaining in the current node packet and the machine is in lockstep (in this case a WPOP is also performed). A WPOP (without a NPOP) is performed when the current window fails the PI test, there are no windows remaining in the current window overlay and the machine is not in lockstep (meaning that the windows have been subdivided below the node level to locate those windows enclosed by a Full node).

Path 11. Path 11 is traversed from the PIT state to the BBOX state when the PI test fails, there are no windows remaining in the current window overlay, there are non-E nodes remaining in the current node packet and the machine is in lockstep.

Once the machine is in the ET state, it performs the enclosure test for one of the windows in the current window overlay, as discussed previously. It may exit the ET state through paths 12, 13, 14 and 15.

Path 12: Path 12 causes the machine to go from the ET state to the BBOX state. The machine traverses path 12 whenever the current window passes the E test (and is painted), the current node projection is at the bottom level of the quadtree, and there are non-E nodes remaining in the current node packet; since, at most, only one window in the current window overlay can be enclosed by the current node projection (guaranteed to be true when the node is at the bottom level of the octree), processing of that node is complete, and the remaining nodes in the current node packet must be processed. Path 12 is also traversed if the E test is failed, the current node projection is at the bottom level of the quadtree (which also means that the current window level is at the bottom of the quadtree), there are no windows remaining in the current window overlay to be processed, and there are nodes remaining in the current node packet to be processed; in this case, likewise, the next node is to be obtained.

Path 13. Path 13 is traversed from the ET state to the POP state to perform a NPOP whenever the E test is passed, the current node projection level is at the bottom level of the quadtree, and no nodes remain in the current node packet; processing of that subdivision of the octree is complete (again remembering that at most, one window can be enclosed by a node at the bottom level of the octree), and the next level up of the octree must be traversed. Path 13 is traversed to cause a NPOP also whenever the E test fails, the current node is at the bottom level of the octree, there are no windows remaining to be processed in the current window overlay, and there are no nodes in the current node packet left to be processed. In these two cases, a WPOP is also performed (that is, Path 13 is traversed to cause a WPOP and a NPOP whenever the E test passes, the current node is at the bottom level of the octree, and no nodes remain in the current node packet). Path 13 is also traversed to cause both a NPOP and a WPOP whenever the E test fails, the current node is at the bottom level of the octree, and there are neither any windows to be processed in the current window overlay nor any nodes left to be processed in the current node packet. Path 13 is traversed to cause a WPOP whenever the E test is passed and there are no windows remaining to be processed in the current window overlay. Likewise, path 13 is traversed to cause a WPOP whenever the E test fails, the current window level is at the bottom of the quadtree, no windows remain to be processed in the current window overlay, and the current node is at the bottom level of the octree.

Path 14. Path 14 is traversed to cause the machine to change from the ET state to the PIT state in one of two cases. First, whenever the E test passes, the current node is not at the bottom level of the octree, and there are windows remaining to be processed in the current window overlay (recall that while the BBOX test is performed on all four windows in the window overlay simultaneously, the PI and E tests are performed sequentially on individual windows in the overlay). Path 14 is also traversed when the E test fails, the current level is at the bottom of the quadtree, and windows remain in the current window overlay to be processed (the current window cannot be further subdivided because it is at the bottom level, so no action is taken and the next window to be processed is obtained).

Path 15. Path 15 is traversed to cause the machine to change from the ET state to the WPUSH state whenever the E test has failed and the window level is not at the bottom level of the quadtree. This condition occurs when the machine subdivides windows but not nodes (i.e. goes below lockstep).

The POP state may be exited via paths 16, 17 and 18.

Path 16. Path 16 is traversed to change the state from a NPOP to a BBOX state whenever there is a node remaining in the current node packet. Path 16 is also traversed when a WPOP but not a NPOP was performed, there are no windows remaining in the current window overlay, there are nodes remaining in the current node packet and the machine is in lockstep.

Path 17. Path 17 is traversed to remain in the POP state in four cases. First, path 17 is traversed whenever a NPOP is performed and the new current node packet has no non-Empty nodes remaining in it; in this case, a second NPOP is immediately performed. Path 17 is also traversed when a NPOP was just performed, the new current node packet has no non-Empty nodes remaining in it and the window level is below the screen level; in this case, a second NPOP and WPOP are performed. Path 17 is traversed when a WPOP was just performed, there are no non-Full windows in the new window overlay, there are no non-Empty nodes in the new current node packet, and the processor is in lockstep; in this case, both a NPOP and WPOP are performed. Finally, path 17 is traversed when a WPOP was just performed, the machine is not in lockstep and there are no nonFull windows remaining in the new window overlay; in this case, a second WPOP is performed to look for windows yet to be processed.

Path 18. Path 18 is traversed to change the state of the machine from a POP state to the PIT state. This occurs when a WPOP was performed without a NPOP and there are windows remaining in the current window overlay; before the window packet just POPed was PUSHed, the BBOX test had been performed on all four windows in the window overlay, so that the only windows remaining are those which had passed the BBOX test. To continue processing this overlay where processing was left off requires the PI test next be performed on the next window remaining in the overlay (according to the quadtree traversal sequence).

Path 19: Path 19 is traversed to change the state of the machine from a PUSH state to the BBOX state. This path is always traversed (without condition) at the end of a PUSH cycle.

The state transitions described above for the State Transition Diagram shown in FIG. 48 may be summarized in the following State Transition Table:

The following definitions apply to the logic variables used in the State Transition Table:

| | |
|---|---|
| BELOW | True if the node level (NLEV) is below the screen level (quadtree level 0) and above or equal to the bottom level of the quadtree (level 9). |
| BFAIL | True if none of the windows in the window overlay passed the BBOX test. |
| BPASS | True if any of the windows in the window overlay passed the BBOX test. |
| EFAIL | True if an Enclosure Test fails. |
| EPASS | True if an Enclosure Test passes. |
| GO | True when the Initialization Controller block 160 has completed initializing the Image Display Processor. |
| INT | True if one of the cut planes intersects the current node. |
| LOCKSTEP | True if the window level (WLEV) is equal to the Node Level (NLEV). |
| NFULL | True if the current node is Full. |
| NPART | True if the current node is Partial. |
| NREM | True if there are either Partial or |

TABLE V

| # | From | → | To | Condition |
|---|---|---|---|---|
| 1. | INIT | → | INIT: | $\overline{\text{GO}}$ |
| 2. | INIT | → | BBOX: | GO |
| 3. | BBOX | → | PIT: | (BELOW.BPASS) |
| 4a. | BBOX | → | NPOP: | (BELOW.BFAIL.LOCKSTEP.$\overline{\text{NREM}}$) + ($\overline{\text{BELOW}}$).SFAIL.$\overline{\text{NREM}}$) |
| 4b. | BBOX | → | WPOP: | (BELOW.BFAIL.LOCKSTEP.$\overline{\text{NREM}}$) + (BELOW.BFAIL.$\overline{\text{LOCKSTEP}}$) |
| 5a. | BBOX | → | NPUSH: | ($\overline{\text{BELOW}}$.SPASS) |
| 5b. | BBOX | → | WPUSH: | (SCREEN.SPASS) |
| 6. | BBOX | → | BBOX: | (BELOW.BFAIL.LOCKSTEP.NREM) + $\overline{\text{BELOW}}$.SFAIL.NREM) |
| 7. | PIT | → | ET: | (PPASS.NFULL.WEMPTY.$\overline{\text{LOCKSTEP}}$) + (PPASS.WSUBPX) |
| 8a. | PIT | → | NPUSH: | (PPASS.NPART) + (PPASS.INT.$\overline{\text{NSUBPX}}$) |
| 8b. | PIT | → | WPUSH | (PPASS.WPART) + (PPASS.LOCKSTEP.$\overline{\text{WSUBPX}}$) |
| 9. | PIT | → | PIT: | (PFAIL.NREM) |
| 10a. | PIT | → | NPOP: | (PFAIL.$\overline{\text{WREM}}$.$\overline{\text{NREM}}$.LOCKSTEP) |
| 10b. | PIT | → | WPOP: | (PFAIL.$\overline{\text{WREM}}$.$\overline{\text{NREM}}$.LOCKSTEP) + (PFAIL.$\overline{\text{WREM}}$.$\overline{\text{LOCKSTEP}}$) |
| 11. | PIT | → | BBOX: | (PFAIL.$\overline{\text{WREM}}$.NREM.LOCKSTEP) |
| 12. | ET | → | BBOX: | (EPASS.NSUBPX.NREM) + (EFAIL.NSUBPX.$\overline{\text{WREM}}$.NREM) |
| 13a. | ET | → | NPOP: | (EPASS.NSUBPX.$\overline{\text{NREM}}$) + (EFAIL.NSUBPX.$\overline{\text{WREM}}$.$\overline{\text{NREM}}$) |
| 13b. | ET | → | WPOP: | (EPASS.NSUBPX.$\overline{\text{NREM}}$) + (EFAIL.NSUBPX.$\overline{\text{WREM}}$.$\overline{\text{NREM}}$) + (EPASS.$\overline{\text{WREM}}$.$\overline{\text{NSUBPX}}$) + (EFAIL.WSUBPX.$\overline{\text{WREM}}$.NSUBPX) |
| 14. | ET | → | PIT: | (EPASS.$\overline{\text{NSUBPX}}$.WREM) + (EFAIL.WSUBPX.WREM) |
| 15a. | ET | → | NPUSH: | not allowed |
| 15b. | ET | → | WPUSH: | (EFAIL.$\overline{\text{WSUBPX}}$) |
| 16a. | NPOP | → | BBOX: | NREM |
| 16b. | WPOP | → | BBOX: | ($\overline{\text{NPOP}}$.$\overline{\text{WREM}}$.NREM.LOCKSTEP) |
| 17a. | NPOP | → | NPOP: | $\overline{\text{NREM}}$ |
| 17b. | NPOP | → | WPOP: | ($\overline{\text{NREM}}$.BELOW) |
| 17c. | WPOP | → | NPOP: | ($\overline{\text{NPOP}}$.$\overline{\text{WREM}}$.LOCKSTEP.$\overline{\text{NREM}}$) |
| 17d. | WPOP | → | WPOP: | ($\overline{\text{WREM}}$.$\overline{\text{LOCKSTEP}}$) + ($\overline{\text{NPOP}}$.$\overline{\text{WREM}}$.LOCKSTEP.$\overline{\text{NREM}}$) |
| 18a. | NPOP | → | PIT: | not allowed |
| 18b. | WPOP | → | PIT: | ($\overline{\text{NPOP}}$.NREM) |
| 19a. | NPUSH | → | BBOX | Always |
| 19b. | WPUSH | → | BBOX | Always |

| | -continued |
|---|---|
| | Full nodes left to be processed in the current node packet. |
| NSUBPX | True if the window overlay for the current node projection comprises windows at the bottom level of the quadtree. |
| PFAIL | True if a Polygon Intersection Test failed. |
| PPASS | True if a Polygon Intersection Test passed. |
| SCREEN | True if the window overlay for the current node projection is composed of windows each of which are of the size equal to the Display Screen. |
| SFAIL | True if a Screen Intersection Test failed. |
| SPASS | True if a Screen Intersection Test passed. |
| WEMPTY | True if the current window is Empty. |
| WPART | True if the current window is Partial. |
| WREM | True if windows remain to be processed in the current window overlay. |
| WSUBPX | True if the current window level is at the bottom level of the quadtree. |

Figure 49:
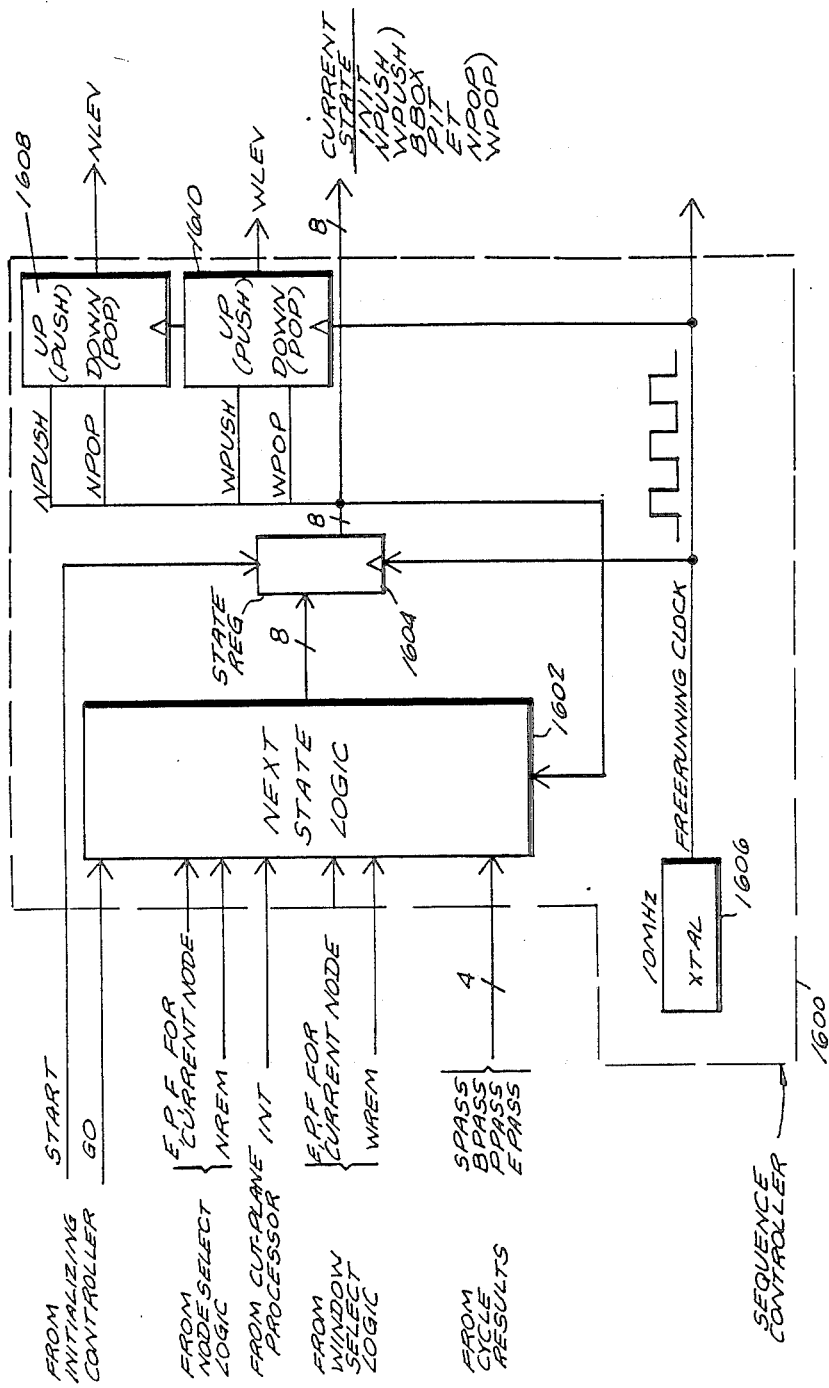
FIG. 49 is a schematic diagram of the Sequence Controller block shown in FIG. 25.

Referring to FIG. 49, shown is a schematic diagram of the Sequence Controller block 1600 of the presently preferred embodiment of the present invention. The Sequence Controller comprises a Next State Logic block 1602 (suitably comprising a combinational logic array), a State Register 1604 and a System Clock Oscillator 1606 (suitably a crystal-controlled oscillator). The contents of the State Register 1604 is the current state of the Image Display Processor block 152, suitably encoded into an 8-bit binary value so that one output line is asserted for each of the eight states. The State Register 1604 is continuously clocked by the output from the System Clock 1606 (which also is connected to the rest of the Image Display Processor block). The output of the State Register 1604 is connected to the various blocks of the Image Display Processor block 152, and controls the sequence of events in the Image Display Processor.

The output of the State Register block 1604 is also connected to the input of the Next State Logic block 1602 (since the next state to be stored in the State Register is determined in part by the present state). Also applied as inputs to the Next State Logic block 1602 are all of the signals used in the State Transition table. While some of these signals have not been previously discussed individually, those skilled in the art could readily derive them from the signals that have been discussed using simple logic operations.

It will be understood by those skilled in the art that given the State Transition Diagram of FIG. 48 and the State Transition Table (Table V), the outputs of the Next State Logic block 1602 as a function of the inputs of that block are completely described (except for the arbitrary assignment of binary values to encode the various states). Moreover, while the Next State Logic block 1602 is implemented as a combinational logic array in the preferred embodiment of the present invention to increase speed of operation, other implementations, such as a ROM (where the inputs address the ROM in the information stored in each location in the ROM is the next state), a microprocessor, or any other group of hardware which implements the State Transition Diagram of FIG. 48 and the State Transition Table V may be employed.

While the invention has been described in connection with what is presently considered to be the most practical and preferred embodiment, it is to be understood that the invention is not to be limited to the disclosed embodiments but on the contrary, it is intended to cover various modifications and equivalent arrangements included within the scope and spirit of the appended claims which scope is to be accorded the broadest interpretation so as to encompass all such modifications and equivalent structures.

```
      APPENDIX A:   OCTREE DATA CONVERSION SOFTWARE
C
C  COPYRIGHT 1983, MEAGER SOFTWARE LIMITED, LOUDONVILLE, NEW YORK
C
C  THE ARGUMENTS ARE AS FOLLOWS:
C     SCANS  - (I*4) NUMBER OF SCANS TO PROCESS
C     LOOKUP - (I*2) ARRAY OF 4095 VALUES FOR CONVERTING GRAY SCALE IMAGE
C              VALUES INTO BINARY. ENTRIES SHOULD BE 0 FOR E NODES, 2 FOR F NODES
C              & 3 FOR F2 NODES. THE POSSIBLE GRAY SCALE VALUES RANGE FROM 0 TO 4095
C              A GRAY SCALE VALUE OF 0 IS NOT REPRESENTED IN THE TABLE. IT IS
C              AUTOMATICALLY CONVERTED TO AN E NODE. ALL OTHER VALUES GO THROUGH
C              THE LOOKUP TABLE.
C
       EQUIVALENCE(OUTBUF,NODES)
       INTEGER*4 OUTBUF(15000)
       INTEGER*2 NODES(30000)
C
C  OFFSETS WILL BE PUT INTO 'OUTBUF' (I*4). THE NODE PACKETS WILL BE
C  MAPPED INTO 'NODES' (I*2) (USE ONLY ODD ENTRIES)
C
       INTEGER*2 VALUE8(256,256,4)
       INTEGER*2 VALUE7(128,128,4),ADDRS7(128,128,4)
       INTEGER*2 VALUE6(64,64,4),ADDRS6(64,64,4)
       INTEGER*2 VALUE5(32,32,4),ADDRS5(32,32,4)
       INTEGER*2 VALUE4(16,16,4),ADDRS4(16,16,4)
       INTEGER*2 VALUE3(8,8,4),ADDRS3(8,8,4)
       INTEGER*2 VALUE2(4,4,4),ADDRS2(4,4,4)
       INTEGER*2 VALUE1(2,2,2),ADDRS1(2,2,2)
C
C
C
```

```
      INTEGER*4 SCANS
      INTEGER*2 LOOKUP(4096),END,NODPAK,ALLE,ALLF,ALLF2
      INTEGER*2 TOP,BOT
C
      COMMON/COM0/OUTBUF
      COMMON/COM1/VALUES
      COMMON/COM2/VALUE7,ADDRS7
      COMMON/COM3/VALUE6,ADDRS6,VALUE5,ADDRS5,VALUE4,ADDRS4
C
      DATA MAXBUF/15000/
      DATA ALLE/0/
      DATA ALLF/:125252/
      DATA ALLF2/:177777/
C
C  NEXT IS THE NEXT AVAILABLE OUTPUT NODE PACKET LOCATION (START AT BOTTOM)
C
      NEXT=MAXBUF
      BOT=MAXBUF
      END=0
      ISCAN=0
C
      L1=1
      IF(END.EQ.0) GO TO 199
      DO 120 I=1,2
      DO 120 II=1,2
      VALUE1(I,II,2)=0
120   CONTINUE
      GO TO 100
199   CONTINUE
      DO 200 L2=1,3,2
      IF(END.EQ.0) GO TO 299
      DO 220 I=1,4
      DO 220 II=1,4
      DO 220 III=3,4
      VALUE2(I,II,III)=0
220   CONTINUE
      GO TO 200
299   CONTINUE
C
      DO 300 L3=1,3,2
      IF(END.EQ.0) GO TO 399
      DO 320 I=1,8
      DO 320 II=1,8
      DO 320 III=3,4
      VALUE3(I,II,III)=0
320   CONTINUE
      GO TO 300
399   CONTINUE
C
      DO 400 L4=1,3,2
      IF(END.EQ.0) GO TO 499
      DO 420 I=1,16
      DO 420 II=1,16
      DO 420 III=3,4
      VALUE4(I,II,III)=0
420   CONTINUE
      GO TO 400
499   CONTINUE
C
      DO 500 L5=1,3,2
      IF(END.EQ.0) GO TO 599
      DO 520 I=1,32
      DO 520 II=1,32
      DO 520 III=3,4
      VALUE5(I,II,III)=0
520   CONTINUE
      GO TO 500
599   CONTINUE
C
      DO 600 L6=1,3,2
      IF(END.EQ.0) GO TO 699
      DO 620 I=1,64
      DO 620 II=1,64
      DO 620 III=3,4
      VALUE6(I,II,III)=0
620   CONTINUE
      GO TO 600
699   CONTINUE
C
      DO 700 L7=1,3,2
      IF(END.EQ.0) GO TO 799
      DO 720 I=1,128
      DO 720 II=1,128
      DO 720 III=3,4
      VALUE7(I,II,III)=0
720   CONTINUE
      GO TO 700
799   CONTINUE
C
      DO 800 L8=1,4
C
C  LEVEL 8 PROCESSING
C
      ISCAN=ISCAN+1
      IF(ISCAN.LE.SCANS) GO TO 810
C  DONE
      END=1
      DO 820 I=1,256
      DO 820 II=1,256
      VALUE8(I,II,L8)=0
820   CONTINUE
      GO TO 800
C
810   CONTINUE
      CALL RDSCAN(VALUE8(1,1,L8))
C
      DO 830 I=1,256
      DO 830 II=1,256
      IF(VALUE8(I,II,L8).EQ.0) GO TO 830
      VALUE8(I,II,L8)=LOOKUP(VALUE8(I,II,L8))
830   CONTINUE
C
800   CONTINUE
C
C  LEVEL 7 PROCESSING
```

```
C   (THE 4 LEVEL 8 SCANS ARE IN PLACE NOW, GENERATE 2 LEVEL 7 SCANS)
C
      DO 750 I1=1,253,4
      DO 750 I2=1,253,4
      DO 750 I3=1,3,2
      DO 750 I4=1,3,2
      DO 750 I5=1,3,2
C
      IX=I2-I5+3
      IY=I1-I4+3
      IZ=4-I3
C
      NODPAK=VALUES(IX,IY,IZ)
      NODPAK=OR(NODPAK,LS(VALUES(IX+1,IY,IZ),2))
      NODPAK=OR(NODPAK,LS(VALUES(IX,IY+1,IZ),4))
      NODPAK=OR(NODPAK,LS(VALUES(IX+1,IY+1,IZ),6))
      NODPAK=OR(NODPAK,LS(VALUES(IX,IY,IZ+1),8))
      NODPAK=OR(NODPAK,LS(VALUES(IX+1,IY,IZ+1),10))
      NODPAK=OR(NODPAK,LS(VALUES(IX,IY+1,IZ+1),12))
      NODPAK=OR(NODPAK,LS(VALUES(IX+1,IY+1,IZ+1),14))
C
      IX2=(IX+1)/2
      IY2=(IY+1)/2
      IZ2=L7+IZ/2
C
      IF(NODPAK.NE.ALLE) GO TO 755
C
C   ARE ALL E NODES, MARK LEVEL 7 ENTRY AS E (OUTPUT NO NODE PACKET)
C
      VALUE7(IX2,IY2,IZ2)=0
      GO TO 750
755   CONTINUE
C
      IF(NODPAK.NE.ALLF) GO TO 760
C
C   ALL ARE F NODES, MARK LEVEL 7 ENTRY AS F (OUTPUT NO NODE PACKET)
C
      VALUE7(IX2,IY2,IZ2)=2
      GO TO 750
C
760   CONTINUE
      IF(NODPAK.NE.ALLF2) GO TO 765
C
C   ALL ARE F2 FONS, MARK LEVEL 7 ENTRY AS F2 (OUTPUT NO NODE PACKET)
C
      VALUE7(IX2,IY2,IZ2)=3
      GO TO 750
C
765   CONTINUE
C
C   NOT ALL E AND NOT ALL F NODES - OUTPUT A NODE PACKET AND MARK LEVEL
C   7 VALUE AS A P NODE
C
      VALUE7(IX2,IY2,IZ2)=1
      OUTBUF(NEXT)=0
      IADRS=2*NEXT-1
      NODES(IADRS)=NODPAK
      ADDRS7(IX2,IY2,IZ2)=NEXT
      NEXT=NEXT-1
      IF(NEXT.LE.0) GO TO 130
C
750   CONTINUE
C
700   CONTINUE
C
C   LEVEL 6 PROCESSING
C   (THE 4 LEVEL 7 SCANS ARE IN PLACE NOW, GENERATE 2 LEVEL 6 SCANS)
C
      DO 650 I1=1,125,4
      DO 650 I2=1,125,4
      DO 650 I3=1,3,2
      DO 650 I4=1,3,2
      DO 650 I5=1,3,2
C
      IX=I2-I5+3
      IY=I1-I4+3
```

```
      IZ=4-I3
C
      NODPAK=VALUE7(IX,IY,IZ)
      NODPAK=OR(NODPAK,LS(VALUE7(IX+1,IY,IZ),2))
      NODPAK=OR(NODPAK,LS(VALUE7(IX,IY+1,IZ),4))
      NODPAK=OR(NODPAK,LS(VALUE7(IX+1,IY+1,IZ),6))
      NODPAK=OR(NODPAK,LS(VALUE7(IX,IY,IZ+1),8))
      NODPAK=OR(NODPAK,LS(VALUE7(IX+1,IY,IZ+1),10))
      NODPAK=OR(NODPAK,LS(VALUE7(IX,IY+1,IZ+1),12))
      NODPAK=OR(NODPAK,LS(VALUE7(IX+1,IY+1,IZ+1),14))
C
      IX2=(IX+1)/2
      IY2=(IY+1)/2
      IZ2=L6+IZ/2
C
      IF(NODPAK.NE.ALLE) GO TO 655
C
C   ARE ALL E NODES, MARK LEVEL 6 ENTRY AS E (OUTPUT NO NODE PACKET)
C
      VALUE6(IX2,IY2,IZ2)=0
      GO TO 650
655   CONTINUE
C
      IF(NODPAK.NE.ALLF) GO TO 660
C
C   ALL ARE F NODES, MARK LEVEL 6 ENTRY AS F (OUTPUT NO NODE PACKET)
C
      VALUE6(IX2,IY2,IZ2)=2
      GO TO 650
C
660   CONTINUE
      IF(NODPAK.NE.ALLF2) GO TO 665
C
C   ALL ARE F2 FODES, MARK LEVEL 6 ENTRY AS F2 (OUTPUT NO NODE PACKET)
C
      VALUE6(IX2,IY2,I62)=3
      GO TO 650
C
665   CONTINUE
C
C   NOT ALL E AND NOT ALL F NODES - OUTPUT A NODE PACKET AND MARK LEVEL
C   6 VALUE AS A P NODE
C
      VALUE6(IX2,IY2,IZ2)=1
C
C   COMPUTE REL ADDRESS FOR THIS PACKET (FIND FIRST P NODE)
C
      IADRS=0
      IF(VALUE7(IX+1,IY+1,IZ+1).EQ.1) IADRS=ADDRS7(IX+1,IY+1,IZ+1)
      IF(VALUE7(IX,IY+1,IZ+1).EQ.1) IADRS=ADDRS7(IX,IY+1,IZ+1)
      IF(VALUE7(IX+1,IY,IZ+1).EQ.1) IADRS=ADDRS7(IX+1,IY,IZ+1)
      IF(VALUE7(IX,IY,IZ+1).EQ.1) IADRS=ADDRS7(IX,IY,IZ+1)
      IF(VALUE7(IX+1,IY+1,IZ).EQ.1) IADRS=ADDRS7(IX+1,IY+1,IZ)
      IF(VALUE7(IX,IY+1,IZ).EQ.1) IADRS=ADDRS7(IX,IY+1,IZ)
      IF(VALUE7(IX+1,IY,IZ).EQ.1) IADRS=ADDRS7(IX+1,IY,IZ)
      IF(VALUE7(IX,IY,IZ).EQ.1) IADRS=ADDRS7(IX,IY,IZ)
      OUTBUF(NEXT)=IADRS-NEXT
      IF(IADRS.EQ.0) OUTBUF(NEXT)=0
C
      IADRS=2*NEXT-1
      NODES(IADRS)=NODPAK
      ADDRS6(IX2,IY2,IZ2)=NEXT
      NEXT=NEXT-1
      IF(NEXT.LE.0) GO TO 130
C
650   CONTINUE
C
600   CONTINUE
C
C   LEVEL 5 PROCESSING
C   (THE 4 LEVEL 6 SCANS ARE IN PLACE NOW, GENERATE 2 LEVEL 5 SCANS)
C
      DO 550 I1=1,61,4
      DO 550 I2=1,61,4
      DO 550 I3=1,3,2
      DO 550 I4=1,3,2
```

```
      DO 550 I5=1,3,2
C
      IX=I2-I5+3
      IY=I1-I4+3
      IZ=4-I3
C
      NODPAK=VALUE6(IX,IY,IZ)
      NODPAK=OR(NODPAK,LS(VALUE6(IX+1,IY,IZ),2))
      NODPAK=OR(NODPAK,LS(VALUE6(IX,IY+1,IZ),4))
      NODPAK=OR(NODPAK,LS(VALUE6(IX+1,IY+1,IZ),6))
      NODPAK=OR(NODPAK,LS(VALUE6(IX,IY,IZ+1),8))
      NODPAK=OR(NODPAK,LS(VALUE6(IX+1,IY,IZ+1),10))
      NODPAK=OR(NODPAK,LS(VALUE6(IX,IY+1,IZ+1),12))
      NODPAK=OR(NODPAK,LS(VALUE6(IX+1,IY+1,IZ+1),14))
C
      IX2=(IX+1)/2
      IY2=(IY+1)/2
      IZ2=L5+IZ/2
C
      IF(NODPAK.NE.ALLE) GO TO 555
C
C  ARE ALL E NODES, MARK LEVEL 5 ENTRY AS E (OUTPUT NO NODE PACKET)
C
      VALUE5(IX2,IY2,IZ2)=0
      GO TO 550
555   CONTINUE
C
      IF(NODPAK.NE.ALLF) GO TO 560
C
C  ALL ARE F NODES, MARK LEVEL 5 ENTRY AS F (OUTPUT NO NODE PACKET)
C
      VALUE5(IX2,IY2,IZ2)=2
      GO TO 550
C
560   CONTINUE
      IF(NODPAK.NE.ALLF2) GO TO 565
C
C  ALL ARE F2 FODES, MARK LEVEL 5 ENTRY AS F2 (OUTPUT NO NODE PACKET)
C
      VALUE5(IX2,IY2,I52)=3
      GO TO 550
C
565   CONTINUE
C
C  NOT ALL E AND NOT ALL F NODES - OUTPUT A NODE PACKET AND MARK LEVEL
C  5 VALUE AS A P NODE
C
      VALUE5(IX2,IY2,IZ2)=1
C
C  COMPUTE REL ADDRESS FOR THIS PACKET (FIND FIRST P NODE)
C
      IADRS=0
      IF(VALUE6(IX+1,IY+1,IZ+1).EQ.1) IADRS=ADDRS6(IX+1,IY+1,IZ+1)
      IF(VALUE6(IX,IY+1,IZ+1).EQ.1) IADRS=ADDRS6(IX,IY+1,IZ+1)
      IF(VALUE6(IX+1,IY,IZ+1).EQ.1) IADRS=ADDRS6(IX+1,IY,IZ+1)
      IF(VALUE6(IX,IY,IZ+1).EQ.1) IADRS=ADDRS6(IX,IY,IZ+1)
      IF(VALUE6(IX+1,IY+1,IZ).EQ.1) IADRS=ADDRS6(IX+1,IY+1,IZ)
      IF(VALUE6(IX,IY+1,IZ).EQ.1) IADRS=ADDRS6(IX,IY+1,IZ)
      IF(VALUE6(IX+1,IY,IZ).EQ.1) IADRS=ADDRS6(IX+1,IY,IZ)
      IF(VALUE6(IX,IY,IZ).EQ.1) IADRS=ADDRS6(IX,IY,IZ)
      OUTBUF(NEXT)=IADRS-NEXT
      IF(IADRS.EQ.0) OUTBUF(NEXT)=0
C
      IADRS=2*NEXT-1
      NODES(IADRS)=NODPAK
      ADDRS5(IX2,IY2,IZ2)=NEXT
      NEXT=NEXT-1
      IF(NEXT.LE.0) GO TO 130
C
550   CONTINUE
C
500   CONTINUE
C
C  LEVEL 4 PROCESSING
C  (THE 4 LEVEL 5 SCANS ARE IN PLACE NOW, GENERATE 2 LEVEL 4 SCANS)
C
```

```
        DO 450 I1=1,29,4
        DO 450 I2=1,29,4
        DO 450 I3=1,3,2
        DO 450 I4=1,3,2
        DO 450 I5=1,3,2
C
        IX=I2-I5+3
        IY=I1-I4+3
        IZ=4-I3
C
        NODPAK=VALUE5(IX,IY,IZ)
        NODPAK=OR(NODPAK,LS(VALUE5(IX+1,IY,IZ),2))
        NODPAK=OR(NODPAK,LS(VALUE5(IX,IY+1,IZ),4))
        NODPAK=OR(NODPAK,LS(VALUE5(IX+1,IY+1,IZ),6))
        NODPAK=OR(NODPAK,LS(VALUE5(IX,IY,IZ+1),8))
        NODPAK=OR(NODPAK,LS(VALUE5(IX+1,IY,IZ+1),10))
        NODPAK=OR(NODPAK,LS(VALUE5(IX,IY+1,IZ+1),12))
        NODPAK=OR(NODPAK,LS(VALUE5(IX+1,IY+1,IZ+1),14))
C
        IX2=(IX+1)/2
        IY2=(IY+1)/2
        IZ2=L4+IZ/2
C
        IF(NODPAK.NE.ALLE) GO TO 455
C
C  ARE ALL E NODES, MARK LEVEL 4 ENTRY AS E (OUTPUT NO NODE PACKET)
C
        VALUE4(IX2,IY2,IZ2)=0
        GO TO 450
455     CONTINUE
C
        IF(NODPAK.NE.ALLF) GO TO 460
C
C  ALL ARE F NODES, MARK LEVEL 4 ENTRY AS F (OUTPUT NO NODE PACKET)
C
        VALUE4(IX2,IY2,IZ2)=2
        GO TO 450
C
460     CONTINUE
        IF(NODPAK.NE.ALLF2) GO TO 465
C
C  ALL ARE F2 FODES, MARK LEVEL 4 ENTRY AS F2 (OUTPUT NO NODE PACKET)
C
        VALUE4(IX2,IY2,I42)=3
        GO TO 450
C
465     CONTINUE
C
C  NOT ALL E AND NOT ALL F NODES - OUTPUT A NODE PACKET AND MARK LEVEL
C  4 VALUE AS A P NODE
C
        VALUE4(IX2,IY2,IZ2)=1
C
C  COMPUTE REL ADDRESS FOR THIS PACKET (FIND FIRST P NODE)
C
        IADRS=0
        IF(VALUE5(IX+1,IY+1,IZ+1).EQ.1) IADRS=ADDRS5(IX+1,IY+1,IZ+1)
        IF(VALUE5(IX,IY+1,IZ+1).EQ.1) IADRS=ADDRS5(IX,IY+1,IZ+1)
        IF(VALUE5(IX+1,IY,IZ+1).EQ.1) IADRS=ADDRS5(IX+1,IY,IZ+1)
        IF(VALUE5(IX,IY,IZ+1).EQ.1) IADRS=ADDRS5(IX,IY,IZ+1)
        IF(VALUE5(IX+1,IY+1,IZ).EQ.1) IADRS=ADDRS5(IX+1,IY+1,IZ)
        IF(VALUE5(IX,IY+1,IZ).EQ.1) IADRS=ADDRS5(IX,IY+1,IZ)
        IF(VALUE5(IX+1,IY,IZ).EQ.1) IADRS=ADDRS5(IX+1,IY,IZ)
        IF(VALUE5(IX,IY,IZ).EQ.1) IADRS=ADDRS5(IX,IY,IZ)
        OUTBUF(NEXT)=IADRS-NEXT
        IF(IADRS.EQ.0) OUTBUF(NEXT)=0
C
        IADRS=2*NEXT-1
        NODES(IADRS)=NODPAK
        ADDRS4(IX2,IY2,IZ2)=NEXT
        NEXT=NEXT-1
        IF(NEXT.LE.0) GO TO 130
C
450     CONTINUE
C
400     CONTINUE
```

```
C
C  LEVEL 3 PROCESSING
C  (THE 4 LEVEL 4 SCANS ARE IN PLACE NOW, GENERATE 2 LEVEL 3 SCANS)
C
       DO 350 I1=1,13,4
       DO 350 I2=1,13,4
       DO 350 I3=1,3,2
       DO 350 I4=1,3,2
       DO 350 I5=1,3,2
C
       IX=I2-I5+3
       IY=I1-I4+3
       IZ=4-I3
C
       NODPAK=VALUE4(IX,IY,IZ)
       NODPAK=OR(NODPAK,LS(VALUE4(IX+1,IY,IZ),2))
       NODPAK=OR(NODPAK,LS(VALUE4(IX,IY+1,IZ),4))
       NODPAK=OR(NODPAK,LS(VALUE4(IX+1,IY+1,IZ),6))
       NODPAK=OR(NODPAK,LS(VALUE4(IX,IY,IZ+1),8))
       NODPAK=OR(NODPAK,LS(VALUE4(IX+1,IY,IZ+1),10))
       NODPAK=OR(NODPAK,LS(VALUE4(IX,IY+1,IZ+1),12))
       NODPAK=OR(NODPAK,LS(VALUE4(IX+1,IY+1,IZ+1),14))
C
       IX2=(IX+1)/2
       IY2=(IY+1)/2
       IZ2=L3+IZ/2
C
       IF(NODPAK.NE.ALLE) GO TO 355
C
C  ARE ALL E NODES, MARK LEVEL 3 ENTRY AS E (OUTPUT NO NODE PACKET)
C
       VALUE3(IX2,IY2,IZ2)=0
       GO TO 350
355    CONTINUE
C
       IF(NODPAK.NE.ALLF) GO TO 360
C
C  ALL ARE F NODES, MARK LEVEL 3 ENTRY AS F (OUTPUT NO NODE PACKET)
C
       VALUE3(IX2,IY2,IZ2)=2
       GO TO 350
C
360    CONTINUE
       IF(NODPAK.NE.ALLF2) GO TO 365
C
C  ALL ARE F2 FODES, MARK LEVEL 3 ENTRY AS F2 (OUTPUT NO NODE PACKET)
C
       VALUE3(IX2,IY2,I32)=3
       GO TO 350
C
365    CONTINUE
C
C  NOT ALL E AND NOT ALL F NODES - OUTPUT A NODE PACKET AND MARK LEVEL
C  3 VALUE AS A P NODE
C
       VALUE3(IX2,IY2,IZ2)=1
C
C  COMPUTE REL ADDRESS FOR THIS PACKET (FIND FIRST P NODE)
C
       IADRS=0
       IF(VALUE4(IX+1,IY+1,IZ+1).EQ.1) IADRS=ADDRS4(IX+1,IY+1,IZ+1)
       IF(VALUE4(IX,IY+1,IZ+1).EQ.1) IADRS=ADDRS4(IX,IY+1,IZ+1)
       IF(VALUE4(IX+1,IY,IZ+1).EQ.1) IADRS=ADDRS4(IX+1,IY,IZ+1)
       IF(VALUE4(IX,IY,IZ+1).EQ.1) IADRS=ADDRS4(IX,IY,IZ+1)
       IF(VALUE4(IX+1,IY+1,IZ).EQ.1) IADRS=ADDRS4(IX+1,IY+1,IZ)
       IF(VALUE4(IX,IY+1,IZ).EQ.1) IADRS=ADDRS4(IX,IY+1,IZ)
       IF(VALUE4(IX+1,IY,IZ).EQ.1) IADRS=ADDRS4(IX+1,IY,IZ)
       IF(VALUE4(IX,IY,IZ).EQ.1) IADRS=ADDRS4(IX,IY,IZ)
       OUTBUF(NEXT)=IADRS-NEXT
       IF(IADRS.EQ.0) OUTBUF(NEXT)=0
C
       IADRS=2*NEXT-1
       NODES(IADRS)=NODPAK
       ADDRS3(IX2,IY2,IZ2)=NEXT
       NEXT=NEXT-1
       IF(NEXT.LE.0) GO TO 130
```

```
C
350     CONTINUE
C
300     CONTINUE
C
C   LEVEL 2 PROCESSING
C   (THE 4 LEVEL 3 SCANS ARE IN PLACE NOW, GENERATE 2 LEVEL 2 SCANS)
C
        DO 250 I1=1,5,4
        DO 250 I2=1,5,4
        DO 250 I3=1,3,2
        DO 250 I4=1,3,2
        DO 250 I5=1,3,2
C
        IX=I2-I5+3
        IY=I1-I4+3
        IZ=4-I3
C
        NODPAK=VALUE3(IX,IY,IZ)
        NODPAK=OR(NODPAK,LS(VALUE3(IX+1,IY,IZ),2))
        NODPAK=OR(NODPAK,LS(VALUE3(IX,IY+1,IZ),4))
        NODPAK=OR(NODPAK,LS(VALUE3(IX+1,IY+1,IZ),6))
        NODPAK=OR(NODPAK,LS(VALUE3(IX,IY,IZ+1),8))
        NODPAK=OR(NODPAK,LS(VALUE3(IX+1,IY,IZ+1),10))
        NODPAK=OR(NODPAK,LS(VALUE3(IX,IY+1,IZ+1),12))
        NODPAK=OR(NODPAK,LS(VALUE3(IX+1,IY+1,IZ+1),14))
C
        IX2=(IX+1)/2
        IY2=(IY+1)/2
        IZ2=L2+IZ/2
C
        IF(NODPAK.NE.ALLE) GO TO 255
C
C   ARE ALL E NODES, MARK LEVEL 2 ENTRY AS E (OUTPUT NO NODE PACKET)
C
        VALUE2(IX2,IY2,IZ2)=0
        GO TO 250
255     CONTINUE
C
        IF(NODPAK.NE.ALLF) GO TO 260
C
C   ALL ARE F NODES, MARK LEVEL 2 ENTRY AS F (OUTPUT NO NODE PACKET)
C
        VALUE2(IX2,IY2,IZ2)=2
        GO TO 250
C
260     CONTINUE
        IF(NODPAK.NE.ALLF2) GO TO 265
C
C   ALL ARE F2 FODES, MARK LEVEL 2 ENTRY AS F2 (OUTPUT NO NODE PACKET)
C
        VALUE2(IX2,IY2,IZ2)=3
        GO TO 250
C
265     CONTINUE
C
C   NOT ALL E AND NOT ALL F NODES - OUTPUT A NODE PACKET AND MARK LEVEL
C   2 VALUE AS A P NODE
C
        VALUE2(IX2,IY2,IZ2)=1
C
C   COMPUTE REL ADDRESS FOR THIS PACKET (FIND FIRST P NODE)
C
        IADRS=0
        IF(VALUE3(IX+1,IY+1,IZ+1).EQ.1) IADRS=ADDRS3(IX+1,IY+1,IZ+1)
        IF(VALUE3(IX,IY+1,IZ+1).EQ.1) IADRS=ADDRS3(IX,IY+1,IZ+1)
        IF(VALUE3(IX+1,IY,IZ+1).EQ.1) IADRS=ADDRS3(IX+1,IY,IZ+1)
        IF(VALUE3(IX,IY,IZ+1).EQ.1) IADRS=ADDRS3(IX,IY,IZ+1)
        IF(VALUE3(IX+1,IY+1,IZ).EQ.1) IADRS=ADDRS3(IX+1,IY+1,IZ)
        IF(VALUE3(IX,IY+1,IZ).EQ.1) IADRS=ADDRS3(IX,IY+1,IZ)
        IF(VALUE3(IX+1,IY,IZ).EQ.1) IADRS=ADDRS3(IX+1,IY,IZ)
```

```
          IF(VALUE3(IX,IY,IZ).EQ.1) IADRS=ADDRS3(IX,IY,IZ)
          OUTBUF(NEXT)=IADRS-NEXT
          IF(IADRS.EQ.0) OUTBUF(NEXT)=0
C
          IADRS=2*NEXT-1
          NODES(IADRS)=NODPAK
          ADDRS2(IX2,IY2,IZ2)=NEXT
          NEXT=NEXT-1
          IF(NEXT.LE.0) GO TO 130
C
250       CONTINUE
C
200       CONTINUE
C
C   LEVEL 1 PROCESSING
C   (THE 4 LEVEL 2 SCANS ARE IN PLACE NOW, GENERATE SINGLE LEVEL 1 SCAN)
C
          I1=1
          I2=1
          DO 150 I3=1,3,2
          DO 150 I4=1,3,2
          DO 150 I5=1,3,2
C
          IX=I2-I5+3
          IY=I1-I4+3
          IZ=4-I3
C
          NODPAK=VALUE2(IX,IY,IZ)
          NODPAK=OR(NODPAK,LS(VALUE2(IX+1,IY,IZ),2))
          NODPAK=OR(NODPAK,LS(VALUE2(IX,IY+1,IZ),4))
          NODPAK=OR(NODPAK,LS(VALUE2(IX+1,IY+1,IZ),6))
          NODPAK=OR(NODPAK,LS(VALUE2(IX,IY,IZ+1),8))
          NODPAK=OR(NODPAK,LS(VALUE2(IX+1,IY,IZ+1),10))
          NODPAK=OR(NODPAK,LS(VALUE2(IX,IY+1,IZ+1),12))
          NODPAK=OR(NODPAK,LS(VALUE2(IX+1,IY+1,IZ+1),14))
C
          IX2=(IX+1)/2
          IY2=(IY+1)/2
          IZ2=L1+IZ/2
C
          IF(NODPAK.NE.ALLE) GO TO 155
C
C   ARE ALL E NODES, MARK LEVEL 1 ENTRY AS E (OUTPUT NO NODE PACKET)
C
          VALUE1(IX2,IY2,IZ2)=0
          GO TO 150
155       CONTINUE
C
          IF(NODPAK.NE.ALLF) GO TO 160
C
C   ALL ARE F NODES, MARK LEVEL 1 ENTRY AS F (OUTPUT NO NODE PACKET)
C
          VALUE1(IX2,IY2,IZ2)=2
          GO TO 150
C
160       CONTINUE
          IF(NODPAK.NE.ALLF2) GO TO 165
C
C   ALL ARE F2 FODES, MARK LEVEL 1 ENTRY AS F2 (OUTPUT NO NODE PACKET)
C
          VALUE1(IX2,IY2,IZ2)=3
          GO TO 150
C
165       CONTINUE
C
C   NOT ALL E AND NOT ALL F NODES - OUTPUT A NODE PACKET AND MARK LEVEL
C   1 VALUE AS A P NODE
C
          VALUE1(IX2,IY2,IZ2)=1
C
C   COMPUTE REL ADDRESS FOR THIS PACKET (FIND FIRST P NODE)
C
          IADRS=0
          IF(VALUE2(IX+1,IY+1,IZ+1).EQ.1) IADRS=ADDRS2(IX+1,IY+1,IZ+1)
          IF(VALUE2(IX,IY+1,IZ+1).EQ.1) IADRS=ADDRS2(IX,IY+1,IZ+1)
          IF(VALUE2(IX+1,IY,IZ+1).EQ.1) IADRS=ADDRS2(IX+1,IY,IZ+1)
```

```
      IF(VALUE2(IX,IY,IZ+1).EQ.1) IADRS=ADDRS2(IX,IY,IZ+1)
      IF(VALUE2(IX+1,IY+1,IZ).EQ.1) IADRS=ADDRS2(IX+1,IY+1,IZ)
      IF(VALUE2(IX,IY+1,IZ).EQ.1) IADRS=ADDRS2(IX,IY+1,IZ)
      IF(VALUE2(IX+1,IY,IZ).EQ.1) IADRS=ADDRS2(IX+1,IY,IZ)
      IF(VALUE2(IX,IY,IZ).EQ.1) IADRS=ADDRS2(IX,IY,IZ)
      OUTBUF(NEXT)=IADRS-NEXT
      IF(IADRS.EQ.0) OUTBUF(NEXT)=0
C
      IADRS=2*NEXT-1
      NODES(IADRS)=NODPAK
      ADDRS1(IX2,IY2,IZ2)=NEXT
      NEXT=NEXT-1
      IF(NEXT.GT.0) GO TO 115
130   CONTINUE
      WRITE(1,112)
112   FORMAT('ERROR - INSUFFICIENT NODE SPACE - ABORTED')
      GO TO 1000
115   CONTINUE
C
150   CONTINUE
C
100   CONTINUE
C
C  THE LEVEL 1 SCAN IS IN PLACE, OUTPUT NODE PACKET FOR IT
C
      IX=1
      IY=1
      IZ=1
      NODPAK=VALUE1(IX,IY,IZ)
      NODPAK=OR(NODPAK,LS(VALUE1(IX+1,IY,IZ),2))
      NODPAK=OR(NODPAK,LS(VALUE1(IX,IY+1,IZ),4))
      NODPAK=OR(NODPAK,LS(VALUE1(IX+1,IY+1,IZ),6))
      NODPAK=OR(NODPAK,LS(VALUE1(IX,IY,IZ+1),8))
      NODPAK=OR(NODPAK,LS(VALUE1(IX+1,IY,IZ+1),10))
      NODPAK=OR(NODPAK,LS(VALUE1(IX,IY+1,IZ+1),12))
      NODPAK=OR(NODPAK,LS(VALUE1(IX+1,IY+1,IZ+1),14))
C
C  COMPUTE REL ADDRESS FOR THIS PACKET (FIND FIRST P NODE)
C
      IADRS=0
      IF(VALUE1(IX+1,IY+1,IZ+1).EQ.1) IADRS=ADDRS1(IX+1,IY+1,IZ+1)
      IF(VALUE1(IX,IY+1,IZ+1).EQ.1) IADRS=ADDRS1(IX,IY+1,IZ+1)
      IF(VALUE1(IX+1,IY,IZ+1).EQ.1) IADRS=ADDRS1(IX+1,IY,IZ+1)
      IF(VALUE1(IX,IY,IZ+1).EQ.1) IADRS=ADDRS1(IX,IY,IZ+1)
      IF(VALUE1(IX+1,IY+1,IZ).EQ.1) IADRS=ADDRS1(IX+1,IY+1,IZ)
      IF(VALUE1(IX,IY+1,IZ).EQ.1) IADRS=ADDRS1(IX,IY+1,IZ)
      IF(VALUE1(IX+1,IY,IZ).EQ.1) IADRS=ADDRS1(IX+1,IY,IZ)
      IF(VALUE1(IX,IY,IZ).EQ.1) IADRS=ADDRS1(IX,IY,IZ)
      OUTBUF(NEXT)=IADRS-NEXT
      IF(IADRS.EQ.0) OUTBUF(NEXT)=0
C
      IADRS=2*NEXT-1
      NODES(IADRS)=NODPAK
C
1000  CONTINUE
      TOP=NEXT
      CALL PRTREE(NODES,TOP,BOT)
      RETURN
      END
C
C******************************************************* END OF BLOCK *******
OK,
```

APPENDIX B: INITIALIZATION CONTROLLER SOFTWARE

```
C
      SUBROUTINE FTB3B(IOPT,SCALE,ICROT,ISLOC,IOVSIZ,ICOLOR,MINCOL,
     & RERUN)
      IMPLICIT INTEGER (A-Z)
```

```
C
C  THE INPUT ARGUMENTS ARE AS FOLLOWS:
C
C    IOPT - DISPLAY OPTION BITS
C    SCALE(3) - SCALE FACTOR IN X,Y,Z (1.0 FILLS THE 256 BY 256 WINDOW)
C    ANG(3) - VIEW ANGLES
C    ICROT(3) - CENTER OF ROTATION (0 TO 128K)
C    ISLOC(3) - LOCATION IN SCREEN COORDINATE SYSTEM OF CENTER OF ROTATION
C               (64K PLACES THE CENTER OF ROTATION AT THE CENTER OF THE
C               256 BY 256 PIXEL (512 BY 512 SUBPIXEL) WINDOW)
C    IOVSIZ - NODE OVERSIZE VALUE (:20 IS ONE SUBPIXEL WINDOW WIDTH)
C    ICOLOR(A,B) - OBJECT COLOR TABLE. A = OBJECT NUMBER (1 TO 16), B = COLOR
C                  (1 TO 3, 1=RED, 2=BLUE, 3=GREEN)
C                  MAXIMUM INTENSITY (ICOLOR+MINCOL) IS 1024.
C    MINCOL(16,3) - OBJECT MINIMUM COLOR INTENSITY (SAME ARGUMENTS AS ICOLOR).
C                  NOTE: THE COLOR USED FOR DISPLAY IS (COS(A)*ICOLOR+MINCOL)
C                  WHERE A IS THE ANGLE BETWEEN THE FACE NORMAL AND THE
C                  VIEWPOINT.
C
C  THE UNIVERSE IS ASSUMED TO BE 128K CUBED IN SIZE. WITH A SCALE FACTOR OF 1.
C  THE UNIVERSE LOOKED AT END ON FILLS A 512 BY 512 SCREEN. MOST OF THE INITAL
C  PARAMETERS ARE DERIVED FROM THE SIZE OF A CHILD OF THE UNIVERSE SCALED UP B
C  2**8 OR 256.
C
      REAL SCALE(3),ANG(3),CUTNRM(3)
      INTEGER ICROT(3),ISLOC(3),ICOLOR(16,3),MINCOL(16,3)
C
      REAL PROJX(3,4),R(3,3)
      INTEGER KR(3,8),IPROJX(3,4),KDIST(8),KPOINT(3),TMPKPT(3)
      INTEGER KRTEMP(3,8),SCLFAC
      REAL PROJX2(3,4),PROJX3(3,4)
      LOGICAL BELOW,BFAIL,FACEOK
      LOGICAL BPASS,BPASS0,BPASS1,BPASS2,BPASS3,EFAIL,EPASS,LKSTEP
      LOGICAL LSBBOX,LSET,LSINIT,LSKILL,LSPIT,LSPOP,LSPUSH,NFULL
      LOGICAL LSNPSH,LSWPSH,LSNPOP,LSWPOP
      LOGICAL NPART,NREM,NSUBPX,PFAIL,PIGDNE,PPASS,SCREEN,SFAIL
      LOGICAL SPASS,WEMPTY,WPART,WREM,WSUBPX
C
      DIMENSION AX(8),AXPERM(8),AY(8),AYPERM(8),NDOOFF(3),NDOOFP(3),
     1 ND1OFF(3),ND1OFP(3),ND2OFF(3),ND2OFP(3),NPOPS(6),WPOPS(11),
     2 NSTACK(16,6),WDOOFF(4),WD1OFF(4),WD2OFF(4),IEPASS(9),IBPASS(5),
     3 WDOOFP(4),WD1OFP(4),WD2OFP(4),QTREE(21846),QOFF(9),WSTACK(16,11)
C
      COMMON /LOGVAR/ BELOW,BFAIL,FACEOK,
     1 BOTTOM,BPASS,BPASS0,BPASS1,BPASS2,BPASS3,EFAIL,EPASS,LKSTEP,
     2 LSBBOX,LSET,LSINIT,LSKILL,LSPIT,LSPOP,LSPUSH,NFULL,NPART,
     3 NREM,PFAIL,PIGDNE,PPASS,SCREEN,SFAIL,SPASS,WEMPTY,WPART,WREM,
     4 LSNPSH,LSWPSH,LSNPOP,LSWPOP,NSUBPX,WSUBPX
C
      COMMON /INTVAR/ AX,AXPERM,AY,AYPERM,CPROP,NPDO,NPD1,NPD2,NCD0,
     1 NCD1,NCD2,E,FACE,FDAG0P,FDAG1P,FDAG2P,FDIAG0,CNUM,INTDIR,
     2 INTDR0,INTDR1,INTDR2,NSTACK,PCYCLE,IEPASS,IBPASS,
     3 FDIAG1,FDIAG2,NCX,NCY,NDOOFF,NDOOFP,ND1OFF,ND1OFP,ND2OFF,ND2OFP,
     4 NDAG0P,NDAG1P,NDAG2P,NDIAG0,NDIAG1,NDIAG2,NPOPS,NODTOP,NDIV,
     5 NLEV,NODPNT,NPX,NPY,NSPNT,PX,PXPERM,PY,PYPERM,SCLOFF,
     6 SDELT2,SDELTA,W2X2X,W2X2Y,W3X3X,W3X3Y,WDIV,WSPNT
      COMMON/INTVAR/ WCD0,WPD0,WCD1,WPD1,WCD2,WPD2,WDOOFF,WD1OFF,
```

```
      1 WD2OFF,WDOOFP,WD1OFP,WD2OFP,WDAG0P,WDAG1P,WDAG2P,WPOPS,
      2 WDIAG0,WDIAG1,WDIAG2,WLEV,WNUM,WPROP,WPX,WPY,WCX,WCY,WSTACK,
      3 IBBOXS,IBBOXB,IPUSH,IPIT,IET,IPOP,IKILL,IFKILL,IPKILL
C
      COMMON /QDAT/ QTREE,QOFF
C
      INTEGER NKOOFF(8),NKOOFP(8),KSTACK(16),KPOPS
      LOGICAL INT,OK2DSP,KIN,KENABL
      COMMON /CUTVAR/ NKOOFP,NKOOFF,KDAG0P,KDIAG0,NPKO,NCKO,LDIAG0,
     0                KSTACK,KPOPS,INT,OK2DSP,KIN,KENABL
C
      LOGICAL RERUN,REINIT,INTRK
      COMMON /TRACK/ ANG, INTRK
      CHARACTER*1 ICHAR
      REAL A,B,C,D
      REAL S1,S2,S3,C1,C2,C3,T1,T2,T3,T4,ES,SLOPE,DIV,X,Y
C INTENS CONTAINS THE R, G AND B INTENSITY VALUES FOR THE FACES FOR THE OBJEC
C (INTENS(OBJECT,FACE,COLOR))
      INTEGER INTENS(16,3,3)
C
C 'ES' VARIABLE IS 'EDGE SCALED' (256*512)
C
      SCLFAC = LS(1,SCLOFF)
      SCLOV2 = SCLFAC/2
      ES=512.0 * FLOAT(SCLFAC)
      REINIT = .FALSE.
C
1     S1=SIN(ANG(1))
      S2=SIN(ANG(2))
      S3=SIN(ANG(3))
      C1=COS(ANG(1))
      C2=COS(ANG(2))
      C3=COS(ANG(3))
C
C GENERATE COEFFICIENTS OF ROTATION MATRIX (R)
C (INDEX IS ROW,COL)
C
C THE OBJECT COORDINATE SYSTEM IS CHANGED FROM FTB-3A AND BEFORE. A RIGHT
C HANDED SYSTEM IS NOW USED SUCH THAT, IF ALL VIEW ANGLES ARE 0, THE ORIGINS
C MATCH AND A SCALE FACTOR OF 1 IS USED, THE X AND Y AXES OF THE OBJECT MATCH
C THOSE OF THE SCREEN (X TO THE RIGHT, Y UP, WITH THE ORIGIN AT THE LOWER LEF
C OF THE WINDOW). Z IS POSITIVE OUT OF THE SCREEN.
C
C THE VIEW ANGLES ARE SUCH THAT ANGLE 1 MOVES THE VIEWER TO THE RIGHT (POSITI
C X) (RELATIVE TO THE OBJECT) ABOUT THE ROTATION POINT. ANGLE 2 MOVES THE
C VIEWER UP (POSITIVE Y DIRECTION). ANGLE 3 ROTATES THE OBJECT CCW.
C
C THE TRANSFORMATIONS ARE AS FOLLOWS:
C
C    X' = COS(ANG1)*X - SIN(ANG1)*Z
C    Z' = SIN(ANG1)*X + COS(ANG1)*Z
C
C    Y' = COS(ANG2)*Y - SIN(ANG2)*Z
C    Z' = SIN(ANG2)*Y + COS(ANG2)*Z
C
C    X' = COS(ANG3)*X - SIN(ANG3)*Y
C    Y' = SIN(ANG3)*X + COS(ANG3)*Y
C
```

```
C USING Sn = SIN(ANGn) & Cn = COS(ANGn), THE ROTATION MATRICES ARE:
C
C   C1   0  -S1      1   0   0       C3  -S3   0
C    0   1   0   X   0  C2  -S2   X  S3   C3   0
C   S1   0  C1       0  S2  C2        0    0   1
C
C THE CONCATENATED ROTATION MATRIX IS:
C
C    (C1C3-S1S2S3)     (C1S3-S1S2C3)    (S1C2)
C       (-C2S3)            (C2C3)        (S2)
C    (-S1C3+C1S2S3)    (-S1S3-C1S2C3)   (C1C2)
C
C
      T1=S1*S3
      T2=C1*S3
      T3=S1*C3
      T4=C1*C3
C
      R(1,1)=C1*C3+T1*S2
      R(1,2)=-C2*S3
      R(1,3)=-S1*C3+T2*S2
C
      R(2,1)=C1*S3-T3*S2
      R(2,2)=C2*C3
      R(2,3)=-S1*S3-T4*S2
C
      R(3,1)=S1*C2
      R(3,2)=S2
      R(3,3)=C1*C2
C
C GENERATE SCALED OFFSET VALUES
C
      PROJX(1,1)=-SCALE(1)*FLOAT(ICROT(1))
      PROJX(2,1)=-SCALE(2)*FLOAT(ICROT(2))
      PROJX(3,1)=-SCALE(3)*FLOAT(ICROT(3))
C
C PUT INTO REMAINING POINTS
C
      DO 101 I=1,3
      DO 100 II=2,4
        PROJX(I,II)=PROJX(I,1)
100   CONTINUE
101   CONTINUE
C
C ADD IN VERTICES ON AXES
C
      PROJX(1,1)=PROJX(1,1)+SCALE(1)*ES
      PROJX(2,2)=PROJX(2,2)+SCALE(2)*ES
      PROJX(3,3)=PROJX(3,3)+SCALE(3)*ES
C
C ROTATE BY MULTIPLYING BY ROTATION (3 BY 3) MATRIX
C PROJX IS NOT ROTATED (ABSOLUTE)
C PROJX2 IS ROTATED (ABSOLUTE)
C PROJX3 IS ROTATED (RELATIVE TO ORIGIN)
```

```
C
      DO 111 I=1,4
        DO 110 II=1,3
        PROJX2(II,I)=R(II,1)*PROJX(1,I)+R(II,2)*PROJX(2,I)+
     &   R(II,3)*PROJX(3,I)
110     CONTINUE
111   CONTINUE
C
C ROTATED, NOW PUT BACK IN CORRECT LOCATION
C
      DO 121 I=1,4
        DO 120 II=1,3
        PROJX2(II,I)=PROJX2(II,I)+FLOAT(ISLOC(II))
120     CONTINUE
121   CONTINUE
C
C NOW PUT ALL BUT THE ORIGIN (SECOND INDEX = 4) RELATIVE TO THE ORIGIN
C
      DO 131 I=1,3
        PROJX3(I,4)=PROJX2(I,4)
        DO 130 II=1,3
        PROJX3(I,II)=PROJX2(I,II)-PROJX2(I,4)
130     CONTINUE
131   CONTINUE
C
      DO 141 I=1,3
        DO 140 II=1,4
        IPROJX(I,II)=IFIX(PROJX3(I,II))
140     CONTINUE
141   CONTINUE
C
C GENERATE THE 8 POINTS IN THE CUBE (RELATIVE TO THE ORIGIN)
C
      DO 153 N=1,3
        DO 152 I9=1,2
        I=I9-1
          DO 151 J9=1,2
          J=J9-1
            DO 150 K9=1,2
            K=K9-1
            IVAL=I*4+J*2+K+1
            KR(N,IVAL)=K*IPROJX(N,1)+J*IPROJX(N,2)+I*IPROJX(N,3)
            KRTEMP(N,IVAL) = KR(N,IVAL)/SCLOV2
150         CONTINUE
151       CONTINUE
152     CONTINUE
153   CONTINUE
C
C Do calculations for cut plane initialization.
C
      IF (KENABL) THEN
        IF (.NOT.(REINIT.OR.INTRK)) THEN
        WRITE(6,3000) ((KRTEMP(I,J),I=1,3),J=1,8)
3000    FORMAT(' The corners of the universe are:',8(/,3I13),/,
     &         ' Input normal vector, point for cutplane and LDIAG',/,
     &         ' <cr> for default values',/,
     &         ' 1234.1 234.1 234.1 23456 23456 23456 23456' )
        READ(5,3001) (CUTNRM(I),I=1,3),(KPOINT(I),I=1,3),LDIAG0
```

```
3001      FORMAT(3F6.1,4I6)
          IF(CUTNRM(1).EQ.0.0.AND.KPOINT(1).EQ.0.AND.LDIA60.EQ.0) THEN
          WRITE(6,3002)
3002      FORMAT(' Using default values')
          LDIA60 = 40
          CUTNRM(1) = -100.0
          CUTNRM(2) = -100.0
          CUTNRM(3) = -100.0
          KPOINT(1) = ICROT(3)/128
          KPOINT(2) = ICROT(2)/128
          KPOINT(3) = ICROT(1)/128
          ENDIF
222       WRITE(6,2000)
          READ(5,2001) ICHAR
2000      FORMAT(' Display inside or outside the cutplanes? (I or O)')
2001      FORMAT(A1)
          IF (ICHAR.EQ.1HI) KIN =.TRUE.
          IF (ICHAR.EQ.1HO) KIN =.FALSE.
          IF (ICHAR.NE.1HI.AND.ICHAR.NE.1HO) GOTO 222
          LDIA60 = -LDIA60 * SCLOV2
          ENDIF
C Scale the normal vector to the cut-plane
          A = CUTNRM(1) * SCALE(1)
          B = CUTNRM(2) * SCALE(2)
          C = CUTNRM(3) * SCALE(3)
C Scale the point on the cutplane
          TMPKPT(1) = KPOINT(1) * SCALE(1) * SCLOV2
          TMPKPT(2) = KPOINT(2) * SCALE(2) * SCLOV2
          TMPKPT(3) = KPOINT(3) * SCALE(3) * SCLOV2
          D = -(A*TMPKPT(1) + B*TMPKPT(2) + C*TMPKPT(3))
          NRMLYZ = IFIX(SQRT(A*A + B*B + C*C))
C Calculate the perpendicular distances from each corner to the cut-plane
          KMIN = 1
          DO 155 I=1,8
          KDIST(I) = (A*KR(1,I) + B*KR(2,I) + C*KR(3,I) + D)/NRMLYZ
          IF (KDIST(I) .LE. KDIST(KMIN)) KMIN = I
155       CONTINUE
C Calculate the values to be loaded into the PIG
          KMAX = 9 - KMIN
          KDA60P = (KDIST(KMAX) - KDIST(KMIN))/2
          NPKO = KDIST(KMIN)
          DO 157 I=1,8
          NKOOFP(I) = (KDIST(I) - KDIST(KMIN))/2
157       CONTINUE
          ENDIF
C
C DETERMINE VERTEX NUMBERS FOR BBOX MIN AND MAX
C
      IXMIN=1
      IYMIN=1
      IF(IPROJX(1,1).LT.0) IXMIN=2
      IF(IPROJX(1,2).LT.0) IXMIN=IXMIN+2
      IF(IPROJX(1,3).LT.0) IXMIN=IXMIN+4
      IF(IPROJX(2,1).LT.0) IYMIN=2
      IF(IPROJX(2,2).LT.0) IYMIN=IYMIN+2
      IF(IPROJX(2,3).LT.0) IYMIN=IYMIN+4
      IXMAX=9-IXMIN
      IYMAX=9-IYMIN
```

```
C
C  COMPUTE INTERIOR DIRECTION BITS
C
      INTDIR=0
C  Z AXIS
      IF((IPROJX(1,3).LT.0).OR.
     $ ((IPROJX(1,3).EQ.0).AND.(IPROJX(2,3).GT.0)))
     $ INTDIR=IOR(INTDIR,1)
C  Y AXIS
      IF((IPROJX(1,2).LT.0).OR.
     $ ((IPROJX(1,2).EQ.0).AND.(IPROJX(2,2).GT.0)))
     $ INTDIR=IOR(INTDIR,2)
C  X AXIS
      IF((IPROJX(1,1).GE.0).OR.
     $ ((IPROJX(1,1).EQ.0).AND.(IPROJX(2,1).LE.0)))
     $ INTDIR=IOR(INTDIR,4)
C
      NPX=IPROJX(1,4)+KR(1,IXMIN)
      NPY=IPROJX(2,4)+KR(2,IYMIN)
      PXPERM=-(KR(1,IXMAX)-KR(1,IXMIN))/2
      PYPERM=-(KR(2,IYMAX)-KR(2,IYMIN))/2
      AXPERM(1)=(KR(1,1)-KR(1,IXMIN))/2
      AYPERM(1)=(KR(2,1)-KR(2,IYMIN))/2
      AXPERM(5)=(KR(1,2)-KR(1,IXMIN))/2
      AYPERM(5)=(KR(2,2)-KR(2,IYMIN))/2
      AXPERM(3)=(KR(1,3)-KR(1,IXMIN))/2
      AYPERM(3)=(KR(2,3)-KR(2,IYMIN))/2
      AXPERM(7)=(KR(1,4)-KR(1,IXMIN))/2
      AYPERM(7)=(KR(2,4)-KR(2,IYMIN))/2
      AXPERM(2)=(KR(1,5)-KR(1,IXMIN))/2
      AYPERM(2)=(KR(2,5)-KR(2,IYMIN))/2
      AXPERM(6)=(KR(1,6)-KR(1,IXMIN))/2
      AYPERM(6)=(KR(2,6)-KR(2,IYMIN))/2
      AXPERM(4)=(KR(1,7)-KR(1,IXMIN))/2
      AYPERM(4)=(KR(2,7)-KR(2,IYMIN))/2
      AXPERM(8)=(KR(1,8)-KR(1,IXMIN))/2
      AYPERM(8)=(KR(2,8)-KR(2,IYMIN))/2
C
C  CALCULATE SLOPE AND DIVISOR (SQRT(SLOPE**2+1))
C  NOTE: IF THE SLOPE IS INFINITE, THE DIVISOR IS SET TO 0 (SLOPE IS LEFT
C          UNDEFINED IN THIS CASE)
C
C  THE DISTANCE (D) FROM THE ORIGIN TO A LINE THROUGH POINT (X,Y) WITH SLOPE
C  SLOPE(N) IS D=(Y-SLOPE(N)*X)/DIV(N) IF DIV(N).NE.0
C  IF DIV(N).EQ.0, D=-X
C
      IF(IPROJX(1,1).EQ.0) GO TO 205
      SLOPE=PROJX3(2,1)/PROJX3(1,1)
      DIV=SQRT(SLOPE*SLOPE+1.0)
      NPD2=IFIX((PROJX2(2,3)-SLOPE*PROJX2(1,3))/DIV)
      NDAG2P=IFIX(((PROJX3(2,2)-PROJX3(2,3))-
     $ SLOPE*(PROJX3(1,2)-PROJX3(1,3)))/DIV)/2
      FDAG2P=IFIX((PROJX3(2,2)-SLOPE*PROJX3(1,2))/DIV)/2
      ND2OFP(1)=-IFIX((PROJX3(2,3)-SLOPE*PROJX3(1,3))/DIV)/2
```

```
C
C GENERATE WPD_ VALUES
C
C THE VALUE OF IV IS DETERMINED AS FOLLOWS:
C    IV  SLOPE  INTDIR  INCREMENT
C    0   - OR INF  0     -
C    1     +      0      X
C    2   - OR INF  1     X,Y
C    3     +      1      Y
C
      IV=0
      IF(SLOPE.GE.0.0)IV=1
      IF(IAND(INTDIR,4).NE.0) IV=IV+2
C
C CALCULATE CRITICAL VERTEX (0 OR 512 IN X & Y)
C
      X=0.0
      Y=0.0
      IF((IV.EQ.1).OR.(IV.EQ.2)) X=ES
      IF(IV.GE.2) Y=ES
C
      WPD2=IFIX((3.0*Y-ES-SLOPE*(3.0*X-ES))/DIV)
      WDA62P=IFIX((-2.0*Y+ES-SLOPE*(-2.0*X+ES))/DIV)
      WD20FP(1)=-IFIX((Y-SLOPE*X)/DIV)
      WD20FP(2)=-IFIX((Y-SLOPE*(X-ES))/DIV)
      WD20FP(3)=-IFIX((Y-ES-SLOPE*X)/DIV)
      WD20FP(4)=-IFIX((Y-ES-SLOPE*(X-ES))/DIV)
      GO TO 210
C
C VERTICAL LINE
C
205   CONTINUE
      WPD2=-PROJX2(1,3)
      NDA62P=IFIX(PROJX3(1,3)-PROJX3(1,2))/2
      FDA62P=-IFIX(PROJX3(1,2))/2
      WD20FP(1)=IFIX(PROJX3(1,3))/2
      X=0.0
      IF(IAND(INTDIR,4).NE.0) X=ES
      WPD2=-IFIX(3.0*X-ES)
      WDA62P=-IFIX(-2.0*X+ES)
      WD20FP(1)=IFIX(X)
      WD20FP(2)=IFIX(X-ES)
      WD20FP(3)=IFIX(X)
      WD20FP(4)=IFIX(X-ES)
210   CONTINUE
C
C SLOPE 2
C
      IF(IPROJX(1,2).EQ.0) GO TO 215
      SLOPE=PROJX3(2,2)/PROJX3(1,2)
      DIV=SQRT(SLOPE*SLOPE+1.0)
      NPD1=IFIX((PROJX2(2,3)-SLOPE*PROJX2(1,3))/DIV)
      NDA61P=IFIX(((PROJX3(2,1)-PROJX3(2,3))-
     * SLOPE*(PROJX3(1,1)-PROJX3(1,3)))/DIV)/2
      FDA61P=IFIX((PROJX3(2,1)-SLOPE*PROJX3(1,1))/DIV)/2
```

```
      ND10FP(1)=-IFIX((PROJX3(2,3)-SLOPE*PROJX3(1,3))/DIV)/2
      IV=0
      IF(SLOPE.GE.0.0)IV=1
      IF(IAND(INTDIR,2).NE.0) IV=IV+2
      X=0.0
      Y=0.0
      IF((IV.EQ.1).OR.(IV.EQ.2)) X=ES
      IF(IV.GE.2) Y=ES
      NPD1=IFIX((3.0*Y-ES-SLOPE*(3.0*X-ES))/DIV)
      NDAG1P=IFIX((-2.0*Y+ES-SLOPE*(-2.0*X+ES))/DIV)
      ND1OFP(1)=-IFIX((Y-SLOPE*X)/DIV)
      ND1OFP(2)=-IFIX((Y-SLOPE*(X-ES))/DIV)
      ND1OFP(3)=-IFIX((Y-ES-SLOPE*X)/DIV)
      ND1OFP(4)=-IFIX((Y-ES-SLOPE*(X-ES))/DIV)
      GO TO 220
215   CONTINUE
      NPD1=-PROJX2(1,3)
      NDAG1P=IFIX(PROJX3(1,3)-PROJX3(1,1))/2
      FDAG1P=-IFIX(PROJX3(1,1))/2
      ND1OFP(1)=IFIX(PROJX3(1,3))/2
      X=0.0
      IF(IAND(INTDIR,2).NE.0) X=ES
      NPD1=-IFIX(3.0*X-ES)
      NDAG1P=-IFIX(-2.0*X+ES)
      ND1OFP(1)=IFIX(X)
      ND1OFP(2)=IFIX(X-ES)
      ND1OFP(3)=IFIX(X)
      ND1OFP(4)=IFIX(X-ES)
220   CONTINUE
C
C SLOPE 1
C
      IF(IPROJX(1,3).EQ.0) GO TO 225
      SLOPE=PROJX3(2,3)/PROJX3(1,3)
      DIV=SQRT(SLOPE*SLOPE+1.0)
      NPDO=IFIX((PROJX2(2,1)-SLOPE*PROJX2(1,1))/DIV)
      NDAGOP=IFIX(((PROJX3(2,2)-PROJX3(2,1))-
     & SLOPE*(PROJX3(1,2)-PROJX3(1,1)))/DIV)/2
      FDAGOP=IFIX((PROJX3(2,2)-SLOPE*PROJX3(1,2))/DIV)/2
      NDOOFP(1)=-IFIX((PROJX3(2,1)-SLOPE*PROJX3(1,1))/DIV)/2
      IV=0
      IF(SLOPE.GE.0.0)IV=1
      IF(IAND(INTDIR,1).NE.0) IV=IV+2
      X=0.0
      Y=0.0
      IF((IV.EQ.1).OR.(IV.EQ.2)) X=ES
      IF(IV.GE.2) Y=ES
      NPDO=IFIX((3.0*Y-ES-SLOPE*(3.0*X-ES))/DIV)
      NDAGOP=IFIX((-2.0*Y+ES-SLOPE*(-2.0*X+ES))/DIV)
      NDOOFP(1)=-IFIX((Y-SLOPE*X)/DIV)
      NDOOFP(2)=-IFIX((Y-SLOPE*(X-ES))/DIV)
      NDOOFP(3)=-IFIX((Y-ES-SLOPE*X)/DIV)
      NDOOFP(4)=-IFIX((Y-ES-SLOPE*(X-ES))/DIV)
      GO TO 230
225   CONTINUE
      NPDO=-PROJX2(1,1)
      NDAGOP=IFIX(PROJX3(1,1)-PROJX3(1,2))/2
```

```
      FDA60P=-IFIX(PROJX3(1,2))/2
      ND00FP(1)=IFIX(PROJX3(1,1))/2
      X=0.0
      IF(IAND(INTDIR,1).NE.0) X=ES
      WPD0=-IFIX(3.0*X-ES)
      WDA60P=-IFIX(-2.0*X+ES)
      WD00FP(1)=IFIX(X)
      WD00FP(2)=IFIX(X-ES)
      WD00FP(3)=IFIX(X)
      WD00FP(4)=IFIX(X-ES)

230   CONTINUE

C
      ND00FP(2)=NDA60P-1
      ND00FP(3)=FDA60P
      ND10FP(2)=NDA61P-1
      ND10FP(3)=FDA61P
      ND20FP(2)=NDA62P-1
      ND20FP(3)=FDA62P

C
C WINDOW ADDRESS INITALIZATION
C
      WPX=-1
      WPY=-1

C
C COMPUTE FACE INTENSITIES
C
      DO 302 IOBJ=1,1
       DO 301 IFACE=1,3
        DO 300 ICOL=1,3
         IAXIS=4-IFACE
         INTENS(IOBJ,IFACE,ICOL)=IFIX(((PROJX2(3,IAXIS)-PROJX2(3,4))
     $   *FLOAT(ICOLOR(IOBJ,ICOL)))/(SCALE(IAXIS)*ES)+
     $   MINCOL(IOBJ,ICOL))

300   CONTINUE

301   CONTINUE

302   CONTINUE

C
C
C COMPUTE NODE AND WINDOW LEVELS

C NOTE THAT PXPERM AND PYPERM ARE NEGATIVE
C
```

```
        MAXDIM=PXPERM
        IF(PYPERM.LT.PXPERM) MAXDIM=PYPERM
        MAXDIM=(-2*MAXDIM+SCLFAC-1)/SCLFAC
        DO 310 I=1,100
          IF(MAXDIM.GT.(2**I)) GO TO 310
          NLEV=10-I
          GO TO 315
310     CONTINUE
C
315     CONTINUE
        WLEV=NLEV
        IF(WLEV.LT.0) WLEV=0
C
        SDELTA=LS(IOVSIZ,SCLOFF-4)
        SDELT2=SDELTA*2
C
C
C  Negate values for the PIG and the simulator
C
        NDAG0P=-NDAG0P
        NDAG1P=-NDAG1P
        NDAG2P=-NDAG2P
        FDAG0P=-FDAG0P
        FDAG1P=-FDAG1P
        FDAG2P=-FDAG2P
        WPD0=-WPD0
        WPD1=-WPD1
        WPD2=-WPD2
        DO 400 I=1,4
          WD00FP(I)=-WD00FP(I)
          WD10FP(I)=-WD10FP(I)
          WD20FP(I)=-WD20FP(I)
400     CONTINUE
C
        RERUN=.FALSE.
        CALL HDINIT(REINIT,RERUN,INTENS)
        IF (REINIT) GOTO 1
        IF (RERUN) RETURN
        CALL PIG(REINIT)
        IF (.NOT.REINIT) RETURN
        GOTO 1
C
C  PRINT COMPUTED VALUES AT TERMINAL
C
C       WRITE(1,800) IXMIN,IXMAX,IYMIN,IYMAX
C800    FORMAT('X(MIN,MAX),Y(MIN,MAX):',4I4)
C       DO 804 I=1,2
C       DO 804 II=1,8
C       KR(I,II)=(KR(I,II)+IPROJX(I,4))/SCLFAC
C804    CONTINUE
C       WRITE(1,806)(KR(1,II),II=1,8)
C806    FORMAT(' CORNER X:',8I7)
C       WRITE(1,808)(KR(2,II),II=1,8)
```

```
C808    FORMAT('       Y:',8I7)
C       WRITE(1,811) NPX,NPY,PXPERM,PYPERM
C811    FORMAT('NPX,NPY,PXPERM,PYPERM:',4I8)
C       WRITE(1,821)AXPERM,AYPERM
C821    FORMAT('AXPERM:',8I8,/,'AYPERM:',8I8)
C       WRITE(1,831) NPD0,NPD1,NPD2
C831    FORMAT('NPD0,1,2:',3I8)
C       WRITE(1,841) NDAG0P,NDAG1P,NDAG2P
C841    FORMAT('NDAG0P,1,2:',3I8)
C       WRITE(1,851) FDAG0P,FDAG1P,FDAG2P
C851    FORMAT('FDAG_P:',3I8)
C       WRITE(1,861) ND00FP,ND10FP,ND20FP
C861    FORMAT('ND00FP:',3I8,/,'ND10FP:',3I8,
C      1 /,'ND20FP:',3I8)
C       WRITE(1,871) INTDIR
C871    FORMAT('INTDIR:',I8)
C       WRITE(1,881) WPD0,WPD1,WPD2
C881    FORMAT('WPD_:',3I8)
C       WRITE(1,891) WDAG0P,WDAG1P,WDAG2P
C891    FORMAT('WDAG_P:',3I8)
C       WRITE(1,895) WD00FP,WD10FP,WD20FP
C895    FORMAT('WD00FP:',4I8,/,'WD10FP:',4I8,/,'WD20FP:',4I8)
C       WRITE(1,896) WLEV,NLEV
C896    FORMAT('WLEV,NLEV:',2I4)
C       WRITE(1,897)((INTENS(1,I,J),J=1,3),I=1,3)
C897    FORMAT('INTENS (R,G,B):',3I8,/,' (FACE 2)      ',3I8,/,
C      1' (FACE 3)       ',3I8)
C
```

What is claimed is:

1. A method for interactively generating a two-dimensional image of a three-dimensional scene including at least one object, said method comprising the steps of:
   (a) providing input data volumetrically defining said object within a three-dimensional universe;
   (a1) selecting a random viewing direction;
   (a2) determining a sequence in response to said selected viewing direction;
   (b) progressively subdividing the volume of said three-dimensional universe into volumetric subdivisions;
   (c) projecting said volumetric subdivisions which are contained by said object onto a view plane in the order of said sequence and in a direction determined by said selected viewing direction;
   (d) progressively subdividing the area of said view plane into subdivisions;
   (e) determining which of the subdivisions of said view plane are enclosed by the projections of said volumetric subdivisions of said three-dimensional universe; and
   (f) painting areas of a display screen corresponding to said view plane subdivisions determined by said determining step (e) to be enclosed by said projections and not enclosed by projections earlier in said sequence.

2. A method as in claim 1 wherein:
said method further includes the step of scaling at least one dimension of said three-dimensional universe by a scaling factor which is independent of any dimension of said view plane area; and
said subdividing step (b) includes the step of subdividing said volume into subdivisions having a dimension proportional to said scaling factor.

3. A method for generating a two-dimensional image of a three-dimensional scene including at least one object, said method comprising:
   (a) providing input data volumetrically defining said object within a three-dimensional universe;
   (a1) selecting a random viewing direction;
   (a2) determining a sequence in response to said selected viewing direction;
   (b) progressively subdividing the volume of said three-dimensional universe into subdivisions;
   (c) projecting said volumetric subdivisions which are contained by said object onto a view plane in the order of said sequence wherein volumetric subdivisions containing said object visually obstructing other volumetric subdivisions containing said object are projected before said other subdivisions;
   (d) progressively subdividing the area of said view plane into subdivisions;
   (e) determining, for each of said projections, which of the subdivisions of said view plane are enclosed by said projection; and
   (f) painting areas of a display screen corresponding to said subdivisions of said view plane determined by said determining step (e) to be enclosed by at least one of said projections, including the step of painting said display screen areas only in response to the first projection in said sequence determined by said determining step (e) to enclose said view plane subdivisions to which said display screen areas correspond.

4. A method as in claim 3 wherein said painting step includes the step of determining, in response to said selected viewing direction, which volumetric subdivisions of said universe visually obstruct other ones of said volumetric subdivisions.

5. A method as in claim 3 wherein at least one of said progressively subdividing step (b) and said determining step (e) is performed by hard-wired digital logic elements.

6. A method as in claim 3 wherein said progressively subdividing step (b) and said projecting step (c) are performed recursively for smaller and smaller subdivisions of said three-dimensional universe until a predetermined resolution limit is reached, and said progressively subdividing step (d), said determining step (e) and said painting step (f) are performed recursively for smaller and smaller subdivisions of said view plane until a predetermined resolution limit is reached.

7. A method for generating a two-dimensional image of a three-dimensional scene including at least one object, said method comprising:
   (a) providing input data volumetrically defining said object within a three-dimensional universe;
   (b) progressively subdividing the volume of said three-dimensional universe into volumetric subdivisions;
   (c) defining a subset of the volume of said three-dimensional universe to be displayed;
   (d) projecting said volumetric subdivisions which are contained by said object and which lie within said subset onto a view plane;
   (e) progressively subdividing the area of said view plane into subdivisions;
   (f) determining which of the view plane subdivisions are enclosed by said projections of said volumetric subdivisions; and
   (g) painting areas of a display screen corresponding to said view plane subdivisions determined by said determining step (f) to be enclosed by said projections.

8. A method for generating a two-dimensional image of a three-dimensional scene including at least one object, said method comprising the steps of:
   (a) providing input data volumetrically defining an object within a three-dimensional universe;
   (b) subdividing said three-dimensional universe into a hierarchy of a plurality of levels of subdivided volumes, each level comprising at least one discrete volume, said volumes being characterized by the degree to which they are occupied by said object, a volume in any level being a subdivision of a volume in the level above said any level in said hierarchy;
   (c) selecting a point of view for viewing said object;
      (c1) determining a sequence for visiting said volumes in said hierarchy in response to said selected point of view;
   (d) establishing a two-dimensional view plane;
   (e) visiting the volumes in said hierarchy in the order of said sequence until a volume occupied by said object to a predetermined degree which is not visually obstructed from said selected point of view by any other volume in said hierarchy occupied by said object to said predetermined degree is encountered;
   (f) projecting said unobstructed volume onto said view plane at a location and orientation determined by said selected point of view and by the location of said volume in said three-dimensional universe;
   (g) subdividing said view plane into a plurality of discrete areas;
   (h) determining which of said view plane areas are enclosed by said projection projected by said projecting step (f) and which of said areas intersect said projection but are not enclosed by said projection;
   (i) painting said view plane areas determined by said determining step (h) to be enclosed by said projection;
   (j) further subdividing said view plane areas determined to intersect but not to be enclosed by said projection and repeating said determining step (h) and said painting step (i) for said further subdivided view plane areas;
   (k) repeating said visiting step (e) to visit the next volume in said sequence occupied by said object to said predetermined degree which is not visually obstructed from said selected point of view by any volume in said hierarchy occupied by said object to said predetermined degree and also not projected onto said view plane earlier in said sequence by said projecting step (f), repeating said projecting step (f) and said subdividing step (g) for said next volume, and performing said determining step (h), painting step (i) and further subdividing step (j) on the projection of said next volume for previously unpainted ones of said view plane areas, until all of the volumes in said hierarchy occupied by said object to said predetermined degree and not visually obstructed from said selected point of view by any volume in said hierarchy occupied by said object to said predetermined degree and also not projected onto said view plane earlier in said sequence by said projecting step (f) have been visited; and
   (l) displaying the view plane areas painted by said painting step (i).

9. A method as in claim 8 wherein at least one of said visiting step (e), projecting step (f), subdividing step (g), determining step (h), painting step (i), further subdividing step (j) and repeating step (k) are performed by processing electrical signals with hard-wired digital logic elements.

10. A method as in claim 8 wherein said subdividing step (b) subdivides each of said volumes occupied but not to a predetermined degree into 8 volumes of identical size, shape and orientation.

11. A method as in claim 10 wherein:
said three-dimensional universe is defined by a parallelepiped; and
said subdividing step (b) subdivides said universe into parallelepiped-shaped volumes.

12. A method as in claim 8 wherein:
said three-dimensional universe is defined by a parallelepiped; and
said subdividing step (b) subdivides said universe into parallelepipeds.

13. A method as in claim 12 wherein:
said determining step (h) includes the step of determining which of said areas are enclosed by the projection of one of three faces, said three faces corresponding to the three visible faces of the six-sided projection of said volume along the axis of said selected point of view onto said view plane;
said painting step (i) paints each of said view plane areas determined to be enclosed by the projection of one said faces one of three shades depending upon which face projection encloses said area; and
said further subdividing step (j) is performed on view plane areas which intersect said volume projection but which are not enclosed by the projection of one of said faces 14. A method as in claim 8 wherein:
said subdividing step (b) includes the step of creating a representation of said hierarchically-subdivided three-dimensional universe, said representation having a plurality of entries, each of said entries representing one of said volumes, each of said entries comprising at least one field containing indicia of the occupation by said object of the volume which said each entry represents; and
said visiting step (e) includes the step of processing said plurality of entries.

15. A method as in claim 14 wherein said creating step of said subdividing step (b) includes the step of arranging said representation in a tree structure.

16. A method as in claim 15 wherein said entry-processing step of said visiting step (e) encounters said unobstructed volume by a depth-first traversal of said tree structure.

17. A method as in claim 16 wherein:
said establishing step (d) includes the step of clearing every entry in an hierarchical representation of said view plane, said representation of said view plane comprising a plurality of levels, each of said levels comprising a plurality of entries representing and corresponding to said discrete view plane areas;
said painting step (i) includes the step of marking the entries in said representation representing said painted view plane areas; and
said repeating step (k) includes the step of determining if an entry of said hierarchical representation of said view plane has been marked in order to determine whether a view plane area represented by said entry has been previously painted.

18. A method as in claim 15 wherein said subdividing step (b) subdivides each of said volumes occupied but not to a predetermined degree into 8 volumes of identical size, shape and orientation.

19. A method as in claim 15 wherein only entries representing subdivisions of volumes occupied by said object but not occupied by said object to said predetermined degree are included in said tree structure.

20. A method as in claim 19 wherein said visiting step (e) includes the step of adding an offset stored in each of said entries in said tree structure to the storage address where said entry is stored in a storage device to obtain the storage addresses in said storage device of entries representing subdivisions of the volume which said entry represents.

21. A method as in claim 8 wherein:
said establishing step (d) includes the step of clearing every entry in an hierarchical representation of said view plane, said view plane representation comprising a plurality of levels, each of said levels representing a plurality of discrete areas of said subdivided view plane, each of said levels comprising a plurality of entries representing and corresponding to said discrete areas;
said painting step (i) includes the step of marking the entries in said representation representing said view plane areas which are painted; and
said repeating step (k) includes the step of determining if entries of said hierarchical representation of said view plane representing said view plane areas have been previously painted.

22. A method as in claim 21 wherein said representation of said view plane is arranged in a tree structure.

23. A method as in claim 22 wherein:
said view plane is rectangular;
said subdividing step (g) subdivides said view plane into at least four rectangular areas of equal size and orientation; and
said further subdividing step (j) subdivides each of said areas into four rectangles of equal size and orientation.

24. A method as in claim 22 wherein said previously-painted determining step of said repeating step (k) includes the step of accessing the entries in said representation of said view plane representing said areas by addressing an interleaved memory.

25. A method as in claim 8 wherein said painting step (i) includes the step of uniformly painting each of said areas one of a plurality of different shades.

26. A method as in claim 8 wherein said painting step (i) includes the step of painting each of said areas of said view plane a shade which is dependent upon the orientation, with respect to said view point, of the surface of said volume the projection of which encloses said area.

27. A method as in claim 8 wherein said displaying step (l) is performed by modifying the intensity of pixels on an electronic display, each of said pixels corresponding to said subdivided area of said view plane at said predetermined degree of resolution.

28. A method as in claim 8 wherein said painting step (i) includes the step of painting said areas of said view plane at said predetermined degree of resolution which are significantly enclosed by said projection.

29. A method as in claim 8 wherein:
said subdividing step (g) includes the step of selecting an overlay comprising a predetermined number of contiguous ones of said view plane areas which together enclose a projection projected by said projecting step (f);
said determining step (h) is performed only on said areas comprising said overlay; and
said further subdividing step (j) further subdivides only said areas comprising said overlay.

30. A method as in claim 29 wherein the size of each of said areas of said view plane in said subdividing step (g) is larger than the size of said projection.

31. A method as in claim 29 wherein four of said contiguous areas are selected by said subdividing step (g).

32. A method as in claim 31 wherein the size of each of said areas of said view plane in said subdividing step (g) is larger than the size of said projection.

33. A method as in claim 8 wherein the size of each of said areas of said view plane in said subdividing step (g) is larger than the size of said projection.

34. A method as in claim 8 wherein said determining step (h) includes the preliminary step of testing said areas for intersection with a bounding box comprising a polygon of predetermined shape and orientation which is just large enough to enclose said projection.

35. A method as in claim 34 wherein said bounding box is rectangular.

36. A method as in claim 35 wherein:
said view plane is rectangular;
said subdividing step (g) subdivides said view plane into at least four rectangular areas of equal size and orientation; and
said further subdividing step (j) subdivides each of said areas into four rectangles of equal size and orientation.

37. A method as in claim 36 wherein said bounding box and said view plane areas have the same orientation.

38. A method as n claim 8 wherein said projecting step (f) includes the step of processing retained data defining the size and orientation of projections of larger-sized volumes in said three-dimensional universe by hard-wired digital logic elements to obtain the size and orientation of projections of smaller-sized volumes in said three-dimensional universe.

39. A method as in claim 8 further including the step of defining a region of said three-dimensional universe and wherein said visiting step (e) only visits volumes contained within said region.

40. A method as in claim 39 wherein said region of said region-defining step is defined by at least one surface having a location and orientation which is selected by a user.

41. A method as in claim 40 wherein said region of said region-defining step is defined by at least one pair of parallel planes.

42. A method for generating a two-dimensional image of a three-dimensional object, said method comprising the steps of:
(a) providing input data volumetrically defining an object within a three-dimensional universe;
(b) subdividing said three-dimensional universe into a hierarchy of a plurality of smaller, subdivided discrete volumes, said volumes arranged in levels, comprising a plurality of discrete volumes of said volumes being characterized by the degree to which they are occupied by said object, a volume in any level being a subdivision of a volume in a level above said any level;
(c) selecting a point of view for viewing said object;
(c1) determining a traversal sequence in response to said selected point of view;
(d) selecting a region of said three-dimensional universe to be displayed;
(e) establishing a two-dimensional view plane;
(f) visiting the volumes in said hierarchy which are contained within said region in the order of said traversal sequence until a volume occupied by said object to a predetermined degree which is not visually obstructed from said selected point of view by any other volume in said hierarchy which is contained within said region and is occupied by said object to said predetermined degree is encountered;
(g) projecting said unobstructed volume onto said view plane at a location and orientation determined by said selected point of view and by the location of said volume in said three-dimensional universe;
(h) subdividing said view plane into a plurality of discrete areas;
(i) determining which of said view plane areas are enclosed by said projection and which of said view plane areas intersect but are not enclosed by said projection;
(j) painting said view plane areas determined to be enclosed by said projection;
(k) further subdividing said view plane areas determined to intersect but not to be enclosed by said projection and repeating said determining and said painting steps for said further subdivided areas;
(l) repeating said visiting step to obtain the next volume in said sequence contained within said region occupied by said object to said predetermined degree which is not visually obstructed from said selected point of view by any volume in said hierarchy which is contained within said region, occupied by said object to said predetermined degree and also not projected onto said view plane earlier in said sequence, repeating said projecting step (g) and said subdividing step (h) for said next volume, and performing said determining, painting and further subdividing steps on the projection of said next volume for previously unpainted ones of said view plane areas until all of the volumes in said hierarchy contained within said region and occupied by said object to said predetermined degree and not visually obstructed from said selected point of view by any volume in said hierarchy contained within said region, occupied by said object to said predetermined degree and also not projected onto said view plane earlier in said sequence have been visited; and
(m) displaying the painted view plane areas.

43. A method as in claim 42 wherein said region selecting step (d) includes the step of defining at least one surface having a location and orientation which is selected by a user, said surface being used to at least partially define said region.

44. A method as in claim 43 wherein said surface-defining step of said region selecting step (d) includes the step of defining at least one pair of parallel planes.

45. A system for generating a two-dimensional image of a three-demensional scene including at least one object, comprising:
means, connected to receive an externally generated viewing direction signal specifying a random desired viewing direction, for determining a sequence in response to said selected viewing direction signal, and
data acquisition means for acquiring input data volumetrically defining an object to be displayed;
data conversion means, connected to receive said input data for defining said object within a three-dimensional universe the volume of which is subdivided into a plurality of volumetric subdivisions;
image processing means, operatively connected to said data conversion means and said sequence selected viewing direction determining means and also connected to receive said signal, for:
projecting said volumetric subdivisions of said three-dimensional universe which are contained by said object onto a view plane in the order of said sequence and in a direction determined by said selected viewing direction signal;
progressively subdividing the area of said view plane into subdivisions;
determining which of the view plane subdivisions are enclosed by the projections of said volumetric subdivisions of said three-dimensional universe; and painting areas of a display screen corresponding to said view plane subdivisions determined to be enclosed by said projections.

46. A system as in claim 45 wherein said image processing means consists of a plurality of hardwired digital logic elements.

47. A system as in claim 45 wherein said image processing means consists of a hard-wired finite-state sequential digital logic circuit.

48. A system as in claim 45 wherein:

said system further includes means operatively connected to said image processing means for scaling at least one dimension of said three-dimensional universe by a scaling factor which is independent of any dimension of said view plane area; and said projections have a dimension proportional to said scaling factor.

49. A system for generating a two-dimensional image of a three-dimensional scene including at least one object, comprising:

data acquisition means for acquiring information volumetrically defining an object to be displayed;

data conversion means, connected to receive said information acquired by said data acquisition means, for representing said object within a three-dimensional universe subdivided into a plurality of volumetric subdivisions; display means for displaying an image; and a digital signal processor connected to said data coversion means and said display means and preprogrammed to perform the following functions project said volumetric subdivisions of said three-dimensional universe which are contained by said object onto a view plane in a predetermined sequence wherein volumetric subdivisions containing said object not visually obstructed by other volumetric subdivisions containing said object are projected before said other subdivisions;

progressively subdivide the area of said view plane into subdivisions;

determine, for each of said projections, which of the view plane subdivisions are enclosed by said projection; and set the intensity of portions of said display means corresponding to said view plane subdivisions determined to be enclosed by at least one projection and not determined to be enclosed by the projection of a volumetric subdivision projected earlier in said sequence.

50. A system as in claim 49 wherein said data acquisition means includes user interactive means for analytically defining said object to be displayed.

51. A system for generating a two-dimensional image of a three-dimensional object, comprising:

data acquisition means for acquiring information volumetrically defining an object to be displayed;

data conversion means connected to receive said information acquired by said data acquiring means for representing said object within a three-dimensional universe the volume of which is subdivided into a plurality of volumetric subdivisions;

interactive means for defining a subset of the volume of said three-dimensional universe to be displayed in response to user interaction;

display means for displaying an image; and a digital signal processing means connected to said data conversion means, interactive means and display means, for performing the following functions:

(1) project said volumetric subdivisions of said three-dimensional universe which are contained by said object and which lie within said subset onto a view plane, (2) progressively subdivide the area of said view plane into subdivisions, (3) determine which of the view plane subdivisions are enclosed by said projections of said volumetric subdivisions of said three-dimensional universe; and (4) select the intensity of areas of said display means corresponding to said view plane subdivisions determined to be enclosed by said projections.

52. A system for generating a two-dimensional image of a three-dimensional scene including at least one object, said system comprising:

data acquisition means for acquiring input data volumetrically defining an object to be displayed;

data conversion means, responsive to said input data acquired by said data acquisition means, for generating electrical signals defining said object within a three-dimensional universe subdivided into a hierarchy of a plurality of levels of subdivided volumes, each of said levels comprising at least one discrete volume, said volumes being characterized by the degree to which they are occupied by said object, any subdivided volume in said universe being a subdivision of a volume in the level above said any volume;

interactive means for selecting a point of view for viewing said object in response to interaction therewith by a user and for producing signals indicating said selected point of view;

image processing means, connected to said data conversion means and said interactive means, for generating electrical signals specifying an image of said object as viewed from said selected view point, including:

(1) image window processing means for establishing a two-dimesional view plane, including means for subdividing said view plane into a plurality of discrete areas;

(2) object node processing means, responsive to said electrical signals produced said conversion means and also connected to receive said selected point of view signals for determining a traversal sequence in response to said selected point of view signals and for visiting the volumes of said three-dimensional universe in said hierarchy in the order of said sequence until a volume occupied by said object to a predetermined degree which is not visually obstructed from said selected point of view by any other volume in said hierarchy occupied said object to said predetermined degree is encountered, and for so visiting, in the order of said sequence, each of the volumes of said universe occupied by said object to object to said predetermined degree and not visually obstructed from said selected point of view by any volume in said hierarchy occupied by said object to said predetermined degree and also not projected onto said view plane earlier in said sequence until all of the volumes in said hierarchy occupied by said object to said predetermined degree and not visually obstructed from said selected point of view by any other volume in said hierarchy occupied by said object to said predetermined degree have been visited;

(3) geometric processing and projecting means, connected to receive said point of view signal and operatively coupled to said object node processing means, for projecting each of said unobstructed volumes onto said view plane at a location and orientation determined by said selected point of view and the location of said volumes in said three-dimensional universe;

(4) geometric comparing means, operatively coupled to said image window processing means and said geometric processing and projecting means, for determining, for each of said projections, which of said discrete view plane areas are enclosed by said projections and which of said view plane areas intersect but are not enclosed by said projections, said view plane subdividing means including recursive means for further subdividing view plane areas determined by said geometric comparing means to intersect but not to be enclosed by said projections; and (5) window writer means, connected to said geometric comparing means for painting said areas of said view plane determined to be both enclosed by a projection and not already painted because of enclosure by the projection of a volume visited earlier in said sequence; and image display means, connected to said window writer means, for displaying the painted view plane areas.

53. A system as in claim 52 wherein said data acquisition means includes a computed tomography scanner.

54. A system as in claim 52 wherein:
said data conversion means includes object storage means for storing a representation of said hierarchically-subdivided three-dimensional universe, said object storage means including a plurality of storage locations corresponding to and associated with said volumes, each of said storage locations having at least one field containing said characterization of the volume corresponding therewith; and
said object node processing means includes means for reading the contents of the storage locations of said object storage means corresponding to said visited volumes.

55. A system as in claim 54 wherein said object storage means stores said representation in a tree structure.

56. A system as in claim 54 wherein:
said data conversion means subdivides each of said volumes in each of said levels into 8 volumes of identical size, shape and orientation; and
said object storage means stores said representation in an octree structure.

57. A system as in claim 56 wherein said object storage means stores the subdivisions only of volumes occupied by said object but not to said predetermined degree.

58. A system as in claim 56 wherein at least one of the plurality of storage locations of said object storing means includes a linking field for specifying storage locations to be read by said object node processing means later in said traversal sequence.

59. A system as in claim 58 wherein:
said object storage means includes means for storing an offset associated with each of said storage locations, said offset locating the address of storage locations representing the subdivisions of the volume corresponding to the storage location associated with the offset relative to the address of said storage location associated with the offset; and
said object node processing means includes addressing means for addressing storage locations corresponding to the subdivisions of a volume corresponding to a given storage location by adding said offset associated with said given storage location to the address of said given storage location.

60. A system as in claim 52 wherein said interactive means includes a trackball.

61. A system as in claim 52 wherein said image processing means includes a plurality of hard-wired digital logic elements.

62. A system as in claim 52 wherein said image processing means consists of a hard-wired finite-state sequential digital logic circuit.

63. A system as in claim 52 wherein: said image processing means further includes:
window storage means, operatively connected to said image window processing means and to said view plane subdividing means, for storing a hierarchical representation of said view plane, said representation of said view plane comprising a plurality of levels, each of said levels representing a plurality of subdivided view plane areas, said window storage means including a plurlaity of storage locations, each of said storage locations corresponding to and associated with one of said view plane areas; and
window storage accesss means, coupled to said window storage means, for marking the storage locations of said window storage means corresponding to said view plane areas which are painted; and
said geometric comparing means determines whether a view plane area has been previously painted by testing whether the storage location of said window storage means corresponding to said view plane area has been marked.

64. A system as in claim 63 wherein said window storage means stores said representation of said view plane in a tree structure.

65. A system as in claim 63 wherein said window storage means comprises an interleaved memory.

66. A system as in claim 52 wherein:
said three-dimensional universe is parallelepiped in shape;
each of said volumes subdividing said three-dimensional universe is parallelepiped in shape;
said geometric comparing means includes means for determining which of said areas are enclosed by the projection of one of three faces of said unobstructed volume, each of said three faces corresponding to one of the visible faces of the six-sided projection of said volume along the axis of said selected point of view onto said view plane;

said window writer means paints each of said view plane areas determined to be enclosed by the projection of one of said faces one of three shades depending upon which face encloses said view plane areas; and said recursive means of said view plane subdividing means further subdivides only those view plane areas which intersect said projection but which are not enclosed by the projection of one of said faces.

67. A system as in claim 52 wherein:
said view plane is rectangular; and
said view plane subdividing means subdivides said view plane into a plurality of rectangles of equal size and orientation.

68. A system as in claim 52 wherein said window writer means includes means for uniformly painting each of said areas one of a plurality of different shades.

69. A system as in claim 52 wherein said window writer means includes means for painting each of said areas of said view plane a shade which is dependent upon the orientation, with respect to said view point, of the surface of said volume the projection of which encloses said area.

70. A system as in claim 52 wherein said recursive means of said view plane subdividing means paints said subdivided areas at said predetermined degree of resolution which are significantly enclosed by said projection.

71. A system as in claim 52 wherein:
said view plane subdividing means includes means for selecting an overlay comprising a predetermined number of contiguous ones of said areas which together enclose said projection; and
said geometric comparing means performs said determination only on said areas comprising said overlay.

72. A system as in claim 71 wherein four of said contiguous areas are selected by said overlay-selecting means.

73. A system as in claim 72 wherein said view plane subdividing means subdivides said view plane into areas each of which is larger than the size of said projection.

74. A system as in claim 71 wherein said view plane subdividing means subdivides said view plane into areas each of which is larger than the size of said projection.

75. A system as in claim 52 wherein each of said plurality of discrete areas into which said view plane subdividing means subdivides said view plane is larger than the size of said projection.

76. A system as in claim 52 wherein said geometric comparing means includes means for testing said areas for intersection with a bounding box comprising a polygon of predetermined shape and orientation which is just large enough to enclose said projection.

77. A system as in claim 76 wherein said bounding box is rectangular.

78. A system as in claim 77 wherein:
said view plane is rectangular;
said view plane subdividing means subdivides said view plane into a plurality of rectangles of equal size and orientation; and
said recursive means further subdivides each of said areas into four rectangles of equal size and orientation.

79. A system as in claim 78 wherein said bounding box and said view plane areas have the same orientation.

80. A system as in claim 79 wherein:
said view plane subdividing means includes means for selecting an overlay comprising a predetermined number of contiguous ones of said areas which together enclose said projection; and
said geometric comparing means performs said test and said determination only on said areas comprising said overlay.

81. A system as in claim 80 wherein four of said contiguous areas are selected by said overlay-selecting means.

82. A system as in claim 81 wherein said view plane subdividing means subdivides said view plane into areas each of which is larger than the size of said projection.

83. A method as in claim 52 wherein said geometric processing and projecting means includes:
means for retaining data defining the size and orientation of said projection of larger-sized volumes in said three-dimensional universe; and
means for processing said retained data to obtain the size and orientation of the projection of smaller-sized volumes in said three-dimensional universe.

84. A system as in claim 83 wherein said means for processing said retained data comprises:
shift registers;
arithmetic adders; and
digital logic gates.

85. A system as in claim 83 wherein said means for retaining data comprises a stack.

86. A system as in claim 52 further including means for defining a region of said three-dimensional universe and wherein said object node processing means only visits volumes contained within said region.

87. A system as in claim 86 wherein said region-defining means includes means for defining at least one surface having a location and orientation which is selected by a user.

88. A system as in claim 86 wherein said said region-defining means includes means for defining at least one pair of parallel planes.

89. A system as in claim 52 wherein said display means includes:
an electronic display; and
means for modifying the intensity of pixels on said electronic display, each of said pixels corresponding to said subdivided area of said view plane at said predetermined degree of resolution.

90. A system as in claim 89 wherein said intensity-modifying means includes frame buffer means for storing said modified intensity of each of said pixels.

91. A system for generating a two-dimensional image of a three-dimensional object volumetrically defined within a three-dimensional universe the volume of which has been subdivided into a plurality of volumetric subdivisions, said system comprising:
memory means for storing signals representing said volumetric subdivisions;
node processing means, coupled to said memory means and connected to receive an externally-generated signal representing a random selected viewing direction, for projecting said subdivisions of said three-dimensional universe which are contained by said object onto a two-dimensional, mathematically-defined view plane and an order and in a direction responsive to said selected viewing direction;

window geometry processing means for progressively subdividing the area of said view plane into subdivisions of discrete areas;

geometric comparing means coupled to said window geometry processing means and said node processing means for determining which of the view plane area subdivisions are enclosed by said projections of said volumetric subdivisions of said three-dimensional universe;

view plane memory means coupled to said geometric comparing means and said window geometry processing means for storing data representing the view plane subdivisions determined by said geometric comparing means to be enclosed by said projections; and means coupled to said view plane memory means for displaying said painted view plane areas.

92. A system as in claim 91 wherein said node processing means, window geometry processing means and geometric comparing means each consist of a plurality of hard-wired digital logic elements.

93. A system as in claim 91 wherein said, node processing means, window processing means and geometric comparing means together form a hard-wired finite-state sequential digital logic circuit.

94. A system for generating on a display a two-dimensional image of a three-dimensional scene including at least one object volumetrically defined within a three-dimensional universe the volume of which is subdivided into a plurality of volumetric subdivisions, said system comprising:

means for projecting said volumetric subdivisions of said three-dimensional universe which are contained by said object onto a view plane in a predetermined order wherein volumetric subdivisions not visually obstructed from a predetermined view point by other volumetric subdivisions containing said object are projected before said other volumetric subdivisions;

means for progressively subdividing the area of a view plane into subdivisions;

means operatively connected to said projecting means and said progressively subdividing means for determining, for each of said projections, which of the view plane areas are enclosed by the projections; and image forming means operatively connected to said determining means for setting the intensity of areas of a display corresponding to said view plane subdivisions determined by said determining means to be enclosed by projections, the intensity of each of said display areas being set only once.

95. A system as in claim 94 wherein said projecting means, progressively subdividing means, determining means and image forming means each comprise a plurality of hard-wired digital logic elements.

96. A system as in claim 94 wherein said projecting means, progressively subdividing means, determining means and image forming means together comprise a hard-wired finite-state sequential digital logic circuit.

97. A system for generating a two-dimensional image display of a three-dimensional scene comprising at least one object volumetrically defined within a three-dimensional universe, the volume of said universe being subdivided into a plurality of volumetric subdivisions, said system comprising:

interactive means for defining a subset of the volume of said three-dimensional universe in response to user interaction;

node processing means coupled to said interactive means for projecting volumetric subdivisions of said three-dimensional universe which are contained by said object and which lie within said subset onto a view plane, window geometry processing means for progressively subdividing the area of said view plane into subdivisions, geometric comparing means connected to said node processing means and said window geometry processing means for determining which of the view plane subdivisions are enclosed by said projections of said volumetric subdivisions; and window writer and displaying means operatively coupled to said geometric comparing means for displaying areas corresponding to said view plane subdivisions determined to be enclosed by said projections.

98. A system for generating indicia of a two-dimensional image of a three-dimensional object volumetrically defined within a three-dimensional universe, said universe subdivided into a hierarchy of levels, each of said levels comprising a plurality of discrete volumes, each of said volumes being characterized by the degree to which it is occupied by said object, different levels subdividing said universe into volumes of different sizes, said system including:

interactive means for selecting a point of view for viewing said object in response to user interaction;

image window processing means for establishing a two-dimensional view plane, including means for subdividing said view plane into discrete areas;

object node processing means operatively connected to said image window processing means and said interactive means, for determining a traversal sequence in response to said selected point of view, for visiting the volumes of said three-dimensional universe in said hierarchy in the order of said traversal sequence until a volume occupied by said object to a predetermined degree which is not visually obstructed from said selected point of view by any other volume in said hierarchy occupied by said object to said predetermined degree is encountered, and for subsequently visiting, in the order of said sequence, each of the volumes occupied by said object to said predetermined degree and not visually obstructed from said selected point of view by any volume in said hierarchy occupied by said object to said predetermined degree and also not earlier visited;

geometric processing and projecting means operatively coupled to said object node processing means and said interactive means for projecting each of said unobstructed volumes onto said view plane at locations and orientations determined by said selected point of view and the location of said volumes in said three-dimensional universe;

geometric comparing means operatively coupled to said image window processing means and said object node processing means for determining, for each of said projections, which of said discrete view plane areas are enclosed by said projection and which of said areas intersect but are not enclosed by said projection, and for controlling said image window processing means to recursively subdivide view plane areas determined to intersect but not to be enclosed by said projection; and window writer means operatively coupled to said geometric comparing means for producing and outputting signals representing said view plane areas determined to be both enclosed by a projection and not enclosed by the projection of a volume visited earlier in said sequence.

99. An image display processor (a) connected to receive information representing a solid object, and (b) outputting signals representing an image of said solid object, said processor comprising:

object node processing means, connected to receive said object-representing information, for progressively subdividing a three-dimensional object universe containing said object into volumetric subdivisions and for producing node property signals indicating the degree to which said volumetric subdivisions are occupied by said object;

node select logic mean, connected to receive an externally-generated signal representing a selected arbitrary point of view and also connected to receive said node property signals, for successively selecting said volumetric subdivisions in order of a sequence corresponding to said selected point of view and for producing selection signals representing said selected volumetric subdivisions;

object node geometry processing means, connected to receive said selection signals and said point of view representing signal, for generating node geometry signals representing at least one of the dimensions, the location and the orientation of said volumetric subdivisions selected by said node delect logic means as projected onto a predetermined two-dimensional view plane in accordance with said selected point of view;

image window logic means, connected to receive said selection signals, for progressively subdividing said two-dimensional view plane into area subdivisions, for selecting area subdivisions having a predetermined relationship to said projected selected volumetric subdivisions, and for generating window geometry signals representing at least one of the dimensions and the locations of said selected area subdivisions;

cycle results means, connected to receive said node geometry signals and said window geometry signals, for producing results indicating whether said selected area subdivisions are enclosed by the projections of said selected volumetric subdivisions;

window writer means, connected to receive said results and said window geometry signals, for composing an image in response to the area subdivisions determined to be enclosed by projections, and for generating and outputting signals representing said image; and sequence control means, connected to receive said results, for controlling said object node processing means, node select logic means, object node geometry processing means and image window logic means to recursively subdivide said view plane and said object universe until all volumetric subdivisions of a predetermined volume which contain a portion of said object, are not filled by said object and are not hidden from said selected point of view by other volumetric subdivisions earlier in the order of said sequence have been projected and the area subdivisions enclosed by the resulting projections have been determined.

100. A processor as in claim 99 wherein said image window logic means includes:

window overlay select logic means, connected to receive said node geometry signals, for selecting view plane area subdivisions large enough to completely enclose and corresponding in locations with the projections of said selected volumetric subdivisions and for producing window designation signals designating said selected view plane area subdivisions; and image window geometry processing means connected to receive said window designation signals for generating window geometry signals representing the dimensions and locations of said selected view plane area subdivisions.

101. A processor as in claim 100 wherein said image window logic means further includes:

image window memory means for storing a quadtree data structure representing said view plane area subdivisions; and image window packet processing means, cooperating with said window memory means and connected to receive said window results and said window designation signals, for updating said quadtree data structure stored in said window memory means in response to said results and for producing data, in response to data stored in said window memory means, representing said selected area subdivisions and/or further subdivisions thereof.

102. A processor as in claim 101 wherein:

said image memory means comprises an interleaved memory addressable to produce data representing a selected 2×2 array of contiguous view plane area subdivisions of equal size; and said window overlay select logic means is also connected to receive said node geometry signals and includes:

means for subdividing each area subdivision of a 2×2 array of contiguous view plane area subdivisions of equal size into a 2×2 array of contiguous view plane area subdivisions of equal size to thereby generate a 4×4 array of view plane area subdivisions, and means for selecting one of the sixteen possible 2×2 arrays of contiguous view plane area subdivisions within said 4×4 array in response to said node geometry signals.

103. A processor as in claim 99 wherein said cycle results means includes:

bounding box arithmetic logic means for comparing the locations of the smallest rectangles of predetermined orientation completely containing projections of said selected volumetric subdivisions with the locations of said selected view plane area subdivisions; and enclosure and intersections arithmetic logic means for comparing the locations of the projections of said selected volumetric subdivisions with the locations of said selected view plane area subdivisions.

104. A processor as in claim 99 wherein:

said processor further includes cut plane processing means, connected to receive an externally applied signal specifying a region of said object universe and also connected to receive said node select logic means selection signals, for producing a cut plane status signal indicating whether said selected volumetric subdivisions are within said region; and wherein said cycle results means is also connected to receive said status signal and conditions said results on said status signal.

105. A processor as in claim 99 further including at least one stack means for retaining information representing larger volumetric and/or area subdivisions when said sequence control means controls said object node packet processing means, node select logic means, object node geometry processing means and image window logic means to recursively subdivide said view plane and/or said object universe into smaller volumetric and area subdivisions, respectively.

106. A processor as in claim 99 further including:

object memory means for storing an octree data structure representing said subdivided object universe, said memory means including plural storage locations, each storage location containing data specifying the degree of occupancy by said object of eight contiguous parallelepipeds of similar size, shape and orientation, each storage location also containing a pointer pointing to memory storage locations containing data specifying the degree of occupancy of subdivisions of said parallelepiped; and memory address pointing means, connected between said object node processing means and said object memory means, for addressing storage locations of said object memory means representing said volumetric subdivisions, for reading the data contained in said addressed locations, and for providing said read data to said object node processing means.

107. A processor as claim 99 wheren:

said desired point of view specified by said externally-generated signal is arbitrary; and said object node geometry processing means includes:

node bounding box geometry means, connected to receive said point of view representing signal, for generating parameters specifying the locations of said volumetric subdivisions selected by said node select logic means as projected along the axis of said selected point of view onto said view plane with respect to coordinate axes of said plane, and node polygon geometry means, connected to receive said point of view representing signal, for producing parameters specifying the orientations of three of the six sides of projections of said volumetric subdivisions with respect to said view plane axes.

108. A processor as in claim 99 wherein said image window logic means is also connected to receive said results, and includes:

means for storing data representing the degree to which said area subdivisions are enclosed by said projections; and means for determining, in response to said data representing the degree of enclosure of a given area subdivision, the degree to which subdivisions of said given subdivision are enclosed by said projections.

109. A method for generating a two-dimensional image of a three-dimensional object, said method comprising:

(a) providing input data volumetrically defining said object within a three-dimensional universe;

(b) selecting a random viewing direction;

(c) determining a sequence in response to said selected viewing direction;

(d) progressively subdividing the volume of said three-dimensional universe into volumetric subdivisions;

(e) projecting said volumetric subdivisions which are contained by said object onto a view plane in the order of said sequence wherein volumetric subdivisions visually obstructing, in said selected viewing direction, other subdivisions containing said object are projected after said other subdivisions; and (f) painting areas of a display screen corresponding to said projections.

110. A system for generating a two-dimensional image of a three-dimensional object, comprising:

means for providing data volumetrically defining an object within a three-dimensional universe;

means for selecting a random viewing direction;

display means for displaying an image; and a digital signal processor connected to said data providing means, selecting means and display means and preprogrammed to perform the following functions:

determine a sequence in response to said selected viewing direction;

progressively subdivide said three-dimensional universe into volumetric subdivisions;

project said volumetric subdivisions of said three-dimensional universe which are contained by said object onto a view plane in the order of said sequence wherein volumetric subdivisions continuing said object not visually obstructed, in said selected viewing direction, by other volumetric subdivisions containing said object are projected after said other subdivisions; and vary the intensity of portions of said display means corresponding to said projections.

* * * * *